US007563849B2

(12) United States Patent
Takahashi et al.

(10) Patent No.: US 7,563,849 B2
(45) Date of Patent: Jul. 21, 2009

(54) ETHYLENE (CO) POLYMER AND ITS USE

(75) Inventors: Mamoru Takahashi, Yamaguchi (JP); Tetsuji Kasai, Yamaguchi (JP); Junji Saito, Sodegaura (JP); Naoto Matsukawa, Sodegaura (JP); Kazutaka Tsuru, Sodegaura (JP); Makoto Mitani, Sodegaura (JP); Terunori Fujita, Sodegaura (JP); Shiro Otsuzuki, Yamaguchi (JP); Tetsuhiro Matsumoto, Yamaguchi (JP); Toshiyuki Tsutsui, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 565 days.

(21) Appl. No.: 11/211,845

(22) Filed: Aug. 26, 2005

(65) Prior Publication Data

US 2006/0047096 A1 Mar. 2, 2006

Related U.S. Application Data

(62) Division of application No. 09/744,904, filed as application No. PCT/JP00/03945 on Jun. 16, 2000, now Pat. No. 7,335,716.

(30) Foreign Application Priority Data

| Jun. 17, 1999 | (JP) | ................................. 11-171099 |
| Jun. 17, 1999 | (JP) | ................................. 11-171100 |
| Jun. 17, 1999 | (JP) | ................................. 11-171101 |
| Dec. 10, 1999 | (JP) | ................................. 11-352095 |
| Dec. 10, 1999 | (JP) | ................................. 11-352096 |
| Dec. 10, 1999 | (JP) | ................................. 11-352097 |
| Apr. 18, 2000 | (JP) | ............................. 2000-122385 |
| Apr. 18, 2000 | (JP) | ............................. 2000-122386 |
| Apr. 18, 2000 | (JP) | ............................. 2000-122387 |
| Apr. 21, 2000 | (JP) | ............................. 2000-126327 |
| Apr. 21, 2000 | (JP) | ............................. 2000-126328 |
| Apr. 24, 2000 | (JP) | ............................. 2000-127665 |
| Apr. 24, 2000 | (JP) | ............................. 2000-127666 |
| Apr. 24, 2000 | (JP) | ............................. 2000-127667 |
| May 30, 2000 | (JP) | ............................. 2000-164794 |
| May 30, 2000 | (JP) | ............................. 2000-164795 |

(51) Int. Cl.
*C08F 267/04* (2006.01)
(52) U.S. Cl. .................. 525/285; 525/286; 525/293; 525/296; 525/301; 525/303; 525/309; 525/317
(58) Field of Classification Search ................ 525/285, 525/286, 293, 296, 301, 303, 309, 317
See application file for complete search history.

(56) References Cited

U.S. PATENT DOCUMENTS

| 4,071,674 A | 1/1978 | Kashiwa et al. |
| 4,438,238 A | 3/1984 | Fukushima et al. |
| 4,482,639 A | 11/1984 | Desmond et al. |
| 4,788,264 A * | 11/1988 | Ukita .......................... 525/285 |
| 5,260,384 A | 11/1993 | Morimoto et al. |
| 5,272,236 A | 12/1993 | Lai et al. |
| 5,631,069 A | 5/1997 | Wooster et al. |
| 5,693,424 A | 12/1997 | Watanabe et al. |
| 5,708,080 A | 1/1998 | Tsutsui et al. |
| 5,731,393 A | 3/1998 | Kojoh et al. |
| 5,747,620 A | 5/1998 | Machida et al. |
| 5,798,305 A | 8/1998 | Horiuchi |
| 5,837,764 A | 11/1998 | Akagawa et al. |
| 5,849,823 A | 12/1998 | Kale et al. |
| 6,096,841 A | 8/2000 | Sacchetti et al. |
| 6,153,716 A | 11/2000 | Welch et al. |
| 6,194,341 B1 | 2/2001 | Canich et al. |
| 6,294,631 B1 | 9/2001 | Brant |
| 6,297,338 B1 | 10/2001 | Cotts et al. |
| 6,309,997 B1 | 10/2001 | Fujita et al. |

FOREIGN PATENT DOCUMENTS

| CA | 987847 | 4/1976 |
| DE | 21 66 407 | 1/1974 |
| EP | 0 519 746 A1 | 12/1992 |

(Continued)

OTHER PUBLICATIONS

Malmberg, A. et al., Macromolecules, vol. 31, No. 24, 1998, pp. 8448-8454.
Brandrup, J. et al., Polymer Handbook Third Edition, John Wiley & Sons, pp. VII/1-VII/4, VII/6.
Peacock, A.J., Handbook of Polyethylene, Marcel Dekker, Inc., pp. 1-3, 38-41, 60-61, 128-137.
Gabriel, C. et al., Polymer, vol. 43, 2002, pp. 6383-6390.
Izzo, L. et al., Macromolecules, vol. 32, 1999, pp. 6913-6916.

*Primary Examiner*—Bernard Lipman
(74) *Attorney, Agent, or Firm*—Birch, Stewart, Kolasch & Birch, LLP

(57) ABSTRACT

An ethylene (co)polymer of the present invention is a (co)polymer with excellent moldability and mechanical properties and either an ethylene homopolymer or a copolymer of ethylene and an α-olefin of 4 to 20 carbon atoms. The (co)polymer has methyl branches measured by $^{13}$C-NMR less than 0.1 in number per 1,000 carbon atoms and Mw/Mn measured by GPC not lower than 1.8 and lower than 4.5. The (co)polymer is either an ethylene homopolymer or a copolymer of ethylene and an α-olefin of 3 to 20 carbon atoms. The melt tension (MT) and the swell ratio (SR) satisfy the relation; $\log(MT) > 12.9 - 7.15 \times SR$; and the intrinsic viscosity ($[\eta]$) and the melt flow rate (MFR) satisfy the relation; $[\eta] > 1.85 \times MFR^{-0.192}$ in the case of MFR<1 and the relation; $[\eta] > 1.85 \times MFR^{-0.213}$ in the case of MFR$\geq$1. Such an ethylene (co)polymer can be usable for various molding applications and especially suitable for pipes.

28 Claims, No Drawings

FOREIGN PATENT DOCUMENTS

| | | |
|---|---|---|
| EP | 0 670 337 A1 | 9/1995 |
| EP | 0 874 005 A1 | 10/1998 |
| EP | 874005 A1 | 10/1998 |
| EP | 1 013 674 A1 | 12/1999 |
| GB | 1 329 334 | 9/1973 |
| JP | 59 232134 A | 12/1984 |
| JP | 08-302083 A | 11/1996 |
| JP | 09-183816 A | 7/1997 |
| JP | 10-17617 A | 1/1998 |
| JP | 11-228635 A | 8/1999 |
| JP | 11-236410 A | 8/1999 |
| WO | WO-93/08221 | 4/1993 |
| WO | WO-95/27005 A1 | 10/1995 |
| WO | WO-00/24822 A1 | 5/2000 |

\* cited by examiner

ETHYLENE (CO) POLYMER AND ITS USE

This application is a Divisional of application Ser. No. 09/744,904 filed on Jan. 31, 2001 now U.S. Pat. No. 7,335,716 and for which priority is claimed under 35 U.S.C. § 120. Application Ser. No. 09/744,904 is the national phase of PCT International Application No. PCT/JP00/03945 filed on Jun. 16, 2000 under 35 U.S.C. § 371. The entire contents of each of the above-identified applications are hereby incorporated by reference.

TECHNICAL FIELD

The present invention relates to ethylene (co)polymer and its use and more particularly, relates to ethylene (co)polymer with excellent moldability and mechanical properties and the use of the ethylene (co) polymer.

BACKGROUND ART

Molded products of ethylene (co)polymer such as ethylene homopolymer, ethylene-α-olefin copolymer, and the likes are widely used for various kinds of purposes including, for example, blow molding products such as small containers, e.g. cosmetic bottles, detergent bottles, etc., middle size containers, e.g. petroleum cans, industrial chemical cans, etc., large size containers, e.g. automotive fuel tanks, drum cans, etc., molded pipe such as pipes for sewerage systems, pipes for water works, gas pipes, etc., and inflation films to be used for carry bags of supermarkets. The polymers to be employed as materials for various kinds of such molded products are required to have various properties.

For example, a blow molding product is produced by extruding a cylindrical melted resin (parison) from circular dies, pinching the resultant parison with molds, and blow molding for shaping by blowing compressed air. Generally, in the case where a large size container is produced by blow molding, a phenomenon of sagging down of the parison owing to the self-weight (draw down) may occur or the thickness may become uneven at the time of shaping to result in defective shape of the molded products. In order to suppress the draw down, ethylene (co)polymer with a high melt tension should be selected. On the other hand, in order to suppress the thickness unevenness of the molded products or in order to give good pinch off shape of the molded products, ethylene (co)polymer with high swell ratio should be selected. Further, high impact strength or the like is required as the demanded properties of a blow molding product, and today, toughness improvement is also demanded to improve the economical properties.

A molded pipe is required to have excellent pipe fatigue characteristics, mechanical strength, and the likes. As a test for pipe fatigue properties, practically a hot inner pressure creep test, a notched tensile creep test, a notched tensile fatigue test, etc., are performed and it is desirable for the molded pipe to have excellent properties in any of the test. Recently, toughness improvement for improvement of the economical aspects, e.g. thinning of a pipe, is being demanded and excellent moldability for saving electric power consumption is also demanded.

An inflation film is required to have thickness with little unevenness, mechanical strength, and the likes. In order to suppress unevenness of the thickness, it is necessary to improve the stability of tubular melted form (a bubble) extruded at the time of molding and for that, ethylene (co) polymer with high melt tension should be selected.

The inventors of the present invention, in consideration with conventional technology, have studied ethylene (co) polymers capable of providing molded products with excellent moldability and particularly excellent mechanical strength and found that ethylene polymers and copolymers of ethylene and an α-olefin of 4 to 20 carbon atoms scarcely containing methyl branches have excellent moldability and that molded products made of these ethylene (co)polymers especially have excellent mechanical properties.

Further, the following ethylene (co)polymers are found having excellent moldability and molded products of the ethylene (co)polymers have excellent mechanical properties; ethylene (co)polymers satisfying respectively specified relations between the melt tension and the swell ratio and between the intrinsic viscosity and the melt flow rate, ethylene (co)polymers satisfying a specified relation of the number average molecular weight, the weight average molecular weight and the Z-average molecular weight, and ethylene (co)polymers having at least 2 relative maximum values and at least 1 relative minimum value in the molecular weight distribution curve respectively having the intensity satisfying a specified relation of the intensity of the relative minimum value and the lower intensity of the relative maximum values.

Finding that compositions containing such ethylene (co) polymers also have above described properties and so do graft-modified ethylene (co)polymers produced by graft modification of such ethylene (co)polymers and compositions containing such graft-modified ethylene (co)polymers, the inventors reach the present invention.

The ethylene (co)polymers produced by conventionally known methods using a Ziegler catalyst described in Japanese Patent No. 821037, a metallocene catalyst and a chromium catalyst described in Japanese Patent Laid-Open No. 9-183816, and a constrained geometric catalyst (CGC) described in WO No. 93/08221, as well as the ethylene (co) polymers produced by a conventionally known high pressure radical catalyst method contain a relatively large number of methyl branches in a molecular chain. If methyl branches exist in ethylene (co)polymer, the methyl branches are taken in crystals and make the crystals weak and the mechanical strength is, therefore, supposed to be lowered.

In the case an ethylene homopolymer or a copolymer of ethylene and an α-olefin is produced by a conventionally known method using a catalyst such as above described catalysts, the following problems sometimes happen to occur.

In the case of using a Zieglar catalyst, it becomes a problem that the produced ethylene (co)polymer contains hard and fragile components since the ethylene (co)polymer scarcely contains α-olefin and that the produced ethylene (co)polymer contains soft and weak components since α-olefin is excessively copolymerized. The components produced by excessive copolymerization of α-olefin may be a cause of sticky properties.

In the case of using a metallocene catalyst, it becomes a problem that an ethylene (co)polymer with a remarkably high molecular weight is hardly obtained.

In the case of using a chromium catalyst, it becomes a problem that the produced ethylene (co)polymer contains branched long chains to result in narrow molecular extension and inferior mechanical strength. Also, in the case of using a chromium catalyst, it becomes a problem that the produced ethylene (co)polymer contains hard and fragile components owing to scarce content of α-olefin and that the produced ethylene (co)polymer contains soft and weak components owing to excess copolymerization of α-olefin.

In the case of using a constrained geometric catalyst, the produced ethylene (co)polymer contains branched long chains to result in narrow molecular extension and, therefore, the mechanical strength is low.

The ethylene (co)polymer produced by a conventionally known high pressure radical catalyst method contains branched long chains to result in narrow molecular extension and, therefore, the mechanical strength is low.

In the case of using a catalyst containing Ta, Nb complexes, the produced ethylene (co)polymer is a low ratio Mw/Mn of the weight average molecular weight (Mw) to the number average molecular weight (Mn) measured by GPC as molecular weight distribution indexes, so that the moldability is inferior.

DISCLOSURE OF THE INVENTION

An ethylene (co)polymer (A1) of the present invention is an ethylene homopolymer or a copolymer of ethylene and an α-olefin of 4 to 20 carbon atoms and is characterized by containing ($i_{A1}$) methyl branches less than 0.1 in number per 1,000 carbon atoms measured by $^{13}$C-NMR and having ($ii_{A1}$) Mw/Mn (Mw denotes the weight average molecular weight, Mn denotes the number average molecular weight) measured by gel permeation chromatography not lower than 1.8 and lower than 4.5.

It is preferable for the ethylene (co)polymer (A1) to satisfy at least one of the following requirements ($iii_{A1}$) to ($x_{A1}$) in addition to the above described requirements ($i_{A1}$) and ($ii_{A1}$)

($iii_{A1}$) the intrinsic viscosity measured in decalin at 135° C. is within a range of 0.2 to 18 dl/g:

($iv_{A1}$) the intrinsic viscosity ([η] (dl/g)) and the density (d (g/cm$^3$)) satisfy the following relation; d≧0.0003×[η]$^2$−0.0121×[η]+0.9874; in the case the intrinsic viscosity measured in decalin at 135° C. is 0.3 to 1.5 dl/g:

($v_{A1}$) the intrinsic viscosity ([η] (dl/g)) measured in decalin at 135° C. and the melt flow rate (MFR (g/10 minutes) measured under 2.16 kg load at 190° C. satisfy the following relations; [η]>1.85×MFR$^{−0.92}$ in the case of MFR<1 and [η]>1.85×MFR$^{−0.213}$ in the case of MFR≧1:

($vi_{A1}$) the components to be eluted at 105° C. or higher in a heating elution separation test are 5% by weight or lower in the case the comonomer content is 1.5 mole % or higher and the components to be eluted at 106° C. or higher in a heating elution separation test are 8% by weight or lower in the case the comonomer content is less than 1.5 mole %:

($vii_{A1}$) the amount of the components precipitated when the ethylene (co)polymer is dissolved in p-xylene at 130° C. and then cooled to 75° C. to precipitate dissolved components in a poor solvent is 15% by weight or lower based on the ethylene (co)polymer:

($viii_{A1}$) the decane-soluble components (W(% by weight)) at 23° C. and the density (d (g/cm$^3$)) satisfy the following relations; W<80×exp(−100×(d−0.88))+0.1 in the case MFR≧10 g/10 minutes and W<80×(MFR−9)$^{0.26}$×exp(−100×(d−0.88))+0.1 in the case MFR>10 g/10 minutes:

($ix_{A1}$) the α-olefin content (K (mole %)) and the melting point (Tm (° C.)) of the highest peak of an endothermic curve measured by a differential scanning calorimeter satisfy the following relations; Tm≦135.0−10.0K in the case K=0.1 to 1.5 mole %; Tm≦121.9−1.3K in the case K=1.5 to 5.5 mole %; and Tm≦139.7−4.5K in the case K=5.5 to 20 mole %: and ($x_{A1}$) the number of branches having a length equivalent to that of hexyl or longer measured by $^{13}$C-NMR is less than 0.1 per 1,000 of carbon atoms.

The ethylene (co)polymer (A1) is preferably ethylene-1-butene copolymer or ethylene-1-hexene copolymer.

The ethylene (co)polymer (A1) is produced by polymerization of solely ethylene or copolymerization of ethylene and an α-olefin of 4 to 20 carbon atoms in the presence of an olefin polymerization catalyst comprising, for example, (a1) a transition metal compound having the following general formula (I) and, if necessary, (b) at least one compound selected from (b-1) an organometallic compound, (b-2) an organoaluminum oxy compound, and (b-3) a compound capable of forming ion pairs by reaction on the transition metal compound.

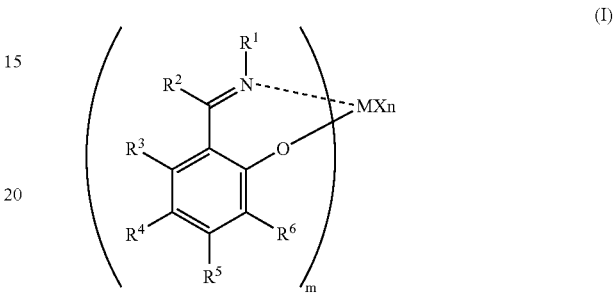

(where, M denotes a transition metal atom selected from the group IV and the group V of the periodic table; m denotes 1 or 2; $R^1$ denotes an aliphatic hydrocarbon group of 5 or more carbon atoms in total which may be substituted by aromatic hydrocarbon group or alicyclic hydrocarbon group or alicyclic hydrocarbon group of 7 or more carbon atoms in total which may be substituted by aromatic hydrocarbon group or aliphatic hydrocarbon group; $R^2$ to $R^5$ may be the same or different to one another and denote hydrogen atom, a hydrocarbon group, hydrocarbon group-substituted silyl, an oxygen-containing group, a nitrogen-containing group, or a sulfur-containing group and of which two or more group may be bonded to one another to form a ring; $R^6$ denotes a hydrocarbon group or a hydrocarbon-substituted silyl group; in the case m is 2, at least one of the groups denoted as $R^2$ to $R^6$ belonging to any one of the ligands may be bonded to at least one of the groups denoted as $R^2$ to $R^6$ belonging to another ligand; in the case m is 2, respective $R^1$, respective $R^2$, respective $R^3$, respective $R^4$ respective $R^5$, and respective $R^6$ may be the same or different to one another; n denotes a number satisfying the valence of M; X denotes hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue group, a silicon-containing group, a germanium-containing group, or a tin-containing group; in the case n is 2 or higher, X's may be the same or different to one another and X's may be bonded to one another to form a ring).

An ethylene (co)polymer (A2) of the present invention is an ethylene homopolymer or a copolymer of ethylene and an α-olefin of 4 to 20 carbon atoms and is characterized by containing ($i_{A2}$) methyl branches less than 0.1 in number per 1,000 carbon atoms measured by $^{13}$C-NMR and having ($ii_{A2}$) Mw/Mn (Mw denotes the weight average molecular weight, Mn denotes the number average molecular weight) measured by gel permeation chromatography not lower than 4.5 and not higher than 60.

It is preferable for the ethylene (co)polymer (A2) to satisfy at least one of the following requirements ($iii_{A2}$) to ($xiii_{A2}$) in addition to the above described requirements ($i_{A2}$) and ($ii_{A2}$):

($iii_{A2}$) the intrinsic viscosity measured in decalin at 135° C. is within a range of 0.2 to 18 dl/g:

($iv_{A2}$) the intrinsic viscosity ($[\eta]$ (dl/g)) measured in decalin at 135° C. and the melt flow rate (MFR (g/10 minutes) measured under 2.16 kg load at 190° C. satisfy the following relations; $[\eta]>1.85\times MFR^{-0.192}$ in the case of MFR<1 and $[\eta]>1.85\times MFR^{-0.213}$ in the case of MFR$\geq$1:

($v_{A2}$) components having a molecular weight of 500,000 reduced to polyethylene measured by GPC-IR in the components eluted at 105° C. or higher in a heating elution separation test are not more than 5% by weight:

($vi_{A2}$) the components eluted at 105° C. or higher in a heating elution separation test are not more than 5% by weight in the case the comonomer content is 1.5 mole % or higher and the components eluted at 106° C. or higher in a heating elution separation test are 8% by weight or lower in the case the comonomer content is less than 1.5 mole %:

($vii_{A2}$) the components having a molecular weight of 10,000 reduced to the polyethylene measured by GPC-IR among components precipitated, when dissolving the ethylene (co)polymer in p-xylene at 130° C. and cooling to 75° C., then precipitating the dissolved components in a poor solvent, are 30% by weight or lower:

($viii_{A2}$) the components precipitated, when dissolving the ethylene (co)polymer in p-xylene at 130° C. and cooling to 75° C., then precipitating the dissolved components in a poor solvent, are 15% or lower in the whole ethylene (co)polymer:

($ix_{A2}$) the components having a molecular weight of 10,000 reduced to the polyethylene measured by GPC-IR among components precipitated, when dissolving the ethylene (co)polymer in p-xylene at 130° C. and cooling to 75° C., then precipitating the dissolved components in a poor solvent, are 5% or lower in the whole ethylene (co)polymer:

($x_{A2}$) the decane-soluble components (W(% by weight)) at 23° C. and the density (d (g/cm$^3$)) satisfy the following relations; $W<80\times\exp(-100\times(d-0.88))+0.1$ in the case MFR$\geq$10 g/10 minutes and $W<80\times(MFR-9)^{0.26}\times\exp(-100\times(d-0.88))+0.1$ in the case MFR>10 g/10 minutes:

($xi_{A2}$) the number of branches having a length equivalent to that of hexyl or longer measured by $^{13}$C-NMR is less than 0.1 per 1,000 of carbon atoms:

($xii_{A2}$) the ratio Mw/Mn of the weight average molecular weight (Mw) and the number average molecular weight (Mn), calculated from the logarithmic normal distribution produced by distributing molecular weight distribution curves measured by gel permeation chromatography to two same logarithmic normal distribution curves, is within a range of 3 to 8: and ($xiii_{A2}$) there exist components to be eluted at 109° C. or higher in a heating elution separation test and the intrinsic viscosity ($[\eta]$ (dl/g)) measured at 135° C. in decalin and the density (d (g/cm$^3$)) of the components satisfy the following relation; $d\geq 0.0003\times[\eta]^2-0.0121\times[\eta]+0.9874$.

The ethylene (co)polymer (A2) is preferably a copolymer of ethylene and 1-butene or a copolymer of ethylene and 1-hexene.

The ethylene (co)polymer (A2) includes one which comprises (A2-1) either ethylene homopolymer or a copolymer of ethylene and an α-olefin of 4 to 20 carbon atoms having ($i_{A2-1}$) the intrinsic viscosity ($[\eta]_{A2-1}$) measured in decalin at 135° C. within a range of 0.3 to 2.5 dl/g, ($ii_{A2-1}$) the number of methyl branches measured by $^{13}$C-NMR less than 0.1 per 1,000 of carbon atoms, and ($iii_{A2-1}$) Mw/Mn (Mw denotes the weight average molecular weight, Mn denotes the number average molecular weight) measured by gel permeation chromatography within a range of 3 to 8; and (A2-2) either ethylene homopolymer or a copolymer of ethylene and an α-olefin of 4 to 20 carbon atoms having ($i_{A2-2}$) the intrinsic viscosity ($[\eta]_{A2-2}$) measured in decalin at 135° C. within a range of 2.0 to 20 dl/g and ($ii_{A2-2}$) the number of methyl branches measured by $^{13}$C-NMR less than 0.1 per 1,000 of carbon atoms, and has a relation the intrinsic viscosity ($[\eta]_{A2-1}$) of the above described ethylene (co)polymer (A2-1) and the intrinsic viscosity ($[\eta]_{A2-2}$) of the above described ethylene (co)polymer (A2-2) satisfying $[\eta]_{A2-1}<[\eta]_{A2-2}$, and contains 10 to 90 parts by weight of the above described ethylene (co)polymer (A2-1) and 10 to 90 parts by weight of the above described ethylene (co)polymer (A2-2) (wherein (A2-1)+(A2-2)=100 parts by weight).

It is preferable for the ethylene (co)polymer (A2-1) to satisfy the following relation between the intrinsic viscosity ($[\eta]$ (dl/g)) and the density (d (g/cm$^3$)); $d\geq 0.0003\times[\eta]^2-0.0121\times[\eta]+0.9874$; in the case the intrinsic viscosity measured in decalin at 135° C. is 0.3 to 1.5 dl/g.

An ethylene (co)polymer (A3) of the present invention is an ethylene homopolymer or a copolymer of ethylene and an α-olefin of 3 to 20 carbon atoms and is characterized by having ($i_{A3}$) the melt tension (MT (g)) at 190° C. and the swell ratio (SR) calculated from the strand diameter extruded at 190° C. satisfying the following relation; $\log(MT)>12.9-7.15\times SR$; and ($ii_{A3}$) the intrinsic viscosity ($[\eta]$ (dl/g)) measured in decalin at 135° C. and the melt flow rate (MFR (g/10 minutes) measured under 2.16 kg load at 190° C. satisfying the following relations; $[\eta]>1.85\times MFR^{-0.192}$ in the case of MFR<1 and $[\eta]>1.85\times MFR^{-0.213}$ in the case of MFR$\geq$1.

It is preferable for the ethylene (co)polymer (A3) to satisfy at least one of the following requirements ($iii_{A3}$) to ($v_{A3}$) in addition to the above described requirements ($i_{A3}$) and ($ii_{A3}$):

($iii_{A3}$) the weight average molecular weight (Mw) measured by gel permeation chromatography and the swell ratio (SR) calculated from the strand diameter extruded at 190° C. satisfy the following relation; $SR>4.55-0.56\times\log(Mw)$:

($iv_{A3}$) the number average molecular weight (Mn), the weight average molecular weight (Mw) and the Z average molecular weight (Mz) measured by gel permeation chromatography satisfy the following relations; $Mz/Mw\geq 7/(1-5.5/(Mw/Mn))$ and $Mw/Mn>5.5$: and ($v_{A3}$) the number of the vinyl groups at the molecular terminals, calculated by conversion to that per one molecular chain having the same molecular weight as the number average molecular weight, is 0.50 or higher.

The ethylene (co)polymer (A3) is preferably an ethylene homopolymer or a copolymer of ethylene and an α-olefin of 4 to 20 carbon atoms and is the number of methyl branches measured by $^{13}$C-NMR less than 0.1 per 1,000 of carbon atoms.

An ethylene (co)polymer (A4) of the present invention is an ethylene homopolymer or a copolymer of ethylene and an α-olefin of 3 to 20 carbon atoms and is characterized by having ($i_{A4}$) the number average molecular weight (Mn), the weight average molecular weight (Mw), and the Z average molecular weight (Mz) measured by gel permeation chromatography satisfying the following relation;

$Mz/Mw\geq 4/(0.5-4.50/((Mw/Mn)-0.2))$ and Mw/Mn>9.2.

It is preferable for the ethylene (co)polymer (A4) to satisfy the following requirements ($iii_{A4}$) and ($iv_{A4}$) or to satisfy the following requirements ($ii_{A4}$) and ($iv_{A4}$) in addition to the above described requirements ($i_{A4}$):

($ii_{A4}$) the weight average molecular weight (Mw) measured by gel permeation chromatography and the swell ratio (SR) calculated from the strand diameter extruded at 190° C. satisfy the following relation; SR>4.55−0.56×log(Mw):

($iii_{A4}$) the melt tension (MT (g)) at 190° C. and the swell ratio (SR) calculated from the strand diameter extruded at 190° C. satisfy the following relation; log(MT)>12.9−7.15× SR; and ($iv_{A4}$) the intrinsic viscosity ($[\eta]$ (dl/g)) measured in decalin at 135° C. and the melt flow rate (MFR (g/10 minutes)) measured under 2.16 kg load at 190° C. satisfy the following relations; $[\eta]>1.85 \times MFR^{-0.192}$ in the case of MFR<1 and $[\eta]>1.85 \times MFR^{-0.213}$ in the case of MFR≧1.

The ethylene (co)polymer (A4) preferably satisfies the following requirement ($v_{A4}$) in addition to the above described requirements.

($v_{A4}$) the number of the vinyl groups at the molecular terminals, calculated by conversion to that per one molecular chain having the same molecular weight as the number average molecular weight, is 0.50 or higher.

The ethylene (co)polymer (A4) is preferably an ethylene homopolymer or a copolymer of ethylene and an α-olefin of 4 to 20 carbon atoms and is the number of methyl branches measured by $^{13}$C-NMR less than 0.1 per 1,000 of carbon atoms.

An ethylene (co)polymer (A5) of the present invention is an ethylene homopolymer or a copolymer of ethylene and an α-olefin of 3 to 20 carbon atoms and is characterized by having ($i_{A5}$) at least 2 relative maximum values and at least 1 relative minimum value in the molecular weight distribution curve measured by gel permeation chromatography and the intensity ($W_1$) of the relative minimum value and the lower intensity ($W_2$) of the relative maximum values having the relative minimum value between them satisfying; $W_1/W_2<0.85$.

The ethylene (co)polymer (A5) is preferable to satisfy the following requirements ($iii_{A5}$) and ($vi_{A5}$) or to satisfy the following requirements ($ii_{A5}$) and ($vi_{A5}$) in addition to the above described requirements ($i_{A5}$):

($ii_{A5}$) the weight average molecular weight (Mw) measured by gel permeation chromatography and the swell ratio (SR) calculated from the strand diameter extruded at 190° C. satisfy the following relation; SR>4.55−0.56×log(Mw):

($iii_{A5}$) the melt tension (MT (g)) at 190° C. and the swell ratio (SR) calculated from the strand diameter extruded at 190° C. satisfy the following relation; log(MT)>12.9−7.15× SR; and ($vi_{A5}$) the intrinsic viscosity ($[\eta]$ (dl/g)) measured in decalin at 135° C. and the melt flow rate (MFR (g/10 minutes)) measured under 2.16 kg load at 190° C. satisfy the following relations; $[\eta]>1.85 \times MFR^{-0.192}$ in the case of MFR<1 and $[\eta]>1.85 \times MFR^{-0.213}$ in the case of MFR≧1.

The ethylene (co)polymer (A5) preferably satisfies the following requirement ($v_{A5}$) in addition to the above described requirements.

($v_{A5}$) the number of the vinyl groups at the molecular terminals, calculated by conversion to that per one molecular chain having the same molecular weight as the number average molecular weight, is 0.50 or higher.

The ethylene (co)polymer (A5) is preferably an ethylene homopolymer or a copolymer of ethylene and an α-olefin of 4 to 20 carbon atoms and is the number of methyl branches measured by $^{13}$C-NMR less than 0.1 per 1,000 of carbon atoms.

The ethylene (co)polymers (A1) to (A5) have excellent moldability and excellent mechanical strength.

An ethylene (co)polymer composition (C1-1) of the present invention is characterized by comprising the above described ethylene (co)polymer (A1) and an un-modified other polymer (B1).

The above described polymer (B1) is preferably an ethylene (co)polymer (B1-1) other than the ethylene (co)polymer (A1).

An ethylene (co)polymer composition (C2-1) of the present invention is characterized by comprising the above described ethylene (co)polymer (A2) and an un-modified other polymer (B2).

The above described polymer (B2) is preferably an ethylene (co)polymer (B2-1) other than the ethylene (co)polymer (A2).

An ethylene (co)polymer composition (C3-1) of the present invention is characterized by comprising the above described ethylene (co)polymer (A3) and an un-modified other polymer (B3).

The above described polymer (B3) is preferably an ethylene (co)polymer (B3-1) other than the ethylene (co)polymer (A3).

An ethylene (co)polymer composition (C4-1) of the present invention is characterized by comprising the above described ethylene (co)polymer (A4) and an un-modified other polymer (B4).

The above described polymer (B4) is preferably an ethylene (co)polymer (B4-1) other than the ethylene (co)polymer (A4).

An ethylene (co)polymer composition (C5-1) of the present invention is characterized by comprising the above described ethylene (co)polymer (A5) and an un-modified other polymer (B5).

The above described polymer (B5) is preferably an ethylene (co)polymer (B5-1) other than the ethylene (co)polymer (A5).

The ethylene (co)polymer compositions (C1-1) to (C5-1) have excellent moldability and excellent mechanical strength.

A molded product of the present invention is characterized by being made of a polymer or a composition selected from the above described ethylene (co)polymers (A1) to (A5) or the above described ethylene (co)polymer compositions (C1-1) to (C5-1).

Examples of the molded products are; a product by blow molding, a product by tubular film process, a product by casting, a product by extrusion lamination molding, a product by extrusion molding, a product by foaming, and a product by injection molding.

As the molded product, a product by blow molding, a product by extrusion molding, a product by foaming, and a product by injection molding are preferable and among them, a pipe is especially preferable.

A molded product made of polymers or compositions selected from the ethylene (co)polymers (A1) to (A5) and the ethylene (co)polymer compositions (C1-1) to (C5-1) is excellent moldability and excellent mechanical strength.

A graft-modified ethylene (co)polymer (A1-1) of the present invention is characterized by being produced by graft-modification of the above described ethylene (co)polymer (A1) having a polar group-containing monomer.

A graft-modified ethylene (co)polymer (A2-1) of the present invention is characterized by being produced by graft-modification of the above described ethylene (co)polymer (A2) having a polar group-containing monomer.

A graft-modified ethylene (co)polymer (A3-1) of the present invention is characterized by being produced by graft-modification of the above described ethylene (co)polymer (A3) having a polar group-containing monomer.

A graft-modified ethylene (co)polymer (A4-1) of the present invention is characterized by being produced by graft-modification of the above described ethylene (co)polymer (A4) having a polar group-containing monomer.

A graft-modified ethylene (co)polymer (A5-1) of the present invention is characterized by being produced by graft-modification of the above described ethylene (co)polymer (A5) having a polar group-containing monomer.

The graft-modified ethylene (co)polymers (A1-1) to (A5-1) have high adhesion strength to a material with high polarity, excellent mechanical strength, and excellent moldability in various forming and molding methods.

A graft-modified ethylene (co)polymer composition (C1-2) of the present invention is characterized by comprising the above described graft-modified ethylene (co)polymer (A1-1) and another un-modified polymer (D1).

The un-modified polymer (D1) is preferably an ethylene (co)polymer (D1-1).

A graft-modified ethylene (co)polymer composition (C2-2) of the present invention is characterized by comprising the above described graft-modified ethylene (co)polymer (A2-1) and another un-modified polymer (D2).

The un-modified polymer (D2) is preferably an ethylene (co)polymer (D2-1).

A graft-modified ethylene (co)polymer composition (C3-2) of the present invention is characterized by comprising the above described graft-modified ethylene (co)polymer (A3-1) and another un-modified polymer (D3).

The un-modified polymer (D3) is preferably an ethylene (co)polymer (D3-1).

A graft-modified ethylene (co)polymer composition (C4-2) of the present invention is characterized by comprising the above described graft-modified ethylene (co)polymer (A4-1) and another un-modified polymer (D4).

The un-modified polymer (D4) is preferably an ethylene (co)polymer (D4-1).

A graft-modified ethylene (co)polymer composition (C5-2) of the present invention is characterized by comprising the above described graft-modified ethylene (co)polymer (A5-1) and another un-modified polymer (D5).

The un-modified polymer (D5) is preferably an ethylene (co)polymer (D5-1).

The graft-modified ethylene (co)polymer compositions (C1-2) to (C5-2) have high adhesion strength to a material with high polarity, excellent mechanical strength, and excellent moldability in various forming and molding methods.

An ethylene (co)polymer composition (C1-3) of the present invention is characterized by comprising the above described ethylene (co)polymer (A1) and a graft-modified ethylene (co)polymer (E1).

An ethylene (co)polymer composition (C2-3) of the present invention is characterized by comprising the above described ethylene (co)polymer (A2) and a graft-modified ethylene (co)polymer (E2).

An ethylene (co)polymer composition (C3-3) of the present invention is characterized by comprising the above described ethylene (co)polymer (A3) and a graft-modified ethylene (co)polymer (E3).

An ethylene (co)polymer composition (C4-3) of the present invention is characterized by comprising the above described ethylene (co)polymer (A4) and a graft-modified ethylene (co)polymer (E4).

An ethylene (co)polymer composition (C5-3) of the present invention is characterized by comprising the above described ethylene (co)polymer (A5) and a graft-modified ethylene (co)polymer (E5).

The ethylene (co)polymer compositions (C1-3) to (C5-3) have high adhesion strength to a material with high polarity, excellent mechanical strength, and excellent moldability in various forming and molding methods.

BEST MODE FOR CARRYING OUT THE INVENTION

The ethylene (co)polymers of the present invention and their utilization will particularly be described below.

Ethylene (co)polymer (A1)

An ethylene (co)polymer (A1) of the present invention is an ethylene homopolymer or a random copolymer of ethylene and an α-olefin of 4 to 20 carbon atoms.

The α-olefin of 4 to 20 carbon atoms may be, for example, a straight chain or branched α-olefin of 4 to 20 carbon atoms such as 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene; and a cyclic olefin of 4 to 20 carbon atoms such as cyclopentene, cycloheptene, norbornene, 5-methyl-2-norbornene, tetracyclododecene, 2-methyl-1,4,5,8-dimethano-1,2,3,4,4a,5,8,8a-octahydronaphthalene. Among them, 1-butene and 1-hexene are preferable.

The ethylene (co)polymer (A1) contains normally 50 to 100% by weight, preferably 55 to 100% by weight, further preferably 65 to 100% by weight, and most preferably 70 to 100% by weight of a repeated unit derived from ethylene and 0 to 50% by weight, preferably 0 to 45% by weight, further preferably 0 to 35% by weight, and most preferably 0 to 30% by weight of a repeated unit derived from α-olefin of 4 to 20 carbon atoms.

The ethylene (co)polymer (A1) is ($i_{A1}$) methyl branches less than 0.1, preferably less than 0.08, in number per 1,000 carbon atoms measured by $^{13}$C-NMR.

Since such a polymer has a tough crystal structure, the polymer has excellent mechanical strength.

The ethylene (co)polymer (A1) is ($ii_{A1}$) Mw/Mn (Mw denotes the weight average molecular weight, Mn denotes the number average molecular weight) measured by gel permeation chromatography (GPC) not lower than 1.8 and lower than 4.5, preferably not lower than 2.0 and lower than 4.0.

An ethylene (co)polymer having the Mw/Mn within the above described ranges is well balanced moldability and mechanical strength.

The ethylene (co)polymer (A1) is further preferable to have Mz/Mw (Mz denotes Z average molecular weight) measured by GPC not higher than Mw/Mn.

It is preferable for the ethylene (co)polymer (A1) to satisfy at least one of the following requirements ($iii_{A1}$) to ($x_{A1}$) in addition to the above described requirements ($i_{A1}$) and ($ii_{A1}$).

($iii_{A1}$) the intrinsic viscosity measured in decalin at 135° C. is within a range of 0.2 to 18 dl/g, preferably 0.5 to 15 dl/g, further preferably 0.8 to 10 dl/g, furthermore preferably 1.0 to 8 dl/g, and most preferably 1.7 to 7.5 dl/g.

An ethylene (co)polymer having the intrinsic viscosity lower than the above described ranges is insufficient strength since the crystal is weak and an ethylene (co)polymer having the intrinsic viscosity higher than the above described ranges is sometimes provided with insufficient rigidity or sometimes becomes difficult to be molded.

($iv_{A1}$) The intrinsic viscosity ([η] (dl/g)) and the density (d (g/cm$^3$)) satisfy the relation; $d \geq 0.0003 \times [\eta]^2 - 0.0121 \times [\eta] + 0.9874$, preferably $d \geq 0.0010 \times [\eta]^2 - 0.0145 \times [\eta] + 0.9900$; in the case the intrinsic viscosity measured in decalin at 135° C. is 0.3 to 1.5 dl/g, preferably 0.4 to 1.0 dl/g, and further preferably 0.5 to 0.9 dl/g.

An ethylene (co)polymer having the intrinsic viscosity and the density satisfying the above described relation is especially excellent in rigidity.

($v_{A1}$) The intrinsic viscosity ([η] (dl/g)) measured in decalin at 135° C. and the melt flow rate (MFR (g/10 minutes)) measured under 2.16 kg load at 190° C. satisfy the relations; $[\eta] > 1.85 \times MFR^{-0.192}$, preferably $[\eta] > 1.95 \times MFR^{-0.192}$, in the case of MFR<1 and $[\eta] > 1.85 \times MFR^{-0.213}$, preferably $[\eta] > 1.95 \times MFR^{-0.213}$, in the case of MFR≧1.

An ethylene (co)polymer having the intrinsic viscosity and MFR satisfying the above described relations is characterized by, for example, excellent mechanical strength of a molded product.

($vi_{A1}$) The components to be eluted at 105° C. or higher in a heating elution separation test are normally 5% by weight or lower, preferably 4% by weight or lower, in the case the comonomer content is 1.5 mole % or higher and the components to be eluted at 106° C. or higher in a heating elution separation test are normally 8% by weight or lower, preferably 7% by weight or lower, in the case the comonomer content is less than 1.5 mole %, preferably not less than 0.4 mole % and less than 1.5 mole %.

An ethylene (co)polymer satisfying the above described requirements contains a few ethylene homopolymer components and is excellent mechanical strength.

($vii_{A1}$) The components precipitated, when the ethylene (co)polymer is dissolved in p-xylene at 130° C. and then cooled to 75° C. to precipitate dissolved components in a poor solvent, is 15% by weight or lower based on the ethylene (co)polymer. It is preferable to satisfy the above described requirement in the case the comonomer content of the ethylene (co)polymer is 0.8 to 2.0 mole %.

The ethylene (co)polymer (A1) satisfying the above described requirements contains a few components having a large quantity of comonomers and is excellent mechanical strength.

($viii_{A1}$) The decane-soluble components (W (% by weight)) at 23° C. and the density (d (g/cm$^3$)) satisfy the following relations; $W<80 \times exp(-100 \times (d-0.88))+0.1$, preferably $W<60 \times exp(-100 \times (d-0.88))+0.1$, in the case MFR≦10 g/10 minutes and $W<80 \times (MFR-9)^{0.26} \times exp(-100 \times (d-0.88))+0.1$ in the case MFR>10 g/10 minutes.

The ethylene (co)polymer satisfying the above described requirements is excellent mechanical strength and is scarcely sticky.

($ix_{A1}$) The α-olefin content (K (mole %)) and the melting point (Tm (° C.)) of the highest peak of an endothermic curve measured by a differential scanning calorimeter satisfy the following relations; Tm≦135.0-10.0K, preferably Tm≦135.0-10.7K, in the case K=0.1 to 1.5 mole %; Tm≦121.9-1.3K, preferably Tm≦120.5-K in the case K=1.5 to 5.5 mole %; and Tm≦139.7-4.5K, preferably Tm≦145.3-5.5K, in the case K=5.5 to 20 mole %.

The ethylene (co)polymer satisfying the above described requirements is a narrow composition distribution and is excellent in mechanical strength, heat seal property, and the likes.

($x_{A1}$) The number of branches having a length equivalent to that of hexyl or longer measured by $^{13}$C-NMR is less than 0.1, preferably less than 0.03, per 1,000 of carbon atoms.

In the case long chain branches exist, the branches are detected as hexyl or higher groups and in that case, the mechanical strength is lowered. The ethylene (co)polymer satisfying the above described requirements, therefore, is excellent in mechanical strength.

The methods for measuring above described respective physical properties will be described later.

Production Method of the Ethylene (co)polymer (A1)

The above described ethylene (co)polymer (A1) can be produced by polymerizing solely ethylene or copolymerizing ethylene and an α-olefin of 4 to 20 carbon atoms in the presence of, for example, an olefin polymerization catalyst described below.

The word, 'polymerization', appearing in the present detailed description may be used for meaning not only homopolymerization but also copolymerization.

An olefin polymerization catalyst to be employed for an ethylene (co)polymer (A1) of the present invention comprises (a1) a transition metal compound having a general formula (I) described below and, if necessary, (b) at least one of compounds selected from (b-1) an organometallic compound, (b-2) an organoaluminum oxy compound, and (b-3) a compound capable of forming ion pairs by reaction on the transition metal compound.

The respective catalyst components constituting such an olefin polymerization catalyst will be described below.

(a1) A Transition Metal Compound

The transition metal compound (a1) is described as the general formula (I) below.

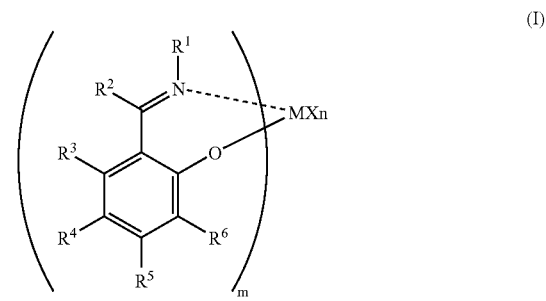

(I)

Where, M denotes a transition metal atom selected from the group IV and the group V of the periodic table and particularly titanium, zirconium, hafnium, vanadium, niobium, tantalum, and so forth, preferably titanium, zirconium, and hafnium, and especially preferably zirconium.

N . . . M generally means coordination and in the present invention, it does not necessarily mean coordination.

R$^1$ denotes an aliphatic hydrocarbon group of 5 or more carbon atoms in total, preferably 5 to 30 carbon atoms, which may be substituted by an aromatic hydrocarbon group or alicyclic hydrocarbon group or denotes an alicyclic hydrocarbon group of 7 or more carbon atoms in total, preferably 7 to 30 carbon atoms, which may be substituted by aromatic hydrocarbon group or alicyclic hydrocarbon group.

Examples of the aliphatic hydrocarbon groups are those having 1 to 30 carbon atoms, preferably those having 4 to 30 carbon atoms, and more preferably those having 5 to 30 carbon atoms.

In more detail, preferable are methyl, ethyl, n-propyl, isopropyl, n-butyl, isobutyl, sec-butyl, tert-butyl, n-pentyl, tert-amyl, 1,2-dimethylpropyl, 1-ethylpropyl, isoamyl, 1-methylbutyl, 2-methylbutyl, neopentyl, n-hexyl, 1,3-dimethylbutyl, 3,3-dimethylbutyl, n-heptyl, 1-ethylpenty, 1-methylhexyl, n-octyl, 1,5-dimethylhexyl, 2-ethylhexyl, 1-methylheptyl, tert-octyl, n-nonyl, n-decyl, n-undecyl, n-dodecyl, n-tridecyl, n-tetradecyl, n-petntadecyl, n-hexadecyl, n-heptadecyl, and n-octadecyl. Of these, especially preferable are n-pentyl, tert-amyl, 1,2-dimethylpropyl, 1-ethylpropyl, isoamyl, 1-methylbutyl, 2-methylbutyl, neopentyl, n-hexyl, 1,3-dimethylbutyl, 3,3-dimethylbuty, n-heptyl, 1-ethylpentyl, 1-methylhexyl, n-octyl, 1,5-dimethylhexyl, 2-ethylhexyl, 1-methylheptyl, tert-octyl, n-nonyl, n-decyl, n-undecyl, n-dodcyl, n-tridecyl, n-tetradecyl, n-pentadecyl, n-hexadecyl, n-heptadecyl and n-octadecyl.

The aliphatic hydrocarbon groups may be substituted by aromatic hydrocarbon groups or alicyclic hydrocarbon groups.

Examples of the aliphatic hydrocarbon groups substituted by aromatic hydrocarbon groups or alicyclic carbon groups include groups having 4 to 30 carbon atoms, such as benzyl, methylenenaphthyl, metylenefluorenyl, methyleneanthranyl, methylenecyclopropyl, methylenecyclobutyl, methylenecyclopentyl, methylenecyclohexyl, methylene-2-methylcyclohexyl, methylene-2,3-dimethylcyclohexyl, methylene-2,2-dimethylcyclohexyl, methylene-2,6-dimethylcyclohexyl, methylene-2,2,6,6-tetramethylcyclohexyl, methyleneadamantyl, methylenecyclopropylmethyl, methylenecyclobutylmethyl and methylenecyclopentylmethyl. Among these, preferably used are groups having 5 to 30 carbon atoms, such as benzyl, methylenenaphthyl, methylenefluorenyl, methyleneanthranyl, methylenecyclobuty, methylenecyclopentyl, methylenecyclohexyl, methylene-2-methylcyclohexyl, methylene-2,3-dimethylcyclohexyl, methylene-2,2-dimethylcyclohexyl, methylene-2,6-dimethylcyclohexyl, methylene-2,2,6,6-tetramethylcyclohexyl, methyleneadamantyl, methylenecyclopropylmethyl, methylenecyclobutylmethyl and methylenecyclopentylmethyl.

The alicyclic hydrocarbon groups include, for example, groups having 3 to 30 carbon atoms, and groups having 7 to 30 carbon atoms are preferable; in more detail, cyclopropyl, cyclobutyl, cyclopentyl, cyclohexyl, adamantyl and norbornyl.

The alicyclic hydrocarbon groups may contain aromatic hydrocarbon groups or alicyclic hydrocarbon groups as substituents. Examples of the alicyclic hydrocarbon groups having aromatic hydrocabon groups or alicyclic hydrocabon groups as substituents include groups having 7 to 30 carbon atoms, such as 2-methylcyclohexyl, 2,3-dimethylcyclohexyl, 2,2-dimethylcyclohexyl, 2,6-dimethylcyclohexyl, 2,2,6,6-tetramethylcyclohexyl, cyclopropylmethyl, cyclobutylmethyl, cyclpentylmethyl, cyclopropylphenyl, cyclobutylphenyl, cyclpentylphenyl and cyclohexylphenyl.

The aliphatic hydrocarbon group in the definition of $R^1$ means the carbon atom directly bonded to nitrogen of the above described general formula (I) is a constituent of an aliphatic skeleton even in the case the group have aromatic hydrocarbon group or alicyclic hydrocarbon group substituents and the alicyclic hydrocarbon group in the definition means the carbon atom directly bonded to nitrogen of the above described general formula (I) is a constituent of an alicyclic skeleton even in the case the group have aromatic hydrocarbon group or aliphatic hydrocarbon group substitutents.

$R^2$ to $R^5$ may be the same or different to one another and denote hydrogen atom, a hydrocarbon group, hydrocarbon group-substituted silyl, an oxygen-containing group, a nitrogen-containing group, or a sulfur-containing group.

As the hydrocarbon group, the following are exampls; a straight chain or branched alkyl group of 1 to 30, preferably 1 to 20 carbon atoms such as methyl, ethyl, n-propyl, isopropyl, n-butyl, isobutyl, sec-butyl, tert-butyl, neopentyl, n-hexyl, or the like; a straight chain or branched alkenyl group of 2 to 30, preferably 2 to 20 carbon atoms such as vinyl, allyl, isopropenyl, or the like; a straight chain or branched alkynyl group of 2 to 30, preferably 2 to 20 carbon atoms such as ethynyl, propargyl, or the like: a cyclic saturated hydrocarbon group of 3 to 30, preferably 3 to 20 carbon atoms such as cyclopropyl, cyclobutyl, cyclopentyl, cyclohexyl, adamantyl, or the like; a cyclic unsaturated hydrocarbon group of 5 to 30 carbon atoms such as cyclopentadienyl, indenyl, fluorenyl, or the like; an aryl group of 6 to 30, preferably 6 to 20 carbon atoms such as phenyl, benzyl, naphthyl, biphenylyl, terphenylyl, phenanthryl, anthryl, or the like; and an alkyl-substituted aryl group such as tolyl, iso-propylphenyl, tert-butylphenyl, dimethylphenyl, di-tert-butylphenyl, or the like.

The above described hydrocarbon groups may be substituted by halogens and as a halogen-substituted hydrocarbon group, a halogenated hydrocarbon group of 1 to 30, preferably 1 to 20 carbon atoms such as trifluoromethyl, pentafluorophenyl, chlorophenyl, or the like is an example.

Further, the above described hydrocarbon groups may have other hydrocarbon group substituents and examples of the hydrocarbon group substituted hydrocarbon groups are aryl-substituted alkyl groups such as benzyl, cumyl, or the like.

Among them, the following are especially preferable; a straight chain or branched alkyl group of 1 to 30, preferably 1 to 20 carbon atoms such as methyl, ethyl, n-propyl, isopropyl, n-butyl, isobutyl, sec-butyl, tert-butyl, neopentyl, n-hexyl, or the like; an aryl group of 6 to 30, preferably 6 to 20 carbon atoms such as phenyl, naphthyl, biphenylyl, terphenylyl, phenanthryl, anthryl, or the like; and a substituted aryl group of these aryl groups having 1 to 5 substituents such as halogen atoms, alkyl groups of 1 to 30, preferably 1 to 20 carbon atoms, alkoxyl groups of 1 to 30, preferably 1 to 20 carbon atoms, aryl groups of 6 to 30, preferably 6 to 20 carbon atoms, and aryloxy groups of 6 to 30, preferably 6 to 20 carbon atoms.

As the hydrocarbon-substituted silyl group, the following are examples; hydrocarbon-substituted silyl groups such as methylsilyl, dimethylsilyl, trimethylsilyl, ethylsilyl, diethylsilyl, triethylsilyl, tripropylsilyl, tricyclohexylsilyl, phenylsilyl, diphenylsilyl, triphenylsilyl, dimethyl-tert-butylsilyl, dimethylphenylsilyl, methyldiphenylsilyl, tritolylsilyl, trinaphthylsilyl, dimethyl(pentafluorophenyl)silyl. Among them, methylsilyl, dimethylsilyl, trimethylsilyl, ethylsilyl, diethylsilyl, triethylsilyl, dimethylphenylsilyl, and triphenylsilyl are preferable, and trimethylsilyl, triethylsilyl, triphenylsilyl, and dimethylphenylsilyl are especially preferable.

The oxygen-containing group is a group containing 1 to 5 oxygen atoms in the group. Examples of the oxygen-containing groups are; hydroxyl group, alkoxyl group, aryloxyl group, arylalkoxyl group, acetoxyl group, carbonyl group, ester group, ether group, acyl group, carboxyl group, carbonato group, peroxy group, carboxylic anhydride group, and the likes and hydroxy group, alkoxy group, aryloxy group, arylalkoxy group, acetoxy group, carbonyl group, are preferable. As a preferable oxygen-containing group, the following are examples; hydroxyl; alkoxyl group such as methoxyl, ethoxyl, n-propoxyl, isopropoxyl, n-butoxyl, isobutoxyl, tert-butoxyl, and the likes; aryloxyl group such as phenoxyl, methylphenoxyl, 2,6-dimethylphenoxyl, 2,4,6-trimethylphenoxyl, naphthoxyl, and the likes; arylalkoxyl group such as phenylmethoxyl, phenylethoxyl, and the likes; acetoxyl; carbonyl; and the likes. In the case the oxygen-containing group contains carbon atoms, the number of carbon atoms is preferably within 1 to 30, more preferably within 1 to 20.

The nitrogen-containing group is a group containing 1 to 5 nitrogen atoms in the group. Examples of the nitrogen-containing groups are; amino group, imino group, amido group, imido group, nitro group, hydrazino group, hydrazono group, nitroso group, cyano group, isocyano group, cyanic acid ester group, amidino group, diazo group, amino group in ammonium salt form, and amino group, imino group, amido group, imido group, and nitro group are preferable. As a preferable nitrogen-containing group, the following are examples; amino group such as methylamino, dimethylamino, diethylamino, dipropylamino, dibutylamino, dicyclohexylamino, phenylamino, diphenylamino, ditolylamino dinaphthylamino, methylphenylamino; imino group such as methylimino, ethylimino, propylimino, butylimino, and phenylimino; amido group such as acetamido, N-methylacetamido, and N-methylbenzamido; imido group such as acetimido and benzimido; and nitro group. In the case the nitrogen-containing group contains carbon atoms, the number of carbon atoms is preferably within 1 to 30, more preferably within 1 to 20.

The sulfur-containing group is a group containing 1 to 5 sulfur atoms in the group. Examples of the sulfur-containing groups are; sulfonate group, sulfinate group, alkylthio group, arylthio group, mercapto group, thio ester group, dithio ester group, thioacyl group, thio ether group, thiocyanic acid ester group, isothiocyanic acid ester group, sulfone ester group, sulfonamido group, thiocarboxyl group, dithiocarboxyl group, sulfo group, sulfonyl group, sulfinyl group, and sulfenyl group, and sulfonate group, sulfinate group, alkylthio group, and arylthio group are preferable. As the preferable sulfur-containing group, the following are examples; sulfonate group such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate, pentafluorobenzenesulfonate; sulfinate group such as methylsulfinate, phenylsulfinate, benzylsulfinate, p-toluenesulfinate, trimethylbenzenesulfinate, and pentafluorobenzenesulfinate; alkylthio group such as methylthio and ethylthio; and arylthio group such as phenylthio, methylphenylthio, and naphthylthio. In the case the sulfur-containing group contains carbon atoms, the number of carbon atoms is preferably within 1 to 30, more preferably within 1 to 20.

$R^6$ denotes a hydrocarbon group or a hydrocarbon-substituted silyl group and similar groups exemplified for the above described $R^2$ and $R^5$ are definite examples.

Regarding the above described substituents, more concrete description will be given.

As $R^4$, hydrocarbon-substituted silyl group, an oxygen-containing group, a nitrogen-containing group, or a sulfur-containing group are preferable; and an oxygen-containing group such as alkoxy group, aryloxy group, and hydroxy group, a nitrogen-containing group such as amino group, imino group, amido group, imido group, and nitro group, and a sulfur-containing group such as alkylthio group and arylthio group are more preferable; and alkoxy group, aryloxy group, and amino group are furthermore preferable; and alkoxy group is especially preferable.

A preferable hydrocarbon group for $R^6$ is a straight chain or branched alkyl group of 1 to 30, preferably 1 to 20 carbon atoms such as methyl, ethyl, n-propyl, isopropyl, n-butyl, isobutyl, sec-butyl, tert-butyl, neopentyl, and n-hexyl; a cyclic saturated hydrocarbon group of 3 to 30, preferably 3 to 20 carbon atoms such as cyclopropyl, cyclobutyl, cyclopentyl, cyclohexyl, and adamantyl; aryl group of 6 to 30, preferably 6 to 20 carbon atoms such as phenyl, benzyl, naphthyl, biphenylyl, and triphenylyl; and these groups having alkyl group of 1 to 30, preferably 1 to 20 carbon atoms and aryl group of 6 to 30, preferably 6 to 20 carbon atoms as substituent groups.

A preferable hydrocarbon-substituted silyl group for $R^6$ is methylsilyl, dimethylsilyl, trimethylsilyl, ethylsilyl, diethylsilyl, triethylsilyl, diphenylmethylsilyl, triphenylsilyl, dimethylphenylsilyl, dimethyl-tert-butylsilyl, and dimethyl(pentafluorophenyl)silyl. Especially preferable groups are trimethylsilyl, triethylphenylsilyl, diphenylmethylsilyl, isophenylsilyl, dimethylphenylsilyl, dimethyl-tert-butylsilyl, and dimethyl(pentafluorophenyl)silyl.

A group selected from the following groups is especially preferable for $R^6$; branched alkyl group of 3 to 30, preferably 3 to 20 carbon atoms such as isopropyl, isobutyl, sec-butyl, tert-butyl, and neopentyl; a group (e.g. cumyl group and the likes) obtained by substituting hydrogen atoms of these groups by aryl group of 6 to 30, preferably 6 to 20 carbon atoms; and cyclic saturated hydrocarbon group of 3 to 30, preferably 3 to 20 carbon atoms such as adamantyl, cyclopropyl, cyclobutyl, cyclopentyl, and cyclohexyl, and the likes. Further, aryl group of 6 to 30, preferably 6 to 20 carbon atoms such as phenyl, naphthyl, fluorenyl, anthranyl, phenanthryl, and the like and hydrocarbon-substituted silyl group are also preferable.

Two or more groups of $R^2$ to $R^6$, preferably neighboring groups, may be bonded to form an alicyclic group, aromatic ring, or a hydrocarbon ring containing hetero atoms such as nitrogen atom and these rings may further have substituents.

m denotes 1 or 2 and is preferably 2.

In the case m is 2, at least one of the groups denoted as $R^2$ to $R^6$ belonging to any one of the ligands may be bonded to at least one of the groups denoted as $R^2$ to $R^6$ belonging to another ligand; and also in the case m is 2, respective $R^1$, respective $R^2$, respective $R^3$, respective $R^4$, respective $R^5$, and respective $R^6$ may be the same or different to one another.

n denotes a number satisfying the valence of M and is particularly an integer from 2 to 4 and preferably 2.

X denotes hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue group, a silicon-containing group, a germanium-containing group, or a tin-containing group.

As the hydrocarbon group, the oxygen-containing group, and the sulfur-containing group, groups similar to those exemplified for $R^2$ to $R^6$ can be exemplified. The oxygen-containing group and the sulfur-containing group, however, do not include heterocyclic compound residues.

The halogen atoms include fluorine, chlorine, bromine, and iodine.

As the nitrogen-containing group, the following are definite groups; amino group; alkylamino group such as methylamino, dimethylamino, diethylamino, dipropylamino, dibutylamino, dicyclohexylamino, and the likes; and arylamino or alkylarylamino group such as phenylamino, diphenylamino, ditolylamino, dinaphthylamino, methylphenylamino, and the likes.

The boron-containing group is a group containing 1 to 5 boron atoms in the group and does not include heterocyclic compound residues to be described below. Examples of the boron-containing groups, are; borandiyl group, borantriyl group, diboranyl group, and $BR_4$ (R denotes hydrogen, alkyl group, (substituted) aryl group, a halogen atom, and the likes).

The aluminum-containing group is a group containing 1 to 5 aluminum atoms in the group. Examples of the aluminum-containing groups are a hydrocarbon group of 1 to 30, preferably 1 to 20 carbon atoms having one or two substituents and $AlR_4$ (R denotes hydrogen, alkyl group, (substituted) aryl group, a halogen atom, and the likes).

The phosphorus-containing group is a group containing 1 to 5 phosphorus atoms in the group and does not include heterocyclic compound residues to be described below. Examples of the phosphorus-containing groups are; phosphoryl group, thiophosphoryl group, phosphine group, phosphite group, phosphonic acid group, phosphinic acid group, and the likes and phosphine group, phosphite group, phosphonic acid group, and phosphinic acid group are preferable. As a preferable phosphorus-containing group, the following are definite groups; trialkylphosphine group such as trimethylphosphine, tributylphosphine, and tricyclohexylphosphine; triarylphosphine group such as triphenylphosphine and tritolylphosphine; phosphite group (phosphide group) such as methylphosphite, ethylphosphite and phenylphosphite; phosphonic acid group; and phosphinic acid group.

As a halogen-containing group, groups containing at least one of fluorine, chlorine, bromine, and iodine are included. Definite groups as the halogen-containing group are fluorine-containing groups such as PF6, $BF_4$, chlorine-containing groups such as $ClO_4$, $SbCl_6$, and iodine-containing groups such as $IO_4$.

The heterocyclic compound residue is a group containing one or more hetero atoms in the ring structure and the hetero atoms include oxygen, nitrogen, sulfur, phosphorus, and boron. As the ring structure, rings of 3 to 18 members, preferably 4 to 7 members, and more preferably 5 to 6 members are included. Particularly, the following are included; nitrogen-containing compound residues such as pyrrole, pyridine, pyrimidine, quinoline, and triazine; oxygen-containing compound residues such as furan and pyran; and sulfur-containing compound residues such as thiophene; and further the groups obtained by substituting these heterocyclic compound residues by substituents groups such as alkyl group of 1 to 30, preferably 1 to 20 carbon atoms and alkoxy group of 1 to 30, preferably 1 to 20 carbon atoms.

The silicon-containing group is a group containing 1 to 5 silicon atoms in the group. As the silicon-containing group, the following are included; silyl group, siloxy group, hydrocarbon-substituted silyl group, hydrocarbon-substituted siloxy group, hydrocarbon-substituted silyl ether group, silicon-substituted alkyl group, and silicon-substituted aryl group: and hydrocarbon-substituted silyl group, hydrocarbon-substituted silyl ether group, silicon-substituted alkyl group, and silicon-substituted aryl group are preferable. As the preferable silicon-containing group, the following are definite groups; hydrocarbon-substituted silyl group such as methylsilyl, dimethylsilyl, trimethylsilyl, ethylsilyl, diethylsilyl, triethylsilyl, tripropylsilyl, tricyclohexylsilyl, phenylsilyl, diphenylsilyl, triphenylsilyl, dimethyl-tert-butylsilyl, dimethylphenylsilyl, methyldiphenylsilyl, tritolylsilyl, trinaphthylsilyl, dimethyl(pentafluorophenyl)silyl; hydrocarbon-substituted silyl ether group such as trimethylsilyl ether; silicon-substituted alkyl group such as trimethylsilylmethyl; and silicon-substituted aryl group such as trimethylsilylphenyl: and hydrocarbon-substituted silyl group is especially preferable. Among the hydrocarbon-substituted silyl group, methylsilyl, dimethylsilyl, trimethylsilyl, ethylsilyl, diethylsilyl, triethylsilyl, dimethylphenylsilyl, and triphenylsilyl are preferable and trimethylsilyl, triethylsilyl, triphenylsilyl and dimethylphenylsilyl are especially preferable. In the case the silicon-containing group contains carbon atoms, the number of carbon atoms is preferably within a range 1 to 30 and more preferably within a range 1 to 20.

As the germanium-containing group, groups obtained by substituting silicon of above described silicon-containing groups by germanium are definite groups.

As the tin-containing group, groups obtained by substituting silicon of above described silicon-containing groups by tin are definite groups.

X of them is preferably hydrogen atom, halogen atom, hydrocarbon, oxygen-containing group, and nitrogen-containing group and more preferably hydrogen atom, halogen atom, and hydrocarbon group. Additionally, in the case n denotes 2 or higher number, X's may be the same or different to one another and X's may be bonded to one another to form a ring.

Definite compounds of the above described transition metal compound having the defined general formula (I) will be illustrated below and no need to say, the transition metal compound is not limited to those compounds.

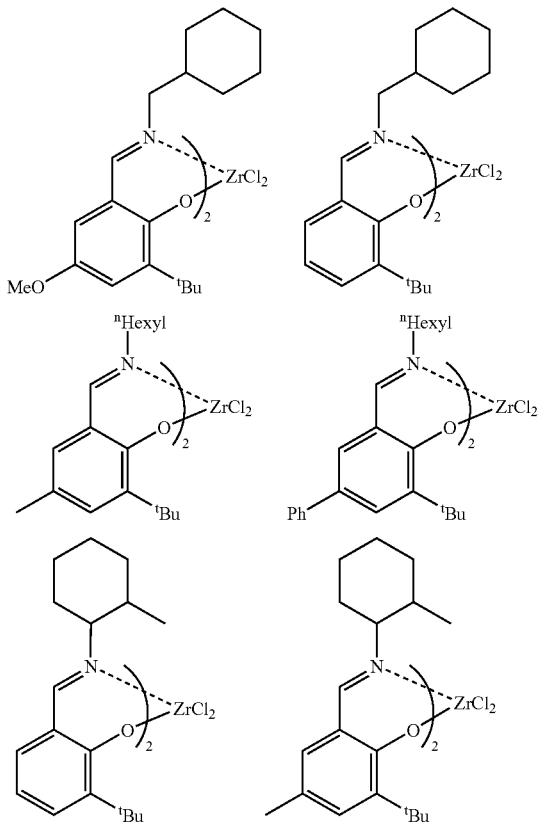

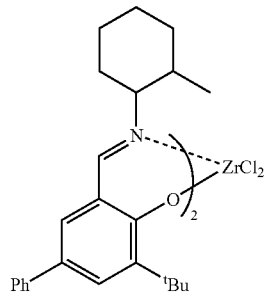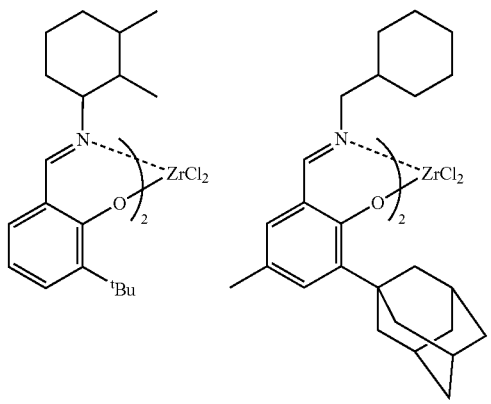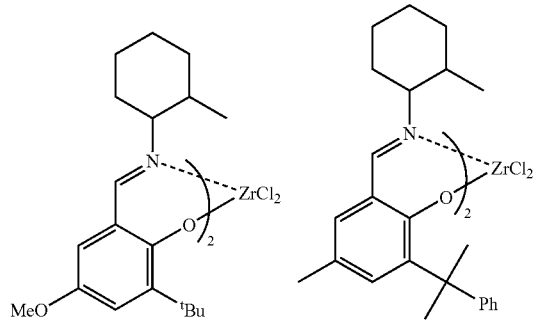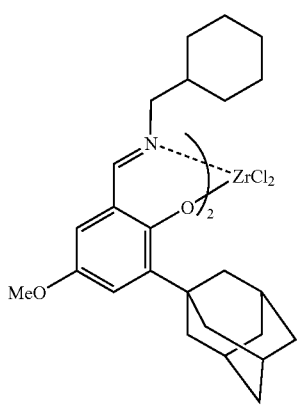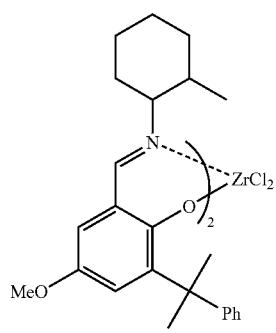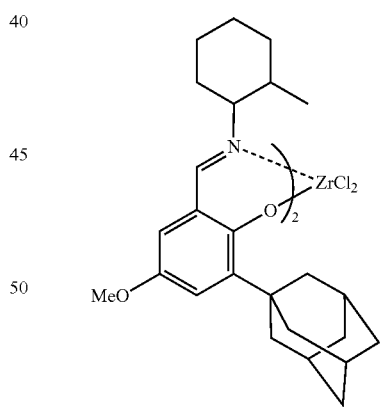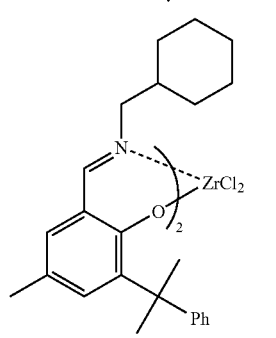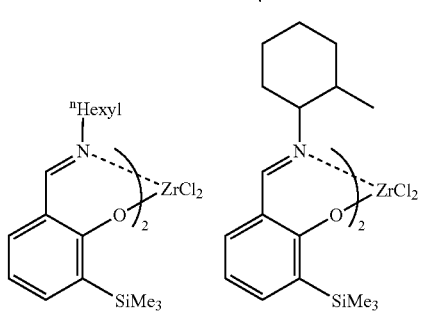

-continued
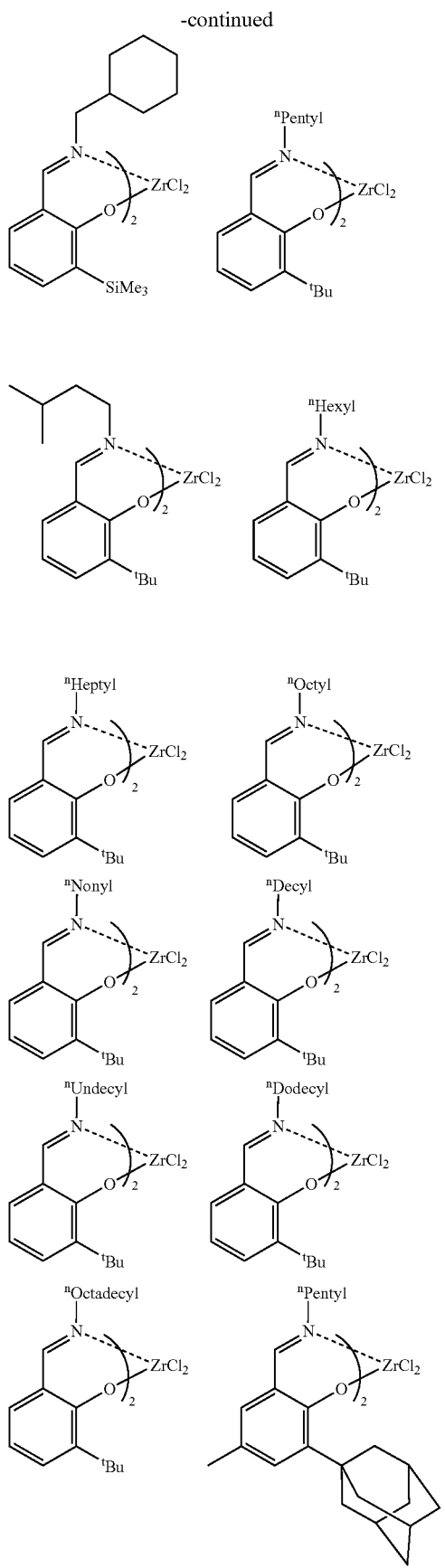
-continued
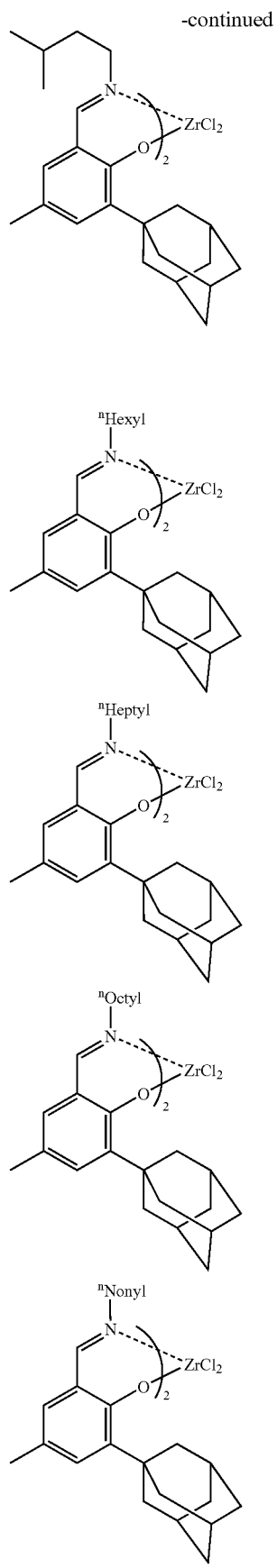

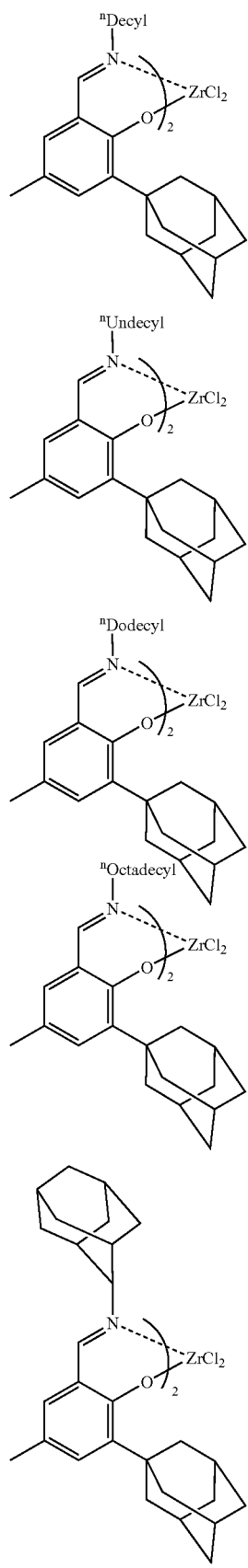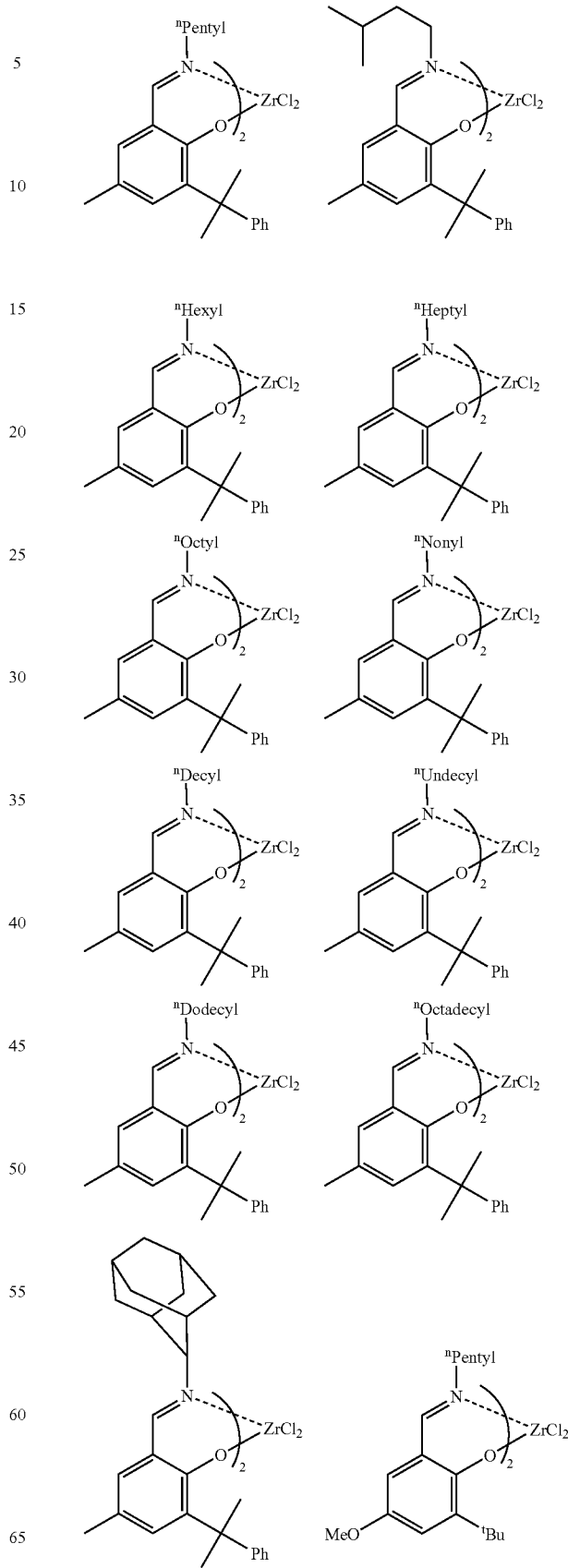

-continued
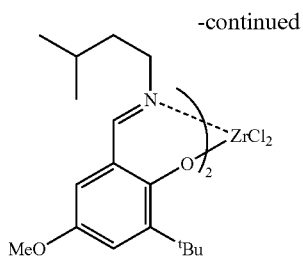
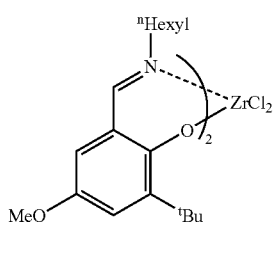
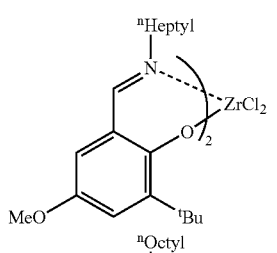
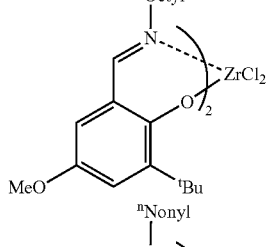
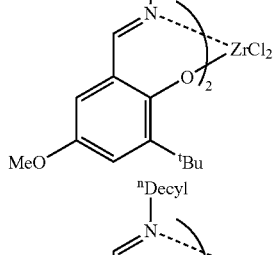
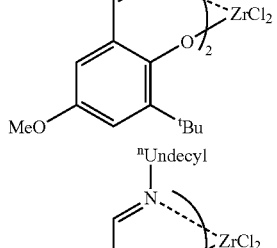
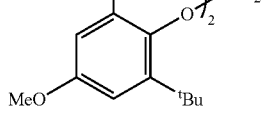
-continued
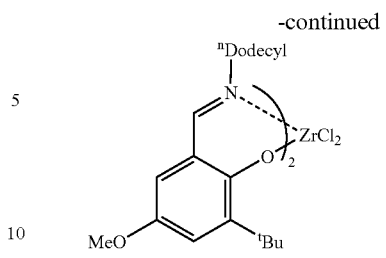
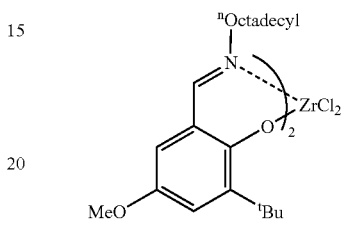
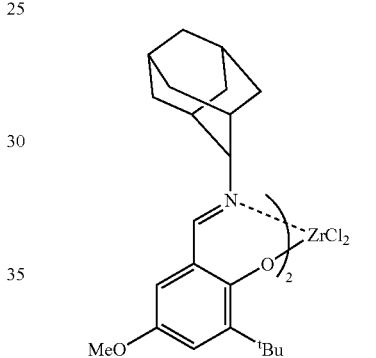
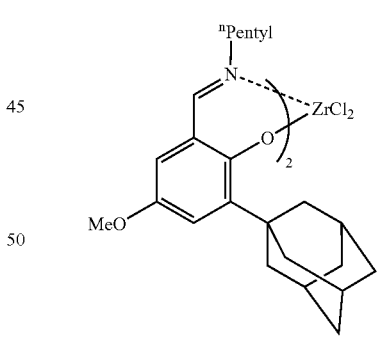

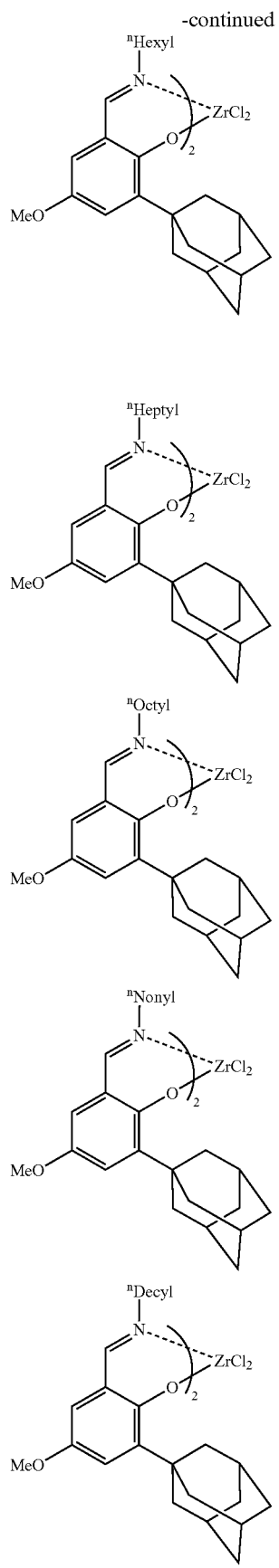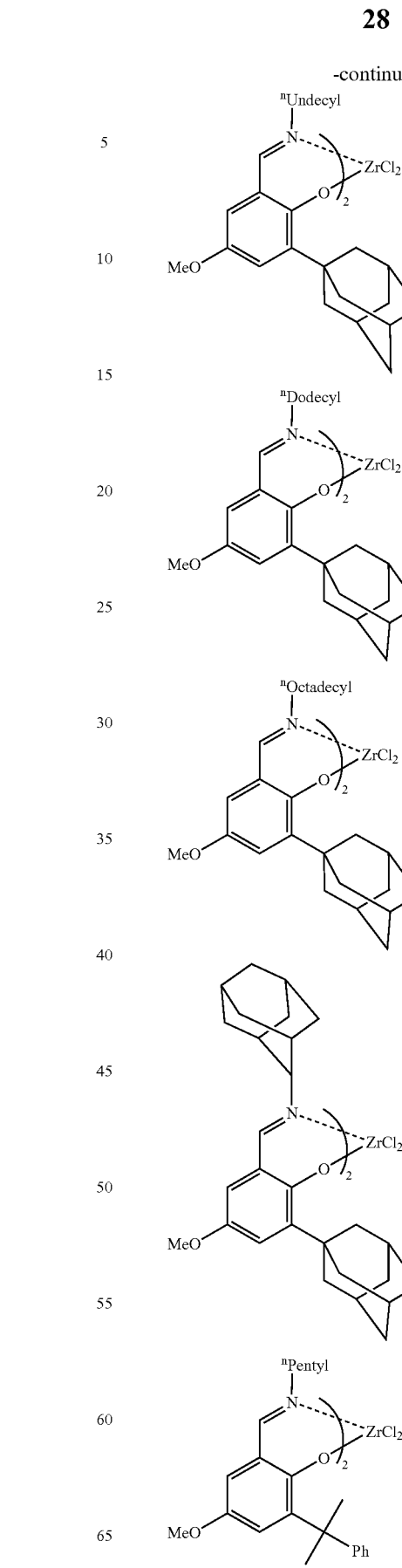

-continued
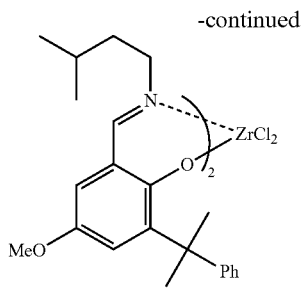
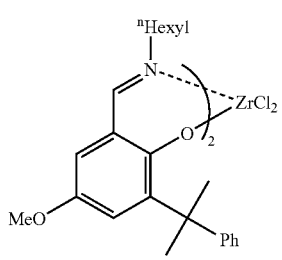
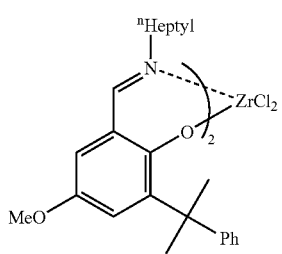
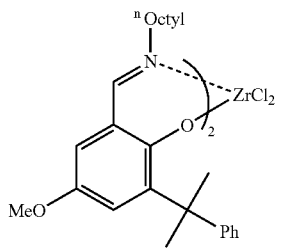
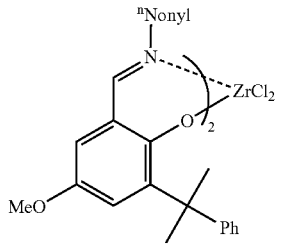
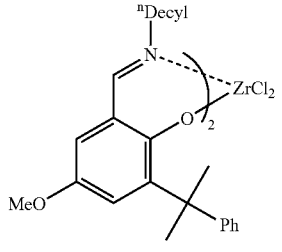
-continued
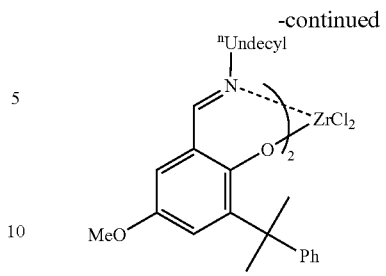
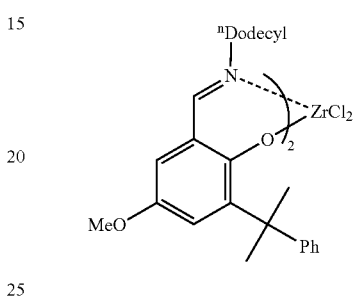
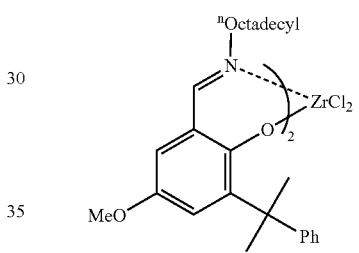
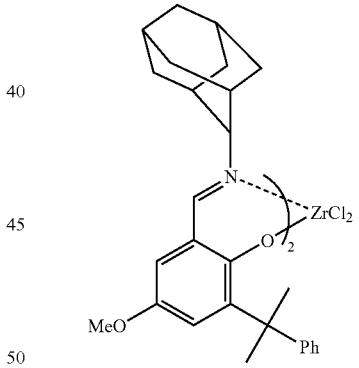
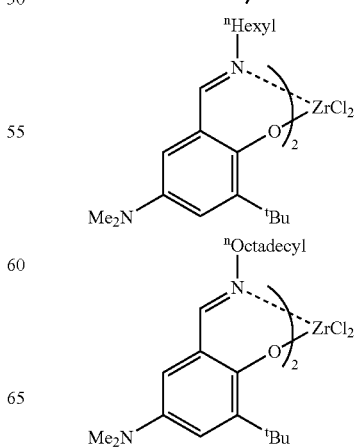

-continued
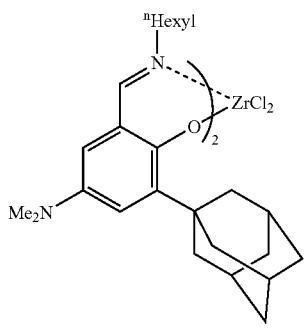
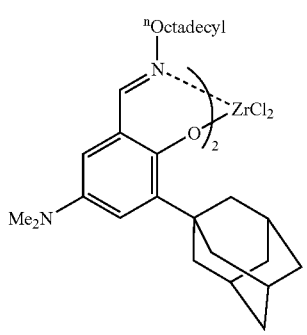
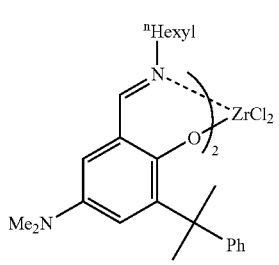
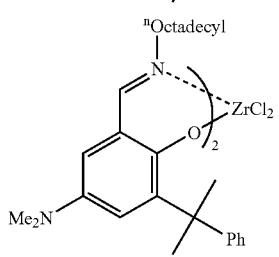
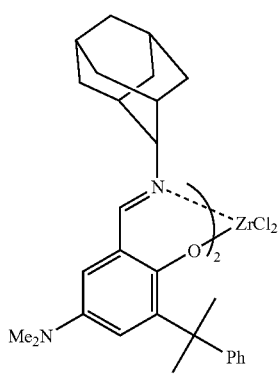
-continued
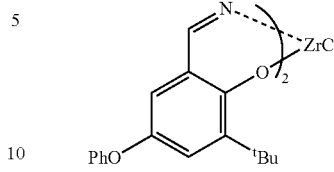
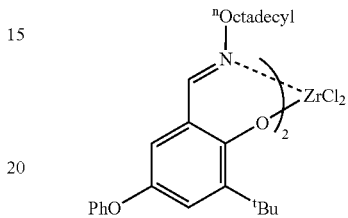
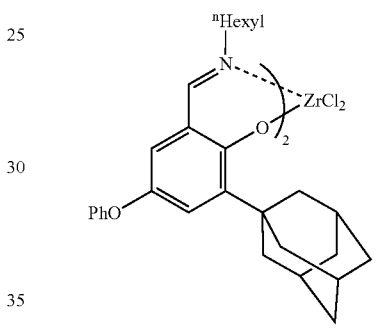
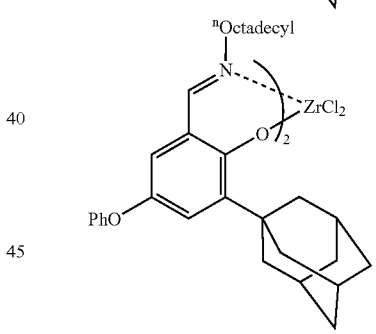
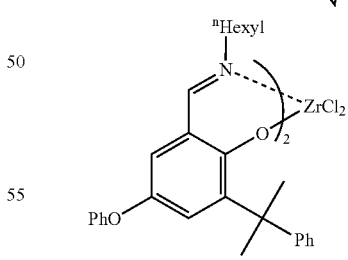
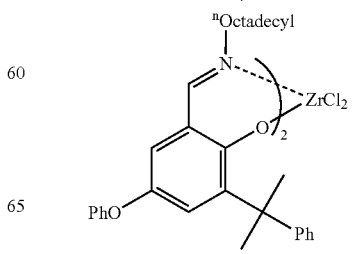

-continued

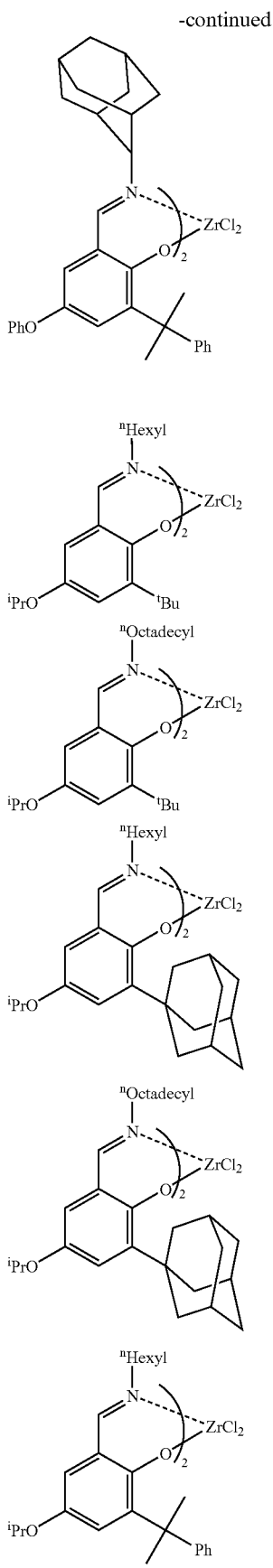

-continued

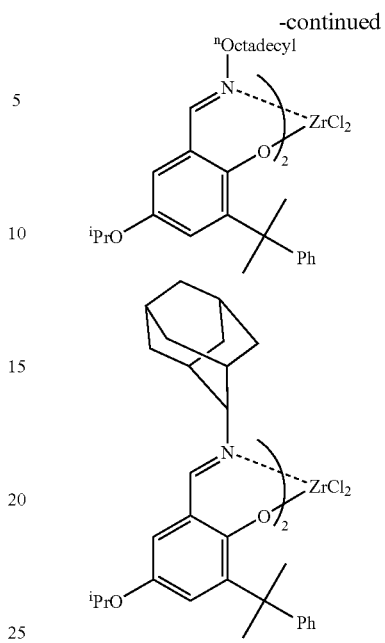

In the illustrated compounds, Me denotes methyl group, $^i$Pr isopropyl group, $^n$Bu n-butyl group, $^t$Bu tert-butyl group, $^n$Pentyl n-pentyl group, $^n$Hexyl n-hexyl group, $^n$Heptyl n-heptyl group, $^n$Octyl n-octyl group, $^n$Nonyl n-nonyl group, $^n$Decyl n-decyl group, $^n$Undecyl n-undecyl group, $^n$Dodecyl n-dodecyl group, $^n$Octadecyl n-octadecyl group, and Ph phenyl group.

In the present invention, regarding above described transition metal compounds, the compounds of which zirconium metal is substituted by metals such as titanium and hafnium besides zirconium may be used.

The method for producing the transition metal compound having the above described general formula (I) is not specially restricted and the compound can be produced as described below, for example.

The transition metal compound having the general formula (I) can be synthesized by reaction of a compound (a ligand precursor) capable of forming a ligand such as thiosalicylidene ligand and anilino ligand and a transition metal M-containing compound of $MX_k$ (M and X are the same as M and X in the above described general formula (I) and k denotes the number satisfying the valence of M).

The ligand precursor capable of forming thiosalicylidene ligand can be obtained by reaction of, for example, thiosalicylaldehyde compounds and either aniline compounds or amine compounds.

The ligand precursor can also be obtained by reaction of o-acylbenzenethiol and either aniline compounds or amine compounds.

Particularly, the precursor can be obtained, for example, by dissolving a thiosalicylaldehyde compound or o-acylbenzenethiol together with an aniline compound unsubstituted in nitrogen atom or a primary amine compound in a solvent and stirring the resultant solution for about 1 to 48 hours at room temperature or in reflux condition. As the solvent to be employed, an alcohol solvent such as methanol, ethanol, and the likes and a hydrocarbon solvent such as toluene and the likes are preferable. As a catalyst, an acid catalyst such as formic acid, acetic acid, toluenesulfonic acid, and the likes may be employed. During the reaction, dewatering of the system by a Dean-Stark is effective to promote the reaction.

As a dehydration agent, a molecular sieve, magnesium sulfate, sodium sulfate, and the likes may be employed.

The anilino ligand precursor can be obtained by reaction of o-formaniline compound and either an aniline compound or an amino compound. The ligand precursor can also be obtained by reaction of o-acylaniline and either an anilinoacid or an amine.

Particularly, the ligand precursor can be synthesized in the same manner as described above using, for example, either an o-formylaniline compound unsubstituted in nitrogen atom or o-acylaniline unsubstituted in nitrogen atom and either an aniline compound unsubstituted in nitrogen atom or a primary amine compound.

The o-acylaniline to be employed can be obtained by reducing carboxylic acid group of, for example, o-aminobenzoic acid compound. Also, N-alkylation of an anthranyl compound gives corresponding N-alkyl-o-acylaniline compound.

Reaction of a ligand precursor obtained by the above described method and a transition metal M-containing compound gives the corresponding transition metal compound. Particularly, a transition metal compound can be obtained by dissolving a ligand precursor in a solvent, bringing the resultant solution into contact with a base, if necessary, to produce a thiophenoxide or an anilino salt, and then mixing the produced substance with a transition metal M-containing compound such as a metal halide, an alkylated metal compound, or the like at a low temperature, and stirring the mixture at −78° C. to a room temperature or in reflux condition for 1 to 24 hours.

As the solvent to be used, polar solvents such as ethers, tetrahydrofuran, and the likes and a hydrocarbon solvent such as toluene are preferable and solvents other than these solvents may also be used. Examples of preferred bases include lithium salts such as lithium n-buthyl; sodium salts such as sodium hydride; nitrogen containing compounds such as pyridine, triethyl amine or the like, but are not limited to them.

Depending on a transition metal compound to be used, without requiring a thiophenoxide or an anilino salt to be produced, a ligand precursor and a metal compound are alternatively reacted directly on each other to synthesize a corresponding compound.

The structure of the obtained transition metal compound is determined by $^1$H-NMR at 270 MHz (Nippon Electronic Company GSH-270), FT-IR (SHIMADZU FT-IR$^{8200}$D), FD-mass spectrometer (Nippon Electronic Company SX-102A), a metal content analyzer (dry incineration, dissolution in a diluted nitric acid, and then analysis by ICP method; SHIMADZU ICPS-8000), a carbon, hydrogen, and nitrogen content analyzer (Heraus Edulmentale GmbH CHNO type), and so forth.

A transition metal compound produced by the above described method is separated by a conventional known method and used for polymerization and on the other hand, without separating the transition metal compound, the reaction solution of a ligand precursor and a metal compound may be used as it is for polymerization.

Such transition metal compounds defined as the formula (I) may be used solely or in combination with two or more types as olefin polymerization catalysts.

At the time of producing the ethylene co(polymer) (A1), it is one of preferable examples that the above described transition metal compound (a1) is used together with at least one type of compounds (b) selected from (b-1) an organometallic compound, (b-2) an organoaluminum oxy compound, and (b-3) a compound capable of forming ion pairs by reaction on a transition metal compound.

(b-1) An Organometallic Compound

Specific examples of (b-1) organometallic compounds to be used for producing the ethylene (co)polymer (A1) are organometallic compounds of group I, group II and group XII and group XIII of the periodic table and illustrated below;

(b-1a) an organoaluminum compound having a general formula $R^a{}_mAl(OR^b)_nH_pX_q$ (where, $R^a$ and $R^b$ may be the same or different to each other and denote hydrocarbon groups of 1 to 15, preferably 1 to 4 carbon atoms; X denotes a halogen atom; m satisfies 0<m≦3; n satisfies 0≦n<3; p satisfies 0≦p<3; q satisfies 0≦q<3; and m+n+p+q=3);

(b-1b) alkylated complexes of a group I metal in the periodic table and aluminum having a general formula $M^2AlR^a{}_4$ (where, $M^2$ denotes Li, Na, or K; and $R^a$ denotes a hydrocarbon group of 1 to 15, preferably 1 to 4 carbon atoms); and (b-1c) dialkyl compounds of a group II metal or a group XII metal having a general formula $R^aR^bM^3$ (where, $R^a$ and $R^b$ may be the same or different to each other and denote hydrocarbon groups of 1 to 15, preferably 1 to 4 carbon atoms; $M^3$ denotes Mg, Zn, or Cd).

Examples of an organoaluminum compounds belonging to the above defined compound (b-1a) are;

an organoaluminum compound having a general formula $R^a{}_mAl(OR^b)_{3-m}$ (where, $R^a$ and $R^b$ may be the same or different to each other and denote hydrocarbon groups of 1 to 15, preferably 1 to 4 carbon atoms; and m denotes a number preferably satisfying 1.5≦m≦3);

an organoaluminum compound having a general formula $R^a{}_mAlX_{3-m}$ (where, $R^a$ denotes a hydrocarbon group of 1 to 15, preferably 1 to 4 carbon atoms; X denotes a halogen atom; and m preferably satisfies 0<m<3);

an organoaluminum compound having a general formula $R^a{}_mAlH_{3-m}$ (where, $R^a$ denotes a hydrocarbon group of 1 to 15, preferably 1 to 4 carbon atoms; and m preferably satisfies 2≦m<3); and an organoaluminum compound having a general formula $R^a{}_mAl(OR^b)_nX_q$ (where, $R^a$ and $R^b$ may be the same or different to each other and denote hydrocarbon groups of 1 to 15, preferably 1 to 4 carbon atoms; X denotes a halogen atom; m satisfies 0<m≦3; n satisfies 0≦n<3; q satisfies 0≦q<3; and m+n+q=3).

As an organoaluminum compound belonging to the above defined compound (b-1a), the following are more concrete compounds;

tri-n-alkylaluminum, such as trimethylaluminum, triethylaluminum, tri-n-butylaluminum, tripropylaluminum, tripentylaluminum, trihexylaluminum, trioctylaluminum and tridecylaluminum;

tri-chain-branched alkylaluminum, such as triisopropylaluminum, triisobutylaluminum, tri-sec-butylaluminum, tri-tert-butylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminum, such as tricyclohexylaluminum and tricyclocotylaluminum;

triarylaluminum such as triphenylaluminum and tritolylaluminum;

dialkylaluminum hydride such as diisobutylaluminum hydride;

trialkenylaluminum such as triisoprenylaluminum represented by $(i-C_4H_9)Al(CH_5H_{10})_2$ (wherein x, y, and z are integers, and z≧2X);

alkylaluminumalkoxide, such as isobutylaluminummethoxide, isobutylaluminumetoxide and isobutylaluminumsopropoxide;

dialkylaluminumalkoxide, such as dimethylaluminummethoxide, and diethylaluminumethoxide, dibutylaluminumbutoxide;

alkylaluminumsesquialkoxide, such as ethylaluminumsesquiethoxide, and butylaluminumsesquibutoxide;

partly alkoxylated alkylaluminum having an average composition represented by $R^a{}_{2.5}Al(OR^b)_{0.5}$ dialkylaluminumaryloxide, such as diethylaluminumphenoxide, diethylaluminum (2,6-di-t-butyl-4-methylphenoxide), ethylaluminum bis(2,6-di-t-butyl-4-methylphenoxide), diisobutylaluminum bis(2,6-di-t-butyl-4-methylphenoxide) and isobutylaluminium bis(2,6-di-t-butyl-4-methylphenoxide);

dialkylaluminum halide such as dimethylaluminum chloride, diethylaluminum chloride, dibutylaluminum chloride, diethylaluminum bromide, and diisobutylaluminum chloride;

alkylaluminum sesquihalide, such as ethylaluminum sesquichloride, butylaluminum sesquichloride, and ethylaluminum sesquibromide;

partly halogenated alkylaluminum, such as alkylaluminum dihalide including ethylaluminum dichloride, propylaluminum dichloride, and butylaluminum dibromide;

dialkylaluminum hydride, such as diethylaluminum hydride, and dibutylaluminum hydride;

partly hydrogenated alkylaluminum, such as alkylaluminum dihydride including ethylaluminum dihydride and proylaluminum dihydride; and partly alkoxylated and halogenated alkylaluminum, such as ethylaluminum ethoxychloride, butylaluminum butoxychloride and ethylaluminum ethoxybromide.

Further, compounds similar to the defined compound (b-1a) may be employed and, for example, an organoaluminum compound comprising two or more aluminum compounds bonded through nitrogen atom is among them. A concrete compound of such compounds is $(C_2H_5)_2AlN(C_2H_5)Al(C_2H_5)_2$.

As compounds belonging to the above defined compound (b-1b), $LiAl(C_2H_5)_4$, $LiAl(C_7H_{15})_4$, and the likes are concrete examples.

Furthermore, as the (b-1) organometallic compound, the following are usable; methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium, butylethylmagnesium, and the likes.

Compounds capable of forming the above described organoaluminum compounds in polymerization system, for example, combination of an aluminum halide and alkyllithium and combination of an aluminum halide and alkylmagnesium can be employed.

Among the (b-1) organometallic compounds, organoaluminum compounds are preferable.

Such (b-1) organometallic compounds as described above may be used solely or in combination of two or more types.

(b-2) An Organoaluimnum Oxy Compound

An (b-2) organoaluminum oxy compound possible to be employed for production of an ethylene (co)polymer (A1) may be conventionally well known aluminoxanes and also benzene-insoluble organoaluminum oxy compounds just like those exemplified in Japanese Patent Laid-Open No. 2-78687.

A conventionally well known aluminoxane can be produced by, for example, a method described below and, generally, obtained as a solution of a hydrocarbon solvent.

(1) A method wherein an organoaluminum compound such as trialkylaluminum is added to a suspension of a hydrocarbon solvent containing a salt containing adsorbed water or crystal water, for example hydrated magnesium chloride, hydrated copper sulfate, hydrated aluminum sulfate, hydrated nickel sulfate, hydrated cerous chloride, and the likes and reaction of the adsorbed or crystal water and the organoaluminum compound is carried out.

(2) A method wherein reaction of water, ice, or steam directly to an organoaluminum compound such as trialkylaluminum is carried out in a solvent such as benzene, toluene, ethyl ether, tetrahydrofuran, and the likes.

(3) A method wherein reaction of an organotin oxide such as dimethyltin oxide and dibutyltin oxide on an organoaluminum compound such as trialkylaluminum is carried out in a solvent such as decane, benzene, toluene, and the likes.

The aluminoxane may contain a slight amount of organometallic components. It is also acceptable that the solvent or the unreacted organoaluminum compound is removed from the recovered aluminoxane solution by distillation and then the recovered compound is dissolved in a solvent again or suspended in a poor solvent for an aluminoxane.

As an organoaluminum compound to be used for producing an aluminoxane, the same organoaluminum compounds exemplified as the organoaluminum compounds belonging to the above defined (b-1a) compounds are concrete examples.

Among them, trialkylaluminum and tricycloalkylaluminum are preferable and trimethylaluminum is especially preferable.

Above described organoaluminum compounds may be employed either solely or in combination of two or more types.

As a solvent to be employed for producing an aluminoxane, the following are usable hydrocarbon solvents; an aromatic hydrocarbon such as benzene, toluene, xylene, cumene, and cymene; an aliphatic hydrocarbon such as pentane, hexane, heptane, octance, decane, dodecane, hexadecane, and octadecane; an alicyclic hydrocarbon such as cyclopentane, cyclohexane, cyclooctane, and methylcyclepentane; petroleum fraction such as gasoline, kerosine, and light oil; and halide compounds (for example, chlorides and bromides) of the above described aromatic hydrocarbon, aliphatic hydrocarbon, and alicyclic hydrocarbon. Further, ethers such as ethyl ether and tetrahydrofuran can be employed. Among them, an aromatic hydrocarbon or an aliphatic hydrocarbon is especially preferable.

It is preferable for a benzene-insoluble organoaluminum oxy compound to be employed for the present invention that the Al component to be dissolved in benzene at 60° C. is normally 10% or lower, preferably 5% or lower, and especially preferably 2% or lower, in terms of Al atom. That is, the organoalumium oxy compound insoluble or hardly soluble in benzene is preferable.

An (b-2) organoaluminum oxy compound possible to be employed for production of an ethylene (co)polymer (A1) may also include a boron-containing organoaluminum oxy compound having a general formula (II) described below.

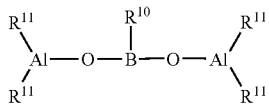

(II)

Where, $R^{10}$ denotes a hydrocarbon of 1 to 10 carbon atoms. $R^{11}$ may be the same or different to one another and denotes hydrogen atom, halogen atom, and a hydrocarbon of 1 to 10 carbon atoms.

The boron-containing organoaluminum oxy compound of the above described general formula (II) can be produced by carrying out reaction of an alkylboric acid having a general formula (III)

(III)

(where, $R^{10}$ denotes the same group as described above) and an-organoaluminum compound in an inert solvent in an inert gas atmosphere at −80° C. to a room temperature for 1 minute to 24 hours.

Concrete alkylboric acids defined as the above described general formula (III) are methylboric acid, ethylboric acid, isopropylboric acid, n-propylboric acid, n-butylboric acid, isobutylboric acid, n-hexylboric acid, cyclohexylboric acid, phenylboric acid, 3,5-difluorophenylboric acid, pentafluorophenylboric acid, 3,5-bis(trifluoromethyl)phenylboric acid. Among them, methylboric acid, n-butylboric acid, isobutylboric acid, 3,5-difluorophenylboric acid, and pentafluorophenylboric acid are preferable. Those compounds are used solely or in combination of two or more compounds.

As an organoaluminum compound to be used for reaction on such alkylboric acid, particularly, the same organoaluminum compounds exemplified as the organoaluminum compounds belonging to the above defined (b-1a) compounds are concrete examples.

Among them, trialkylaluminum and tricycloalkylaluminum are preferable, especially trimethylaluminum, triethylaluminum, and triisobutylaluminum are preferable. Those compounds are used solely or in combination with two or more of them.

Above described organoalumium oxy compounds (b-2) are used solely or in combination with two or more of them.

(b-3) A Compound Capable of Forming Ion Pairs by Reaction on a Transition Metal Compound A compound (b-3) (hereafter named as "ionizing ionic compound") capable of forming ion pairs by reaction on a transition metal compound and possible to be used for producing the ethylene (co)polymer (A1) is a compound forming ion pairs by reaction on a transition metal compound of the above described formula (I). Examples of such compounds are Lewis acids, ionic compounds, borane compounds, and Carbolan compounds described in Japanese Patent Laid-Open No. 1-501950, Japanese Patent Laid-Open No. 1-502036, Japanese Patent Laid-Open No. 3-179005, Japanese Patent Laid-Open No. 3-179006, Japanese Patent Laid-Open No. 3-207703, Japanese Patent Laid-Open No. 3-207704, U.S. Pat. No. 5,321,106. Further, heteropoly-compounds and isopoly-compounds are also examples.

Particularly, compounds defined as $BR_3$ (R denotes phenyl group optionally substituted by substituents such as fluorine, methyl group, and trifluoromethyl group or fluorine) are among Lewis acids and, for example, the following are definite compounds; trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, and tris(3,5-dimethylphenyl) boron.

Examples of the ionic compounds are the compounds defined as the general formula (IV) described below.

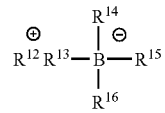

(IV)

Where, $R^{12}$ denotes $H^+$, carbonium cation, oxonium cation, ammonium cation, phosphonium cation, cycloheptyltrienyl cation, ferrocenium cation containing a transition metal, and the likes; and $R^{13}$ to $R^{16}$ may be the same or different to one another and denote an organic group, preferably aryl group or substituted aryl group.

As the prescribed carbonium cation, carbonium cations comprising three substitutents such as triphenylcarbonium cation, tri(methylphenyl)carbonium cation, tri(dimethylphenyl)carbonium cation are definite examples.

The above ammonium cations include trialkylammonium cation, such as trimethylammonium cation, triethylammonium cation, tripropyl ammonium cation, tributylammonium cation and tri(n-butyl)ammonium cation, N,N-dialkylanilinium cation, such as N,N-dimethylanilinium cation, N,N-diethylanilinium cation and N,N-2,4,6-pentamethylanilinium cation; and dialkylammonium cation, such as di(isopropyl)ammonium cation and dicyclohexylammonium cation.

The above phosphonium cations include, for example, triarylphosphonium cations, such as triphenylphosphonium cation, tri(ethylphenyl)phosphonium cation and tri(dimethylphenyl)phosphonium cation.

As $R^{12}$, preferable are carbonium cation, ammonium cation and the like, especially preferable are triphenylcarbonium cation, N,N-dimethylanilinium cation and N,N-diethylanilinium cation.

Examples of ionized compounds may include trialkyl substituted ammonium salt, N,N-dialkylanilinium salt, dialkylammonium salt and triarylphosphonium salt.

Examples of trialkyl-substituted ammonium salt include triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tri(n-butyl)ammonium tetra(pentafluorophenyl)boron, tripropylammonium tetra(o,p-dimethylphenyl)boron, tri(n-butyl)ammonium tetra(m,m-dimethylphenyl)boron, tri(n-butyl)ammonium tetra(p-trifluoromethylphenyl)boron, tri(n-butyl)ammonium tetra(3, 5ditrifluoromethylphenyhl)boron and tri(n-butyl)ammonium tetra(o-tolyl)boron.

Examples of N,N-dialkylaluminium salts are N,N-diethylanilinium tetra(phenyl)boron, N,N-diethylalinium tetra (phenyl)boron, N,N-2,4,6-dimethylanilinium tetra(phenyl) boron and the like.

Dialkylammonium salts include, for example, di(1-propyl) ammonium tetra(pentaluorophenyl)boron and dicyclohexylammonium tetra(phenyl)boron.

Furthermore, as the ionized compounds there may be mentioned triphenylcarbenium tetraquis(pentafluorophenyl)borate, N,N-dimethylanilinium tetraquis(pentafluorophenyl) borate, ferroceniumtetra(pentafluorophenyl)borate, triphenylcarbeniumpentaphenylcyclopentadienyl complex, N,N-diethylaniliniumpentaphenylcyclopentadienyl complex, and boron compounds represented by the following formula (V) or (VI).

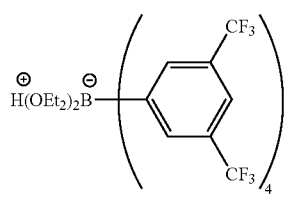

(V)

wherein, Et is an ethyl group.

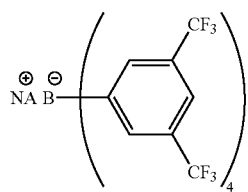

(VI)

As the borane compounds, there can be exemplified decaborane (14);

anion salts such as bis(tri(n-butyl)ammonium)nonaborate, bis(tri(n-butyl)ammonium)decaborate, bis(tri(n-butyl)ammonium)undecaborate, bis(tri(n-butyl)ammonium)dodecaborate, bis(tri(n-nutyl)ammonium)decachlorodecaborate, and bis(tri(n-butyl)ammonium)dodecachlorododecaborate; and metallic borane anion salts, such as salt of tri(n-butyl) ammonium bis(dodecahydride dodecaborate)cobalt acid (III) and salt of bis(tri(n-butyl)ammonium)bis(dodecahydride decaborate)nickel acid (III).

The carborane compounds include, for example, anion salts, such as 4-carbanonaborane (14), 1,3-dicarbanonaborane (13), 6,9-dicarbadecaborane (14), dodecahydride-1-phenyl-1,3-dicarbanonaborane, dodecahydride-1-methyl-1,3-dicarbanonaborane, undecahydride-1,3-dimethyl-1,3-dicarbanonaborane, 7,8-dicarbaundecaborane (13), 2,7-dicarbaundecaborane (13), undecahydride-7,8-methyl-7,8-dicarbaundecaborane, tri(n-butyl)ammonium 1-carbadecaborate, tri(n-utyl)ammonium 1-carbaundecaborate, tri(n-butyl)ammonium 1-carbadodecaborate, tri(n-tributyl) ammonium 1-trimethylsilyl-1-carbadecaborate, tri(n-butyl) ammoniumbromo-1-carbadodecaborate, tri(n-butyl) ammonium 6-carbadecaborate (14), tri(n-butyl)ammonium 6-carbadecaborate (12), tri(n-butyl)ammonium 7-carbaundecaborate (13), tri(n-butyl)ammonium 7,8-dicarbaundecaborate (12), tri(n-butyl)ammonium 2,9-dicarbaundecaborate (12), tri(n-butyl)ammoniumdodecahydride-8-methyl-7,9-dicarbaundecaborate, tri(n-butyl)ammoniumundecahydride-8-ethyl-7,9-dicarbaundecaborate, tri(n-butyl)ammoniumundecahydride-8-butyl-7,9-dicarbaundecaborate, tri(n-butyl)ammoniumundecahydride-8-allyl-7,9-dicarbaundecaborate, tri(n-butyl)ammoniumundecahydride-9-trimethylsilyl-7,8-dicarbaundecaborate and tri(n-butyl)ammoniumundecahydride-4,6-dibromo-7-carbaundecaborate; and metallic carborane anion salts, such as salt of tri(n-butyl) ammonium bis(nonahydride-1,3-dicarbanonaborate)cobalt acid (III), tri(n-butyl)ammonium bis(undecahydride-7,8-dicarbaundecaborate) ferric salt (III), salt of tri(n-butyl)ammonium bis(uindecahydride-7,8-dicarbaundecaborate)cobalt acid (III), salt of tri(n-butyl)ammonium bis(undecahydride-7,8-dicarbaundecaborate)nickel acid (III), salt of tri(n-butyl) ammonium bis(undecahydride-7,8-dicarbaundecaborate) cupric acid (III), tri(n-butyl)ammonium bis(undecahydride-7,8-dicarbaundecaborate) aurate (III), tri(n-butyl)ammonium bis(nonahydride-7,8-dimethyl-7,8-dicarbaundecaborate)ferric salt (III), salt of tri(n-butyl)ammonium bis(nonahydride-7,8-dimethyl-7,8-dicarbaundecaborate)chromic acid (III), salt of tri(n-butyl)ammonium bis(tribromooctahydride-7,8-dicarbaundecaborate) cobalt acid (III), salt of tris(tri(n-butyl) ammonium)bis(undecahydride-7-carbaundecaborate)chromic acid (III), salt of bis(tri(n-butyl)ammonium)bis (undecahydride-7-carbaundecaborate)manganic acid (IV), bis(tri(n-butyl)ammonium)bis(undecahydride-7-carbaundecaborate)cobalt acid (III) and his(tri(n-butyl)ammonium)bis (undecahydride-7-carbaundecaborate)nickel acid (IV).

Each of the heteropoly-compounds comprises an atom selected from silicon, phosphorus, titanium, germanium, arsenic, and tin and one or two or more atoms selected from vanadium, niobium, molybdenum, and tungsten. Particularly, the following are usable; phosphorus vanadate, germanovanadic acid, arsenic vanadate, phosphorus niobate, germanoniobic acid, siliconomolybdic acid, phosphorus molybdate, titanium molybdate, germanomolybdic acid, arsenic molybdate, tin molybdate, phosphorus tungstate, germanotungstic acid, tin tungstate, phosphorus molybdovanadic acid, phosphorus tungstovanadic acid, germanotungstovanadic acid, phosphorus molybdotungstovanadic acid, germanomolybdotungstovanadic acid, phosphorus molybdotungstic acid, and phosphorus molybdoniobic acid, salts of these acids, for example, salts of group I metals or group II metals in the periodic table, particularly lithium, sodium, potassium, rubidium, cesium, beryllium, magnesium, calcium, strontium, barium, or the like, and organic salts such as triphenylethyl salt or the like. There is no limit to use acids and salts other than those.

Above described (b-3) ionizing ionic compounds are used solely or in combination with two or more of them.

At the time of producing the ethylene co(polymer) (A1), the above described transition metal compound (a1) may be used solely or together with at least one type of compounds (b) selected from (b-1) an organometallic compound, (b-2) an organoaluminum oxy compound, and (b-3) a compound capable of forming ion pairs by reaction on a transition metal compound.

In the case the transition metal compound (a1) is used in combination with the component (b), the transition metal compound (a1) forms a compound of a general formula (I-a) as described below in polymerization system.

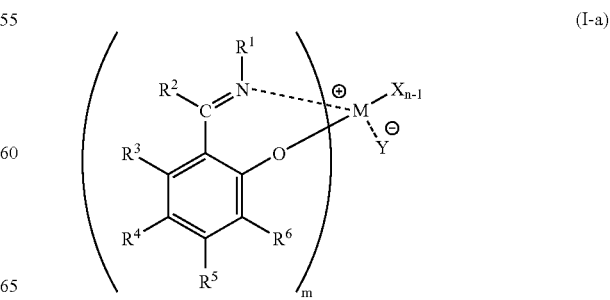

(I-a)

(Where, $R^1$ to $R^6$, M, m, n, and X are defined as same as $R^1$ to $R^6$, M, m, n, and X for the above described general formula (I); and Y denotes so called weakly coordinated anion).

In the above described general formula (I-a), the bond of metal M and Y may be covalent bond or ionic bond.

Examples for Y are weakly coordinated anions described on Chemical Review, vol. 88 (1988) p. 1405, Chemical Review vol. 93 (1993) p. 927, and WO 98/30612, p. 6. Particularly, the following examples are;

$AlR_4^-$ (R may be the same or different to one another and denotes oxygen atom, nitrogen atom, phosphorus atom, hydrogen atom, halogen atom, or a substituent containing these atoms; or an aliphatic hydrocarbon group, an aromatic hydrocarbon group, or an alicyclic hydrocarbon group; or an aliphatic hydrocarbon group, an aromatic hydrocarbon group, or an alicyclic hydrocarbon group substituted by oxygen atom, nitrogen atom, phosphorus atom, or, halogen atom; or an aliphatic hydrocarbon group, an aromatic hydrocarbon group, or an alicyclic hydrocarbon group substituted by substituents containing oxygen atom, nitrogen atom, phosphorus atom, or halogen atom); or

$BR_4^-$ (R may be the same or different to one another and denotes oxygen atom, nitrogen atom, phosphorus atom, hydrogen atom, halogen atom, or a substituent containing these atoms; or an aliphatic hydrocarbon group, an aromatic hydrocarbon group, or an alicyclic hydrocarbon group; or an aliphatic hydrocarbon group, an aromatic hydrocarbon group, or an alicyclic hydrocarbon group substituted by oxygen atom, nitrogen atom, phosphorus atom, or, halogen atom;

or an aliphatic hydrocarbon group, an aromatic hydrocarbon group, or an alicyclic hydrocarbon group substituted by substituents containing oxygen atom, nitrogen atom, phosphorus atom, or halogen atom); or $PF_6^-$, $SbF_5^-$, trifluoromethanesulfonate, p-toluenesulfonate, or the like.

A catalyst for olefin polymerization may contain a carrier (c) described below and/or an organic compound (d) described later, on necessity, together with the above described transition metal compound (a1) (hereafter sometimes called as "component (a1)") and, if necessary, at least one of compounds (b) (hereafter sometimes called as "component (b)") selected from the above described (b-1) organometallic compound, (b-2) organoaluminum oxy compound, and (b-3) ionizing ionic compound.

(c) Carrier

A (c) carrier to be employed, optionally, for producing an ethylene (co)polymer (A1) is inorganic or organic compounds and granular or fine particle solid.

Among them, as the inorganic compounds, porous oxides, inorganic halogen compounds, clays, clay minerals, ion-exchangeable lamellar compounds are preferable.

Particularly, the following are substances usable as the porous oxides; $SiO_2$, $Al_2O_3$, MgO, ZrO, $TiO_2$, $B_2O_3$, CaO, ZnO, BaO, $ThO_2$, composite compounds containing these oxides, and their mixture, for example, natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO. Among them, substances containing $SiO_2$ and/or $Al_2O_3$ as a main component is preferable.

Additionally, the above described inorganic compounds may contain a small amount of carbonate, sulfate, nitrate, and oxide components such as $Na_2CO_3$, $K_2CO_3$, $CaCO_3$, $MgCO_3$, $Na_2SO_4$, $Al_2(SO_4)_3$, $Ba_2SO_4$, $KNO_3$, $Mg(NO_3)_2$, $Al(NO_3)_3$, $Na_2O$, $K_2O$, and $Li_2O$.

Such porous oxides have different properties depending on the types and production methods and it is desirable for a carrier to be preferably used for the present invention to have the particle diameter 10 to 300 μm, preferably 20 to 200 μm, the specific surface area within a range of 50 to 1000 m²/g, preferably 100 to 700 m²/g, and the fine pore volume within a range 0.3 to 3.0 cm³/g. Such a carrier may be calcined at 100 to 1000° C., preferably 150 to 700° C., if necessary, to be used.

As an inorganic halogen compound, $MgCl_2$, $MgBr_2$, $MnCl_2$, $MnBr_2$, and the likes are used. The inorganic halogen compound may be used as it is or after being milled by a ball mill or a vibration mill. Further, an inorganic halogen compound obtained by dissolving an inorganic halogen compound in a solvent such as alcohol and then precipitating the compound in fine particle state by a precipitating agent may also be used.

A clay generally comprises clay minerals as main components. An ion-exchangeable lamellar compound is a compound having a crystal structure in which planes constituted of ion bonds are overlaid one another in parallel with weak bond energy and the contained ions are exchangeable. Almost all of clay minerals are ion-exchangeable lamellar compounds. Not only natural but also artificially synthesized clays, clay minerals, and ion-exchangeable lamellar compounds are usable.

Examples of clays, clay minerals, and ion-exchangeable lamellar compounds are clays, clay minerals, and ionic crystal compounds having a lamellar crystal structure such as hexagonal close packing type, antimony type, $CdCl_2$ type, $CdI_2$ type, or the like structure.

Examples of such clays and clay minerals are; kaolin, bentonite, Kibushi clay, Gaerome clay, allophane, hisingerite, pyrophyllite, mica-group minerals, montmorillonitic clays, vermiculite, chlorite-group minerals, palygorskite, kaolinite, nacrite, dickite, halloysite, and the likes; and examples of the ion-exchangeable lamellar compounds are the following crystalline acidic salts of polyvalent metals; α-Zr(HAsO$_4$)$_2$—H$_2$O, α-Zr (HPO$_4$)$_2$, α-Zr(KPO$_4$)$_2$—3H$_2$O, α-Ti (HPO$_4$)$_2$, α-Ti (HAsO$_4$)$_2$—H$_2$O, α-Sn (HPO$_4$)$_2$—H$_2$O, γ-Zr (HPO$_4$)$_2$, γ-Ti(HPO$_4$)$_2$, γ-Ti(NH$_4$PO$_4$)$_2$.H$_2$O, and the likes.

Such clays, clay minerals, and ion-exchangeable lamellar compounds have preferably 0.1 cc/g or more, especially preferably 0.3 to 5 cc/g, of pore volume of fine pores of 20 Å or longer radius measured by mercury pressure penetration method. The pore volume for fine pores with radius within a range of 20 to 3×10⁴ Å is measured by a mercury pressure penetration method using a mercury porosimeter.

In the case a substance having less than 0.1 cc/g pore volume of fine pores with 20 Å or longer radius is used as a carrier, it tends to be difficult to obtain high polymerization activity.

It is also preferable to carry out chemical treatment for the clays and clay minerals.

Any treatment such as surface treatment for removing impurities adhering to the surface, treatment affecting the crystal structure of clays, and the likes may be employed as the chemical treatment. Particularly, as the chemical treatment, acid treatment, alkali treatment, salt treatment, organic substance treatment, and the likes are included. Acid treatment brings a removal of impurities on the surface, while cations of such as Al, Fe, mg in the crystal structure are eluted there by, results to increase the surface area. The crystal structure of a clay is broken by the alkali treatment to result in alteration of the structure of the clay. Also, ion complexing, molecular complexing, and organic derivatives are formed by the salt treatment and the organic substance treatment to change the surface area and the interlayer distance.

An ion-exchangeable lamellar compound may be a lamellar compound in which interlayer distance is widened by replacing exchangeable ion in interlayers with another bulky ion based on the ion exchangeable property. Such a bulky ion works just like a pole to support the lamellar structure and is commonly called a pillar. To introduce another substance into interlayer gaps of a lamellar compound is called intercalation. Examples of guest compounds to be intercalated are; cationic inorganic compounds such as $TiCl_4$ and $ZrCl_4$; metal alkoxides (R denotes a hydrocarbon group) such as $Ti(OR)_4$, $Zr(OR)_4$, $PO(OR)_3$, and $B(OR)_3$; and metal hydroxide ions such as $[Al_{13}O_4(OH)_{24}]^{7+}$, $[Zr_4(OH)_{14}]^{2+}$, $[Fe_3O(OCOCH_3)_6]^+$. Those compounds are used solely or in combination with two or more of them. Further, at the time of intercalation, a polymer obtained by hydrolysis of a metal alkoxide such as $Si(OR)_4$, $Al(OR)_3$, and $Ge(OR)_4$ (R denotes a hydrocarbon), a colloidal inorganic compound such as $SiO_2$ or the like is allowed to coexist. Examples of the pillars are oxides produced by thermal dehydration after intercalation of above described metal hydroxide ions.

Clays, clay minerals, and ion-exchangeable lamellar compounds may be used as they are or after treated by a ball mill or a sieve. Further, they may be used after addition and adsorption of water to and on them and heat dehydration treatment for them. Additionally, they may be used solely or in combination of two or more of them.

Among them, clays or clay minerals are preferable and montmorillonite, vermiculite, pectolite, taeniolite, and synthesized mica are especially preferable.

Examples of the organic compounds are granular or fine particle-like solids having a particle diameter 10 to 300 μm. Particularly, (co)polymer produced from mainly α-olefin of 2 to 14 carbon atoms such as ethylene, propylene, 1-butene, 4-methyl-1-pentene, and the likes; (co)polymer produced from mainly vinylcyclohexane and styrene; and their modified substances are among the organic compounds.

(d) An Organic Compound Component

A (d) organic compound be employed for a purpose of improving the polymerizable property and the physical properties of a produced polymer optionally in production of an ethylene (co)polymer (A1). Examples of such organic compounds are alcohols, phenolic compounds, carboxylic acids, phosphorus compounds, and sulfonic acid salts and compounds other than these compounds are also allowed to be used.

As alcohols and phenolic compounds, compounds defined as $R^{20}$—OH are normally used. $R^{20}$ in that case denotes a hydrocarbon group of 1 to 50 carbon atoms or a halogenated hydrocarbon group of 1 to 50 carbon atoms.

As the alcohols, $R^{20}$ is preferably a halogenated hydrocarbon. On the other hand, it is preferable for the phenolic compounds to be substituted by hydrocarbon of 1 to 20 carbon atoms at α,α' position of the hydroxyl group.

As carboxylic acids, compounds defined as $R^{21}$—COOH are normally used. $R^{21}$ denotes a hydrocarbon group of 1 to 50 carbon atoms or a halogenated hydrocarbon group of 1 to 50 carbon atoms; and especially a halogenated hydrocarbon group of 1 to 50 carbon atoms is preferable.

As phosphorus compounds, phosphoric acids having P—O—H bond, phosphates and phosphine oxides having P—OR, P═O bond are preferable used.

As sulfonic acid salts, those having a general formula (VII) described below are used.

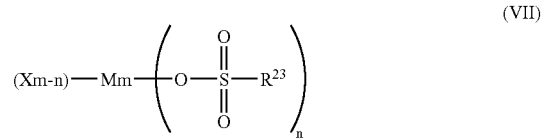

Where, M denotes an element of group I metals or group XIV in the periodic table; $R^{23}$ denotes a hydrocarbon group of 1 to 20 carbon atoms or a halogenated hydrocarbon group of 1 to 20 carbon atoms; X denotes a hydrogen atom, a halogen atom, a hydrocarbon group of 1 to 20 carbon atoms or a halogenated hydrocarbon group of 1 to 20 carbon atoms.

m denotes an integer of 1 to 7; and n satisfies $1 \leq n \leq 7$.

Polymerization

An ethylene (co)polymer (A1) is produced using an olefin polymerization catalyst described above by homopolymerization of ethylene or copolymerization of ethylene and an α-olefin of 4 to 20 carbon atoms.

At the time of polymerization, methods described below are applicable while the manner of using respective components and the order to add the components are optional;

(1) a method by adding a component (a1) and a component (b) in optional order to a polymerizer;

(2) a method by adding catalyst components comprising a carrier (c) bearing a component (a1) and a component (b) in optional order to a polymerizer;

(3) a method by adding catalyst components comprising a carrier (c) bearing a component (b) and a component (a1) in optional order to a polymerizer; and (4) a method by adding catalyst components comprising a carrier (c) bearing both of a component (a1) and a component (b) to a polymerizer.

In above described respective methods (1) to (4), at least two of respective catalyst components may previously be brought into contact with one another.

In above described respective methods (3), (4) in which the component (b) is deposited, a component (b) which is not deposited on a carrier may be added, if necessary, in an optional order. In that case, the components (b) may be the same or different to each other.

In solid catalyst components comprising the carrier (c) bearing the component (a1) and the component (b), an olefin may previously polymerized and catalyst components may further be deposited on the previously polymerized solid catalyst components.

Polymerization may be carried out by any one of the methods; liquid-phase polymerization methods such as solution polymerization and suspension polymerization-and gas-phase polymerization methods. Among the methods, suspension polymerization is preferable.

As an inert hydrocarbon solvent to be used for a liquid-phase polymerization, the following are concrete examples; an aliphatic hydrocarbon such as propane, butane, pentane, hexane, heptane, octane, decane, dodecane, and kerosine; an alicyclic hydrocarbon such as cyclopentane, cyclohexane, and methylcyclepentane; an aromatic hydrocarbon such as benzene, toluene, and xylene; and a halogenated hydrocarbon such as ethylene chloride, chlorobenzene, and dichloromethane; and their mixtures. An olefin itself may be used as a solvent.

At the time of carrying out (co)polymerization using above described olefin polymerization catalyst, a component (a1) is so added as to keep the concentration normally $10^{-12}$ to $10^{-2}$ mole, preferably $10^{-10}$ to $10^{-3}$ mole, per 1 liter of the reaction volume.

A component (b-1) to be used optionally is so added as to keep the mole ratio ((b-1)/M) of the component (b-1) and a transition metal (M) in a component (a1) within normally 0.01 to 100,000 and preferably 0.05 to 50,000.

A component (b-2) to be used optionally is so added as to keep the mole ratio ((b-2)/M) of aluminum atom in the component (b-2) and a transition metal (M) in a component (a1) within normally 10 to 500,000 and preferably 20 to 100,000.

A component (b-3) to be used optionally is so added as to keep the mole ratio ((b-3)/M) of the component (b-3) and a transition metal (M) in a component (a1) within normally 1 to 10 and preferably 1 to 5.

A component (d) to be used optionally is so added as to keep the mole ratio ((d)/(b-1)) within normally 0.01 to 10 and preferably 0.1 to 5 in the case a component (b) is a component (b-1); the mole ratio ((d)/(b-2)) within normally 0.001 to 2 and preferably 0.005 to 1 in the case a component (b) is a component (b-2); and the mole ratio ((d)/(b-3)) within normally 0.01 to 10 and preferably 0.1 to 5 in the case a component (b) is a component (b-3).

The polymerization temperature in the case of using such a catalyst for olefin polymerization is normally −50 to +250° C., preferably 0 to 200° C., and especially preferably 60 to 170° C. The polymerization pressure is generally a normal pressure to 100 kg/cm$^2$ and preferably a normal pressure to 50 kg/cm$^2$: and the polymerization reaction may be carried out by any method such as batch type, semi-continuous, and continuous methods. Though the polymerization can be carried out separately in two or more steps in different reaction conditions, a one-step polymerization is preferable.

The molecular weight of a produced ethylene (co)polymer (A1) can be adjusted either by making hydrogen exist in the polymerization system or changing the polymerization temperature. Further, the molecular weight can be adjusted owing to the difference of components (b) to be used.

An Ethylene (co)polymer (A2)

An ethylene (co)polymer (A2) is an ethylene homopolymer or a random copolymer of ethylene and an α-olefin of 4 to 20 carbon atoms.

Examples of α-olefins of 4 to 20 carbon atoms are a straight chain or branched α-olefin of 4 to 20 carbon atoms as same as described above and a cyclic olefin of 4 to 20 carbon atoms as same as described. Among them, 1-butene or 1-hexene is preferable.

It is desirable for the ethylene (cb)polymer (A2) to contain generally 50 to 100% by weight, preferably 55 to 100% by weight, further preferably 65 to 100% by weight, and most preferably 70 to 100% by weight of a repeated unit derived from ethylene and 0 to 50% by weight, preferably 0 to 45% by weight, further preferably 0 to 35% by weight, and especially preferably 0 to 30% by weight of a repeated unit derived from α-olefin of 4 to 20 carbon atoms.

The ethylene (co)polymer (A2) is ($i_{A2}$) methyl branches less than 0.1, preferably less than 0.08, in number per 1,000 carbon atoms measured by $^{13}$C-NMR. Since such an ethylene (co)polymer is a tough crystal structure, it has excellent mechanical strength.

The ethylene (co)polymer (A2) also is ($ii_{A2}$) Mw/Mn measured by GPC generally not lower than 4.5 and not higher than 60, preferably 5.5 to 50. An ethylene (co)polymer having the Mw/Mn within the above described ranges has excellent mechanical strength.

The preferable state of the ethylene (co)polymer (A2) is that Mz/Mw measured by GPC does not exceed Mw/Mn.

In the case a polymer having an intrinsic viscosity smaller than the above described range, the crystal is weak, so that the strength is insufficient and in the case a polymer having an intrinsic viscosity larger than the above described range, the rigidity sometimes becomes insufficient or molding of the polymer sometimes becomes difficult.

It is preferable for the ethylene (co)polymer (A2) to satisfy at least one of the following requirements ($iii_{A2}$) to ($xiii_{A2}$) in addition to the above described requirements ($i_{A2}$) and ($ii_{A2}$).

($iii_{A2}$) The intrinsic viscosity measured in decalin at 135° C. is within a range of 0.2 to 18 dl/g, preferably 0.5 to 15 dl/g, further preferably 0.8 to 10 dl/g, furthermore preferably 1.0 to 8 dl/g, and most preferably 1.7 to 7.5 dl/g.

($iv_{A2}$) The intrinsic viscosity ($[\eta]$ (dl/g)) measured in decalin at 135° C. and the melt flow rate (MFR (g/10 minutes)) measured under 2.16 kg load at 190° C. satisfy the following relations;

$[\eta]>1.85\times MFR^{-0.192}$, preferably $[\eta]>1.95\times MFR^{-0.192}$, in the case of MFR<1 and $[\eta]>1.85\times MFR^{-0.213}$, preferably $[\eta]>1.95\times MFR^{-0.213}$, in the case of MFR$\geq$1.

An ethylene (co)polymer satisfying above described relations between the intrinsic viscosity and MFR is characterized by, for example, excellent mechanical strength of a molded product.

($v_{A2}$) Components having a molecular weight of 500,000 reduced to polyethylene measured by GPC-IR are generally not more than 5%, preferably not more than 3%, in the components to be eluted at 105° C. or higher in a heating elution separation test. Such an ethylene (co)polymer slightly contains long chain branches and is excellent mechanical strength.

($vi_{A2}$) The components eluted at 105° C. or higher in a heating elution separation test are generally not more than 5% by weight, preferably not more than 4%, in the case the comonomer content is 1.5 mole % or higher and the components to be eluted at 106° C. or higher in a heating elution separation test are generally 8% by weight or lower, preferably 7% by weight, in the case the comonomer content is less than 1.5 mole %, preferably not less than 0.4 mole % and less than 1.5 mole %.

Such an ethylene (co)polymer satisfying above described requirements slightly contains ethylene homopolymer components and is excellent mechanical strength.

($vii_{A2}$) The components having a molecular weight of 10,000 reduced to polyethylene measured by GPC-IR among components precipitated by dissolving the ethylene (co)polymer in p-xylene at 130° C. and then precipitating the dissolved components in a poor solvent after cooling to 75° C. are generally 30% or lower, preferably 25% or lower, more preferably 20% or lower in the precipitated components. It is especially preferable to satisfy the above described requirements in the case the comonomer content is 0.8 to 3.0 mole %. Such an ethylene (co)polymer satisfying above described requirements slightly contains components having a large amount of comonomers and is excellent mechanical strength.

($viii_{A2}$) The components precipitated by dissolving the ethylene (co)polymer in p-xylene at 130° C. and then precipitating the components in a poor solvent after cooling to 75° C. are generally 15% or lower, preferably 12% or lower, in the whole ethylene (co)polymer. It is especially preferable to satisfy the above described requirements in the case the comonomer content in the ethylene (co)polymer (A2) is 0.8 to 3.0 mole %.

Such an ethylene (co)polymer (A2) satisfying above described requirements slightly contains components having a large amount of comonomers and components having extremely low molecular weight and is excellent mechanical strength.

($ix_{A2}$) The components having a molecular weight of 10,000 reduced to polyethylene measured by GPC-IR among components precipitated by dissolving the ethylene (co)polymer in p-xylene at 130° C. and then precipitating the dissolved components in a poor solvent after cooling to 75° C. are generally 5% or lower, preferably 3% or lower, in the whole ethylene (co)polymer. It is especially preferable to satisfy the above described requirements in the case the comonomer content is 0.8 to 3.0 mole %.

Such an ethylene (co)polymer satisfying above described requirements slightly contains components having a large amount of comonomers and is excellent mechanical strength.

($x_{A2}$) The decane-soluble components (W (% by weight)) at 23° C. and the density (d (g/cm$^3$)) satisfy the following relations;

W<80×exp(−100×(d−0.88))+0.1, preferably

W<60×exp(−100×(d−0.88))+0.1 in the case MFR≦10 g/10 minutes and

W<80×(MFR−9)$^{0.26}$×exp(−100×(d−0.88))+0.1 in the case MFR>10 g/10 minutes.

Such an ethylene (co)polymer satisfying above described requirements is excellent mechanical strength and is slightly sticky.

($xi_{A2}$) The number of branches having a length equivalent to that of hexyl or longer measured by $^{13}$C-NMR is generally less than 0.1, preferably less than 0.03, per 1,000 of carbon atoms.

In the case long chain branches exist, they are detected as branches having a length equivalent to that of hexyl or longer, and if long chain branches exist, the mechanical strength is lowered. Consequently, an ethylene (co)polymer satisfying above described requirements is excellent mechanical strength.

($xii_{A2}$) The ratio Mw/Mn of the weight average molecular weight (Mw) and the number average molecular weight (Mn) calculated from the logarithmic normal distribution produced by distributing molecular weight distribution curves measure by gel permeation chromatography to two same logarithmic normal distribution curves is generally within a range of 3 to 8, preferably 3.5 to 7.

($xiii_{A2}$) There exist components to be eluted at 109° C. or higher in a heating elution separation test and the intrinsic viscosity ([η] (dl/g)) measured at 135° C. in decalin and the density (d (g/cm$^3$)) of the components satisfy the following relation;

d≧0.0003×[η]$^2$−0.0121×[η]+0.9874, preferably d≧0.0010×[η]$^2$−0.0145×[η]+0.9900.

The components eluted at 109° C. or higher have the intrinsic viscosity measured at 135° C. in decalin preferably within a range of 0.3 to 1.5 dl/g.

Additionally, the components eluted at 109° C. or higher are within a range of 1 to 90% by weight, preferably 1 to 75% by weight.

The ethylene (co)polymer (A2) satisfying above described requirements comprises, for example, an ethylene (co)polymer (A2-1) described below and an ethylene (co)polymer (A2-2) and contains an ethylene (co)polymer (A2-1) in 10 to 90 parts by weight, preferably 25 to 75 parts by weight and the ethylene (co)polymer (A2-2) in 10 to 90 parts by weight, preferably 25 to 75 parts by weight (wherein, (A2-1)+(A2-2) =100 parts by weight).

An ethylene (co)polymer (A2-1) is an ethylene homopolymer or a random copolymer of ethylene and an α-olefin of 4 to 20 carbon atoms. Examples of α-olefins of 4 to 20 carbon atoms are a straight chain or branched α-olefin of 4 to 20 carbon atoms as same as described above and a cyclic olefin of 4 to 20 carbon atoms as same as described. Among them, 1-butene or 1-hexene is preferable.

It is desirable for the ethylene (co)polymer (A2-1) to contain generally 50 to 100% by weight, preferably 55 to 100% by weight, further preferably 65 to 100% by weight, and most preferably 70 to 100% by weight of a repeated unit derived from ethylene and 0 to 50% by weight, preferably 0 to 45% by weight, further preferably 0 to 35% by weight, and especially preferably 0 to 30% by weight of a repeated unit derived from α-olefin.

In addition to above described requirements, the ethylene (co)polymer (A2-1) satisfies the following requirements ($i_{A2-1}$) to ($iii_{A2-1}$), preferably ($i_{A2-1}$) to ($iv_{A2-1}$).

($i_{A2-1}$) The intrinsic viscosity ([η]$_{A2-1}$) measured in decalin at 135° C. within a range of generally 0.3 to 2.5 dl/g and preferably 0.4 to 1.5 dl/g.

($ii_{A2-1}$) The number of methyl branches measured by $^{13}$C-NMR is generally less than 0.1, preferably less than 0.08, per 1,000 of carbon atoms.

($iii_{A2-1}$) Mw/Mn measured by GPC is within a range of generally 3 to 8 and preferably 3.5 to 7.

($iv_{A2-1}$) The intrinsic viscosity ([η]$_{A2-1}$ (dl/g)) measured in decalin at 135° C. and the melt flow rate (MFR (g/10 minutes) measured under 2.16 kg load at 190° C. satisfy the following relations;

[η]$_{A2-1}$>1.85×MFR$^{0.192}$, preferably [η]$_{A2-1}$>1.95× MFR$^{-0.192}$, in the case of MFR<1 and

[η]$_{A2-1}$>1.85×MFR$^{-0.213}$, preferably [η]$_{A2-1}$>1.95× MFR$^{-0.213}$, in the case of MFR≧1.

It is preferable for the ethylene (co)polymer (A2-1) to satisfy the following requirements described below, in addition to above described requirements.

In the case the intrinsic viscosity measured at 135° C. in decalin is 0.3 to 1.5 dl/g, preferably 0.4 to 1.0 dl/g, and more preferably 0.5 to 0.9 dl/g, the intrinsic viscosity ([η] (dl/g)) and the density (d (g/cm$^3$)) satisfy the following relation;

d≧0.0003×[η]$^2$−0.0121×[η]+0.9874, preferably d≧0.0010×[η]$^2$−0.0145×[η]+0.9900.

In the case the intrinsic viscosity and the density of an ethylene (co)polymer (A2-1) satisfies above described relations, the ethylene (co)polymer is especially excellent in rigidity.

An ethylene (co)polymer (A2-2) is either ethylene homopolymer or a random copolymer of ethylene and an α-olefin of 4 to 20 carbon atoms. Examples of α-olefins of 4 to 20 carbon atoms are a straight chain or branched α-olefin of 4 to 20 carbon atoms as same as described above and a cyclic olefin of 4 to 20 carbon atoms as same as described. Among them, 1-butene or 1-hexene is preferable.

It is desirable that the ethylene (co)polymer (A2-2) contains generally 50 to 100% by weight, preferably 55 to 100% by weight, further preferably 65 to 100% by weight, and most preferably 70 to 100% by weight of a repeated unit derived from ethylene and 0 to 50% by weight, preferably 0 to 45% by weight, further preferably 0 to 35% by weight, and especially preferably 0 to 30% by weight of a repeated unit derived from α-olefin.

The ethylene (co)polymer (A2-2) satisfies the following requirements ($i_{A2-2}$) to ($ii_{A2-2}$), preferably ($i_{A2-2}$) to ($iv_{A22}$), in addition to above described requirements.

($i_{A2-2}$) The intrinsic viscosity ($[\eta]_{A2-2}$) measured in decalin at 135° C. is within a range of generally 2.0 to 20 dl/g and preferably 2.5 to 10 dl/g.

($ii_{A2-2}$) The number of methyl branches measured by $^{13}$C-NMR is generally less than 0.1, preferably less than 0.08, per 1,000 of carbon atoms.

($iii_{A2-2}$) Mw/Mn measured by GPC is within a range of generally 3 to 8 and preferably 3.5 to 7.

($iv_{A2-2}$) The intrinsic viscosity ($[\eta]_{A2-2}$ (dl/g)) measured in decalin at 135° C. and the melt flow rate (MFR (g/10 minutes) measured under 2.16 kg load at 190° C. satisfy the following relations;

$[\eta]_{A2-2} > 1.85 \times MFR^{-0.192}$, preferably $[\eta]_{A2-2} > 1.95 \times MFR^{-0.192}$, in the case of MFR<1 and $[\eta]_{A2-2} > 1.85 \times MFR^{-0.213}$, preferably $[\eta]_{A2-2} > 1.95 \times MFR^{-0.213}$, in the case of MFR≧1.

The intrinsic viscosity ($[\eta]_{A2-1}$) of the above described ethylene (co)polymer (A2-1) and the intrinsic viscosity ($[\eta]_{A2-2}$) of the above described ethylene (co)polymer (A2-2) satisfy $[\eta]_{A2-1} < [\eta]_{A2-2}$.

The measurement methods for above described physical properties will be described later.

Production Method of the Ethylene (co)polymer (A2)

The above described ethylene (co)polymer (A2) can be produced by polymerizing solely ethylene or copolymerizing ethylene and an α-olefin of 4 to 20 carbon atoms in the presence of, for example, an olefin polymerization catalyst similar to that to be employed for production of the ethylene (co)polymer (A1).

At the time of polymerization, methods described below are applicable while the manner of using respective components and the order to add the components are optional;

(1) a method by adding a component (a1) and a component (b) in optional order to a polymerizer;

(2) a method by adding catalyst components comprising a carrier (c) bearing a component (a1) and a component (b) in optional order to a polymerizer;

(3) a method by adding catalyst components comprising a carrier (c) bearing a component (b) and a component (a1) in optional order to a polymerizer; and (4) a method by adding catalyst components comprising a carrier (c) bearing both of a component (a1) and a component (b) to a polymerizer.

In above described respective methods (1) to (4), at least two of respective catalyst components may previously be brought into contact with one another.

In above described respective methods (3), (4) in which the component (b) is deposited on a carrier, a component (b) which is not deposited on a carrier may be added optionally in an optional order. In that case, the components (b) may be the same or different to each other.

In solid catalyst components comprising the carrier (c) bearing the component (a1) and the component (b), an olefin may previously polymerized and catalyst components may further be deposited on the previously polymerized solid catalyst components.

Polymerization may be carried out by any one of the methods; liquid-phase polymerization methods such as solution polymerization and suspension polymerization and gas-phase polymerization methods. Among the methods, suspension polymerization is preferable.

As an inert hydrocarbon solvent to be used for a liquid-phase polymerization, the same inert hydrocarbon solvents to be employed for production of above described ethylene (co)polymer (A1) are concrete examples and an olefin itself may be used as a solvent.

At the time of carrying out (co)polymerization using such an olefin polymerization catalyst, a component (a1) is so added as to keep the concentration generally $10^{-12}$ to $10^{-2}$ mole, preferably $10^{-10}$ to $10^{-3}$ mole, per 1 liter of the reaction volume.

A component (b-1) to be used optionally is so added as to keep the mole ratio ((b-1)/M) of the component (b-1) and a transition metal (M) in a component (a1) within generally 0.01 to 100,000 and preferably 0.05 to 50,000.

A component (b-2) to be used optionally is so added as to keep the mole ratio ((b-2)/M) of aluminum atom in the component (b-2) and a transition metal (M) in a component (a1) within generally 10 to 500,000 and preferably 20 to 100,000.

A component (b-3) to be used optionally is so added as to keep the mole ratio ((b-3)/M) of the component (b-3) and a transition metal (M) in a component (a1) within generally 1 to 10 and preferably 1 to 5.

A component (d) to be used optionally is so added as to keep the mole ratio ((d)/(b-1)) within generally 0.01 to 10 and preferably 0.1 to 5 in the case a component (b) is a component (b-1); the mole ratio ((d)/(b-2)) within generally 0.001 to 2 and preferably 0.005 to 1 in the case a component (b) is a component (b-2); and the mole ratio ((d)/(b-3)) within generally 0.01 to 10 and preferably 0.1 to 5 in the case a component (b) is a component (b-3).

The polymerization temperature in the case of using such an olefin polymerization catalyst is generally −50 to +250° C., preferably 0 to 200° C., and especially preferably 60 to 170° C. The polymerization pressure is generally a normal pressure to 100 kg/cm$^2$ and preferably a normal pressure to 50 kg/cm$^2$: and the polymerization reaction may be carried out by any method such as batch type, semi-continuous, and continuous methods. The polymerization can be carried out separately in two or more steps in different reaction conditions, and two or more multi-step polymerization is preferable.

In the case an ethylene (co)polymer (A2) is produced, for example, in two steps, an ethylene (co)polymer having an intrinsic viscosity of 0.3 to 2.5 dl/g is produced in the prior step and an ethylene (co)polymer having an intrinsic viscosity of 2.0 to 20 dl/g is produced in the posterior step.

The molecular weight of a produced ethylene (co)polymer (A2) can be adjusted either by making hydrogen exist in the polymerization system or changing the polymerization temperature. Further, the molecular weight can be adjusted owing to the difference of components (b) to be used.

In the case an ethylene (co)polymer (A2) comprises an ethylene (co)polymer (A2-1) and an ethylene (co)polymer (A2-2), it can be produced by, for example, forming the ethylene (co)polymer (A2-1) and the ethylene (co)polymer (A2-2) using one polymerization apparatus in two- or more-step polymerization under different reaction conditions. Particularly, in two-step polymerization process, the ethylene (co)polymer (A2-1) is formed by polymerization in the prior step and the ethylene (co)polymer (A2-2) in the posterior step. Or, the ethylene (co)polymer (A2-2) is formed in the prior step and the ethylene (co)polymer (A2-1) in the posterior step.

Further, using a plurality of polymerization apparatuses, the ethylene (co)polymer (A2-1) is formed by polymerization in one polymerization apparatus and then the ethylene (co)polymer (A2-2) is formed by polymerization in another polymerization apparatus in the presence of the ethylene (co) polymer (A2-1) Or, the ethylene (co)polymer (A2-2) is formed by polymerization in one polymerization apparatus and then the ethylene (co)polymer (A2-1) is formed by polymerization in another polymerization apparatus in the presence of the ethylene (co)polymer (A2-2).

The polymerization conditions in an ethylene (co)polymer (A2) comprising the ethylene (co)polymer (A2-1) and the ethylene (co)polymer (A2-2) are within ranges of the production conditions for above prescribed ethylene (co)polymer.

An ethylene (co)polymer (A2) comprising the ethylene (co)polymer (A2-1) and the ethylene (co)polymer (A2-2) can also be produced by a method described below.

(1) A method by mechanically blending an ethylene (co) polymer (A2-1), an ethylene (co)polymer (A2-2), and other components to be added optionally by an extruder, a kneader, or the like.

(2) A method by dissolving an ethylene (co)polymer (A2-1), an ethylene (co)polymer (A2-2), and other components to be added optionally in a good solvent (e.g. hydrocarbon solvents such as hexane, heptane, decane, cyclohexane, benzene, toluene, xylene, and the likes) and then removing the solvent.

(3) A method by separately dissolving an ethylene (co) polymer (A2-1), an ethylene (co)polymer (A2-2), and other components to be added optionally in proper good solvents, mixing the resultant respective solutions, and then removing the solvents.

(4) A method by combining the methods (1) to (3).

Ethylene (co)polymer (A3)

An ethylene (co)polymer (A3) is an ethylene homopolymer or a random copolymer of ethylene and an α-olefin of 3 to 20 carbon atoms.

The α-olefin of 3 to 20 carbon atoms may be, for example, a straight chain or branched α-olefin of 3 to 20 carbon atoms such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicocene; and a cyclic olefin of 3 to 20 carbon atoms such as cyclopentene, cycloheptene, norbornene, 5-methyl-2-norbornene, tetracyclododecene, 2-methyl-1,4,5,8-dimethano-1,2,3,4,4a,5,8,8a-octahydronaphthalene.

The ethylene (co)polymer (A3) is preferably an ethylene homopolymer or a copolymer of ethylene and an α-olefin of 4 to 20 carbon atoms.

It is desirable for the ethylene (co)polymer (A3) to have intrinsic viscosity generally not lower than 1.0 dl/g, preferably 2.0 to 40.0 dl/g and Mw/Mn value measured by GPC generally not lower than 5.5, preferably within a range of 20.0 to 100.0.

The ethylene (co)polymer (A3) contains generally 50 to 100% by weight, preferably 55 to 100% by weight, further preferably 65 to 100% by weight, and most preferably 70-100% by weight of a repeated unit derived from ethylene and 0 to 50% by weight, preferably 0 to 45% by weight, further preferably 0 to 35% by weight, and most preferably 0 to 30% by weight of a repeated unit derived from α-olefin of 3 to 20 carbon atoms.

The ethylene (co)polymer (A3) is ($i_{A3}$) the melt tension (MT (g)) at 190° C. and the swell ratio (SR) calculated from the strand diameter extruded at 190° C. satisfying the following relation;

$\log(MT) > 12.9 - 7.15 \times SR$ and preferably $\log(MT) > 13.3 - 7.15 \times SR$.

An ethylene (co)polymer having MT and SR satisfying above described relations is characterized by excellent bubble stability at the time of inflation molding.

The ethylene (co)polymer (A3) also is ($ii_{A3}$) the intrinsic viscosity ([η] (dl/g)) measured in decalin at 135° C. and the melt flow rate (MFR (g/10 minutes)) measured under 2.16 kg load at 190° C. satisfying the following relations;

$[\eta] > 1.85 \times MFR^{-0.192}$, preferably $[\eta] > 1.95 \times MFR^{-0.192}$; in the case of MFR<1 and $[\eta] > 1.85 \times MFR^{-0.213}$, preferably $[\eta] > 1.95 \times MFR^{-0.213}$, in the case of MFR≧1.

An ethylene (co)polymer having the intrinsic viscosity and MFR satisfying above described relations is characterized by, for example, excellent mechanical strength of a molded product.

It is preferable for the ethylene (co)polymer (A3) to satisfy at least one of the following requirements ($iii_{A3}$) to ($viiA_3$) in addition to the above described requirements ($i_{A3}$) and ($ii_{A3}$)

($iii_{A3}$) The weight average molecular weight (Mw) measured by GPC and the swell ratio (SR) calculated from the strand diameter extruded at 190° C. satisfy the following relation; $SR > 4.55 - 0.56 \times \log(Mw)$, preferably $SR > 4.60 - 0.56 \times \log(Mw)$.

A polymer having the Mw and SR satisfying above described relations is characterized by, for example, blow moldability and excellent weld strength of a blow-molded product.

($iv_{A3}$) The number average molecular weight (Mn), the weight average molecular weight (Mw), and the Z average molecular weight (Mz) measured by GPC satisfy the following relations; $Mz/Mw \geq 7/(1-5.5/(Mw/Mn))$ and Mw/Mn>5.5.

Especially preferably the following requirement ($iv_{A3}$) is satisfied; the number average molecular weight (Mn), the weight average molecular weight (Mw), and the Z average molecular weight (Mz) measured by GPC satisfy the following relation; $Mz/Mw \geq 5/(0.7-6.45/(Mw/Mn)+3)$ and Mw/Mn>6.3.

An ethylene (co)polymer having the number average molecular weight (Mn), the weight average molecular weight (Mw), and the Z average molecular weight (Mz) satisfying above described relations is characterized by, for example, blow moldability and inflation film moldability.

($v_{A3}$) The number of the vinyl groups at the molecular terminals calculated by conversion to that per one molecular chain having the same molecular weight as the number average molecular weight is 0.50 or higher, preferably 0.60 or higher.

The number of vinyl groups at the molecular terminals is generally 1.0 or lower.

In the case the vinyl groups at the molecular terminals are within the above described ranges, the ethylene (co)polymer is easy to be modified and is high adhesion strength to other resin. Also, a composition containing the ethylene (co)polymer comprising the vinyl groups at the molecular terminals within the above described ranges tends to have high adhesion strength to other resin.

($vi_{A3}$) The number of methyl branches measured by $^{13}$C-NMR is less than 0.1 per 1,000 of carbon atoms. The ethylene (co)polymer satisfying such a requirement is an ethylene homopolymer or a copolymer of ethylene and an α-olefin of 4 to 20 carbon atoms.

An ethylene (co)polymer satisfying such a requirement is a rigid crystal structure and therefore is excellent mechanical strength.

(vii$_{A3}$) The number average molecular weight (Mn), the weight average molecular weight (Mw), and the Z average molecular weight (Mz) measured by GPC satisfy the following relations;

Mz/Mw≧4/(0.5–4.50/((Mw/Mn)–0.2)), preferably

Mz/Mw≧4.2/(0.5–4.50/((Mw/Mn)–0.2)) and Mw/Mn>9.2, preferably Mw/Mn>12.0.

It is desirable for an ethylene (co)polymer to have Mz/Mw measured by GPC which does not exceed Mw/Mn.

A polymer having Mn, Mw, and Mz satisfying above described relations is characterized by, for example, excellent blow moldability and inflation film moldability.

In the case a molded product is produced from an ethylene (co)polymer (A3), fish eyes, besides fish eyes having cores of fibers and the likes, are scarcely generated. For example, not more than 20 fish eyes (except fish eyes having cores of fibers and the likes), preferably practically no fish eyes, are observed with eyes in the case a film of 3.5 cm width and 50 μm thickness is formed using a capillary rheometer and eye observation of the film is carried out in the range of 3.0 cm width and 20 cm length.

The methods for measuring above described physical properties will be described below.

Production Method of the Ethylene (co)polymer (A3)

The above described ethylene (co)polymer (A3) can be produced by polymerizing solely ethylene or copolymerizing ethylene and an α-olefin of 3 to 20 carbon atoms in the presence of, for example, an olefin polymerization catalyst described below.

An olefin catalyst to be employed for an ethylene (co)polymer (A3) of the present invention comprises (a2) a transition metal compound having either one of general formulas (VII) to (IX) described below and (b-2) an organoaluminum oxy compound.

The respective catalyst components constituting such an olefin polymerization catalyst will be described below.

(a2) A Transition Metal Compound

The transition metal compound (a2) is defined as any one of the general formulas (VII) to (IX) below.

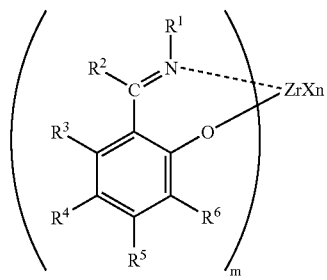

(VII)

(wherein, N . . . Zr generally means coordination and in the present invention, N and Zr may or may not be coordinated: the same in the general formulas (VIII) and (IX) described blow).

Where, m denotes an integer of 1 or 2, preferably 2: $R^1$ denotes an aromatic hydrocarbon group, particularly, an aryl group of 6 to 30, preferably 6 to 20 carbon atoms such as phenyl, benzyl, naphthyl, biphenyl, terphenyl, phenanthryl, anthryl, or the like; and an alkyl-substituted aryl group such as tolyl, iso-propylphenyl, tert-butylphenyl, dimethylphenyl, di-tert-butylphenyl, or the like.

$R^2$ to $R^5$ may be the same or different to one another and denote hydrogen atom or a hydrocarbon group, particularly, a straight chain or branched alkyl group of 1 to 30, preferably 1 to 20 carbon atoms such as methyl, ethyl, n-propyl, isopropyl, n-butyl, isobutyl, sec-butyl, tert-butyl, neopentyl, n-hexyl, or the like; a straight chain or branched alkenyl group of 2 to 30, preferably 2 to 20 carbon atoms such as vinyl, allyl, isopropenyl, or the like; a straight chain or branched alkynyl group of 2 to 30, preferably 2 to 20 carbon atoms such as ethynyl, propargyl, or the like: a cyclic saturated hydrocarbon group of 3 to 30, preferably 3 to 20 carbon atoms such as cyclopropyl, cyclobutyl, cyclopentyl, cyclohexyl, adamantyl, or the like; a cyclic unsaturated hydrocarbon group of 5 to 30 carbon atoms such as cyclopentadienyl, indenyl, fluorenyl, or the like; an aryl group of 6 to 30, preferably 6 to 20 carbon atoms such as phenyl, benzyl, naphthyl, biphenylyl, terphenylyl, phenanthryl, anthryl, or the like; and an alkyl-substituted aryl group of 1 to 30 carbon atoms such as tolyl, iso-propylphenyl, tert-butylphenyl, dimethylphenyl, di-tert-butylphenyl, or the like. Further, the above described hydrocarbon groups may have other hydrocarbon group substituents and examples of the hydrocarbon group-substituted hydrocarbons are aryl-substituted alkyl groups such as benzyl, cumyl, or the like.

$R^6$ denotes a hydrocarbon group of 1 to 4 carbon atoms which is particularly methyl, ethyl, propyl or butyl.

$R^1$ and $R^6$ may be the same or different to one another and among them, two or more groups, preferably neighboring groups, may be bonded one another to form an alicyclic ring or an aromatic ring and these rings may further be substituted.

In the case m is 2, two groups of $R^1$ to $R^6$ may bonded each other and also in the case m is 2, respective $R^1$, respective $R^2$, respective $R^3$, respective $R^4$, respective $R^5$, and respective $R^6$ may be the same or different to each other.

n denotes a number satisfying the valence of Zr (zirconium) and is particularly an integer of 2 to 4, preferably 2.

X denotes hydrogen atom, a halogen atom, or a hydrocarbon group. In the case n is 2 or higher, respective X may be the same or different and respective X may be bonded one another to form a ring. Examples of the hydrocarbon groups are the same groups exemplified for above described $R^2$ to $R^5$. As the halogen atom, fluorine, chlorine, bromine, and iodine are included.

An ethylene (co)polymer satisfying the above described requirements ($i_{A3}$) to ($iii_{A3}$), preferably the above described requirements ($i_{A3}$) to ($iii_{A3}$) and at least one of the above described requirements ($iv_{A3}$) to ($vi_{A3}$), can be produced using a transition metal compound having such a general formula (VII) by polymerization under conditions described below.

Next, a transition metal compound (a2) having such a general formula (VIII) will be described below.

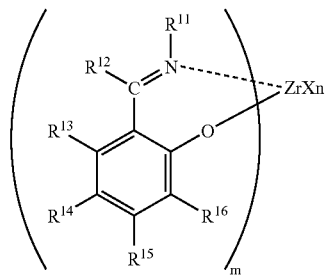

m denotes an integer of 1 or 2 and preferably 2.

$R^{11}$ to $R^{15}$ may be the same or different to one another and each denotes hydrogen atom or a hydrocarbon group, and as the hydrocarbon group, particularly, hydrocarbon groups as same as those exemplified for $R^2$ to $R^5$ are exemplified.

The hydrocarbon group may be substituted by other hydrocarbon groups and as the hydrocarbon group substituted by other hydrocarbon groups, aryl-substituted alkyl groups such as benzyl, cumyl, or the like can be exemplified.

$R^{14}$ denotes an alkyl group of 1 to 8 carbon atoms preferably selected from methyl, ethyl, n-propyl, isopropyl, n-butyl, isobutyl, sec-butyl, tert-butyl, neopentyl, n-hexyl, or the like and methyl group is particularly preferable.

$R^{16}$ denotes a hydrocarbon group of 5 to 30 carbon atoms, particularly, a straight chain or branched alkyl group of 5 to 30, preferably 5 to 20 carbon atoms such as n-pentyl, neopentyl, n-hexyl, n-heptyl, n-octyl or the like; a hydrocarbon group of 5 to 30, preferably 5 to 20 carbon atoms and having an alicyclic skeleton such as cyclopentyl, cyclohexyl, norbonyl, adamantyl, or the like; an aryl group of 6 to 30, preferably 6 to 20 carbon atoms such as phenyl, benzyl, naphthyl, biphenylyl, triphenylyl, fluorenyl, anthryl, phenanthryl, or the like; and a group (e.g. cumyl) selected from these groups and substituted by a hydrocarbon group of 1 to 30 carbon atom, preferably an alkyl group of 1 to 20 carbon atoms and an aryl group of 6 to 30, preferably 6 to 20 carbon atoms.

$R^{16}$ is preferably a hydrocarbon group of 5 to 30 carbon atoms and having an alicyclic skeleton such as cyclopentyl, cyclohexyl, norbonyl, adamantyl, or the like; more preferably a hydrocarbon group of 5 to 20 carbon atoms and having an alicyclic skeleton; and especially preferably adamantyl.

$R^{11}$ and $R^{16}$ may be the same or different to one another and among them, two or more groups, preferably neighboring groups, may be bonded one another to form an alicyclic ring or an aromatic ring and these rings may further be substituted.

In the case m is 2, two groups of $R^{11}$ to $R^{16}$ may bonded each other and also in the case m is 2, respective $R^{11}$, respective $R^{12}$, respective $R^{13}$, respective $R^{14}$, respective $R^{15}$, and respective $R^{16}$ may be the same or different to each other.

n denotes a number satisfying the valence of Zr and is particularly an integer of 2 to 4, preferably 2.

X can be defined as same as X in the above described general formula (VII).

As the transition metal compound of the general formula (VIII), compounds having the formula wherein m is 2 and $R^{16}$ is a hydrocarbon group of 5 to 30 carbon atoms and having an alicyclic skeleton are preferable, and among them, those comprising methyl group as $R^{14}$ and adamantyl as $R^{16}$ are especially preferable.

An ethylene (co)polymer satisfying the above described requirements ($i_{A3}$) to ($iii_{A3}$), preferably the above described requirements ($i_{A3}$) to ($iii_{A3}$) and at least one of the above described requirements ($iv_{A3}$) to ($vi_{A3}$), can be produced using a transition metal compound having such a general formula (VIII).

Next, a transition metal compound (a2) having such a general formula (IX) will be described below.

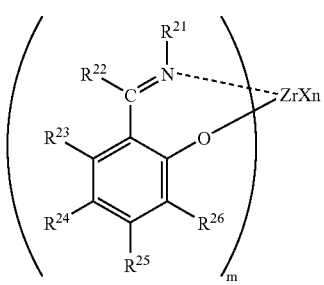

m denotes an integer of 1 or 2 and preferably 2.

$R^{21}$ denotes a aromatic hydrocarbon group which may be substituted by substituent groups and desirably an aromatic hydrocarbon group of 6 to 30, preferably 6 to 20 carbon atoms such as phenyl, benzyl, naphthyl, biphenylyl, terphenylyl, phenanthryl, anthryl, or the like.

The substituent groups which $R^{21}$ may comprise are not specifically limited, and include halogen atoms, hydrocarbon groups, oxygen-containing groups, nitrogen-containing groups, halogen-containing groups, hydrocarbon groups having oxygen-containing groups, hydrocarbon groups having nitrogen-containing groups, and hydrocarbon groups having halogen-containing groups.

As halogen atoms, fluorine, chlorine, bromine, and iodine can be exemplified.

As the hydrocarbon groups, those groups exemplified for $R^2$ to $R^5$ can be exemplified. The hydrocarbon groups may be substituted by halogen for hydrogen atoms and halogen-substituted hydrocarbon groups include, for example, a halogenated hydrocarbon group of 1 to 30, preferably 1 to 20 carbon atoms such as trifluoromethyl, pentafluorophenyl, chlorophenyl, or the like.

Further the hydrocarbon groups may be substituted by other hydrocarbon groups and hydrocarbon groups substituted by other hydrocarbon groups include an aryl-substituted alkyl group such as benzyl, cumyl, or the like.

Of the examples of the hydrocabon groups, especially preferable are alkyl groups having 1 to 30 carbon atoms, preferablely linear or chain-branched alkyl groups having 1 to 20 carbon atoms, such as methyl, ethyl, n-propyl, isopropyl, n-butyl, isobutyl, sec-butyl, 1-butyl, neopentyl and n-hexyl; aryl groups having 6 to 30 carbon atoms, preferably 6 to 20 carbon atoms, such as phenyl, naphtyl, biphenylyl, terphenylyl, phenanthryl and anthryl; and substituted aryl groups where 1 to 5 of such substituents are substituted as alkyl groups having 1 to 30 carbon atoms, preferably 1 to 20 carbon atoms, and an aryl groups having 6 to 30 carbon atoms, preferably 6 to 20 carbon atoms.

As the hydrogen containing groups, the nitrogen containing groups and halogen containing groups there can be exmplified an alkoxy group, an aryloxy groups, an acyl group, an ester group, an amido group, an imido group, an amino group, an imino group, a cyano group, a nitro group, a carboxyl group, a hydroxy group, etc.

Examples of the alkoxy group include methoxy, ethoxy, n-propoxy, isopropoxy, n-butoxy, isobutoxy and tert-butoxy.

Examples of the alyloxy groups include phenoxy, 2,6-dimethylphenoxy and 2,4,6-trimethylphenoxy.

The acyl groups are, for example, a formyl group, an acethyl group, a benzoyl group, a p-chlorobenzoyl group, a p-methoxybenzoyl group.

Examples of the ester groups include acethyloxy, benzoyloxy, methoxycarbonyl, phenoxycarbonyl, and p-chlorophenoxycarbonyl.

The amido groups include, for example, acetamide, N-methylacetamide and N-methylbenzamido.

As imido groups there can be exemplified acetimido and benzimido.

Examples of the amino groups include dimethylamino, ethylmethylamino and diphenylamino.

The imino groups are, for example, methylimino, ethylimino, propylimino, butylimino and phenylimino.

The hydrocarbon groups having oxygen-containing groups include above described hydrocarbon groups substituted by the oxygen-containing groups; the hydrocarbon groups having nitrogen-containing groups include above described hydrocarbon groups substituted by the nitrogen-containing groups; and the hydrocarbon groups having halogen-containing groups include above described hydrocarbon groups substituted by the halogen-containing groups.

$R^{22}$ to $R^{25}$ may be the same or different to one another and respectively denote a hydrogen atom, a halogen atom, a hydrocarbon group, an oxygen-containing group, a nitrogen-containing group, a halogen-containing group, a hydrocarbon group having oxygen-containing groups, a hydrocarbon group having nitrogen-containing groups, and a hydrocarbon group having halogen-containing groups.

As the halogen atom, the hydrocarbon group, the oxygen-containing group, the nitrogen-containing group, a halogen-containing group, the hydrocarbon group having oxygen-containing groups, the hydrocarbon group having nitrogen-containing groups, and the hydrocarbon group having halogen-containing groups, those exemplified as the substituent groups which $R^{21}$ is allowed to comprise can be exemplified.

In a transition metal compound having the above described general formula (IX), one or more of the substituent groups which $R^{21}$ has and groups denoted as $R^{22}$ to $R^{25}$ are respectively a halogen atom, an oxygen-containing group, a nitrogen-containing group, a halogen-containing group, a hydrocarbon group having oxygen-containing groups, a hydrocarbon group having nitrogen-containing groups, or a hydrocarbon group having halogen-containing groups.

One or more of the substituent groups which $R^{21}$ has and groups denoted as $R^{22}$ to $R^{25}$ are preferably substituent groups selected from an aryloxy group, an amino group, an imino group, a cyano group, or a nitro group or a hydrocarbon group having these substituent groups.

Further, it is also preferable that one of the substituent groups which $R^{21}$ has and groups denoted as $R^{22}$ to $R^{25}$ is an alkoxy group and one or more of the rest are substituent groups selected from an alkoxy group, an aryloxy group, an amino group, an imino group, a cyano group, a nitro group, and a hydrocarbon group having these substituent groups.

It is especially preferable that one or more of the substituent groups which $R^{21}$ has and groups denoted as $R^{22}$ to $R^{25}$ are substituent groups selected from an aryloxy group and amino group.

$R^{26}$ is a hydrocarbon group. As the hydrocarbon group preferable for $R^{26}$, the following groups are preferable examples; a straight chain or branched alkyl group of 1 to 30, preferably 1 to 20 carbon atoms such as methyl, ethyl, n-propyl, isopropyl, n-butyl, isobutyl, sec-butyl, tert-butyl, neopentyl, n-hexyl, or the like; a cyclic saturated hydrocarbon group of 3 to 30, preferably 3 to 20 carbon atoms such as cyclopropyl, cyclobutyl, cyclopentyl, cyclohexyl, adamantyl, or the like; an aryl group of 6 to 30, preferably 6 to 20 carbon atoms such as phenyl, benzyl, naphthyl, biphenylyl, triphenylyl, or the like; and one of these group substituted by alkyl groups of 1 to 30, preferably 1 to 20 carbon atoms or by aryl groups of 6 to 30, preferably 6 to 20 carbon atoms.

$R^{21}$ to $R^{26}$ may be the same or different to one another and among them, two or more groups, preferably neighboring groups, may be bonded one another to form an alicyclic ring, an aromatic ring, or a hydrocarbon ring containing hetero atoms such as nitrogen atom and these rings may further be substituted.

In the case m is 2, two groups of $R^{21}$ to $R^{26}$ may bonded each other and also in the case m is 2, respective $R^{21}$, respective $R^{22}$, respective $R^{23}$, respective $R^{24}$, respective $R^{25}$, and respective R may be the same or different to each other.

n denotes a number satisfying the valence of Zr and is particularly an integer of 2 to 4, preferably 2.

X can be defined as same as X in the above described general formula (VII).

An ethylene (co)polymer satisfying the above described requirements ($i_{A3}$) to ($iv_{A3}$), preferably the above described requirements ($i_{A3}$) to ($iv_{A3}$) and at least one of the above described requirements ($v_{A3}$) to ($vi_{A3}$), can be produced using a transition metal compound having such a general formula (IX).

Concrete examples of transition metal compounds (a2) defined as the general formulas (VII) to (IX) will be described below and the transition metal compounds are not limited to those compounds.

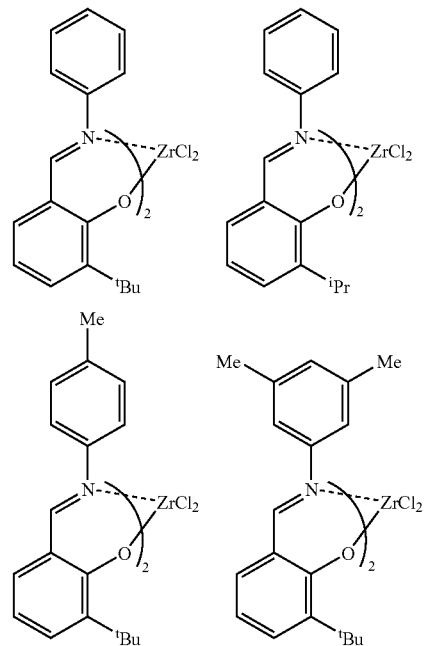

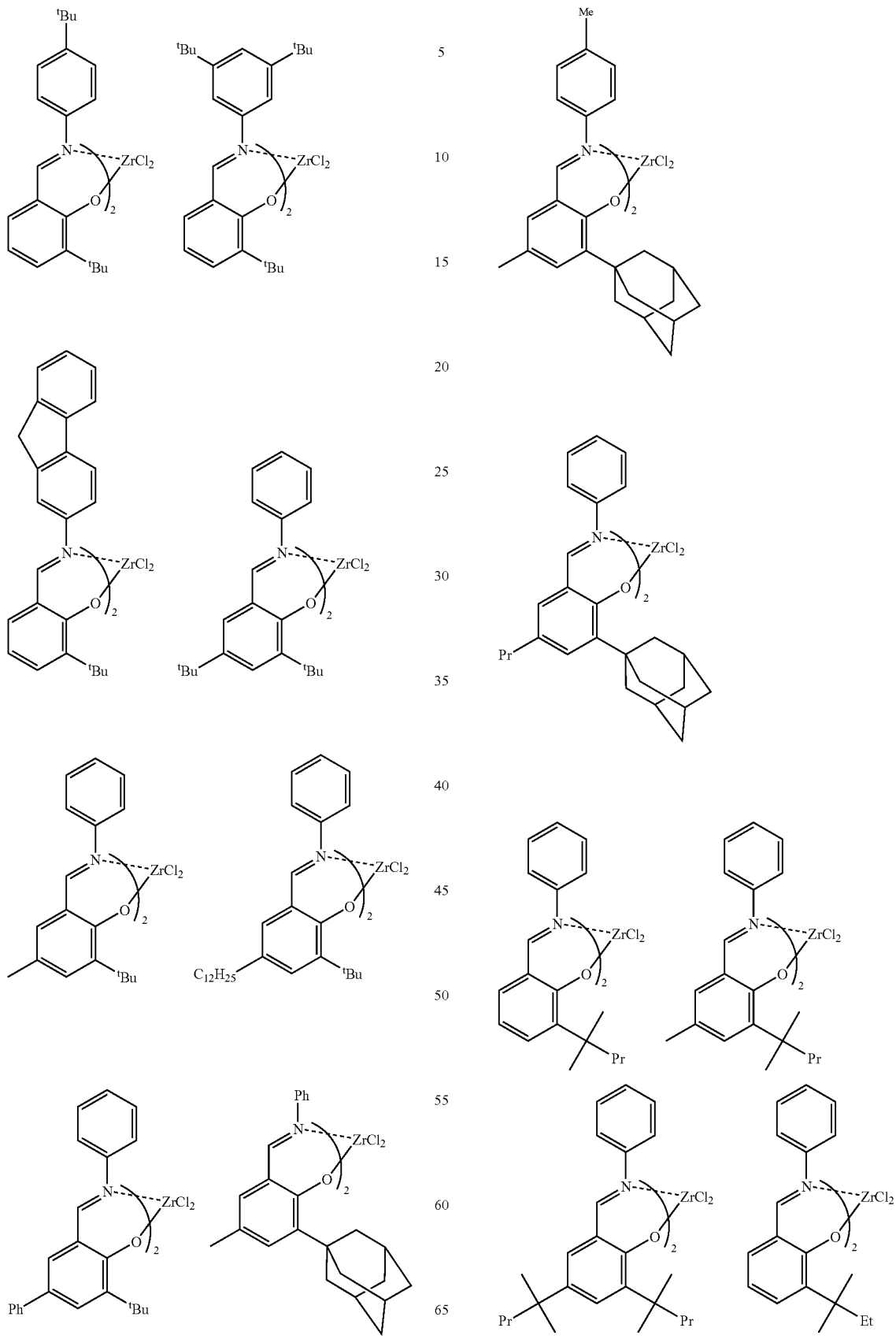

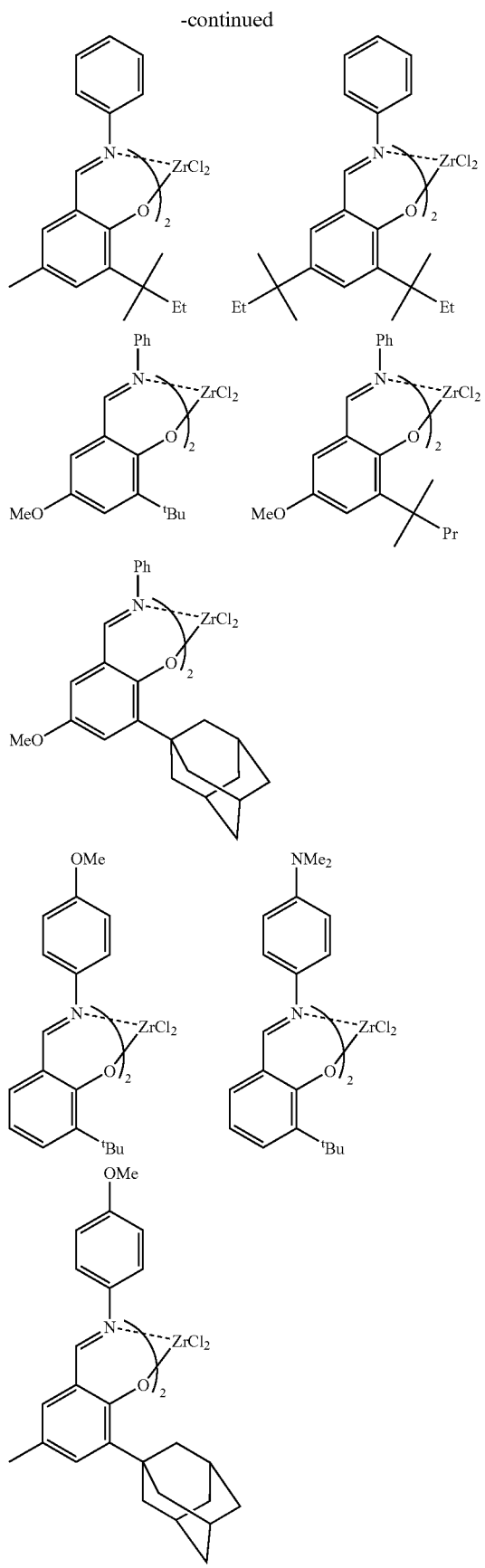
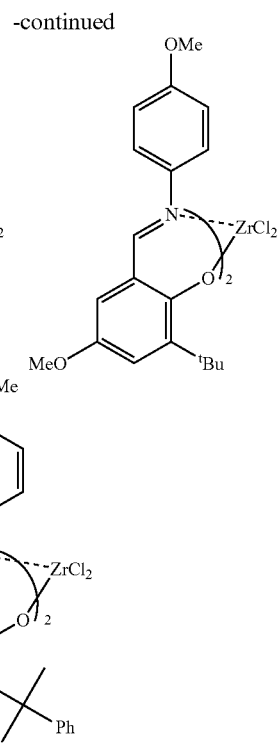

The above exemplified compounds, Me denotes methyl group, Et denotes ethyl group, $^t$Bu tert-butyl group, and Ph phenyl group.

The method for producing the transition metal compound (a2) is not specifically restricted and, for example, the compound can be produced as described below.

The transition metal compound (a2) can be synthesized by, for example, reaction of a compound (a ligand precursor) capable of forming a ligand and a zirconium compound of, for example, ZrXk (X is the same as above defined X and k denotes the number satisfying the valence of Zr).

The ligand precursor can be obtained by reaction of a salicylaldehyde compound and a primary amine compound having a formula $R^1$—$NH_2$ ($R^1$ is the same as $R^1$ of the above described general formula (VII).), for example, an aniline compound or an alkyl amine compound. Particularly, the precursor can be obtained, for example, by dissolving both starting compounds in a solvent. As the solvent, a commonly used solvent for such a reaction is usable and especially an alcohol solvent such as methanol, ethanol, or the like or a hydrocarbon solvent such as toluene or the like is preferable. Then, the resultant solution is stirred for about 1 to 48 hours at from room temperature to reflux condition to obtain a corresponding ligand precursor at high production yield.

Next, a corresponding transition metal compound (a2) can be synthesized by reaction of a ligand precursor produced in such a manner and a zirconium compound. Particularly, the synthesis is carried out by dissolving a synthesized ligand precursor in a solvent, bringing the resultant solution into contact with a base, if necessary, to produce a phenoxide salt, and then mixing the produced substance with a metal compound such as a metal halide, an alkylated metal compound, or the like at a low temperature, and stirring the mixture at −78° C. to a room temperature or in reflux condition for 1 to 48 hours. As the solvent to be used, a solvent commonly used for such a reaction can be usable and polar solvents such as ethers, tetrahydrofuran (THF), and the likes and a hydrocarbon solvent such as toluene are preferable. As the base to be used for producing the phenoxide salt, the following salts are preferable; a metal salt such as a lithium salt, e.g. n-butyllithium, a sodium salt, e.g. sodium hydride, and an organic base, e.g. triethylamine, pyridine, or the like.

An ethylene (co)polymer (A3) can be produced by polymerizing solely ethylene or copolymerizing ethylene and an α-olefin of 3 to 20 carbon atoms in the presence of such above described olefin polymerization catalyst similar in specified conditions.

The polymerization method will be described below.

Polymerization can be carried out by any one of the methods; liquid-phase polymerization methods such as solution polymerization and suspension polymerization and gas-phase polymerization methods.

As an inert hydrocarbon solvent to be used for a liquid-phase polymerization, the same inert hydrocarbon solvents to be employed for producing above described ethylene (co) polymer (A1) are concrete examples and an olefin itself may be used as a solvent.

At the time of carrying out (co)polymerization using such an olefin polymerization catalyst, a transition metal compound (a2) is so added as to keep the concentration generally $10^{-12}$ to $10^{-2}$ mole, preferably $10^{-10}$ to $10^{-3}$ mole, per 1 liter of the reaction volume. An organoaluminum oxy compound (b-2) is so added as to keep the mole ratio (Al/Zr) of aluminum atom (Al) in the compound (b-2) and zirconium (Zr) of the transition metal compound (a2) within generally 10 to 500,000 and preferably 20 to 100,000.

In the case of using such a transition metal compound (a2) defined as above described general formula (VII), polymerization is carried out at the polymerization temperature controlled to be generally 60° C. or higher and preferably 75° C. or higher and the polymerization pressure controlled to be generally 3 to 100 kg/cm² and preferably 5 to 50 kg/cm². In the case of using such a transition metal compound (a2) defined as above described general formula (VIII) or (IX), polymerization is carried out at the polymerization temperature controlled to be generally 40° C. or higher and preferably 50° C. or higher and the polymerization pressure controlled to be generally 3 to 100 kg/cm² and preferably 5 to 50 kg/cm².

The polymerization reaction may be carried out by any method such as batch type, semi-continuous, and continuous methods.

The molecular weight of a produced ethylene (co)polymer (A3) can be adjusted either by making hydrogen exist in the polymerization system or changing the polymerization temperature.

Ethylene (co)polymer (A4)

An ethylene (co)polymer (A4) of the present invention is an ethylene homopolymer or a random copolymer of ethylene and an α-olefin of 3 to 20 carbon atoms.

The α-olefin of 3 to 20 carbon atoms may be, for example, a straight chain or branched α-olefin of 3 to 20 carbon atoms as same as described above and a cyclic olefin of 3 to 20 carbon atoms as same as described above.

The ethylene (co)polymer (A4) is preferably an ethylene homopolymer or a copolymer of ethylene and an α-olefin of 4 to 20 carbon atoms.

It is desirable for the ethylene (co)polymer (A4') to have intrinsic viscosity generally not lower than 1.0 dl/g, preferably 2.0 to 40.0 dl/g.

It is desirable for the ethylene (co)polymer (A4) to contain generally 50 to 100% by weight, preferably 55 to 100% by weight, further preferably 65 to 100% by weight, and most preferably 70 to 100% by weight of a repeated unit derived from ethylene and 0 to 50% by weight, preferably 0 to 45% by weight, further preferably 0 to 35% by weight, and most preferably 0 to 30% by weight of a repeated unit derived from α-olefin.

The ethylene (co)polymer (A4) is ($i_{A4}$) the number average molecular weight (Mn), the weight average molecular weight (Mw), and the Z average molecular weight (Mz) measured by GPC satisfying the following relations;
Mz/Mw≧4/(0.5–4.50/((Mw/Mn)–0.2)) and preferably
Mz/Mw≧4.2/(0.5–4.40/((Mw/Mn)–0.2)) and
Mw/Mn>9.2 and preferably Mw/Mn>12.0.

The desirable state of the ethylene (co)polymer (A4) satisfies that Mz/Mw measured by GPC does not exceed Mw/Mn.

A polymer having Mn, Mw and Mz satisfying above described relations is characterized by, for example, blow moldability and inflation film moldability.

It is preferable for the ethylene (co)polymer (A4) to satisfy the following requirements ($iii_{A4}$) to ($vii_{A4}$) described below, in addition to the above described requirements ($i_{A4}$)

($iii_{A4}$) The melt tension (MT (g)) at 190° C. and the swell ratio (SR) calculated from the strand diameter extruded at 190° C. satisfying the following relations;
log(MT)>12.9–7.15×SR and preferably log(MT)>13.3–7.15×SR.

An ethylene (co)polymer having MT and SR satisfying above described relations is characterized by excellent bubble stability at the time of inflation molding.

($iv_{A4}$) The intrinsic viscosity ([η] (dl/g)) measured in decalin at 135° C. and the melt flow rate (MFR (g/10 minutes)) measured under 2.16 kg load at 190° C. satisfying the following relations;
[η]>1.85×MFR$^{-0.192}$, preferably [η]>1.95×MFR$^{0.192}$, in the case of MFR<1 and
[η]>1.85×MFR$^{-0.213}$, preferably [η]>1.95×MFR$^{-0.213}$, in the case of MFR≧1.

An ethylene (co)polymer having the intrinsic viscosity and MFR satisfying above described relations is characterized by, for example, with excellent mechanical strength of a molded product.

Further in the ethylene (co)polymer (A4), ($ii_{A4}$) The weight average molecular weight (Mw) measured by GPC and the swell ratio (SR) calculated from the strand diameter extruded at 190° C. satisfy the following relations; SR>4.55–0.56×log(Mw), preferably SR>4.60–0.56×log(Mw).

An ethylene (co)polymer having the Mw and SR satisfying above described relations is characterized by, for example, blow moldability and excellent weld strength of a blow-molded product.

It is also preferable for the ethylene (co)polymer (A4) of the present invention to satisfy the following requirements ($v_{A4}$) and/or ($vii_{A4}$) described below, in addition to the above described requirements ($i_{A4}$) or ($i_{A4}$) to ($iv_{A4}$)

($v_{A4}$) The number of the vinyl groups at the molecular terminals calculated by conversion to that per one molecular chain having the same molecular weight as the number average molecular weight is 0.50 or higher, preferably 0.60 or higher.

The number of vinyl groups at the molecular terminals is generally 1.0 or lower.

In the case the vinyl groups at the molecular terminals are within the above described ranges, the ethylene (co)polymer is easy to be modified and is high adhesion strength to other resin. Also, a composition containing the ethylene (co)polymer comprising the vinyl groups at the molecular terminals within the above described ranges tends to have high adhesion strength to other resin.

($vi_{A4}$) The number of methyl branches measured by $^{13}$C-NMR is less than 0.1 per 1,000 of carbon atoms.

An ethylene (co)polymer (A4) satisfying such a requirement is an ethylene homopolymer or a copolymer of ethylene and an α-olefin of 4 to 20 carbon atoms.

An ethylene (co)polymer satisfying such a requirement is a rigid crystal structure and therefore is excellent mechanical strength.

($vii_{A4}$) Only 1 relative maximum value exists in the molecular weight distribution curve measured by GPC or at least 2 relative maximum values and at least 1 relative minimum value exist in the molecular weight distribution curve and in those cases, the intensity ($W_1$) of the relative minimum value and the lower intensity ($W_2$) of the relative the maximum values having the relative minimum value between them satisfy $W_1/W_2 \geq 0.85$, preferably $W_1/W_2 \geq 0.90$.

In the case 2 or more relative minimum values exit, all of the relative minimum values satisfy the above described relations.

An ethylene (co)polymer having $W_1$ and $W_2$ satisfying above described relations is characterized by, for example, extrusion moldability and excellent mechanical strength of a molded product.

In the case a molded product is produced from an ethylene (co)polymer (A4), fish eyes, besides fish eyes having cores of fibers and the likes, are scarcely generated. For example, not more than 20 fish eyes (except fish eyes having cores of fibers and the likes), preferably practically no fish eye, are observed with eyes in the case a film of 3.5 cm width and 50 μm thickness is formed using a capillary rheometer and eye observation of the film is carried out in the range of 3.0 cm width and 20 cm length of the film.

The methods for measuring above described physical properties will be described below.

Production Method of the Ethylene (co)polymer (A4)

The above described ethylene (co)polymer (A4) of the present invention can be produced by polymerizing solely ethylene or copolymerizing ethylene and an α-olefin of 3 to 20 carbon atoms under specified conditions in the presence of, for example, an olefin polymerization catalyst comprising (a3) a transition metal compound having the above described general formula (IX) and (b-2) an organoaluminum oxy compound.

An ethylene (co)polymer (A4) can be produced by any one of the methods; liquid-phase polymerization methods such as solution polymerization and suspension polymerization and gas-phase polymerization methods.

Specific examples of inert hydrocarbon solvents to be used for a liquid-phase polymerization are the same inert hydrocarbon solvents as employed for producing above described ethylene (co)polymer (A1) and an olefin itself may be used as a solvent.

At the time of carrying out (co)polymerization using such an olefin polymerization catalyst, a transition compound (a3) is so added as to keep the concentration generally $10^{-12}$ to $10^{-2}$ mole, preferably $10^{-10}$ to $10^{-3}$ mole, per 1 liter of the reaction volume. An organoaluminum oxy compound (b-2) is so added as to keep the mole ratio (Al/Zr) of aluminum atom (Al) in the compound (b-2) and zirconium (Zr) of the transition metal compound (a3) within generally 10 to 500,000 and preferably 20 to 100,000.

Polymerization is carried out at the polymerization temperature controlled to be generally 40° C. or higher and preferably 50° C. or higher and the polymerization pressure controlled to be generally 3 to 100 kg/cm$^2$ and preferably 5 to 50 kg/cm$^2$.

The polymerization reaction may also be carried out by any method such as batch type, semi-continuous, and continuous methods.

The molecular weight of a produced ethylene (co)polymer (A4) can be adjusted either by making hydrogen exist in the polymerization system or changing the polymerization temperature.

Ethylene (co)polymer (A5)

An ethylene (co)polymer (A5) of the present invention is an ethylene homopolymer or a random copolymer of ethylene and an α-olefin of 3 to 20 carbon atoms.

The α-olefin of 3 to 20 carbon atoms may be, for example, a straight chain or branched α-olefin of 3 to 20 carbon atoms as same as described above and a cyclic olefin of 3 to 20 carbon atoms as same as described above.

The ethylene (co)polymer (A5) is preferably an ethylene homopolymer or a copolymer of ethylene and an α-olefin of 4 to 20 carbon atoms.

It is desirable for the ethylene (co)polymer (A5) to have intrinsic viscosity generally not lower than 1.0 dl/g, preferably 2.0 to 40.0 dl/g and Mw/Mn value measured by GPC generally not lower than 5.5, preferably within a range of 20.0 to 100.0.

Additionally, the desirable state of the ethylene (co)polymer (A5) satisfies that Mz/Mw does not exceed Mw/Mn measured by GPC.

It is also desirable for the ethylene (co)polymer (A5) to contain generally 50 to 100% by weight, preferably 55 to 100% by weight, further preferably 65 to 100% by weight, and most preferably 70 to 100% by weight of a repeated unit derived from ethylene and 0 to 50% by weight, preferably 0 to 45% by weight, further preferably 0 to 35% by weight, and most preferably 0 to 30% by weight of a repeated unit derived from α-olefin.

The ethylene (co)polymer (A5) is ($i_{A5}$) at least 2 relative maximum values and at least 1 relative minimum value existing in the molecular weight distribution curve measured by GPC and the intensity ($W_1$) of the relative minimum value and the lower intensity ($W_2$) of the relative the maximum values having the relative minimum value between them satisfying $W_1/W_2 < 0.85$, preferably $W_1/W_2 < 0.80$.

In the case 2 or more relative minimum values exit, at least one of the relative minimum values satisfy the above described relations.

An ethylene (co)polymer having $W_1$ and $W_2$ satisfying above described relations is characterized by, for example, extrusion moldability and excellent mechanical strength of a molded product.

It is preferable for the ethylene (co)polymer (A5) to satisfy the following requirements ($iii_{A5}$) to ($iv_{A5}$) described below, in addition to the above described requirements ($i_{A5}$).

($iii_{A5}$) The melt tension (MT (g)) at 190° C. and the swell ratio (SR) calculated from the strand diameter extruded at 190° C. satisfying the following relations;

log(MT)>12.9−7.15×SR and preferably log(MT)>13.3−7.15×SR.

A polymer having MT and SR satisfying above described relations is characterized by excellent bubble stability at the time of inflation molding.

($iv_{A5}$) The intrinsic viscosity ([η] (dl/g)) measured in decalin at 135° C. and the melt flow rate (MFR (g/10 minutes) measured under 2.16 kg load at 190° C. satisfying the following relations;

[η]>1.85×MFR$^{-0.192}$, preferably [η]>1.95×MFR$^{-0.192}$, in the case of MFR<1 and

[η]>1.85×MFR$^{-0.213}$, preferably [η]>1.95×MFR$^{0.213}$, in the case of MFR≧1.

An ethylene (co)polymer having the intrinsic viscosity and MFR satisfying above described relations is characterized by, for example, excellent mechanical strength of a molded product.

It is further preferable for the ethylene (co)polymer (A5) to satisfy the following.

($ii_{A5}$) The weight average molecular weight (Mw) measured by GPC and the swell ratio (SR) calculated from the strand diameter extruded at 190° C. satisfy the relations; SR>4.55−0.56×log(Mw), preferably SR>4.60−0.56×log(Mw).

An ethylene (co)polymer having the Mw and SR satisfying above described relations is characterized by, for example, excellent blow moldability and excellent weld strength of a blow-molded product.

It is also preferable for the ethylene (co)polymer (A5) to satisfy the following requirements ($v_{A5}$) and/or ($vi_{A5}$) described below, in addition to the above described requirements ($i_{A5}$) or in addition to the above described ($i_{A5}$) to ($iv_{A5}$).

($v_{A5}$) The number of the vinyl groups at the molecular terminals calculated by conversion to that per one molecular chain having the same molecular weight as the number average molecular weight is 0.50 or higher, preferably 0.60 or higher.

The number of vinyl groups at the molecular terminals is generally 1.0 or lower.

In the case the vinyl groups at the molecular terminals are within the above described ranges, the ethylene (co)polymer is easy to be modified and is high adhesion strength to other resin. Also, a composition containing the ethylene (co)polymer having the vinyl groups at the molecular terminals within the above described ranges tends to have high adhesion strength to other resin.

($vi_{A5}$) The number of methyl branches measured by $^{13}$C-NMR is less than 0.1 per 1,000 of carbon atoms.

An ethylene (co)polymer satisfying such a requirement is an ethylene homopolymer or a copolymer of ethylene and an α-olefin of 4 to 20 carbon atoms.

An ethylene (co)polymer satisfying such a requirement is a rigid crystal structure and therefore is excellent mechanical strength.

In the case a molded product is produced from an ethylene (co)polymer (A5), fish eyes, besides fish eyes having cores of fibers and the likes, are scarcely generated. For example, not more than 20 fish eyes (except fish eyes having cores of fibers and the likes), preferably practically no fish eye, are observed with eyes in the case a film of 3.5 cm width and 50 μm thickness is formed using a capillary rheometer and eye observation of the film is carried out in the range of 3.0 cm width and 20 cm length of the film.

The methods for measuring above described physical properties will be described below.

Production Method of the Ethylene (co)polymer (A5)

The above described ethylene (co)polymer (A5) of the present invention can be produced by polymerizing solely ethylene or copolymerizing ethylene and an α-olefin of 3 to 20 carbon atoms under specified conditions in the presence of, for example, an olefin polymerization catalyst comprising (a4) a transition metal compound having the above described general formula (VIII) and (b-2) an organoaluminum oxy compound.

Polymerization can be carried out by any one of the methods; liquid-phase polymerization methods such as solution polymerization and suspension polymerization and gas-phase polymerization methods.

Specific examples of inert hydrocarbon solvents to be used for a liquid-phase polymerization are the same inert hydrocarbon solvents as employed for producing above described ethylene (co)polymer (A1) and an olefin itself may be used as a solvent.

At the time of carrying out (co)polymerization using such an olefin polymerization catalyst, a transition metal compound (a4) is so added as to keep the concentration generally $10^{-12}$ to $10^{-2}$ mole, preferably $10^{-10}$ to $10^{-3}$ mole, per 1 liter of the reaction volume. An organoaluminum oxy compound (b-2) is so added as to keep the mole ratio (Al/Zr) of aluminum atom (Al) in the compound (b-2) and zirconium (Zr) of the transition metal compound (a4) within generally 10 to 500,000 and preferably 20 to 100,000.

Polymerization is carried out at the polymerization temperature controlled to be generally 40° C. or higher and preferably 50° C. or higher and the polymerization pressure controlled to be generally 3 to 100 kg/cm$^2$ and preferably 5 to 50 kg/cm2.

The polymerization reaction may also be carried out by any method such as batch type, semi-continuous, and continuous methods.

The molecular weight of a produced ethylene (co)polymer (A5) can be adjusted either by making hydrogen exist in the polymerization system or changing the polymerization temperature.

Method for Measuring Physical Properties

The physical properties of the above described ethylene (co)polymers (A1) to (A5) can be measured by following manner.

(Preparation of Specimen for Measurement)

To 100 parts by weight of a powdery ethylene (co)polymer, 0.05 parts by weight of tri(2,4-di-tert-butylphenyl)phosphate as a secondary antioxidant, 0.1% by weight of n-octadecyl-3-(4'-hydroxy-3',5'-di-tert-butylphenyl)propionate as a heat resistant stabilizer, and 0.05 parts by weight of calcium stearate as a hydrochloric acid absorbent are added. After that, the resultant mixture is melted and kneaded at a set temperature of 180° C. using a Labo Plastomill (a batch type melting and kneading apparatus) produced by Toyo Seiki Seisaku-Sho, taken out, formed into a sheet by a cooling press set at 20° C., and cut into a proper size to obtain a specimen for measurement.

(Measurement of the Number of Methyl Branches)

The number of methyl branches in a polymer molecular chain per 1,000 carbon atoms is measured by $^{13}$C-NMR. The measurement is done using a Lambda 500 type nuclear magnetic resonance apparatus ($^1$H: 500 MHz) produced by Nippon Electronic Company. The measurement is carried out 10,000 to 30,000 integrated times. The peak (29.97 ppm) of a main chain methylene is employed as the chemical shift standard. From 250 to 400 mg of a specimen and 3 ml of a liquid mixture of extra pure grade o-dichlorobenzene produced by Wako Pure Chemical Industries, Ltd. and Benzene-d 6 produced by ISOTEC in 5:1 (volume ratio) are put to a quartz glass tube of 10 mm diameter for NMR measurement sold at a market and heated at 120° C. and the specimen is evenly dispersed in the solvents to carry out the measurement. Ascription of respective absorption in the obtained NMR spectrum is carried out according to the description on pp. 132 to 133, "NMR-introduction and experiment guide [1]," Field of Chemistry, extra edition vol. 141. The number of methyl branches per 1,000 carbon atoms is calculated from the integrated intensity ratio of absorption (19.9 ppm) of the methyl group derived from the methyl branches to the integrated absorption appeared in a range of 5 to 45 ppm.

(The number average molecular weight (Mn), the weight average molecular weight (Mw), the Z-average molecular weight (Mz), the molecular weight distribution (Mw/Mn), the molecular weight distribution (Mz/Mw))

Using the above described specimen and employing GPC-150C produced by Waters, Co., measurement is carried out by the following method. Separation columns employed are TSK gel GMH6-HT+TSK gel GMH6-HTL produced by Tosoh Corporation and each column is 7.8 mm inner diameter and 60 cm in length. The column temperature is controlled to be at 140° C.; 0.025% by weight of o-dichlorobenzene (Wako Pure Chemical Industries, Ltd.) and 2,6-di-tert-butyl-p-cresol (Kanto Kagaku) as an antioxidant are used for the mobile phase and moved at 1.0 ml/minute; the concentration of the specimen is controlled to be 0.1% by weight; the amount of the specimen is set to be 500 micro liter; and a differential refractometer is employed as a detector. Seventeen monodisperse PS having molecular weight 500 to $2.06 \times 10^7$ are used for molecular weight calibration. A molecular weight calibration curve is produced by approximating the relation between the logarithmic value of the reference PS molecular weight and the retention time to a cubic polynominal expression. The average molecular weight and the molecular weight distribution reduced to PE are calculated by converting the molecular weight calibration curve of PS type into the molecular weight calibration curve of PE type using viscosity equations of PS and PE. The calculated Mn, Mw, Mz are those reduced to PE.

(Melt Flow Rate (MFR))

Using the above described specimen, measurement is carried out at 190° C. and 2.16 kg load according to ASTM D1238-89.

(Intrinsic Viscosity ([η]))

The value measured at 135° C. using decalin solvent. That is, about 20 mg of the above described specimen for measurement is dissolved in 15 ml decalin and the specific viscosity $\eta_{sp}$ is measured in an oil bath at 135° C. To the resultant decalin solution, 5 ml of decalin solvent is additionally added to dilute the solution and the specific viscosity $\eta_{sp}$ is measured in the same manner. The dilution process is repeated further two times and the intrinsic viscosity is calculated as $\eta_{sp}/C$ by extrapolating the concentration (C) to be 0.

$$[\eta] = \lim(\eta_{sp}/C)(C \to 0)$$

(A Heating Elution Separation Test (TREF))

An object polymer to be measured is completely dissolved in orthodichlorobenzene to produce a solution of 0.5% by weight concentration. The produced polymer solution is charged in a column of 21.4 mm inner diameter and 150 mm in length and made of a stainless steel (glass beads are used as a filler) and then the temperature of the column is gradually cooled from 140° C. to -15° C. at a rate of 10° C./h. After that, while orthodichlorobenzene being fed in to the column at the flow rate of 1 ml/min, the column temperature is increased from -15° C. to 120° C. at a rate of 15° C./h. The IR spectrum of the polymer component eluted during the temperature increase is continuously measured using a Fourier transform IR spectrophotometer (FT-IR). The obtained spectrum is analyzed to compute the concentration of the eluted polymer at each temperature and the number of branches (the branching degree) per 1,000 carbon atoms.

The temperature fractionated component to be employed for GPC measurement is taken out as an orthodichlorobenzene solution and then recovered from methanol by a re-precipitation method. The recovered polymer is measured by a method described in the GPC measurement item. The average branching degree of the component eluted in a prescribed temperature range is calculated as the average of the branching degree by weight at every respective temperature.

(Measurement of the Number of Hexyl Branches)

The number of methyl branches per 1,000 carbon atoms in a polymer molecular chain is measured by $^{13}$C-NMR. The measurement is carried out using a Lambda 500 type nuclear magnetic resonance apparatus ($^1$H: 500 MHz) produced by Nippon Electronic Company. The measurement is carried out 10,000 to 30,000 integrated times. The peak (29.97 ppm) of a main chain methylene is employed as the chemical shift standard. From 250 to 400 mg of a PE specimen and 3 ml of a liquid mixture of extra pure grade o-dichlorobenzene produced by Wako Pure Chemical Industries, Ltd. and Benzene-d 6 produced by ISOTEC in 5:1 (volume ratio) are put to a quartz glass tube of 10 mm diameter for NMR measurement sold at a market and heated at 120° C. and the specimen is evenly dispersed in the solvents to carry out the measurement. Ascription of respective absorption in the obtained NMR spectrum is carried out according to the description on pp. 132 to 133, "NMR-introduction and experiment guide [1]," Field of Chemistry, extra edition vol. 141. The number of hexyl or higher branches per 1,000 carbon atoms is calculated from the integrated intensity methylene group (C6+3) appeared at 32.2 ppm.

(Decane-Soluble Component)

The amount of a decane-soluble component is measured by adding about 3 g of the copolymer in 450 ml of n-decane, dissolving the copolymer in the decane at 145° C., cooled to 23° C., removing n-decane-insoluble component by filtration, and recovering the n-decane-soluble component from the resultant filtered solution.

(Density)

A specimen for measurement is produced by forming a sheet having a thickness of 0.5 mm at 170° C. under 100 kg/cm$^2$ pressure using a hydraulic thermal press machine manufactured by Kamifuji Metal Industry and cooling the sheet by compressing at 100 kg/cm$^2$ pressure using another hydraulic thermal press machine set at 20° C. The obtained pressed sheet is heated for 1 hour at 120° C. and gradually cooled to a room temperature for 1 hour and then the density is measured by a density gradient tube.

(Melting Point (Tm))

The melting point is set to be a temperature of the maximum peak position of an endothermic curve obtained by a differential scanning calorimeter (DSC). Measurement is carried out based on an endothermic curve of 2nd-run of the processes of packing an aluminum pan with a specimen, heating the specimen to 200° C. at 10° C./minute, keeping it at 200° C. for 5 minutes, cooling it to -150° C. at 20° C./minute, and then again heating at 10° C./minute.

(Amount of Paraxylene Eluted Component)

To a double tube type separable flask, 500 ml of paraxylene (PX), 5 g (measured) of a specimen, BHT in 0.5% by weight to the specimen are put, the mixture is heated to 130° C. at about 2° C./minute and kept at 130° C. for 1 hour. During the process, the mixture is continuously stirred. After confirmation that the specimen is completely dissolved, the mixture is cooled to 75° C. at about 0.6° C./minute and kept at 75° C. for 1 hour, and a part of components of the specimen are precipitated. Stirring is also continuously carried out during the process.

Next, the component dissolved in paraxylene at 75° C. is precipitated by opening a cock in the lower part of the separable flask and dripping the paraxylene in which a part of the specimen is dissolved to 3 liter of acetone at about 7.5 ml/minute. After the acetone containing the precipitated component is filtered, the precipitated component is further washed with acetone two times and dried for a whole day and night by a vacuum drier. Also, the component precipitated in paraxylene at 75° C. is separately recovered and dried.

Respective dried samples are weighed and weight percentage of the component dissolved in paraxylene at 75° C. to the whole specimen is calculate.

GPC-IR Measurement

Measurement is carried out in the following conditions. The molecular weight is calculated by conversion into polyethylene and the amount of methyl branches per 1,000 carbon atoms is defined as a value obtained by subtracting (14× 2000)/M from the methyl amount (Me) of respective molecular weights (M).

Apparatus: ALC/GPC 150-C type manufactured by Waters

Detection apparatus/Detector: FT-IR (Nicolet Magna 560 type)/MCT

Separation column: PLgel MIXED-A (7.5 mm×30 mm×2 columns)

Mobile phase: ODCB

Flow rate: 1.0 ml/min.

Column temperature: 140° C.

Specimen concentration: 0.15 wt. %

Injection amount: 1 ml

FT-IR scanning times: 20 times

FT-IR resolving power: 4 $cm^{-1}$ (Melt Tension (MT))

The melt tension can be determined by measuring the stress at the time when a melted ethylene (co)polymer is extended at a constant speed. That is, the melt tension measurement is carried out using the above described specimen for measurement and a MT measurement apparatus produced by Toyo Seiki Seisaku-Sho in the conditions of 190° C. resin temperature, 15 mm/minute extrusion speed, 10 to 20 m/minute winding speed, 2.095 mm$\phi$ nozzle diameter, and 8 mm nozzle length.

(Swell Ratio (SR))

Melted resin is extruded in the same conditions as those of the above described melt tension measurement and a strand of about 2 cm length is sampled. The strand is cut at a point about 5 mm from the lower side (the side apart from the nozzle) of the strand and the diameter is measured at two points different from each other by 90°. The SR is defined as the value obtained by dividing the average value (mm) of the diameters by 2.095 mm nozzle diameter.

(Measurement of the Amount of Vinyl at Molecular Terminals)

The amount of vinyl at molecular terminals is measured using IR spectrophotometer FT-IR 350 type produced by JASCO Corporation by the following method.

Calibration Curve Production:

A plurality of standard specimens having different number (n) of vinyl type double bonds (n: the number of vinyl groups at terminals per 1,000 carbon atoms) are produced by changing the mixing ratio of polyethylene containing no vinyl type double bonds and polyolefin containing vinyl type double bonds and IR absorption measurement is carried out for these standard specimens. A common tangent line of the relative maximum points near 940 to 850 $cm^{-1}$ is drawn and using the line as a base line, the absorbance $D_s$ in the key band (910 $cm^{-1}$) of the vinyl terminals and the value $D_0$ of the base line are read out. Further, the thickness L (cm) of each specimen is accurately read out using a micrometer and the absorbance per unit thickness D/L (D/L=$(D_s-D_0)$/L) of the key band for each specimen is calculated and the relations of the obtained value and the number (n) of vinyl type double bonds are illustrated to give a calibration curve relevant to the amount of vinyl at terminals per 1,000 carbon atoms.

A film for IR absorption measurement as a standard specimen is produced by mixing polyethylene containing no vinyl type double bond and a polyolefin containing vinyl type double bonds, dissolving the mixture in chloroform at temperature as low as possible, and then evaporating the chloroform to give a mixed specimen, and hot rolling the mixed specimen. As the polyethylene containing no vinyl type double bond, for example, polyethylene (trade name: HZ 2200J) produced by Mitsui Chemicals, Inc. is employed and as the polyolefin containing vinyl type double bonds, 1,2-polybutadiene whose double bond amount is already known is employed.

Regarding a specimen for measurement, a film for IR absorption measurement is produced by hot rolling method and the absorbance per unit thickness D/L of the key band is calculated by the same manner as described above and the amount of vinyl at terminals per 1,000 carbon atoms is calculated using the above described calibration curve.

Next, the number average molecular weight (Mn) of the specimen for measurement is converted into the number of carbons and the amount of vinyl at terminals per one molecular chain having a molecular weight Mn is computed from the obtained number of carbons and the amount of vinyl at terminals per 1,000 carbon atoms.

(Fish Eyes)

A film having a thickness of about 50 μm, about 3.5 cm width, and about 30 cm length is produced by extruding resin at 190° C. resin temperature and 50 mm/min speed using a capillary type flow requirement testing apparatus manufactured by Toyo Seiki Seisaku-Sho and, instead of a nozzle, setting a small type T die with 40 mm width and 0.3 mm slit, and taking over the extruded resin at 1.95 m/min and 10 mm air gap. The number of fish eyes is counted by eye observation of the film in the range of 3.0 cm width and 20 cm length. The fish eyes having cores of fibers and the likes are observed with eyes by magnifying the sample 15 to 150 times using an optical microscope and fish eyes in fibrous shapes and fish eyes colored and apparently having cores of foreign materials are counted and the number of these fish eyes is subtracted.

(Composition)

The composition of an ethylene (co)polymer is determined by measuring $^{13}C$-NMR spectrum of a sample produced by evenly dissolving about 200 mg of copolymer in 1 ml of hexachlorobutadiene in a sample tube with generally 10 mm+diameter in measurement conditions of 120° C. measurement temperature, 25.05 MHz of measurement frequency, 1500 Hz of spectrum width, 4.2 sec. of pulse repeating intervals, and 6 μsec. of pulse width.

Additive

An additive for preventing oxidation or preventing aging may be added to ethylene (co)polymer (A1) to (A5) of the present invention. As such an additive, a heat resistant stabilizer and a hydrochloric acid absorbent are exemplified and further if necessary, a weathering resistant stabilizer may be added.

(A Heat Resistant Stabilizer)

There is no specific limits to the heat resistant stabilizer and, for example, a phenol type stabilizer, an amine type stabilizer, a sulfur type stabilizer such as a thio ether type stabilizer, and a phosphorus type stabilizer such as a phosphite type stabilizer can be exemplified.

The phenol stabilizers include, for example, 2,6-di-t-butyl-4-methylphenol, 2,6-di-t-butyl-4-ethylphenol, 2,6-dicyclohexyl-4-methylphenol, 2,6-di-t-amyl-4-methylphenol, 2,6-di-t-octyl-4-N-propylphenol, 2,6-dicyclohexyl-4-N-octylphenol, 2-isopropyl-4-methyl-6-t-butylphenol, 2-t-butyl-2-ethyl-6-t-octylphenol, 2-isobutyl-4-ethyl-6-t-hexylphenol, 2-cyclohexyl-4-N-butyl-6-isopropylphenol, dl-α-tocopherol, t-butylhydroquinone, 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2-methylenebis[6-(1-methylcyclohexyl)-p-cresol], 2,2'-ethylidenebis(4,6-du-t-butylphenol), 2,2'-butylidenebis(2-t-butyl-4-methylphenol), 2-t-butyl-6-(3-t-butyl-2-hydroxy-5-methylbenzyl)-4-methylphenylacrylate, 2-[1-(2-hydroxy-3-5-di-t-pentylphenyl)ethyl]-4,6-di-t-b pentylphenylacrylate, 1,1,3-tris(2-methyl-4-hydroxy-5-t-butylphenyl)butane, triethyleneglycol-bis[3-(3-t-butyl-5-methyl-4-hydroxyphenyl)propionate], 1,6-hexanediol-bis[3-(3,5-di-t-butyl-4-hydroxyphenyl) propionate], 2,2'-thiodiethylenebis[3-(3,5-di-t-butyl-4-hydroxyphenyl)propionate], N,N'-hexamethylenebis(3,5-di-t-butyl-4-hydroxy-hydrocinamide], 3,5-di-t-butyl-4-hydroxybenzylphosphonate-diethylester, tris(2,6-dimethyl-3-hydroxy-4-t-butylbenzyl)isocyanurate, tris[(3,5-di-t-butyl-4-hydroxyphenyl)propionyloxyethyl]isocyanurate, tris (4-t-butyl-2,6-dimethyl-3-hydroxybenzyl)isocyanurate, 2,4-bis(N-octylthio)-6-(4-hydroxy-3,5-di-t-butylanilino)-1,3,5-triazine, tetraquis[methylene-3-(3,5-di-t-butyl-4-hydroxypyhenyl)propionate]methane, bis(3,5-di-t-butyl-4-hydroxybenzylphosphonic acid ethyl) calcium, bis (3,5-d-t-butyl-4-hydroxybenzylphosphonic acid ethyl)nickel, bis[3,3-bis(3-t-butyl-4-hydroxyphenyl) butylic acid]glicolester, N,N'-bis[3(3,5-di-t-butyl-4-huydroxyphenyl)propionyl]hydrazine, 2,2-oxamidobis[ethyl-3-(3,5-t-butyl-4-Hydroxyphenyl)propionate], 2,2'-methylenebis(4-methyl-6-t-butylphenol)telephthalate, 1,3,5-trimethyl-2,4,6-tris(3,5-di-t-butyl-4-hydroxybenzyl)benzene, 3,9-bis[1,1-dimethyl-2-{β-(3-t-butyl-4-hydroxy-5-methylphenyl)propionyloxy}ethyl]-2,4,8-10-tetraoxaspiro[5,5]undecane, 2,2'-bis[4-(2-(3,5-di-t-butyl-4-hydroxyhydrocinnamoinoxy) ethoxyphenyl) propane and β-(3,5-di-t-butyl-4-hydroxyphenyl)propionic acid stearyl ester.

Examples of thioether stabilizers include dilaurylthiodipropionate, dimyristylthiodipropionate, distearyltiodipropionate, laurylstearylthiodipropionate, pentaerythrytoltetralaurylthiopropionate, distearyldisulfido, 4,4-thiobis(2-methyl-6-t-butylphenol), 4,4'-thiobis(3-methyl-6-t-butylphenol), 2,2'-thiobis(4-methyl-6-t-butylphenol), bis(3-methyl-4-hydroxy-5-t-butylbenzyl)sulfido, 4,4'-butylidenebis(2-methyl-4-hydroxy-5-t-butylphenyl)-2-laurylthioether, 6(4-hydroxy-3,5-di-t-butylanilino)-2,4-bis(octylthio)-1,3,5-triazine, 2,4-bis(4-hydroxy-3,5-di-t-butylanilino)-6-(octylthio)-1,3,5-triazine, tris{2-t-butyl-4-thio(2'-methyl-4'-hydroxy-5'-t-butylphenyl)-5-methylphenyl}phospite, phenodiazine, tetramethylthiuramdisulfido, and tetraethylthiuramdisulfido.

The phospite stabilizers include, for example, triphenylphospite, tris(nonylphenyl)phospite, tris(2,4-di-t-butylphenyl)phospite, tetratridecyl-4,4'-butylidenebis(3-methyl-6-t-butylphenol)-diphospite, 4,4'-isopropylidenediphenolalkylphosphite, alkyls of 12 to 15 carbon atoms, 4,4'-isopropylidnenebis(2-t-butylphenol)•di(nonylphenyl) phospite, tetra(tridecyl)-1,1-3-tris(2-methyl-5-t-butyl-4-hydroxyphenyl)butanediphsophite, tris(3,5-di-t-butyl-4-hydroxyphenyl)phosphite, bis(octylpheny)•bis[4,4'-butylidenebis(3-methyl-6-t-butylphenol)]•1,6-hexanoldiphosphite, hexatridecyl-1,1,3-tris(2-methyl-4-hydroxy-5-t-butylphenol)diphosphite, tris[4,4'-isopropylidenebis(2-t-butylphenol)]phosphite, 9,10-dihydro-9-oxa-10-phosphaphenanthrane-10-oxide, distearylpentaerythrytoldiphosphite, phenyl•4,4'-isopropylidenediphenol•pentaerythrytoldiphosphite, bis(2,4-dipt-butylphenyl)pentaerythrytoldiphosphite, bis(2,4,6-tri-t-butylphenyl)pentaerythrytoldiphospite, bis(2,6-di-t-butyl-4-methylphenyl)pentaerythrytoldiphosphite, phenylbisphenol-A-pentaerythryroldiphosphite, tetraquis(2,4-di-t-butylphenyl(4,4'-bisphenylenediphosphonite, 2,2'-ethylidnebis(4,6-di-t-butylphenyl)phlorophosphonite and 2,2'-methylenebis(4,6-di-t-butylphenyl)octylphosphite.

Those stabilizers may be used solely or in combination with two or more types of them.

(A Hydrochloric Acid Absorbent)

As the hydrochloric acid absorbent, a higher aliphatic acid metal salt, a hydrotalcite, epoxylated octyl stearate, and the likes can be exemplified.

The aliphatic acid metal salts include; alkaline earth metal salts such as magnesium salts, calcium salts, and barium salts, cadmium salts, zinc salts, lead salts, and alkali metal salts such as sodium salts, potassium salts, and lithium salts of higher aliphatic acid such as stearic acid, oleic acid, lauric acid, capric acid, arachidic acid, palmitic acid, behenic acid, 12-hydroxystearic acid, ricinoleic acid, and montanic acid.

The following are concrete higher aliphatic acid metal salts; magnesium stearate, magnesium laurate, magnesium palmitate, calcium stearate, calcium oleate, calcium laurate, barium stearate, barium oleate, barium laurate, barium arachidate, barium behenate, zinc stearate, zinc oleate, zinc laurate, lithium stearate, sodium stearate, sodium palmitate, sodium laurate, potassium stearate, potassium laurate, calcium 12-hydroxystearate, calcium montanate, and the likes.

As the hydrotalcite, compounds described below can be exemplified.

Those hydrochloric acid absorbents may be used solely or in combination of two or more types of them.

(Weathering Resistant Stabilizer)

As the weathering resistant stabilizer, a hindered amine type stabilizer, a UV absorbent, and the likes can be exemplified and as the UV absorbent, benzotriazoles, benzoates, benzophenones, and the likes can be exemplified.

As the hindered amine compounds, there can be exemplified bis(2,2,6,6-tetramethyl-4-piperidyl)sebacate, methyl succinate-1-(2-hydroxyethyl9-4-hydroxy-2,2,6,6-tetramethylpiperidine polycondensates, poly[[6-(1,1,3,3-teramethylbutyl)imino-1,3,5-triazine-2-4-diyl][(2,2,6,6-tetramethyl-4-piperidyl)imino]hexamethylene[(2,2,6,6-tramethyl-4- piperidyl)imino]], tetraquis(2,2,6,6-tetramethyl-4-piperidyl)-1,2,3,4-butanetetracarboxylate, 2,2,6,6-tetramethyl-4-piperidylbenzoate, bis-(1,2,6,6-pentamethyl-4-piperidyl)-2-(3,5-di-t-butyl-4-hydroxybenzyl)-2-N-butylmalonate, bis-(N-methyl-2,2,6,6-tetramethyl-4-piperidyl)sebacate, 1,1'-(1,2-ethanediyl)bis(3,3,5,5-tetramethylpiperadinon), (mixed 2,2,6,6-tetramethyl-4-piperidyl/tridecyl)-1,2,3,4-butanetetracarboxylate, (mixed 1,2,2,6,6-pentamethyl-4-piperidyl/tridecyl)-1,2,3,4-buthanetetracarboxylate, mixed {2,2,6,6-tetramethyl-4-piperidyl/β,β,β',β'-tetramethyl-3,9-[2,4,810-tetraoxaspiro(5,5) undecane]diethyl}-1,2,3,4-buthanetetracarboxylate, mixed {1,2,2,6,6-petnamethyl-4-piperidyl/β,β,β',β'-tetramethyl-3,9-[2,4,8,10-tetraoxaspiro(5,5)undecane]diethyl}-1,2,3,4-buthanetetracarboxylate, N-N'-bis(3-aminopropyl)ethylenediamine-2-4-bis[N-butyl-N-(1,2,2,6,6-pentamethyl-4-piperidyl)amino]-6-chloro-1,3,5-triazine condensates, poly[(6-N-morpholyl-1,3,5-1,3,5-triazine-2-4-diyl-1,3,5-triazine-2-4-diyl)[(2,2,6,6-tetramethyl-4-piperidyl)imino] hexamethylene[(2,2,6,6-tetramethyl-4-piperidyl)imino]], condensates of N,N'-bis(2,2,6,6-tetramethyl-4-piperidyl) hexamethylenediamine and 1,2-dibromoethane, [N-(2,2,6,6-tetramethyl-4-piperidy)-2-methyl-2-(2,2,6,6-tetramethyl-4-piperidyl)imino]propionamide, diester of 1,5-dioxaspiro[5,5]undecane-3,3-dicarboxylic acid and 2,2,6,6-tetramethylpiperidine-4-al, bis(2,2,6,6-tetramethyl-4-piperidyl)succinate, polymethylpropyl-3-oxy[1(2,2,6,6-tetramethyl)piperidyl]siloxane and 1,1',1'''-[1,3,5-triadine-2,4-6-triyltris(cyclohexyliminoethylene)]tris-3,3,5,5-tetramethylpiperadinon-2-one.

Benztriazoles are, for example, 2-(2-hydroxy-3'-t-butyl-5'-methylphenyl)-5-chlorbenzotriazole, 2-(2'-hydroxy-3',5'-di-t-butylphenyl)-5-chlorbenztriazole, 2-(2'-hydroxy-5'-t-octylphenyl)benztriazole, 2-(2'-hydroxy-3',5'-di-t-amylphenyl) benztriazole, 2-(2'-hydroxy-3',5'-di-t-butylphenyl) benztriazole, 2-(2'-hydroxy-3',5'-bis(α,α-dimethylbenzyl) benztriazole, 2-[2'-hydroxy-3'-(3",4",5",6"-tetrahydrophthaloid-methyl)-5'-methylphenyl]-benztriazole, 2,2-methylenebis[4-(1,1,3,3-tetramethylbutyl)-6-(2H-benztriazole-2-yl)phenol] and condensates of methyl-3-[3-t-butyl-5-(2Hbenztriazole-2-yl)-4-hydroxyphenyl]propionate and polyethylenegrycol (molecular weight about 300). These weather stabilizers may be employed singly or in combination of two or more kinds.

Those heat resistant stabilizer, hydrochloric acid absorbent, and weathering resistant stabilizer may be used solely or in combination of a heat resistant stabilizer with hydrochloric acid absorbent, a heat resistant stabilizer with a weathering resistant stabilizer, a hydrochloric acid absorbent with a weathering resistant stabilizer, and a heat resistant stabilizer with both of a hydrochloric acid absorbent and a weathering resistant stabilizer.

In the case of using those heat resistant stabilizer, hydrochloric acid absorbent and weathering resistant stabilizer, the addition amounts are commonly used amounts. For example, 0.005 to 5 parts by weight of a heat resistance stabilizer (of each component in the case of using two types of absorbents) may be added to 100 parts by weight of an ethylene (co) polymer: 0.005 to 5 parts by weight of a hydrochloric acid absorbent (of each component in the case of using two types of absorbents) may be added: and 0.005 to 5 parts by weight of a weathering resistant stabilizer (of each component in the case of using two types of stabilizers) may be added.

Further, the following manner may be employed for using additive.

That is, for example, addition of 5 to 200 ppm of aluminum, 0 to 1000 ppm of a phenol type stabilizer, and 50 to 2000 ppm of a phosphorus type stabilizer to an ethylene (co)polymer may be employed.

In the above described manner, an inorganic salt containing aluminum may be contained as a part or all of aluminum. A preferable compound of such an inorganic salt containing aluminum is hydrotalcites and the likes.

As the hydrotalcites, natural hydrotalc-group minerals whose examples will be described below and synthetic hydrotalcites can be exemplified. Among them, synthetic hydrotalcites are preferable to be used.

① Hydrotalc-Group Minerals;
hydrated carbonate minerals having a general formula $Mg_6R_2(OH)_{16}CO_3 4H_2O(R=Al, Cr, and Fe)$. As a hydrotalc-group mineral, the mineral consisting Al as R is preferable and hydrotalcite and manasseite are preferable examples.

② synthetic hydrotalcites having a general formula $M_{1-x}Al_x(OH)_2(An^-)_{x/n} \cdot mH_2O$ (where, M denotes divalent metal ion of Mg, Ca, or Zn; $A_n^-$ denotes n-valent anion, e.g. $Cl^-, Br^-, I^-, NO_3^{2-}, ClO^{4-}, SO_4^{2-}, CO_3^{2-}, SiO_3^{2-}, HPO_4^{2-}, HBO_3^{2-}, PO_4^{2-}$; x denotes a number satisfying $0<x<0.5$; and m denotes a number satisfying $0 \leq m \leq 2$).

The average particle size of those hydrotalcite compounds may be within a range in which no adverse effect is caused on the film appearance, the excellent extendibility, and the moldability and is not restricted, but is generally 10 μm or smaller, preferably 5 μm or smaller, and further preferably 3 μm or smaller.

From a view of prevention of corrosion of apparatus, it is desirable to control the addition amount as to keep aluminum content in an ethylene (co)polymer at 5 to 200 ppm, preferably 8 to 150 ppm, and more preferably 15 to 150 ppm. It is preferable that at least a part of or all of aluminum is contained in inorganic salt form such as hydrotalcites. The content of aluminum can be determined by elementary analysis method.

As the phenol type stabilizer, above described compounds can be employed.

Examples of the phosphorus stabilizers include trioctylphosphite, triraulylphosphite, tridecylphosphite, octyldiphenylphosphite, tris(2,4-di-t-butylphenyl)phosphite, triphenylphosphite, tris(buthoxyethyl)phosphite, tris(nonylphenyl)phosphite, distearylpentaerythritoldiphosphite, tetra(tridecyl)-1,1,3-tris(2-methyl-5-t-butyl-4-hydroxyphenyl)buthanediphosphite, tetra(mixed alkyls of 12 to 15 carbon atoms)-4,4'-isopropylidenediphenyldiphosphite, tetra (tridecyl)-4,4'-butylidenebis(3-methyl-6-t-butylphenol) diphosphite, tris(3,5-di-t-butyl-4-hydroxyphenyl)phosphite, tris(mono•di-mixed nonylphenyl)phosphite, hydrogenated-4,4'-isopropylidenediphenolpolyphosphite, bis(octylphenyl) •bis[4,4'-butylidenebis(3-methyl-6-t-butylphenol)]•1,6-hexadioldiphosphite, phenyl•4,4'-isopropylidenediphenol•pentaerythritoldiphosphite, tris[4,4'-isopropylidenebis(2-t-butylphenol)]phosphite, phenyl•diisodecylphosphite, di(nonylphenyl)pentaerythrytoldiphosphite, tris(1,3-di-stearyloxyisopropyl)phosphite, 4,4'-isopropylidenebis(2-t-butylphenol)•di(nonylphenyl) phosphite, 9,10-di-hydro-9-oxa-9-oxa-10-phosphaphenanthrane-10-oxide, bis(2,4-di-t-butyl-6-methylphenyl)•ethylphosphite, and 2-[{2,4,8,10-tetraquis(1,1-dimethylethyl) dibenzo(D,F)(1,3,2)-dioxaphosphephine-6-yl}oxy]ethyl] ethaneamine.

As bis(dialkylphenyl)pentaerythritol diphosphite ester, Spiro type one having the general formula (1) described below or cage type one having the general formula (2) may also be usable. Generally, because of an economical reason derived from a method for producing such phosphite esters, a mixture of both isomers is most frequently used.

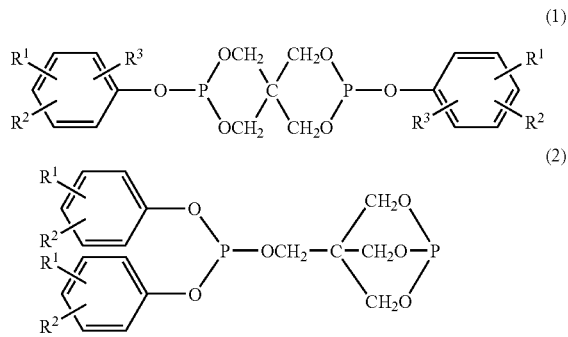

Wherein, $R^1$, $R^2$, $R^3$ are hydrogen atom or an alkyl group of 1 to 9 carbon atoms, especially a branched alkyl group, and among them, tert-butyl group is preferable; the positions of the substitution in the phenyl group are most preferably 2,4,6-positions. A preferable phosphite ester is bis(2,4-di-tert-butylphenyl)pentaerythritol diphosphite, bis(2,6-di-tert-butyl-4-methylphenyl)pentaerythritol diphosphite, and the likes and further a phosphonite having a structure wherein carbon and phosphorus are directly bonded, for example, tetrakis(2,4-di-tert-butylphenyl)-4,4'-biphenylenediphosphonite can also be exemplified. Among them, stabilizers containing trivalent phosphorus are preferable. Those phosphorus type stabilizers may be used solely or in combination with one another.

The addition amount of a phosphorus type stabilizer is 50 to 2,000 ppm, preferably 50 to 1,000 ppm, further preferably 50 to 600 ppm, and furthermore preferably 50 to 300 ppm in an ethylene (co)polymer.

The total amount (X+Y) of the content (X) of a phenol type stabilizer and the content (Y) of a phosphorus stabilizer is desirable to be generally not more than 1000 ppm, preferably from 50 and not more then 1000 ppm, further preferably 50 to 600 ppm, and furthermore preferably 50 to 300 ppm. Further, it is desirable that the ratio (X/Y) of the content (X) of a phenol type stabilizer to the content (Y) of a phosphorus stabilizer is generally from 0 and not higher than 3, preferably not higher than 2, further preferably not higher than 1.5, and furthermore preferably not higher than 1.1.

In the exemplified case, it is further desirable that 50 ppm≦X+Y≦1,000 ppm and 0≦X/Y≦3 are satisfied. The values of X+Y and X/Y may be replaced with more desirable respective values.

In the exemplified case, the total amount (Z+X+Y) of the content (Z) of aluminum, the content (X) of a phenol type stabilizer, and the content (Y) of a phosphorus stabilizer is preferably not more than 2,000 ppm, more preferably from 55 and not more then 1,000 ppm, further preferably 55 to 800 ppm, and especially preferably 55 to 300 ppm.

In the exemplified case, it is preferable that the ratio (X+Y/Z) of the total of the content (X) of a phenol type stabilizer and the content (Y) of a phosphorus stabilizer to the content (Z) of aluminum is preferably from 0.1 to 10, more preferably 2 to 8; and furthermore preferably 2 to 7.

In the case of employing an above described additive, the number of gel generated at the time of molding an ethylene (co)polymer at a high temperature can be suppressed to be low and the prescription is suitable for extrusion molding, for example, inflation molding, T-die molding, lamination molding, and extrusion lamination molding.

As another prescription, for example, addition of aluminum 1 to 200 ppm, a phenol type stabilizer 50 to 1,000 ppm, and a fatty acid metal salt 50 to 2,000 ppm to an ethylene (co)polymer may be employed.

In above exemplified prescription, those above described aluminum can be employed for aluminum. The addition amount is desirably controlled to keep aluminum content 1 to 200 ppm and preferably 1 to 15 ppm in an ethylene (co) polymer. Even in the case that a system containing aluminum more than 15 ppm to 200 ppm, preferably 20 ppm to 150 ppm, the above described problem can be solved by using a fatty acid metal salt described below while the corrosion resistance being maintained.

The content of aluminum can be determined by elementary analysis method. Regarding aluminum contained in an ethylene (co)polymer, it is preferable that at least a part of or all of aluminum is contained in inorganic salt form. Hydrotalcites are preferable for such an inorganic salt containing aluminum.

As the phenol type stabilizer, above described compounds can be employed. Those phenol type stabilizer may be used solely or in combination with one another. The content of a phenol type stabilizer is controlled to be 50 to 1,000 ppm and preferably 50 to 600 ppm in an ethylene (co)polymer.

As the fatty acid metal salt, above described compounds can be exemplified and its content is controlled to be 50 to 2,000 ppm and preferably 50 to 1,000 ppm in an ethylene (co)polymer. In the case the content of aluminum is 1 to 15 ppm, the content of a fatty acid metal salt is preferably, for example, 700 to 2,000 ppm and further preferably 800 to 1,500 ppm. In that case, well balanced resistance to above described high temperature gel formation and corrosion resistance can be provided.

On the other hand, in the case aluminum is contained in more than 15 ppm and not more than 200 ppm, the content of a fatty acid metal salt is preferably 50 to 700 ppm and further preferably 50 to 500 ppm or less. In that case, above described well balanced resistance to above described high temperature gel formation and corrosion resistance can be provided.

In the case of the above described addition manner, the number of gels generated at the time of high temperature molding of an ethylene (co)polymer can be suppressed to be low and the resultant ethylene (co)polymer composition becomes suitable for extrusion molding, for example, inflation molding, T-die molding, lamination molding, and extrusion lamination molding.

Besides the above described compounds, additives such as an anti-static agent, an antifogging agent, a slip agent, a lubricating agent, an anti-blocking agent, a nucleus agent, a pigment, a dye, a plasticizer, and the likes may be added if necessary as long as they do not depart from the purposes of the present invention.

As the antistatic agent or an antifogging agent, the following can be exemplified; polyoxyethylene alkylamine type compounds having the general formula described below

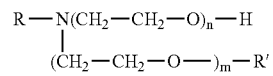

(wherein R denote an aliphatic hydrocarbon group having 7 or more carbon atoms; R' denotes hydrogen or —CO—R" (wherein R" denotes an aliphatic hydrocarbon group having 7 or more carbon atoms); n denotes one or higher integer; and m denotes one or higher integer; monoglycerides; digylicerides; triglycerides; polyglycerin alkyl ester compounds; betaine type compounds; polyoxyethylene alkylene ether compounds; and sorbitan type compounds such as sorbitan monolaurate, sorbitan monostearate, sorbitan monooleate, and the likes.

As the lubricating agent and the slip agent, the following can be exemplified; fatty acid amides such as oleylamide, stearylamide, erucic acid amide, and the likes; alkylene bis (fatty acid amide) such as ethylene bis(stearylamide); metal salts of fatty acid such as stearic acid; and paraffin wax.

As the anti-blocking agent, natural or synthesized $SiO_2$ can be exemplified.

As the crystal nucleus agent, conventionally known various types of nucleus agents can be employed without specific limitation. As the crystal nucleus agent, the following aromatic phosphoric acid ester salts, benzylidene sorbitol, aromatic carboxylic acid, and rosin based nucleus agent can be exemplified.

As an aromatic phosphoric acid ester salt, the following compound having the formula (3) is an example.

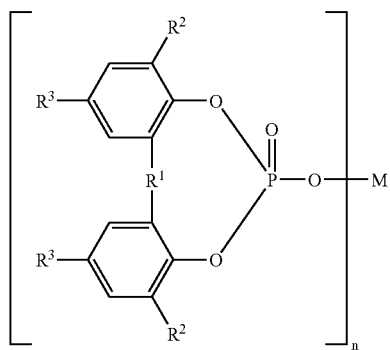

(3)

(where, $R^1$ denotes oxygen atom, sulfur atom, or a hydrocarbon group of 1 to 10 carbon atoms; $R^2$ and $R^3$ denote a hydrogen atom and a hydrocarbon group of 1 to 10 carbon atoms; $R^2$ and $R^3$ may be the same or different to each other; respective $R^2$, respective $R^3$, and $R^2$ and $R^3$ may be bonded to form rings; M denotes a metal atom with mono- to tri-valent; and n denotes an integer from 1 to 3).

Examples of the compound represented by the general formula (3) include
sodium-2,2'-methylene-bis(4,6-di-t-butylphenyl)phosphate,
sodium-2,2'-ethylidene-bis(4,6-di-t-butylphenyl)phosphate,
lithium-2,2'-methylene-bis(4,6-di-t-butylphenyl)phosphate,
lithium-2,2'-ethylidene-bis(4,6-di-t-butylphenyl)phosphate,
sodium-2,2'-ethylidene-bis(4-1-propyl-6-t-butylphenyl) phosphate,
lithium-2,2'-methylene-bis(4-methyl-6-t-butylphenyl)phosphate,
lithium-2,2'-methylene-bis(4-ethyl-6-t-butylphenyl)phosphate,
calcium-bis(2,2'-thiobis(4-methyl-6-t-butylphenyl)phosphate),
calcium-bis(2,2'-thiobis(4-ethyl-6-t-butylphenyl)phosphate),
calcium-bis(2,2'-thiobis(4,6-di-t-butylphenyl)phosphate),
magnesium-bis(2,2'-thiobis(4,6-di-t-butylphenyl)phosphate),
magnesium-bis(2,2'-thiobis(4-t-octylphenyl)phosphate),
sodium-2,2'-buthylidene-bis(4,6-di-methylphenyl)phosphate,
sodium-2,2'-buthylidene-bis(4,6-di-t-butylphenyl)phosphate,
sodium-2,2'-t-octylmethylene-bis(4,6-di-methylphenyl) phosphate,
sodium-2,2'-t-octylmethylene-bis(4,6-di-t-butylphenyl) phosphate,
calcium-bis-(2,2'-methylene-bis(4,6-di-t-butylphenyl)phosphate,
magnecium-bis-(2,2'-methylene-bis(4,6-di-t-butylphenyl) phosphate,
barium-bis-(2,2'-methylene-bis(4,6-di-t-butylphenyl)phosphate,
sodium-2,2'-methylene-bis(4-methyl-6-t-butylphenyl)phosphate,
sodium-2,2'-methylene-bis(4-ethyl-6-t-butylphenyl)phosphate,
sodium-(4,4'-dimethyl-5,6'-di-t-butyl-2,2'-biphenyl)phosphate,
calcium-bis((4,4'-dimethyl-6,6'-di-t-butyl-2,2'-biphenyl) phosphate),
sodium-2,2'-ethylidene-bis(4-m-butyl-6-t-butylphenyl) phosphate,
sodium-2,2'-methylene-bis(4,6-di-methylphenyl)phosphate,
sodium-2,2'-methylene-bis(4,6-di-ethylphenyl)phosphate,
pottassium-2,2'-ethylidene-bis(4,6-di-t-butylphenyl)phosphate,
calcium-bis(2,2'-ethylidene-bis(4,6-di-t-butylphenyl)phosphate,
magnecium-bis(2,2'-ethylidene-bis(4,6-di-t-butylphenyl) phosphate,
barium-bis(2,2'-ethylidene-bis(4,6-di-t-butylphenyl)phosphate,
aluminum-tris(2,2'-methylene-bis(4,6-di-t-butylphenyl) phosphate and
aluminum-tris(2,2'-ethylidene-bis(4,6-di-t-butylphenyl) phosphate, and
a mixture of two or more of them.

Of these, sodium-2,2'-methylene-bis(4,6-di-t-butylphenyl)phosphate is preferable.

As another aromatic phosphoric acid ester salt, the following compound having a general formula (4) described below can be exemplified.

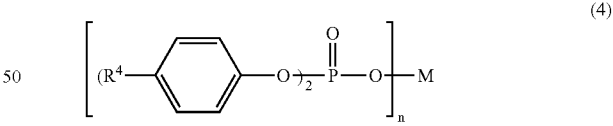

(4)

(where, $R^4$ denotes hydrogen atom or a hydrocarbon group of 1 to 10 carbon atoms; M denotes a metal atom with mono- to tri-valent; and n denotes an integer from 1 to 3).

Concrete compounds defined with the above described general formula (4) are sodium bis(4-tert-butylphenyl)phosphate, sodium bis(4-methylphenyl)phosphate, sodium bis(4-ethylphenyl)phosphate, sodium bis(4-iso-propylphenyl) phosphate, sodium bis(4-tert-octylphenyl)phosphate, potassium bis(4-tert-butylphenyl)phosphate, calcium bis(4-tert-butylphenyl)phosphate, magnesium bis(4-tert-butylphenyl)phosphate, lithium bis(4-tert-butylphenyl)phosphate, aluminum bis(4-tert-butylphenyl)phosphate, and a mixture of two or more of them. Especially, sodium bis(4-tert-butylphenyl)phosphate is preferable.

As benzylidene sorbitol, compounds defined as the formula (5) can be exemplified.

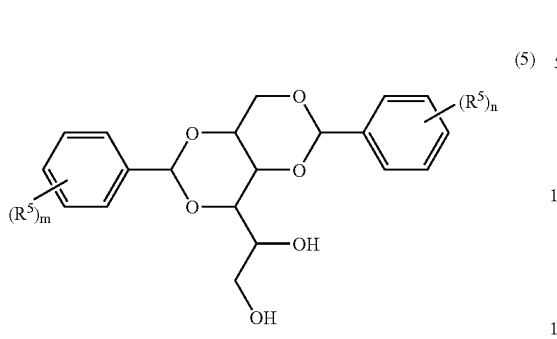

(where, respective $R^5$ may be the same or different to each other and denotes hydrogen atom or a hydrocarbon group of 1 to 10 carbon atoms and m and n denote an integer from 0 to 5, respectively).

Examples of the compound represented by the general formula (5) include
1,3,2,4-dibenzylidene sorbitol,
1,3-benzylidene-2,4-p-methylbenzylidene sorbitol,
1,3-benzylidene-2,4-p-ethylbenzylidene sorbitol,
1,3-p-methylbenzylidene-2,4-benzylidene sorbitol,
1,3-p-ethylbenzylidene-2,4-benzylidene sorbitol,
1,3-p-methylbenzylidene-2,4-p-ethylbenzylidene sorbitol,
1,3-p-ethylbenzylidene-2,4-p-methylbenzylidene sorbitol,
1,3,2,4-di(p-methylbenzylidene)sorbitol,
1,3,2,4-di(p-ethylbenzylidene)sorbitol,
1,3,2,4-di(p-n-propylbenzylidene)sorbitol,
1,3,2,4-di(p-i-propylbenzylidene)sorbitol,
1,3,2,4-di(p-n-butylbenzylidene)sorbitol,
1,3,2,4-di(p-s-butylbenzylidene)sorbitol,
1,3,2,4-di(p-t-butylbenzylidene)sorbitol,
1,3,2,4-di(2',4'-dimethylbenzylidene)sorbitol,
1,3,2,4-di(p-methoxybenzylidene)sorbitol,
1,3,2,4-di(p-ethoxybenzylidene)sorbitol,
1,3-benzylidene-2-4-p-chlorobenzylidene sorbitol,
1,3-p-chlorobenzylidene-2,4-benzylidene sorbitol,
1,3-p-chlorobenzylidene-2,4-p-methylbenzylidene sorbitol,
1,3-p-chlorobenzylidene-2,4-p-ethylbenzylidene sorbitol,
1,3-p-methylbenzylidene-2,4-p-chlorobenzylidene sorbitol,
1,3-p-ethylbenzylidene-2,4-p-chlorobenzylidene sorbitol
and 1,3,2,4-di(p-chlorobenzylidene)sorbitol, and a mixture of two or more of them.

Of these, preferable are
1,3,2,4-dibenzylidene sorbitol,
1,3,2,4-di(p-methylbenzylidene)sorbitol,
1,3,2,4-di(p-ethylbenzylidene)sorbitol,
1,3-p-chlorobenzylidene-2,4-p-methylbenzylidene sorbitol
1,3,2,4-di(p-chlorobenzylidene)sorbitol and a mixture of two of more Among the above defined benzylidene sorbitols, a compound of the formula (6) can be exemplified as a preferable compound.

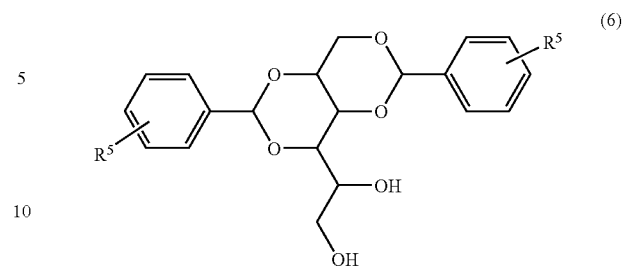

(where, respective $R^5$ may be the same or different to each other and denotes methyl group or ethyl group).

An example of aromatic carboxylic acids is an aluminum hydroxy-di-p-tert-butyl benzoate defined as the formula (7).

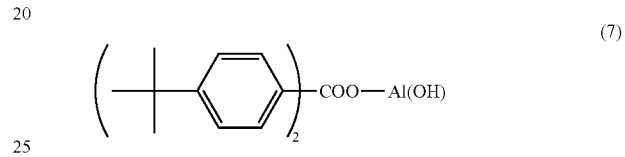

As a rosin type crystal nucleus agent, for example, rosin acid metal salts can be exemplified and the rosin acid metal salts mean the reaction products of rosin acids and metal compounds. As the rosin acids, natural rosin such as gum rosin, tall oil rosin, wood rosin, and the likes; various types of modified rosin such as disproportionated rosin, hydrogenated rosin, dehydrogenated rosin, polymerized rosin, rosin modified with $\alpha,\beta$-ethylenic unsaturated carboxylic acids and the like; purified products of the natural rosin; and purified products of the modified rosin can be exemplified. As an unsaturated carboxylic acid to be employed for producing an $\alpha,\beta$-ethylenic unsaturated carboxylic acid-modified rosin, for example, maleic acid, maleic anhydride, fumaric acid, itaconic acid, itaconic anhydride, citraconic acid, acrylic acid, methacrylic acid, and the likes can be exemplified. Among them, at least one type of rosin acids selected from the group of natural rosin, modified rosin, purified products of the natural rosin; and purified products of the modified rosin is preferable. The rosin acid contains a plurality of resin acid selected from pimaric acid, sandarachpimaric acid, palastric acid, isopimaric acid, abietic acid, dehydroabietic acid, neoabietic acid, dihydropimaric acid, dihydroabietic acid, tetrahydroabietic acid, and the likes.

As a metal compound forming a metal salt by reaction on a rosin acid, compounds containing sodium, potassium, magnesium, or the like and capable of forming salts with rosin acid are examples. Particularly, chlorides, nitrates, acetates, sulfates, carbonates, oxides, and hydroxides of those metals can be exemplified.

As another crystal nucleus agent, high melting point polymers, metal salts of aromatic carboxylic acids and aliphatic carboxylic acids, and inorganic compounds can be exemplified.

As a high melting point polymer, poly(vinyl cycloalkane) such as poly(vinyl chlorohexane), poly(vinyl cyclopentane), and the likes, poly(3-methyl-1-pentene), poly(3-methyl-1-butene), polyalkenylsilane can be exemplified.

As a metal salt of an aromatic carboxylic acid or an aliphatic carboxylic acid, the following can be exemplified;

aluminum benzoate, aluminum p-tert-butylbenzoate, sodium adipate, sodium thiophenecarboxylate, and sodium pyrrolecarboxylate.

Use of Ethylene (co)polymer

An ethylene (co)polymer (A1) of the present invention can be used as a material as it is for various types of molded products and may be blended with another un-modified polymer (B1) to give a composition (C1-1) and the composition containing an ethylene (co)polymer (A1) and another polymer (B1) can be used as a material for various types of molded products. Further, an ethylene (co)polymer (A1) of the present invention can be graft-modified and used as a graft-modified ethylene (co)polymer (A1-1) for various purposes. Furthermore, the graft-modified ethylene (co)polymer (A1-1) may be blended with another polymer (D1) to give a composition (C1-2) and an ethylene (co)polymer (A1) may be blended with a graft-modified polymer (E1) to give a composition (C1-3) and these compositions can be used as materials for various types of molded products.

An ethylene (co)polymer (A2) of the present invention can be used as a material as it is for various types of molded products and may be blended with another un-modified polymer (B2) to give a composition (C2-1) and the composition containing an ethylene (co)polymer (A2) and another polymer (B2) can be used as a material for various types of molded products. Further, an ethylene (co)polymer (A2) of the present invention can be graft-modified and used as a graft-modified ethylene (co)polymer (A2-1) for various purposes. Furthermore, the graft-modified ethylene (co)polymer (A2-3) may be blended with another polymer (D2) to give a composition (C2-2) and an ethylene (co)polymer (A2) may be blended with a graft-modified polymer (E2) to give a composition (C2-3) and these compositions can be used as materials for various types of molded products.

An ethylene (co)polymer (A3) of the present invention can be used as a material as it is for various types of molded products and may be blended with another un-modified polymer (B3) to give a composition (C3-1) and the composition containing an ethylene (co)polymer (A3) and another polymer (B3) can be used as a material for various types of molded products. Further, an ethylene (co)polymer (A3) of the present invention can be graft-modified and used as a graft-modified ethylene (co)polymer (A3-1) for various purposes. Furthermore, the graft-modified ethylene (co)polymer (A3-1) may be blended with another polymer (D3) to give a composition (C3-2) and an ethylene (co)polymer (A3) may be blended with a graft-modified polymer (E3) to give a composition (C3-3) and these compositions can be used as materials for various types of molded products.

An ethylene (co)polymer (A4) of the present invention can be used as a material as it is for various types of molded products and may be blended with another un-modified polymer (B4) to give a composition (C4-1) and the composition containing an ethylene (co)polymer (A4) and another polymer (B4) can be used as a material for various types of molded products. Further, an ethylene (co)polymer (A4) of the present invention can be graft-modified and used as a graft-modified ethylene (co)polymer (A4-1) for various purposes. Furthermore, the graft-modified ethylene (co)polymer (A4-1) may be blended with another polymer (D4) to give a composition (C4-2) and an ethylene (co)polymer (A4) may be blended with a graft-modified polymer (E4) to give a composition (C4-3) and these compositions can be used as materials for various types of molded products.

An ethylene (co)polymer (A5) of the present invention can be used as a material as it is for various types of molded products and may be blended with another un-modified polymer (B5) to give a composition (C5-1) and the composition containing an ethylene (co)polymer (A5) and another polymer (B5) can be used as a material for various types of molded products. Further, an ethylene (co)polymer (A5) of the present invention can be graft-modified and used as a graft-modified ethylene (co)polymer (A5-1) for various purposes. Furthermore, the graft-modified ethylene (co)polymer (A5-1) may be blended with another polymer (D5) to give a composition (C5-2) and an ethylene (co)polymer (A5) may be blended with a graft-modified polymer (E5) to give a composition (C5-3) and these compositions can be used as materials for various types of molded products.

Ethylene (co)polymer Composition (C1-1)

An ethylene (co)polymer composition (C1-1) comprises the above described ethylene (co)polymer (A1) and an un-modified other polymer (B1).

As another polymer (B1), the following can be exemplified; polyolefin, besides the above described ethylene (co)polymer (A1), such as high density polyethylene, middle density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (B1-1) besides the above described ethylene (co)polymer (A1) is preferable.

An ethylene (co)polymer (B1-1) is an ethylene homopolymer or a copolymer of ethylene and an $\alpha$-olefin of 3 to 20 carbon atoms. As an $\alpha$-olefin of 3 to 20 carbon atoms, the foregoing $\alpha$-olefins of 3 to 20 carbon atoms can be exemplified.

In the case the ethylene (co)polymer (B1-1) is a copolymer of ethylene and an $\alpha$-olefin, the mole ratio (ethylene/$\alpha$-olefin) of ethylene and the $\alpha$-olefin depends on the types of the $\alpha$-olefin and is generally 1/99 to 99/1, preferably 50/50 to 95/5. The mole ratio is preferably 50/50 to 90/10 in the case the $\alpha$-olefin is propylene and the mole ratio is preferably 80/20 to 95/5 in the case the $\alpha$-olefin is an $\alpha$-olefin of not less than 4 carbon atoms.

The intrinsic viscosity of the ethylene (co)polymer (B1-1) measured at 135° C. in decalin is not specifically limited and it is desirable to be generally 0.4 to 7 dl/g and preferably 0.5 to 5 dl/g.

Additionally, the ethylene (co)polymer (B1-1) may comprise a repeating unit derived from another compound polymerizable with ethylene or an $\alpha$-olefin besides a repeating unit derived from ethylene and an $\alpha$-olefin of 3 to 20 carbon atoms.

As such compounds, a polyene compound such as a chain polyene compound, a cyclic polyene compound, and the likes and a cyclic monoene compound can be exemplified. The polyene compound is a polyene having two or more conjugated or non-conjugated olefinic double bond and as the chain polyene compound, for example, 1,4-hexadiene, 1,5-hexadiene, 1,7-octadiene, 1,9-decadiene, 2,4,6-octatriene, 1,3,7-octatriene, 1,5,9-decatriene, and divinylbenzene can be exemplified.

Examples of the cyclic polyene compound include 1,3-cyclopentadiene, 1,3-cyclohexadiene, 5-ethyl-1,3-cyclohexadiene, 1,3-cycloheptadiene, dicyclopentadiene, dicyclohexadiene, 5-ethylidene-2-norbornene, 5-vinyl-2- norbornene, 5-isopropylidene-2-norbornene, methylhydroindene, 2,3-diisopropylidene-5-norbornene, 2-ethylidene-3-isopropylidene-5-norbornene, and 2-propenyl-2,5-norbornadiene.

Examples of the cyclic monoene compound include monocycloalkene such as cyclopropene, cyclobutene, cyclopentene, cyclohexene, 3-methylcyclohexene, cycloheptene, cyclooctene, cyclodecene, cyclododecene, tetracyclodecene, octacyclodecene and cycloeicosene;

bicycloalkene such as norbornene, 5-methyl-2-norbornene, 5-ethyl-2-norbornene, 5-isobutyl-2-norbornene, 5,6-dimethyl-2-norbornene, 5,5,6-trimethyl-2-norbornene and 2-bornene;

tricycloalkene such as
2,3,3a,7a-tetrahydro-4,7-methano-1H-indene and
3a,5,6,7a-tetrahydro-4,7-methano-1H-indene;
1,4,5,8-dimethano-1,2,3,4,4a,5,8,8a-octahydronaphthalene and tetracycloalkene such as
2-methyl-1,4,5,8-dimethano-1,2,3,4,4a,5,8,8a-octahydronaphthalene,
2-ethyl-1,4,5,8-dimethano-1,2,3,4,4a,5,8,8a-octahydronaphthalene,
2-propyl-1,4,5,8-dimethano-1,2,3,4,4a,5,8,8a-octahydronaphthalene,
2-hexyl-1,4,5,8-dimethano-1,2,3,4,4a,5,8,8a-octahydronaphthalene,
2-stearyl-1,4,5,8-dimethano-1,2,3,4,4a,5,8,8a-octahydronaphthalene,
2,3-dimethyl-1,4,5,8-dimethano-1,2,3,4,4a,5,8,8a-octahydronaphthalene,
2-methyl-3-ethyl-1,4,5,8-dimethano-1,2,3,4,4a,5,8,8a-octahydronaphthalene,
2-chloro-1,4,5,8-dimethano-1,2,3,4,4a,5,8,8a-octahydronaphthalene,
2-bromo-1,4,5,8-dimethano-1,2,3,4,4a,5,8,8a-octahydronaphthalene,
2-fluoro-1,4,5,8-dimethano-1,2,3,4,4a,5,8,8a-octahydronaphthalene and
2,3-dichclo-1,4,5,8-dimethano-1,2,3,4,4a,5,8,8a-octahydronaphthalene;

polycycloalkene such as
hexacyclo(6,6,1,1$^{3.6}$,1$^{10.13}$,0$^{2.7}$,0$^{9.14}$)heptadecene-4, pentacyclo(8,8,1$^{2.9}$,1$^{4.7}$,1$^{11.18}$,0$^{3.8}$,0$^{12.17}$)heneicosen e-5, octacyclo(8,8,0,1$^{2.9}$,1$^{4.7}$,1$^{11.18}$,0$^{3.8}$,0$^{12.17}$)docosene-5.

The ethylene (co)polymer (B1-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (B1-1), an ethylene homopolymer or a copolymer of ethylene and an α-olefin of 3 to 8 carbon atoms is preferable.

The foregoing ethylene (co)polymer (A1) is not included in the ethylene (co)polymer (B1-1). That is, the ethylene (co)polymer (B1-1) is 0.1 or more methyl branches measured by $^{13}$C-NMR per 1,000 carbon atoms.

An ethylene (co)polymer (B1-1) can be produced by homopolymerizing ethylene by a conventionally known method or copolymerizing ethylene and an α-olefin by a conventionally known method. The polymerization reaction can be carried out in gas-phase (a gas-phase polymerization method) as well as in liquid-phase (a liquid-phase polymerization method).

In an ethylene (co)polymer composition (C1-1), it is desirable that the weight ratio (A1:B1) of an ethylene (co)polymer (A1) and another polymer (B1) is 1:99 to 99:1 and preferably 10:90 to 90:10.

Regarding an ethylene (co)polymer composition (C1-1), additives exemplified as the additives allowed to be added to ethylene (co)polymers (A1) to (A5) may be added, if necessary, as long as the additives do not depart from the purposes of the present invention.

An ethylene (co)polymer composition (C1-1) can be produced by a known method and, for example, the following methods can be employed for the production.

(1) A method by blending an ethylene (co)polymer (A1) and another polymer (B1) and other components to be added if necessary by an extruder, a kneader, or the like.

(2) A method by dissolving an ethylene (co)polymer (A1) and another polymer (B1) and other components to be added if necessary in a proper good solvent (e.g. a hydrocarbon solvent such as hexane, heptane, decane, cyclohexane, benzene, toluene, xylene, or the like) and then removing the solvent.

(3) A method by dissolving an ethylene (co)polymer (A1) and another polymer (B1) and other components to be added if necessary separately in proper good solvents to give their solutions, mixing the solutions, and then removing the solvents.

(4) A method by combining the above described methods (1) to (3).

The foregoing ethylene (co)polymer composition (C1-1) is excellent moldability and mechanical strength.

Ethylene (co)polymer Composition (C2-1)

An ethylene (co)polymer composition (C2-1) comprises the above described ethylene (co)polymer (A2) and an unmodified other polymer (B2) besides (A2).

As another polymer (B2), the following can be exemplified; polyolefin, besides the above described ethylene (co)polymer (A2), such as high density polyethylene, middle density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (B2-1) besides the above described ethylene (co)polymer (A2) is preferable.

An ethylene (co)polymer (B2-1) is an ethylene homopolymer or a copolymer of ethylene and an α-olefin of 3 to 20 carbon atoms. As an α-olefin of 3 to 20 carbon atoms, the foregoing α-olefins of 3 to 20 carbon atoms can be exemplified.

In the case the ethylene (co)polymer (B2-1) is a copolymer of ethylene and an α-olefin, the mole ratio (ethylene/α-olefin) of ethylene and the α-olefin depends on the types of the α-olefin and is generally 1/99 to 99/1, preferably 50/50 to 95/5. The mole ratio is preferably 50/50 to 90/10 in the case the α-olefin is propylene and the mole ratio is preferably 80/20 to 95/5 in the case the α-olefin is an α-olefin of not less than 4 carbon atoms.

The intrinsic viscosity of the ethylene (co)polymer (B2-1) measured at 135° C. in decalin is not specifically limited and it is desirable to be generally 0.4 to 7 dl/g and preferably 0.5 to 5 dl/g.

Additionally, the ethylene (co)polymer (B2-1) may comprise a repeating unit derived from another compound polymerizable with ethylene or an α-olefin besides a repeating unit derived from ethylene and an α-olefin of 3 to 20 carbon atoms.

As such compounds, the foregoing polyene compound such as a chain polyene compound, a cyclic polyene compound, and the likes and a cyclic monoene compound can be exemplified.

The ethylene (co)polymer (B1-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (B2-1), an ethylene homopolymer or a copolymer of ethylene and an α-olefin of 3 to 8 carbon atoms is preferable.

The foregoing ethylene (co)polymer (A2) is not included in the ethylene (co)polymer (B2-1). That is, the ethylene (co)polymer (B2-1) is 0.1 or more methyl branches measured by $^{13}$C-NMR per 1,000 carbon atoms.

An ethylene (co)polymer (B2-1) can be produced by homopolymerizing ethylene by a conventionally known method or copolymerizing ethylene and an α-olefin by a conventionally known method. The polymerization reaction can be carried out in gas-phase (a gas-phase polymerization method) as well as in liquid-phase (a liquid-phase polymerization method).

In an ethylene (co)polymer composition (C2-1), it is desirable that the weight ratio (A2:B2) of an ethylene (co)polymer (A2) and another polymer (B2) is 1:99 to 99:1 and preferably 10:90 to 90:10.

Regarding an ethylene (co)polymer composition (C2-1), additives exemplified as the additives allowed to be added to ethylene (co)polymers (A1) to (A5) may be added if necessary as long as the additives do not depart from the purposes of the present invention.

An ethylene (co)polymer composition (C2-1) can be produced by a known method and, for example, it can be produced from an ethylene (co)polymer (A2) and another polymer (B2) and other components to be added if necessary by the same methods as the methods of producing the foregoing ethylene (co)polymer composition (C1-1).

The foregoing ethylene (co)polymer composition (C2-1) is excellent moldability and mechanical strength.

Ethylene (co)polymer Composition (C3-1)

An ethylene (co)polymer composition (C3-1) comprises the above described ethylene (co)polymer (A3) and an unmodified other polymer (B3) besides (A3).

As another polymer (B3), the following can be exemplified; polyolefin, besides the above described ethylene (co)polymer (A3), such as high density polyethylene, middle density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (B3-1) besides the above described ethylene (co)polymer (A3) is preferable.

An ethylene (co)polymer (B3-1) is an ethylene homopolymer or a copolymer of ethylene and an α-olefin of 3 to 20 carbon atoms. As an α-olefin of 3 to 20 carbon atoms, the foregoing α-olefins of 3 to 20 carbon atoms can be exemplified.

In the case the ethylene (co)polymer (B3-1) is a copolymer of ethylene and an α-olefin, the mole ratio (ethylene/α-olefin) of ethylene and the α-olefin depends on the types of the α-olefin and is generally 1/99 to 99/1, preferably 50/50 to 95/5. The mole ratio is preferably 50/50 to 90/10 in the case the α-olefin is propylene and the mole ratio is preferably 80/20 to 95/5 in the case the α-olefin is an α-olefin of not less than 4 carbon atoms.

The intrinsic viscosity of the ethylene (co)polymer (B3-1) measured at 135° C. in decalin is not specifically limited and it is desirable to be generally 0.4 to 7 dl/g and preferably 0.5 to 5 dl/g.

Additionally, the ethylene (co)polymer (B3-1) may comprise a repeating unit derived from another compound polymerizable with ethylene or an α-olefin besides a repeating unit derived from ethylene and an α-olefin of 3 to 20 carbon atoms.

As such compounds, the foregoing polyene compound such as a chain polyene compound, a cyclic polyene compound, and the likes and a cyclic monoene compound can be exemplified.

The ethylene (co)polymer (B3-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (B3-1), an ethylene homopolymer or a copolymer of ethylene and an α-olefin of 3 to 8 carbon atoms is preferable.

The foregoing ethylene (co)polymer (A3) is not included in the ethylene (co)polymer (B3-1). That is, the ethylene (co)polymer (B3-1) does not satisfy at least one of the foregoing requirements ($i_{A3}$) and ($ii_{A3}$) which the ethylene (co)polymer (A3) satisfies.

An ethylene (co)polymer (B3-1) can be produced by homopolymerizing ethylene by a conventionally known method or copolymerizing ethylene and an α-olefin by a conventionally known method. The polymerization reaction can be carried out in gas-phase (a gas-phase polymerization method) as well as in liquid-phase (a liquid-phase polymerization method).

In an ethylene (co)polymer composition (C3-1), it is desirable that the weight ratio (A3:B3) of an ethylene (co)polymer (A3) and another polymer (B3) is 1:99 to 99:1 and preferably 10:90 to 90:10.

Regarding an ethylene (co)polymer composition (C3-1), additives exemplified as the additives allowed to be added to ethylene (co)polymers (A1) to (A5) may be added if necessary as long as the additives do not depart from the purposes of the present invention.

An ethylene (co)polymer composition (C3-1) can be produced by a known method and, for example, it can be produced from an ethylene (co)polymer (A3) and another polymer (B3) and other components to be added if necessary by the same methods as the methods of the foregoing ethylene (co)polymer composition (C1-1).

The foregoing ethylene (co)polymer composition (C3-1) is excellent moldability and mechanical strength.

Ethylene (co)polymer Composition (C4-1)

An ethylene (co)polymer composition (C4-1) comprises the above described ethylene (co)polymer (A4) and an unmodified other polymer (B4) besides (A4).

As another polymer (B4), the following can be exemplified; polyolefin, besides the above described ethylene (co)

polymer (A4), such as high density polyethylene, middle density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (B4-1) besides the above described ethylene (co)polymer (A4) is preferable.

An ethylene (co)polymer (B4-1) is an ethylene homopolymer or a copolymer of ethylene and an α-olefin of 3 to 20 carbon atoms. As an α-olefin of 3 to 20 carbon atoms, the foregoing α-olefins of 3 to 20 carbon atoms can be exemplified.

In the case the ethylene (co)polymer (B4-1) is a copolymer of ethylene and an α-olefin, the mole ratio (ethylene/α-olefin) of ethylene and the α-olefin depends on the types of the α-olefin and is generally 1/99 to 99/1, preferably 50/50 to 95/5. The mole ratio is preferably 50/50 to 90/10 in the case the α-olefin is propylene and the mole ratio is preferably 80/20 to 95/5 in the case the α-olefin is an α-olefin of not less than 4 carbon atoms.

The intrinsic viscosity of the ethylene (co)polymer (B4-1) measured at 135° C. in decalin is not specifically limited and it is desirable to be generally 0.4 to 7 dl/g and preferably 0.5 to 5 dl/g.

Additionally, the ethylene (co)polymer (B4-1) may comprise a repeating unit derived from another compound polymerizable with ethylene or an α-olefin besides a repeating unit derived from ethylene and an α-olefin of 3 to 20 carbon atoms.

As such compounds, the foregoing polyene compound such as a chain polyene compound, a cyclic polyene compound, and the likes and a cyclic monoene compound can be exemplified.

The ethylene (co)polymer (B4-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (B4-1), an ethylene homopolymer or a copolymer of ethylene and an α-olefin of 3 to 8 carbon atoms is preferable.

The foregoing ethylene (co)polymer (A4) is not included in the ethylene (co)polymer (B4-l). That is, the ethylene (co) polymer (B4-1) does not satisfy the foregoing requirement ($i_{A4}$) which the ethylene (co)polymer (A4) satisfies.

An ethylene (co)polymer (B4-1) can be produced by homopolymerizing ethylene by a conventionally known method or copolymerizing ethylene and an α-olefin by a conventionally known method. The polymerization reaction can be carried out in gas-phase (a gas-phase polymerization method) and in liquid-phase (a liquid-phase polymerization method) as well.

In an ethylene (co)polymer composition (C4-1), it is desirable that the weight ratio (A4:B4) of an ethylene (co)polymer (A4) and another polymer (B4) is 1:99 to 99:1 and preferably 10:90 to 90:10.

Regarding an ethylene (co)polymer composition (C4-1), additives exemplified as the additives allowed to be added to ethylene (co)polymers (A1) to (A5) may be added if necessary as long as the additives do not depart from the purposes of the present invention.

An ethylene (co)polymer composition (C4-1) can be produced by a known method and, for example, it can be produced from an ethylene (co)polymer (A4) and another polymer (B4) and other components to be added if necessary by the same methods as the methods of the foregoing ethylene (co)polymer composition (C1-1).

The foregoing ethylene (co)polymer composition (C4-1) is excellent moldability and mechanical strength.

Ethylene (co)polymer Composition (C5-1)

An ethylene (co)polymer composition (C5-1) comprises the above described ethylene (co)polymer (A5) and an unmodified other polymer (B5) besides (A5).

As another polymer (B5), the following can be exemplified; polyolefin, besides the above described ethylene (co) polymer (A5), such as high density polyethylene, middle density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (B5-1) besides the above described ethylene (co)polymer (A5) is preferable.

An ethylene (co)polymer (B5-1) is an ethylene homopolymer or a copolymer of ethylene and an α-olefin of 3 to 20 carbon atoms. As an α-olefin of 3 to 20 carbon atoms, the same one as the foregoing can be exemplified.

In the case the ethylene (co)polymer (B5-1) is a copolymer of ethylene and an α-olefin, the mole ratio (ethylene/α-olefin) of ethylene and the α-olefin depends on the types of the α-olefin and is generally 1/99 to 99/1, preferably 50/50 to 95/5. The mole ratio is preferably 50/50 to 90/10 in the case the α-olefin is propylene and the mole ratio is preferably 80/20 to 95/5 in the case the α-olefin is an α-olefin of not less than 4 carbon atoms.

The intrinsic viscosity of the ethylene (co)polymer (B5-1) measured at 135° C. in decalin is not specifically limited and it is desirable to be generally a range of 0.4 to 7 dl/g and preferably a range of 0.5 to 5 dl/g.

Additionally, the ethylene (co)polymer (B5-1) may comprise a repeating unit derived from another compound polymerizable with ethylene or an α-olefin besides a repeating unit derived from ethylene and an α-olefin of 3 to 20 carbon atoms.

As such compounds, the foregoing polyene compound such as a chain polyene compound, a cyclic polyene compound, and the likes and a cyclic monoene compound can be exemplified.

The ethylene (co)polymer (B5-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (B5-1), an ethylene homopolymer or a copolymer of ethylene and an α-olefin of 3 to 8 carbon atoms is preferable.

The foregoing ethylene (co)polymer (A5) is not included in the ethylene (co)polymer (B5-1). That is, the ethylene (co)polymer (B5-1) does not satisfy the foregoing requirement ($i_{A5}$) which the ethylene (co)polymer (A5) satisfies.

An ethylene (co)polymer (B5-1) can be produced by homopolymerizing ethylene by a conventionally known method or copolymerizing ethylene and an α-olefin by a conventionally known method. The polymerization reaction can be carried out in gas-phase (a gas-phase polymerization method) and in liquid-phase (a liquid-phase polymerization method) as well.

In an ethylene (co)polymer composition (C5-1), it is desirable that the weight ratio (A5:B5) of an ethylene (co)polymer (A5) and another polymer (B4) is 1:99 to 99:1 and preferably 10:90 to 90:10.

Regarding an ethylene (co)polymer composition (C5-1), additives exemplified as the additives allowed to be added to ethylene (co)polymers (A1) to (A5) may be added if necessary as long as the additives do not depart from the purposes of the present invention.

An ethylene (co)polymer composition (C5-1) can be produced by a known method and, for example, it can be produced from an ethylene (co)polymer (A5) and another polymer (B5) and other components to be added if necessary by the same methods as the methods of the foregoing ethylene (co)polymer composition (C1-1).

The foregoing ethylene (co)polymer composition (C5-1) is excellent moldability and mechanical strength.

Molded Product

As a molded product of ethylene (co)polymers (A1) to (A5) of the present invention or ethylene (co)polymer compositions (C1-1) to (C5-1), the following are concrete examples; a blow molded product, an inflation molded product, a cast molded product, an extrusion laminated molded product, an extrusion molded product, a foam molded product, an injection molded product, and the likes. Additionally, the molded product can be used for fibers, monofilaments, unwoven fabrics, and the likes.

Those molded products include molded products produced from only one of ethylene (co)polymers (A1) to (A5) and ethylene (co)polymer compositions (C1-1) to (C5-1) and molded products (laminated products) comprising parts produced from one of ethylene (co)polymers (A1) to (A5) and ethylene (co)polymer compositions (C1-1) to (C5-1) and parts produced from other resin.

A molded product produced from ethylene (co)polymers (A1) to (A5) and ethylene (co)polymer compositions (C1-1) to (C5-1) and a molding method will be described below in details using an ethylene (co)polymer (A1) and regarding ethylene (co)polymers (A2) to (A5) and ethylene (co)polymer compositions (C1-1) to (C1-5), they are the same.

A Blow Molded Product

As a blow molded product, an extrusion blow molded product, an injection blow molded product, and the likes can be exemplified.

Ethylene (co)polymers (A1) to (A5) have excellent moldability and excellent mechanical strength. From that point, they are especially suitable to be molded by blow molding.

An extrusion blow molded product can be obtained by extruding an ethylene (co)polymer (A1) in a melted state at 100 to 300° C. resin temperature out of a die to form a tubular parison, holding the parison in a mold with a desired shape, and then blowing air to stick the parison to the mold at 100 to 300° C. resin temperature. The stretching (blowing) ratio is preferably 1.5 to 5 times in the transverse direction.

An injection blow molded product can be obtained by intruding an ethylene (co)polymer (A1) at 100 to 300° C. resin temperature into a parison mold to give a parison, holding the parison in a mold with a desired shape, and then blowing air to stick the parison to the mold at 120 to 300° C. resin temperature. The stretching (blowing) ratio is preferably 1.1 to 1.8 time in the vertical direction and 1.3 to 2.5 times in the transverse direction.

As a blow molded product, large scale or middle scale blow molded products such as gasoline tanks, chemical agent cans for industrial use, and the likes and various types of bottles and tubes can be exemplified.

A blow molded product may be produced from a laminated product constituted of at least one layer of the foregoing ethylene (co)polymer (A1) and at least one layer of other resin. Other resin can be selected corresponding to purposes and, for example, nylon, polyvinyl alcohol, modified polyolefins, and polypropylenes are preferable. A blow molded product produced from a laminated product may be produced by co-extrusion molding and posterior sticking process as well.

An Inflation Molded Product

Since ethylene (co)polymers (A1) to (A5) have excellent bubble stability, they have excellent inflation moldability and from a viewpoint of their excellent mechanical strength, they are especially suitable to be molded by inflation molding.

An inflation molded product can be obtained by, for example, molding methods such as conventional air-cooled inflation molding, air-cooled two-step cooled inflation molding, high speed inflation molding, water-cooled inflation molding, and the likes.

A film (an inflation molded product) obtained by inflation molding an ethylene (co)polymer (A1) are suitable for various types of film for packaging such as standardized bags, laminated bags, wrapping films, laminated substrates, sugar bags, oil packaging bags, aqueous material packaging bags, food packagings; liquid transfusion bags, agricultural materials, and the likes.

An inflation molded product may be produced from a laminated product constituted of at least one layer of the foregoing ethylene (co)polymer (A1) and at least one layer of other resin. Other resin can be selected corresponding to purposes and, for example, nylon, polyvinyl alcohol, modified polyolefins, and polypropylenes are preferable. An inflation molded product produced from a laminated product may be produced by co-extrusion molding and posterior sticking process as well.

A Cast Molded Product

Ethylene (co)polymers (A1) to (A5) have excellent cast moldability and excellent mechanical strength and from that point, they are especially suitable to be molded by cast molding.

In the case of producing a cast molded product from an ethylene (co)polymer (A1), conventionally known cast film extrusion apparatus and molding condition can be employed and, for example, a uniaxial screw extruder, a kneading extruder, a ram extruder, a gear extruder, and the likes can be used to mold a melted ethylene (co)polymer into a sheet or a film (un-stretched) by extrusion out of a T-die.

A stretched film can be obtained by stretching such an above described extrusion sheet or an extrusion film (un-stretched) by a known stretching method such as a tenter method (vertical-transverse stretching, transverse-vertical stretching), a simultaneous biaxial stretching method, a uniaxial stretching method, and the likes.

The stretching ratio at the time of stretching a sheet or un-stretched film is generally about 20 to 70 times in the case of biaxial stretching and generally abut 2 to 10 times in the case of a uniaxial stretching. It is desirable to obtain an oriented film having a thickness of about 5 to 20 μm by stretching.

Further, a multilayer film can be produced. For example, using an ethylene (co)polymer (A1), a multilayer film can be produced in combination with a film-like material selected from a polyamide film, a polyester film, and an aluminum foil. In this case, a multilayer film can be produced by extruding an ethylene (co)polymer (A1) on the above described film-like material, joining them, and cooling and taking out the resultant film-like material in the same conditions.

Furthermore, a multilayer film can also be produced by the following method. At first, a film is produced from an ethylene (co)polymer (A1) by the above described method. Next, the film is stuck to one type of film-like materials selected from a polyamide film, a polyester film, and an aluminum foil by an adhesive to give a multilayer film.

The foregoing polyamide film is not especially limited and particularly, a film of nylon-6, nylon-11, nylon-66, nylon-610, or the like can be exemplified. The foregoing polyester film is not especially limited and particularly, a film of poly (ethylene terephthalate), which is a condensate polyester of terephthalic acid and ethylene glycol, a copolymer polyester of terephthalic acid-isophthalic acid-ethylene glycol, and a polyester produced from terephthalic acid and cyclohexane-1,4-dimethanol can be exemplified. The foregoing polyamide film and polyester film are preferably films stretched by biaxial stretching. The foregoing adhesive is preferably an adhesive such as urethane-based adhesive and the likes.

A multilayer film is a multilayer film with double-layer structure comprising a film of an ethylene (co)polymer (A1) and one of a polyamide film, a polyester film, and an aluminum foil and is also a multilayer film having a layer structure comprising 3 or more layers including the double-layer structure.

A film of the above described ethylene (co)polymer (A1) can be used solely as it is and may be used as a multilayer film by being stuck to a polyamide film, a polyester film, or a metal foil such as an aluminum foil and the likes.

A monolayer film made of an ethylene (co)polymer (A1) can be used as it is for various types of wrapping films. The monolayer film is especially suitable for wrapping weighty aqueous materials such as aquatic products and agricultural products. On the other hand, the multilayer film can be used for wrapping food such as meats, confectionery, and the likes which demand gas-barrier property and also can be used for wrapping meats such as ham and sausage and liquids such as soup and mayonnaise.

An Extrusion Laminated Molded Product

Since ethylene (co)polymers (A1) to (A5) can easily be extruded and have a low neck-in, they have excellent extrusion lamination moldability and are suitable to be molded by extrusion lamination molding to give an extrusion laminated molded product.

An extrusion laminated molded product is constituted of a substrate and the foregoing ethylene (co)polymer (A1) layer and such an extrusion laminated molded product can be obtained by extrusion coating a substrate with an ethylene. (co)polymer (A1).

A substrate is not specifically limited as long as it is film moldability and an optional polymer, paper, an aluminum foil, cellophane, and the likes can be employed. As such a polymer, for example, the following can be exemplified; olefin type polymers such as high density polyethylene, middle, low density polyethylene, ethylene-vinyl acetate copolymer, ethylene-acrylic acid ester copolymer, ionomer, polypropylene, poly(1-butene), poly(4-methyl-1-pentene) and the likes; vinyl type polymer such as poly(vinyl chloride), poly(vinylidene chloride), polystyrene, polyacrylate, polyacrylonitrile, and the likes; polyamides such as nylon-6, nylon-66, nylon-10, nylon-11, nylon-12, nylon-610, poly(m-xylylene adipamide) and the likes; polyesters such as poly(ethylene terephthalate), poly(ethylene terephthalate/isophthalate), poly(butylene terephthalate), and the like; and poly(vinyl alcohol), ethylene-vinyl alcohol copolymer, polycarbonates, and the likes.

In the case substrates are polymer films (sheets), the polymer films may be non-oriented or may be uniaxially or biaxially oriented. Those substrates can properly be selected according to a purpose and an object to be wrapped. For example, in the case an object to be wrapped is food easy to get rotten, resin such as polyamides, poly(vinylidene chloride), ethylene-vinyl alcohol copolymer, poly(vinyl alcohol), polyesters, and the likes, which have excellent transparency, rigidity, and gas permeation resistance, can be used. In the case an object to be wrapped is confectionery and fiber wrapping is carried out, polypropylene and the likes having excellent transparency, rigidity, and water permeation resistance are preferable to be used.

An extrusion laminated molded product can be produced by, for example coating a substrate with an ethylene (co) polymer (A1) by extrusion coating method using a T-die.

As described above, at the time of extrusion coating with an ethylene (co)polymer (A1), a substrate may be coated directly with an ethylene (co)polymer (A1) by extrusion coating or in order to heighten the adhesive strength between a substrate and the ethylene (co)polymer (A1), with a known method, for example, an anchor coating agent such as an organotitanium type, polyethylene imine type, an isocyanate type agent, or the like is applied to a substrate or an under resin layer of such as an adhesive polyolefin, a polyethylene by high pressure method, or the like is formed on a substrate and then the substrate may be coated with the ethylene (co)polymer (A1) by extrusion coating.

The processing temperature (the resin temperature in a T-die) at the time of extrusion coating of a substrate with an ethylene (co)polymer (A1) or an under resin is determined in consideration of the adhesion property between the substrate and the ethylene (co)polymer (A1), between the substrate and the under resin (adhesive polyolefins, polyethylenes by high pressure method, and the likes), and between the under resin and the ethylene (co)polymer (A1) and heat seal property and productivity of laminated products, and the processing temperature is preferably 230 to 330° C., further preferably 280 to 320° C., and furthermore preferably 285 to 305° C.

It is also effective to forcibly oxidize the surface of a film of melted resin extruded out of a T-die by blowing ozone to the film in order to reliably obtain excellent adhesion property between a substrate and resin (either under resin or an ethylene (co)polymer (A1)) contacting the substrate.

Extrusion coating is carried out at preferably 20 to 300 m/minute and further preferably 40 to 200 m/minute processing speed.

Such an extrusion laminated molded product is suitable for use as various types of wrapping bags, e.g. aqueous product wrapping bags for liquid soup, pickles, konjak spaghetti, and the likes, paste type product wrapping bags for miso, jam, and the likes, powder product wrapping bags for sugar, flour and flaky and powdery food, and wrapping bags for pharmaceutical tablets and granules.

An Extrusion Molded Product

As an extrusion molded product, a pipe molded product, a profile extrusion molded product, an electric wire-coating molded boy, and the likes can be exemplified.

Since ethylene (co)polymers (A1) to (A5) can easily be extruded and have excellent shape retaining property at the time of melting, they have excellent extrusion moldability and are suitable to be molded by extrusion molding.

In the case of producing an extrusion molded product from an ethylene (co)polymer (A1), conventionally known extrusion apparatus and molding condition can be employed and, for example, a uniaxial screw extruder, a kneading extruder, a ram extruder, a gear extruder, and the likes can be used to mold a melted ethylene (co)polymer (A1) into a sheet or a film (un-stretched) by extrusion out of a T-die.

As the extrusion molded product, various types of pipes such as gas, tap water and sewage pipes, hot water pipes, and the likes, various types of coatings for electric wires and the likes, and spacers for optical fiber cables can be exemplified.

A Foam Molded Product

Ethylene (co)polymers (A1) to (A5) are provided with excellent foaming property owing to the high melt tension and are capable of providing foamed products with even and high foaming ratio and from that point, they are suitable to be molded by foam molding.

A foam molded product can be produced by mixing a foaming agent with an ethylene (co)polymer (A1) and generating foams in a resin molded product by gasifying the foaming agent or generating decomposition gas by heating or decreasing the pressure of the resultant mixture.

As a method for producing a foamed product from an ethylene (co)polymer (A1) of the present invention, the following can be exemplified.

① An Extrusion Foaming Method

A foamed product can continuously be obtained by putting an ethylene (co)polymer (A1) to a hopper of an extruder, injecting a physical type foaming agent through a pressure injection hole equipped in a middle of the extruder at the time of extruding the resin at the temperature near the melting point, and extruding the ethylene (co)polymer out of a mouth piece with a desired shape.

As the physical foaming agent, for example, volatile foaming agents such as flon, butane, pentane, hexane, cyclohexane, and the likes; and inorganic gas based foaming agents such as nitrogen, air, water, carbon dioxide gas, and the likes can be exemplified. Additionally, at the time of extrusion foaming, foam nucleus forming agent such as calcium carbonate, talc, clay, magnesium oxide, and the likes may be added.

The mixing ratio of a physical foaming agent is generally 5 to 60 parts by weight and preferably 10 to 50 parts by weight to 100 parts by weight of an ethylene (co)polymer (A1) If the mixing ratio of a physical foaming agent is too small, the foaming property of a foamed product is deteriorated and, on the contrary, it is too high, the strength of the foamed product is deteriorated.

② A Foaming Method Using a Thermal Decomposition Type Foaming Agent

An ethylene (co)polymer (A1), an organic thermal decomposition type foaming agent such as azodicarbonamide, and other additives and thermoplastic resins optionally are mixed and kneaded by a mixing and kneading apparatus such as a uniaxial extruder, a biaxial extruder, a Banbury mixer, a kneader mixer, rolls, and the likes at a temperature lower than the decomposition temperature of the thermal decomposition type foaming agent to produce a foaming resin composition and the composition is molded generally into a sheet-like shape. Then, the sheet is heated to a temperature higher than the decomposition temperature of the foaming agent to give a foamed product.

The mixing ratio of an organic thermal decomposition type foaming agent is generally 1 to 50 parts by weight and preferably 4 to 25 parts by weight to 100 parts by weight of an ethylene (co)polymer (A1). If the mixing ratio of an organic thermal decomposition type foaming agent is too small, the foaming property of a foamed product is deteriorated and, on the contrary, it is too high, the strength of the foamed product is deteriorated.

③ A Foaming Method in Pressure Container

An ethylene (co)polymer (A1) is molded into a sheet-like or block-like shape by a press machine or an extruder. Next, the molded product is charged in a pressure container, a physical foaming agent is sufficiently dissolved in the resin and then the pressure is decreased to produce a foamed product. Alternatively, it is also possible to carry out foaming by filling a pressure container in which a molded product is put with a physical foaming agent in a room temperature and pressurizing the inside, taking out the resultant molded product after the pressure of the container is decreased, and heating the molded product in an oil bath or an oven.

Further, a cross-linked foamed product can be obtained by previously cross-linking an ethylene (co)polymer (A1) Generally, as a cross-linking method, a method for cross-linking by thermally decomposing a peroxide radical generating agent mixed with resin, cross-linking by radiating ionization radiation, cross-linking by radiating ionization radiation in the presence of a polyfunctional monomer, and silane cross-linking can be exemplified.

To produce a cross-linked foamed product by those methods, an ethylene (co)polymer (A1), an organic thermal decomposition type foaming agent, and a polyfunctional monomer as a cross-linking auxiliary agent and other additives are mixed and kneaded at a temperature lower than the decomposition temperature of the thermal decomposition type foaming agent and molded into a sheet-like shape. The obtained foaming resin composition sheet is cross-linked by radiating a prescribed dose of ionization radiation and then the cross-linked sheet is heated to a temperature higher than the decomposition temperature of the foaming agent to carry out foaming. As the ionization radiation, $\alpha$-ray, $\beta$-ray, $\gamma$-ray, electron beam, and the likes can be exemplified. Instead of radiation cross-linking by ionization radiation, peroxide cross-linking and silane cross-linking can be carried out.

A foamed molded product can be formed into a various types of shapes such as rod-like, tube-like, tape-like, and sheet-like shapes and used for buffer agents, heat insulating materials, base materials of wet compress pad agents, shoe bottoms, sponge, and the likes.

An Injection Molded Product

Since ethylene (co)polymers (A1) to (A5) can easily be injection-molded at high speed owing to their excellent fluidity and have excellent mechanical strength owing to their high intrinsic viscosity, they are suitable to be molded by injection molding.

An injection-molded product can be produced from the foregoing ethylene (co)polymer (A1). As an injection molding method, conventionally carried out injection molding methods can be employed with no specific limitation.

As an injection-molded product, ordinary miscellaneous goods, automotive parts, and the likes can be exemplified.

As above described molded products, a blow molded product, an extrusion molded product, a foamed molded product, an injection molded product have high rigidity and are therefore preferable. Those molded products can stand to breaks even in the case high stress is applied to the molded products. As molded products, an extrusion molded product is especially preferable and among them, a pipe is especially preferable.

Further, in addition to the above described requirement, in the case an ethylene (co)polymer (A2) contains a comonomer, a molded product can stand break even if a relatively low stress is applied for a long duration to the molded product. That is, the molded product is provided with especially excellent fatigue strength. That is, therefore, especially preferable in the case of an extrusion molded product.

A pipe is preferable among molded products produced from an ethylene (co)polymer (A2) of the present invention.

A Graft-Modified Ethylene (co)polymer

A graft-modified ethylene (co)polymer (A1-1) is a modified polymer produced by graft-modifying an ethylene (co) polymer (A1) by a polar monomer. The graft amount of graft group derived from the polar monomer in the graft-modified ethylene (co)polymer (A1-1) is within generally a range of 0.1 to 50% by weight and preferably a range of 0.2 to 30% by weight.

A graft-modified ethylene (co)polymer (A1-1) is characterized by having high adhesion strength to a material with high polarity, excellent mechanical strength, and moldability by various molding methods.

Such a graft-modified ethylene (co)polymer (A1-1) can be produced by reaction of the foregoing ethylene (co)polymer (A1) and a polar monomer which will be described later in the presence of a radical initiator.

A graft-modified ethylene (co)polymer (A2-1) is a modified polymer produced by graft-modifying an ethylene (co) polymer (A2) by a polar monomer. The graft amount of graft group derived from the polar monomer in the graft-modified ethylene (co)polymer (A2-1) is within generally a range of 0.1 to 50% by weight and preferably a range of 0.2 to 30% by weight.

A graft-modified ethylene (co)polymer (A2-1) is characterized by having high adhesion strength to a material with high polarity, excellent mechanical strength, and moldability by various molding methods.

Such a graft-modified ethylene (co)polymer (A2-1) can be produced by reaction of the foregoing ethylene (co)polymer (A2) and a polar monomer which will be described later in the presence of a radical initiator.

A graft-modified ethylene (co)polymer (A3-1) is a modified polymer produced by graft-modifying an ethylene (co) polymer (A3) by a polar monomer. The graft amount of graft group derived from the polar monomer in the graft-modified ethylene (co)polymer (A3-1) is within generally a range of 0.1 to 50% by weight and preferably a range of 0.2 to 30% by weight.

A graft-modified ethylene (co)polymer (A3-1) is characterized by having high adhesion strength to a material with high polarity, excellent mechanical strength, and moldability by various molding methods.

Such a graft-modified ethylene (co)polymer (A3-1) can be produced by reaction of the foregoing ethylene (co)polymer (A3) and a polar monomer which will be described later in the presence of a radical initiator.

A graft-modified ethylene (co)polymer (A4-1) is a modified polymer produced by graft-modifying an ethylene (co) polymer (A4) by a polar monomer. The graft amount of graft group derived from the polar monomer in the graft-modified ethylene (co)polymer (A4-1) is within generally a range of 0.1 to 50% weight by and preferably a range of 0.2 to 30% by weight.

A graft-modified ethylene (co)polymer (A4-1) is characterized by having high adhesion strength to a material with high polarity, excellent mechanical strength owing to high intrinsic viscosity, and moldability by various molding methods.

Such a graft-modified ethylene (co)polymer (A4-1) can be produced by reaction of the foregoing ethylene (co)polymer (A4) and a polar monomer which will be described later in the presence of a radical initiator.

A graft-modified ethylene (co)polymer (A5-1) is a modified polymer produced by graft-modifying an ethylene (co) polymer (A5) by a polar monomer. The graft amount of graft group derived from the polar monomer in the graft-modified ethylene (co)polymer (A5-1) is within generally a range of 0.1 to 50% by weight and preferably a range of 0.2 to 30% by weight.

A graft-modified ethylene (co)polymer (A5-1) is characterized by having high adhesion strength to a material with high polarity, excellent mechanical strength, and moldability by various molding methods.

Such a graft-modified ethylene (co)polymer (A5-1) can be produced by reaction of the foregoing ethylene (co)polymer (A5) and a polar monomer which will be described later in the presence of a radical initiator.

A method for producing graft-modified ethylene (co)polymers (A1-1) to (A5-1) will be described below in details using a graft-modified ethylene (co)polymer (A1-1) as an example and regarding graft-modified ethylene (co)polymers (A2-1) to (A5-1) can be produced in the same manner.

As a polar monomer to be used for modification, the following can be exemplified; hydroxy group-containing ethylenic unsaturated compounds, amino group-containing ethylenic unsaturated compounds, epoxy group-containing ethylenic unsaturated compounds, aromatic vinyl compounds, unsaturated carboxylic acids and their derivatives, vinyl ester compounds, vinyl chloride, and the likes.

Particularly, as the hydroxy group-containing ethylenic unsaturated compounds, the following can be exemplified; (meth)acrylic acid esters such as hydroxyethyl (meth)acrylate, 2-hydroxypropyl (meth)acrylate, 3-hydroxypropyl (meth)acrylate, 2-hydroxy-3-phenoxypropyl (meth)acrylate, 3-chloro-2-hydroxypropyl (meth)acrylate, glycerin mono (meth)acrylate, pentaerythritol mono(meth)acrylate, trimethylolpropane mono(meth)acrylate, tetremethylolethane mono(meth)acrylate, butanediol mono(meth)acrylate, polyethylene glycol mono(meth)acrylate, 2-(6-hydroxyhexanoyloxy) ethylacrylate, and the likes; 10-undecene-1-ol, 1-octene-3-ol, 2-methanolnorbornene, hydroxylstyrene, hydroxyethyl vinyl ether, hydroxylbutyl vinyl ether, N-methylol acrylamide, 2-(meth)acryloyloxyethyl acid phosphate, glycerin mono allyl ether, allyl alcohol, allyloxy ethanol, 2-buthen-1,4, diol, glycerin monoalcohol, and the likes.

An amino group-containing ethylenic unsaturated compound is a compound having an ethylenic double bond and amino group and as such a compound, a vinyl type monomer having at least one type of an amino group and substituted amino groups can be exemplified.

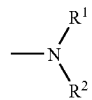

Where, $R^1$ denotes hydrogen atom, methyl group, or ethyl group; $R^2$ denotes hydrogen atom, an alkyl group of 1 to 12 carbon atoms, preferably 1 to 8 carbon atoms, or a cycloalkyl group of 6 to 12, preferably 6 to 8 carbon atoms. The foregoing alkyl group and cycloalkyl group may further have substituent groups.

As such an amino group-containing ethylenic unsaturated compound, the following are concrete examples; alkyl ester types derivatives of acrylic acid or methacrylic acid such as aminoethyl (meth)acrylate, propylaminoethyl (meth)acrylate, dimethylaminoethyl methacrylate, aminopropyl (meth) acrylate, phenylaminoethyl methacrylate, cyclohexylaminoethyl methacrylate, and the likes; vinylamine derivatives such as N-vinyldiethylamine, N-acetylvinylamine, and the likes;

allylamine type derivatives such as allylamine, methallylamine, N-methylallylamine, N,N-dimethylallylamine, N,N-dimethylaminopropylallylamine, and the likes; acrylamide type derivatives such as acrylamide, N-methylacrylamide, and the likes; aminostyrenes such as p-aminostyrene; 6-aminohexylsuccinic imide; and 2-aminoethylsuccinic imide.

As an epoxy group-containing ethylenic unsaturated compound is a monomer containing one or more polymerizable unsaturated bonds and epoxy groups in one molecule and as such an epoxy group-containing ethylenic unsaturated compound, concrete examples are following; glycidyl acrylate, glycidyl methacrylate; dicarboxylic acid mono- and alkylglycidyl ester (in the case of monoglycidyl ester, the number of carbon atoms of alkyl group is 1 to 12) such as maleic acid mono- and di-glycidyl ester, fumaric acid mono- and di-glycidyl ester, crotonic acid mono- and di-glycidyl ester, tetrehydrophthalic acid mono- and di-glycidyl ester, itaconic acid mono- and di-glycidyl ester, butenetricarboxylic acid mono- and di-glycidyl ester, citraconic acid mono- and di-glycidyl ester, endo-cis-bicyclo[2.2.1]hepto-5-en-2,3-dicarboxylic acid (nadic acid™) mono- and di-glycidyl ester, endo-cis-bicyclo[2.2.1]hepto-5-en-2-methyl-2,3-dicarboxylic acid (methylnadic acid™) mono- and di-glycidyl ester, allylsuccinic acid mono- and di-glycidyl ester; p-styrenecarboxylic acid alkylglycidyl ester, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide, and the likes.

As an aromatic vinyl compound, for example, compounds having the following formula can be exemplified.

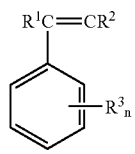

In the above illustrated formula, $R^1$ and $R^2$ may be the same or different to each other and separately denote hydrogen atom or an alkyl group of 1 to 3 carbon atoms; particularly methyl, ethyl, propyl, or isopropyl group. $R^3$ denotes hydrocarbon group of 1 to 3 carbon atoms or a halogen atom; particularly methyl, ethyl, propyl or isopropyl group as well as chlorine, bromine, or iodine atom. Further, n is generally an integer from 0 to 5 and preferably an integer from 1 to 5.

Concrete examples of the aromatic vinyl compound are following; compounds having the above illustrated formula such as styrene, α-methylstyrene, o-methylstyrene, p-methylstyrene, m-methylstyrene, p-chlorostyrene, m-chlorostyrene, p-chloromethylstyrene, and the likes; 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole, N-vinylpyrrolidone, and the likes.

As an unsaturated carboxylic acid, the following are examples; acrylic acid, methacrylic acid, maleic acid, fumaric acid, tetrahydrophthalic acid, itaconic acid, citraconic acid, crotonic acid, isocrotonic acid, norbornenedicarboxylic acid, bicyclo[2.2.1]hepto-2-en-5,6-dicarboxylic acid, or anhydrides of these acids, or their derivatives, (e.g. acid halides, amides, imides, esters, and the likes). Concrete compounds are exemplified as following; malenyl chloride, malenylimide, maleic anhydride, itaconic anhydride, citraconic anhydride, tetrahydrophthalic anhydride, bicyclo[2.2.1]hepto-2-en-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2.2.1]hepto-2-en-5,6-dicarboxylate, hydroxyethyl (meth)acrylate, hydroxypropyl (meth)acrylate, glycidyl (meth)acrylate, aminoethyl methacrylate, aminopropyl methacrylate, and the likes. Among them, (meth)acrylic acid, maleic anhydride, hydroxyethyl (meth)acrylate, glycidyl methacrylate, and aminopropyl methacrylate are preferable.

As a vinyl ester compounds, the following are examples; vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-tert-butylbenzoate, vinyl salicylate, vinyl cyclohexanecarboxylate, and the likes.

Generally 1 to 100 parts by weight, preferably 5 to 80 parts by weight of the foregoing monomer is used to 100 parts by weight of an ethylene (co)polymer (A1).

As a radical initiator, organic peroxides or azo compounds can be exemplified. Concrete examples of the organic peroxides are following; dicumyl peroxide, di-tert-butyl peroxide, 2,5-dimethyl-2,5-bis(tert-butylperoxy)hexane, 2,5-dimethyl-2,5-bis(tert-butylperoxy)hexyne-3,1,3-bis(tert-butylperoxyisopropyl)benzene, 1,1-bis(tert-butylperoxy)varelate, benzoyl peroxide, tert-butylperoxy benzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide, m-tolyl peroxide, and the likes. As an azo compound, azoisobutyronitrile, dimethylazoisobutyronitrile, and the likes can be exemplified.

It is preferable to add generally 0.001 to 10 parts by weight of such a radical initiator to 100 parts by weight of the foregoing ethylene (co)polymer (A1).

A radical initiator can be used being mixed as it is with an ethylene (co)polymer (A1) and a polar monomer and may be used while being dissolved in a small amount of an organic solvent. As an organic solvent to be used in that case, any organic solvent capable of dissolving a radical initiator can be used with no specific limit. As such an organic solvent, the following can be exemplified; aromatic hydrocarbon solvents such as benzene, toluene, xylene, and the likes; aliphatic hydrocarbon type solvents such as pentane, hexane, heptane, octane, nonane, and decane; alicyclic hydrocarbon type solvents such as cyclohexane, methylcyclohexane, decahydronaphthalene, and the likes; chlorohydrocarbons such as chlorobenzene, dichlorobenzene, trichlorobenzene, methylene chloride, chloroform, tetrachloromethane, and tetreachloroethylene; alcohol type solvents such as methanol, ethanol, n-propanol, iso-propanol, n-butanol, sec-butanol, and tert-butanol; ketone type solvents such as acetone, methyl ethyl ketone, and methyl isobutyl ketone; ester type solvents such as ethyl acetate and dimethyl phthalate; and ether type solvents such as dimethyl ether, diethyl ether, di-n-amyl ether, tetrahydrofuran, dioxyanisole, and the likes.

At the time of graft-modifying an ethylene (co)polymer (A1), a reductive substance may be used. A reductive substance is effective to increase the graft quantity of an obtained graft-modified ethylene (co)polymer (A1-1).

As a reductive substance, compounds containing groups such as —SH, SO3H, —NHNH$_2$, —COCH(OH)—, and the likes as well as ferrous ion, chromium ion, cobalt ion, nickel ion, palladium ion, sulfite salts, hydroxylamine, hydrazine and the likes can be exemplified.

Concrete examples of such a reductive substance are following; ferrous chloride, potassium dichromate, cobalt chloride, cobalt naphthenate, palladium chloride, ethanolamine, diethanolamine, N,N-demethylaniline, hydrazine, ethylmercaptan, benzenesulfonic acid, p-toluenesulfonic acid, and the likes.

Generally 0.001 to 5 parts by weight, preferably 0.1 to 3 parts by weight of the foregoing reductive substance is added to 100 parts by weight of an ethylene (co)polymer (A1).

An ethylene (co)polymer (A1) can be graft-modified by a conventionally known method and, for example, graft-modification is carried out by dissolving an ethylene (co)polymer (A1) in an organic solvent, dissolving a polar monomer and radical initiator in the resultant solution, and carrying out reaction at 70 to 200° C., preferably 80 to 190° C. for 0.5 to 15 hours, preferable 1 to 10 hours.

As an organic solvent to be used for graft-modification of an ethylene (co)polymer (A1), any organic solvent capable of dissolving the ethylene (co)polymer (A1) can be used without specific limitation.

As such an organic solvent, aromatic hydrocarbon solvents such as benzene, toluene, xylene, and the likes and aliphatic hydrocarbon type solvents such as pentane, hexane, heptane can be exemplified.

A graft-modified ethylene (co)polymer (A1-1) can also be produced by reaction of an ethylene (co)polymer (A1) and a polar monomer in the absence of a solvent using an extruder. The reaction temperature is generally not lower than the melting point of the ethylene (co)polymer (A1), particularly within a range of 120 to 250° C. and the reaction time in such temperature conditions is generally 0.5 to 10 minutes.

Graft-Modified Ethylene (co)polymer Composition (C1-2)

A graft-modified ethylene (co)polymer composition (C1-2) comprises the above described graft-modified ethylene (co)polymer (A1-1) and an un-modified other polymer (D1).

As another polymer (D1), the following can be exemplified; polyolefin, such as high density polyethylene, medium density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (D1-1) is preferable. The ethylene (co)polymer (D1-1) includes the foregoing ethylene (co)polymer (A1).

An ethylene (co)polymer (D1-1) is an ethylene homopolymer or a copolymer of ethylene and an α-olefin of 3 to 20 carbon atoms. As an α-olefin of 3 to 20 carbon atoms, the same olefins as the foregoing α-olefins can be exemplified.

In the case the ethylene (co)polymer (D1-1) is a copolymer of ethylene and an α-olefin, the mole ratio (ethylene/α-olefin) of ethylene and the α-olefin depends on the types of the α-olefin and is generally 1/99 to 99/1, preferably 50/50 to 95/5. The mole ratio is preferably 50/50 to 90/10 in the case the α-olefin is propylene and the mole ratio is preferably 80/20 to 95/5 in the case the α-olefin is an α-olefin of not less than 4 carbon atoms.

The intrinsic viscosity of the ethylene (co)polymer (D1-1) measured at 135° C. in decalin is desirable to be generally 0.4 to 7 dl/g and preferably 0.5 to 5 dl/g.

Additionally, the ethylene (co)polymer (D1-1) may comprise a repeating unit derived from another compound polymerizable with ethylene or an α-olefin besides a repeating unit derived from ethylene and an α-olefin of 3 to 20 carbon atoms.

As such other compounds, a polyene compound such as a chain polyene compound, a cyclic polyene compound, and the likes and a cyclic monoene compound can be exemplified.

Additionally, the ethylene (co)polymer (D1-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (D1-1), an ethylene homopolymer or a copolymer of ethylene and an α-olefin of 3 to 8 carbon atoms is preferable.

The polymers of the ethylene (co)polymer (D1-1), besides ethylene (co)polymer (A1), can be obtained by homopolymerizing ethylene by a conventionally known method or copolymerizing ethylene and an α-olefin by a conventionally known method. The polymerization reaction can be carried out in gas-phase (a gas-phase polymerization method) as well as in liquid-phase (a liquid-phase polymerization method).

In an ethylene (co)polymer composition (C1-2), it is desirable that the weight ratio (A1-1:D1) of a graft-modified ethylene (co)polymer (A1-1) and another polymer (D1) is 1:99 to 99:1 and preferably 10:90 to 90:10.

Regarding a graft-modified ethylene (co)polymer composition (C1-2), additives exemplified as the additives allowed to be added to ethylene (co)polymers (A1) to (A5) may be added if necessary as long as the additives do not depart from the purposes of the present invention.

A graft-modified ethylene (co)polymer composition (C1-2) can be produced by a known method and, for example, it can be produced from a graft-modified ethylene (co)polymer (A-1), another polymer, preferably ethylene (co)polymer (D1-1), and other components to be added if necessary by the same methods as the methods of the foregoing ethylene (co)polymer composition (C1-1).

The foregoing graft-modified ethylene (co)polymer composition (C1-2) is characterized by high adhesion strength to a material with high polarity, excellent mechanical strength, and excellent moldability to various type of molding methods.

Graft-Modified Ethylene (co)polymer Composition (C2-2)

A graft-modified ethylene (co)polymer composition (C2-2) comprises the above described graft-modified ethylene (co)polymer (A2-1) and an un-modified other polymer (D2).

As another polymer (D2), the following can be exemplified; polyolefin, such as high density polyethylene, middle density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (D2-1) is preferable. The ethylene (co)polymer (D2-1) includes the foregoing ethylene (co)polymer (A2).

An ethylene (co)polymer (D2-1) is an ethylene homopolymer or a copolymer of ethylene and an α-olefin of 3 to 20 carbon atoms. As an α-olefin of 3 to 20 carbon atoms, the same olefins as the foregoing α-olefins can be exemplified.

In the case the ethylene (co)polymer (D2-1) is a copolymer of ethylene and an α-olefin, the mole ratio (ethylene/α-olefin) of ethylene and the α-olefin depends on the types of the α-olefin and is generally 1/99 to 99/1, preferably 50/50 to 95/5. The mole ratio is preferably 50/50 to 90/10 in the case the α-olefin is propylene and the mole ratio is preferably 80/20 to 95/5 in the case the α-olefin is an α-olefin of not less than 4 carbon atoms.

The intrinsic viscosity of the ethylene (co)polymer (D2-1) measured at 135° C. in decalin is desirable to be generally 0.4 to 7 dl/g and preferably 0.5 to 5 dl/g.

Additionally, the ethylene (co)polymer (D2-1) may comprise a repeating unit derived from another compound polymerizable with ethylene or an α-olefin besides a repeating unit derived from ethylene and an α-olefin of 3 to 20 carbon atoms.

As such other compounds, a polyene compound such as a chain polyene compound, a cyclic polyene compound, and the likes and a cyclic monoene compound can be exemplified.

Additionally, the ethylene (co)polymer (D2-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (D2-1), an ethylene homopolymer or a copolymer of ethylene and an α-olefin of 3 to 8 carbon atoms is preferable.

The polymers of the ethylene (co)polymer (D2-1), besides ethylene (co)polymer (A), can be obtained by homopolymerizing ethylene by a conventionally known method or copolymerizing ethylene and an α-olefin by a conventionally known method. The polymerization reaction can be carried out in gas-phase (a gas-phase polymerization method) as well as in liquid-phase (a liquid-phase polymerization method).

In an ethylene (co)polymer composition (C2-2), it is desirable that the weight ratio (A2-1:D2) of a graft-modified ethylene (co)polymer (A2-1) and another polymer (D) is 1:99 to 99:1 and preferably 10:90 to 90:10.

Regarding a graft-modified ethylene (co)polymer composition (C2-2), additives exemplified as the additives allowed to be added to ethylene (co)polymers (A1) to (A5) may be added if necessary as long as the additives do not depart from the purposes of the present invention.

A graft-modified ethylene (co)polymer composition (C2-2) can be produced by a known method and, for example, it can be produced from a graft-modified ethylene (co)polymer (A2-1), another polymer, preferably ethylene (co)polymer (D2-1), and other components to be added if necessary by the same methods as the methods of the foregoing ethylene (co)polymer composition (C1-1).

The foregoing graft-modified ethylene (co)polymer composition (C2-2) is characterized by high adhesion strength to a material with high polarity, excellent mechanical strength, and excellent moldability to various type of molding methods.

Graft-Modified Ethylene (co)polymer Composition (C3-2)

A graft-modified ethylene (co)polymer composition (C3-2) comprises the above described graft-modified ethylene (co)polymer (A3-1) and an un-modified other polymer (D3).

As another polymer (D3), the following can be exemplified; polyolefin, such as high density polyethylene, middle density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (D3-1) is preferable. The ethylene (co)polymer (D3-1) includes the foregoing ethylene (co)polymer (A3).

An ethylene (co)polymer (D3-1) is an ethylene homopolymer or a copolymer of ethylene and an α-olefin of 3 to 20 carbon atoms. As an α-olefin of 3 to 20 carbon atoms, the same olefins as the foregoing α-olefins can be exemplified.

In the case the ethylene (co)polymer (D3-1) is a copolymer of ethylene and an α-olefin, the mole ratio (ethylene/α-olefin) of ethylene and the α-olefin depends on the types of the α-olefin and is generally 1/99 to 99/1, preferably 50/50 to 95/5. The mole ratio is preferably 50/50 to 90/10 in the case the α-olefin is propylene and the mole ratio is preferably 80/20 to 95/5 in the case the α-olefin is an α-olefin of not less than 4 carbon atoms.

The intrinsic viscosity of the ethylene (co)polymer (D3-1) measured at 135° C. in decalin is desirable to be generally 0.4 to 7 dl/g and preferably 0.5 to 5 dl/g.

Additionally, the ethylene (co)polymer (D3-1) may comprise a repeating unit derived from another compound polymerizable with ethylene or an α-olefin besides a repeating unit derived from ethylene and an α-olefin of 3 to 20 carbon atoms.

As such other compounds, a polyene compound such as a chain polyene compound, a cyclic polyene compound, and the likes and a cyclic monoene compound can be exemplified.

Additionally, the ethylene (co)polymer (D3-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (D3-1), an ethylene homopolymer or a copolymer of ethylene and an α-olefin of 3 to 8 carbon atoms is preferable.

The polymers of the ethylene (co)polymer (D3-1), besides ethylene (co)polymer (A3), can be obtained by homopolymerizing ethylene by a conventionally known method or copolymerizing ethylene and an α-olefin by a conventionally known method. The polymerization reaction can be carried out in gas-phase (a gas-phase polymerization method) as well as in liquid-phase (a liquid-phase polymerization method).

In an ethylene (co)polymer composition (C3-2), it is desirable that the weight ratio (A3-1:D3) of a graft-modified ethylene (co)polymer (A3-1) and another polymer (D3) is 1:99 to 99:1 and preferably 10:90 to 90:10.

Regarding a graft-modified ethylene (co)polymer composition (C3-2), additives exemplified as the additives allowed to be added to ethylene (co)polymers (A1) to (A5) may be added if necessary as long as the additives do not depart from the purposes of the present invention.

A graft-modified ethylene (co)polymer composition (C3-2) can be produced by a known method and, for example, it can be produced from a graft-modified ethylene (co)polymer (A3-1), another polymer, preferably ethylene (co)polymer (D3-1), and other components to be added if necessary by the same methods as the methods of the foregoing ethylene (co)polymer composition (C1-1).

The foregoing graft-modified ethylene (co)polymer composition (C3-2) is characterized by high adhesion strength to a material with high polarity, excellent mechanical strength, and excellent moldability to various type of molding methods.

Graft-Modified Ethylene (co)polymer Composition (C4-2)

A graft-modified ethylene (co)polymer composition (C4-2) comprises the above described graft-modified ethylene (co)polymer (A4-1) and an un-modified other polymer (D4).

As another polymer (D4), the following can be exemplified; polyolefin, such as high density polyethylene, middle density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (D4-1) is preferable. The ethylene (co)polymer (D4-1) includes the foregoing ethylene (co)polymer (A4).

An ethylene (co)polymer (D4-1) is an ethylene homopolymer or a copolymer of ethylene and an α-olefin of 3 to 20 carbon atoms. As an α-olefin of 3 to 20 carbon atoms, the same olefins as the foregoing α-olefins can be exemplified.

In the case the ethylene (co)polymer (D4-1) is a copolymer of ethylene and an α-olefin, the mole ratio (ethylene/α-olefin) of ethylene and the α-olefin depends on the types of the α-olefin and is generally 1/99 to 99/1, preferably 50/50 to 95/5. The mole ratio is preferably 50/50 to 90/10 in the case the α-olefin is propylene and the mole ratio is preferably 80/20 to 95/5 in the case the α-olefin is an α-olefin of not less than 4 carbon atoms.

The intrinsic viscosity of the ethylene (co)polymer (D4-1) measured at 135° C. in decalin is desirable to be generally 0.4 to 7 dl/g and preferably 0.5 to 5 dl/g.

Additionally, the ethylene (co)polymer (D4-1) may comprise a repeating unit derived from another compound polymerizable with ethylene or an α-olefin besides a repeating unit derived from ethylene and an α-olefin of 3 to 20 carbon atoms.

As such other compounds, a polyene compound such as a chain polyene compound, a cyclic polyene compound, and the likes and a cyclic monoene compound can be exemplified.

Additionally, the ethylene (co)polymer (D4-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (D4-1), an ethylene homopolymer or a copolymer of ethylene and an α-olefin of 3 to 8 carbon atoms is preferable.

The polymers of the ethylene (co)polymer (D4-1), besides ethylene (co)polymer (A4), can be obtained by homopolymerizing ethylene by a conventionally known method or copolymerizing ethylene and an α-olefin by a conventionally known method. The polymerization reaction can be carried out in gas-phase (a gas-phase polymerization method) as well as in liquid-phase (a liquid-phase polymerization method).

In an ethylene (co)polymer composition (C4-2), it is desirable that the weight ratio (A4-1: D4) of a graft-modified ethylene (co)polymer (A4-1) and another polymer (D4) is 1:99 to 99:1 and preferably 10:90 to 90:10.

Regarding a graft-modified ethylene (co)polymer composition (C4-2), additives exemplified as the additives allowed to be added to ethylene (co)polymers (A1) to (A5) may be added if necessary as long as the additives do not depart from the purposes of the present invention.

A graft-modified ethylene (co)polymer composition (C4-2) can be produced by a known method and, for example, it can be produced from a graft-modified ethylene (co)polymer (A4-1), another polymer, preferably ethylene (co)polymer (D4-1), and other components to be added if necessary by the same methods as the methods of the foregoing ethylene (co) polymer composition (C1-1).

The foregoing graft-modified ethylene (co)polymer composition (C4-2) is characterized by high adhesion strength to a material with high polarity, excellent mechanical strength, and excellent moldability to various type of molding methods.

Graft-Modified Ethylene (co)polymer Composition (C5-2

A graft-modified ethylene (co)polymer composition (C5-2) comprises the above described graft-modified ethylene (co)polymer (A5-1) and an un-modified other polymer (D5).

As another polymer (D5), the following can be exemplified; polyolefin, such as high density polyethylene, middle density polyethylene, high pressure low density polyethylene, straight chain low density polyethylene, ethylene-propylene copolymer, propylene polymer, propylene-ethylene copolymer, propylene-1-butene copolymer, 1-butene polymer, and the likes; and thermoplastic resin such as polyamides, polyesters, polyacetals, polystyrenes, polycarbonates and among them, an ethylene (co)polymer (D5-1) is preferable. The ethylene (co)polymer (D5-1) includes the foregoing ethylene (co)polymer (A5).

An ethylene (co)polymer (D5-1) is an ethylene homopolymer or a copolymer of ethylene and an α-olefin of 3 to 20 carbon atoms. As an α-olefin of 3 to 20 carbon atoms, the same olefins as the foregoing α-olefins can be exemplified.

In the case the ethylene (co)polymer (D5-1) is a copolymer of ethylene and an α-olefin, the mole ratio (ethylene/α-olefin) of ethylene and the α-olefin depends on the types of the α-olefin and is generally 1/99 to 99/1, preferably 50/50 to 95/5. The mole ratio is preferably 50/50 to 90/10 in the case the α-olefin is propylene and the mole ratio is preferably 80/20 to 95/5 in the case the α-olefin is an α-olefin of not less than 4 carbon atoms.

The intrinsic viscosity of the ethylene (co)polymer (D5-1) measured at 135° C. in decalin is desirable to be generally 0.4 to 7 dl/g and preferably 0.5 to 5 dl/g.

Additionally, the ethylene (co)polymer (D5-1) may comprise a repeating unit derived from another compound polymerizable with ethylene or an α-olefin besides a repeating unit derived from ethylene and an α-olefin of 3 to 20 carbon atoms.

As such other compounds, a polyene compound such as a chain polyene compound, a cyclic polyene compound, and the likes and a cyclic monoene compound can be exemplified.

Additionally, the ethylene (co)polymer (D5-1) may further comprise a constituent monomer derived from styrene or substituted styrene. Such other compounds may be used solely or in combination with one another. The content of another compound component is generally 1 to 20 mole % and preferably 2 to 15 mole %.

As an ethylene (co)polymer (D5-1), an ethylene homopolymer or a copolymer of ethylene and an α-olefin of 3 to 8 carbon atoms is preferable.

The polymers of the ethylene (co)polymer (D5-1), besides ethylene (co)polymer (A5), can be obtained by homopolymerizing ethylene by a conventionally known method or copolymerizing ethylene and an α-olefin by a conventionally known method. The polymerization reaction can be carried out in gas-phase (a gas-phase polymerization method) as well as in liquid-phase (a liquid-phase polymerization method).

In an ethylene (co)polymer composition (C5-2), it is desirable that the weight ratio (A5-1:D5) of a graft-modified ethylene (co)polymer (A5-1) and another polymer (D5) is 1:99 to 99:1 and preferably 10:90 to 90: 10.

Regarding a graft-modified ethylene (co)polymer composition (C5-2), additives exemplified as the additives allowed to be added to ethylene (co)polymers (A1) to (A5) may be added if necessary as long as the additives do not depart from the purposes of the present invention.

A graft-modified ethylene (co)polymer composition (C5-2) can be produced by a known method and, for example, it can be produced from a graft-modified ethylene (co)polymer (A5-1), another polymer, preferably ethylene (co)polymer (D5-1), and other components to be added if necessary by the same methods as the methods of the foregoing ethylene (co) polymer composition (C1-1).

The graft-modified ethylene (co)polymer composition (C5-2) is characterized by high adhesion strength to a material with high polarity, excellent mechanical strength, and excellent moldability to various type of molding methods.

Use of Graft-Modified Ethylene (co)polymer and Graft-Modified Ethylene (co)polymer Composition The foregoing graft-modified ethylene (co)polymers (A1-1) to (A5-1) and graft-modified ethylene (co)polymer compositions (C1-2) to (C5-2) can be processed by common press molding, air cooling inflation molding, air cooling two step cooling inflation molding, high speed inflation molding, T-die film molding, water cooling inflation molding and the likes to give films. A film molded by such a manner is excellent transparency and excellent mechanical strength, and heat seal property, hot tack property, high heat resistance, good blocking property, and the likes which are characterized by a conventional LLDPE.

A film produced from a graft-modified ethylene (co)polymer (A1-1) to (A5-1) and a graft-modified ethylene (co) polymer composition (C1-2) to (C5-2) is suitable for various types of wrapping films such as standardized bags, sugar bags, oil wrapping bags, aqueous product wrapping bags and materials for agriculture. Since the film is high adhesion strength to nylon, polyesters, and metal foils, the film can also be used as a multilayer film being stuck to a substrate of those materials.

Ethylene (co)polymer Composition (C1-3)

An ethylene (co)polymer composition (C1-3) comprises ethylene (co)polymer (A1) and a graft-modified ethylene (co) polymer (E1).

A graft-modified ethylene (co)polymer (E1) is a modified polymer produced by graft-modifying the foregoing ethylene (co)polymer (B1-1) by a polar monomer.

A graft-modified ethylene (co)polymer (E1) can be produced using ethylene (co)polymer (B1-1) by a method similar to the method of producing the foregoing graft-modified ethylene (co)polymer (A1-1).

The graft amount of the graft group derived from a polar monomer of a graft-modified ethylene (co)polymer (E1) produced by such a method is generally 0.1 to 50% by weight and preferably 0.2 to 30% by weight.

In an ethylene (co)polymer composition (C1-3), it is desirable that the weight ratio (A1:E1) of an ethylene (co)polymer (A1) and a graft-modified ethylene (co)polymer (E1) is within a range from 1:99 to 99:1, preferably from 10:90 to 90:10.

An ethylene (co)polymer composition (C1-3) may contain additives exemplified as the additives allowed to be added to ethylene (co)polymers (A1) to (A5) if necessary as long as the additives do not depart from the purposes of the present invention.

An ethylene (co)polymer composition (C1-3) can be produced by a known method and, for example, it can be produced from an ethylene (co)polymer (A1), a graft-modified ethylene (co)polymer (E1), and other components to be added if necessary by the same methods as the methods employed for producing the foregoing ethylene (co)polymer composition (C1-1).

The foregoing ethylene (co)polymer composition (C1-3) is characterized by high adhesion strength to a material with high polarity, excellent mechanical strength, and excellent moldability to various type of molding methods.

Ethylene (co)polymer Composition (C2-3)

A ethylene (co)polymer composition (C2-3) comprises ethylene (co)polymer (A2) and a graft-modified ethylene (co) polymer (E2).

A graft-modified ethylene (co)polymer (E2) is a modified polymer produced by graft-modifying the foregoing ethylene (co)polymer (B2-1) by a polar monomer.

A graft-modified ethylene (co)polymer (E2) can be produced using ethylene (co)polymer (B2-1) by a method similar to the method of producing the foregoing graft-modified ethylene (co)polymer (A1-1).

The graft amount of the graft group derived from a polar monomer of a graft-modified ethylene (co)polymer (E2) produced by such a method is generally 0.1 to 50% by weight and preferably 0.2 to 30% by weight.

In an ethylene (co)polymer composition (C2-3), it is desirable that the weight ratio (A2:E2) of an ethylene (co)polymer (A2) and a graft-modified ethylene (co)polymer (E2) is within a range from 1:99 to 99:1, preferably from 10:90 to 90:10.

An ethylene (co)polymer composition (C2-3) may contain additives exemplified as the additives allowed to be added to ethylene (co)polymers (A1) to (A5) if necessary as long as the additives do not depart from the purposes of the present invention.

An ethylene (co)polymer composition (C2-3) can be produced by a known method and, for example, it can be produced from an ethylene (co)polymer (A2), a graft-modified ethylene (co)polymer (E2), and other components to be added if necessary by the same methods as the methods employed for producing the foregoing ethylene (co)polymer composition (C1-1).

The foregoing ethylene (co)polymer composition (C2-3) is characterized by high adhesion strength to a material with high polarity, excellent mechanical strength, and excellent moldability to various type of molding methods.

Ethylene (co)polymer Composition (C3-3)

A ethylene (co)polymer composition (C3-3) comprises ethylene (co)polymer (A3) and a graft-modified ethylene (co) polymer (E3).

A graft-modified ethylene (co)polymer (E3) is a modified polymer produced by graft-modifying the foregoing ethylene (co)polymer (B3-1) by a polar monomer.

A graft-modified ethylene (co)polymer (E3) can be produced using ethylene (co)polymer (B3-1) by a method similar to the method of producing the foregoing graft-modified ethylene (co)polymer (A1-1).

The graft amount of the graft group derived from a polar monomer of a graft-modified ethylene (co)polymer (E3) produced by such a method is generally 0.1 to 50% by weight and preferably 0.2 to 30% by weight.

In an ethylene (co)polymer composition (C3-3), it is desirable that the weight ratio (A3:E3) of an ethylene (co)polymer (A3) and a graft-modified ethylene (co)polymer (E3) is within a range from 1:99 to 99:1, preferably from 10:90 to 90:10.

An ethylene (co)polymer composition (C3-3) may contain additives exemplified as the additives allowed to be added to ethylene (co)polymers (A1) to (A5) if necessary as long as the additives do not depart from the purposes of the present invention.

An ethylene (co)polymer composition (C3-3) can be produced by a known method and, for example, it can be produced from an ethylene (co)polymer (A3), a graft-modified ethylene (co)polymer (E3), and other components to be added if necessary by the same methods as the methods employed for producing the foregoing ethylene (co)polymer composition (C1-1).

The foregoing ethylene (co)polymer composition (C3-3) is characterized by high adhesion strength to a material with high polarity, excellent mechanical strength, and excellent moldability to various type of molding methods.

Ethylene (co)polymer Composition (C4-3)

A ethylene (co)polymer composition (C4-3) comprises ethylene (co)polymer (A4) and a graft-modified ethylene (co)polymer (E4).

A graft-modified ethylene (co)polymer (E4) is a modified polymer produced by graft-modifying the foregoing ethylene (co)polymer (B4-1) by a polar monomer.

A graft-modified ethylene (co)polymer (E4) can be produced using ethylene (co)polymer (B4-l) by a method similar to the method of producing the foregoing graft-modified ethylene (co)polymer (A1-1).

The graft amount of the graft group derived from a polar monomer of a graft-modified ethylene (co)polymer (E4) produced by such a method is generally 0.1 to 50% by weight and preferably 0.2 to 30% by weight.

In an ethylene (co)polymer composition (C4-3), it is desirable that the weight ratio (A4:E4) of an ethylene (co)polymer (A4) and a graft-modified ethylene (co)polymer (E4) is within a range from 1:99 to 99:1, preferably from 10:90 to 90:10.

An ethylene (co)polymer composition (C4-3) may contain additives exemplified as the additives allowed to be added to ethylene (co)polymers (A1) to (A5) if necessary as long as the additives do not depart from the purposes of the present invention.

An ethylene (co)polymer composition (C4-3) can be produced by a known method and, for example, it can be produced from an ethylene (co)polymer (A4), a graft-modified ethylene (co)polymer (E4), and other components to be added if necessary by the same methods as the methods employed for producing the foregoing ethylene (co)polymer composition (C1-1).

The foregoing ethylene (co)polymer composition (C4-3) is characterized by high adhesion strength to a material with high polarity, excellent mechanical strength, and excellent moldability to various type of molding methods.

Ethylene (co)polymer Composition (C5-3)

An ethylene (co)polymer composition (C5-3) comprises ethylene (co)polymer (A5) and a graft-modified ethylene (co) polymer (E5).

A graft-modified ethylene (co)polymer (E5) is a modified polymer produced by graft-modifying the foregoing ethylene (co)polymer (B5-1) by a polar monomer.

A graft-modified ethylene (co)polymer (E5) can be produced using ethylene (co)polymer (B5-1) by a method similar to the method of producing the foregoing graft-modified ethylene (co)polymer (A1-1).

The graft amount of the graft group derived from a polar monomer of a graft-modified ethylene (co)polymer (E5) produced by such a method is generally 0.1 to 50% by weight and preferably 0.2 to 30% by weight.

In an ethylene (co)polymer composition (C5-3), it is desirable that the weight ratio (A5:E5) of an ethylene (co)polymer (A5) and a graft-modified ethylene (co)polymer (E5) is within a range from 1:99 to 99:1, preferably from 10:90 to 90:10.

An ethylene (co)polymer composition (C5-3) may contain additives exemplified as the additives allowed to be added to ethylene (co)polymers (A1) to (A5) if necessary as long as the additives do not depart from the purposes of the present invention.

An ethylene (co)polymer composition (C5-3) can be produced by a known method and, for example, it can be produced from an ethylene (co)polymer (A5), a graft-modified ethylene (co)polymer (E5), and other components to be added if necessary by the same methods as the methods employed for producing the foregoing ethylene (co)polymer composition (C1-1).

The ethylene (co)polymer composition (C5-3) is characterized by high adhesion strength to a material with high polarity, excellent mechanical strength, and excellent moldability to various type of molding methods.

Use of Ethylene (co)polymer Compositions (C1-3) to (C5-3)

The foregoing ethylene (co)polymer compositions (C1-3) to (C5-3) can be processed by common press molding, air cooling inflation molding, air cooling two step cooling inflation molding, high speed inflation molding, T-die film molding, water cooling inflation molding and the likes to give films. A film molded by such a manner is excellent transparency and excellent mechanical strength, and heat seal property, hot tack property, high heat resistance, good blocking property, and the likes which are characterized by a conventional LLDPE.

A film produced from a ethylene (co)polymer composition (C1-3) to (C5-3) is suitable for various types of wrapping films such as standardized bags, sugar bags, oil wrapping bags, aqueous product wrapping bags and materials for agriculture. Since the film is high adhesion strength to nylon, polyesters, and metal foils, the film can also be used as a multilayer film being stuck to a substrate of those materials.

Advantages of the Invention

Ethylene (co)polymers (A1) to (A5) of the present invention have excellent moldability and excellent mechanical strength.

Ethylene (co)polymer compositions (C1-1) to (C5-1) of the present invention have excellent moldability and excellent mechanical strength.

Molded products of the present invention have excellent mechanical strength.

Graft-modified ethylene (co)polymer (A1-1) to (A5-1) of the present invention have high adhesion strength to a material with high polarity, excellent mechanical strength, and excellent moldability for various type of molding methods.

Graft-modified ethylene (co)polymer compositions (C1-2) to (C5-2) of the present invention have high adhesion strength to a material with high polarity, excellent mechanical strength, and excellent moldability to various type of molding methods.

Ethylene (co)polymer compositions (C1-3) to (C5-3) of the present invention have high adhesion strength to a material with high polarity, excellent mechanical strength, and excellent moldability for various type of molding methods.

EXAMPLES

While the present invention will be described more particularly with reference to examples, the description is, however, not intended to have any limitation on the scope of the present invention.

Synthesis 1

2-tert-Butylphenol 7.51 g (50 mmol) and THF (tetrahydrofuran) 54 ml were charged in a sufficiently dried 500 ml reactor purged with argon, ethylmagnesium bromide 18.53 ml (an ether solution, 3.0N, 55.6 mmol) was added dropwise to the reactor at 0° C. in 15 minutes and after that, the temperature was gradually raised to a room temperature and the resultant mixture was stirred for 1 hour at a room temperature. Toluene 180 ml was added, the resultant mixture was heated to 100° C., and about 40 ml of the mixed solvents of ether and THF were evaporated off to obtain a slightly opaque slurry. After the slurry was cooled to a room temperature, p-formaldehyde 3.75 g (125 mmol) and triethylamine 10.45 ml (75 mmol) were added and the resultant mixture was stirred at 88° C. for 1 hour. After being cooled to a room temperature, the mixture was quenched with 10% hydrochloric acid and an organic layer was concentrated and purified by a silica gel column to obtain 3-tert-butylsalicylaldehyde 6.22 g (yield 70%).

$^1$H-NMR(CDCl$_3$): 1.42 (s, 9H), 6.94 (t, 1H), 7.25-7.54 (m, 2H), 9.86 (s, 1H), 11.79 (s, 1H).

Ethanol 80 ml, n-octadecylamine 6.06 g (22.5 mmol), and 3-tert-butylsalicylaldehyde 2.84 g (15.0 mmol) were charged in a 200 ml reactor sufficiently purged with nitrogen, a small amount of acetic acid was added, and the resultant mixture was continuously stirred for 24 hours at a room temperature. The reaction liquid was concentrated in vacuum to remove the solvents to obtain a yellow color crystalline compound of the following formula (L1) 56 g (yield 70.7%).

$^1$H-NMR(CDCl$_3$): 0.89 (t, 3H), 1.26 (s, 30H), 1.44 (s, 9H), 1.53-1.75 (m, 2H), 3.57 (t, 2H), 6.79 (t, 1H), 7.08-7.11 (dd, 1H), 7.26-7.32 (dd, 1H), 8.32 (s, 1H), 14.22 (1H).

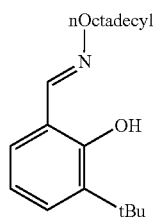

The compound (L1) 0.86 g (2.0 mmol) and ether 20 ml were charged in a sufficiently dried 100 ml reactor purged with argon and cooled to −78° C. and stirred. To the resultant mixture, n-butyllithium 1.43 ml (an n-hexane solution, 1.54M, 2.2 mmol) was added dropwise in 10 minutes and after that, the temperature was gradually raised to a room temperature and the resultant mixture was stirred for 4 hours at a room temperature to prepare a lithium salt solution. The solution was added dropwise to 20 ml of a THF solution which contained ZrCl$_4$(THF)$_2$ complex 0.38 g (1.0 mmol) and was cooled to −78° C. On completion of dropwise addition, the resultant mixture was continuously stirred while being gradually heated to a room temperature. The resultant mixture was further stirred for 15 hours at a room temperature and then the solvents of the reaction liquid were evaporated. The obtained solid was recrystallized by ether/hexane to obtain a vivid yellow color crystalline compound of the following formula (C1) 0.220 g (yield 21.6%).

$^1$H-NMR(CDCl$_3$): 0.88 (t, 6H), 1.25 (s, 78H), 1.57 (s, 4H), 3.59 (t, 4H), 6.92 (t, 2H), 7.20-7.26 (dd, 2H), 7.55-7.62 (dd, 2H), 8.15 (s, 1H). FD-mass spectrometry: 1018

[General Formula (C1)]

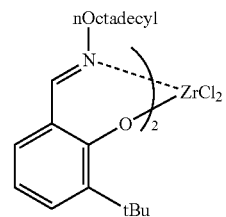

Synthesis 2

2-tert-Butyl-4-methylphenol 9.68 g (58.93 mmol) and THF 100 ml were charged in a sufficiently dried 1 liter reactor purged with nitrogen, ethylmagnesium bromide 23.00 ml (an ether solution, 3.0N, 69.00 mmol) was added dropwise to the reactor at 0° C. in 30 minutes and after that, the resultant mixture was gradually heated to a room temperature and stirred for 1 hour at a room temperature. Toluene 100 ml was added, the resultant mixture was heated to 95° C., and the mixed solvents of the ether/THF were evaporated off to obtain a slightly opaque slurry. After the slurry was cooled to a room temperature, toluene 100 ml, p-formaldehyde 4.50 g (149.90 mmol) and triethylamine 12.50 ml (89.93 mmol) were added and the resultant mixture was stirred at 95° C. for 2 hour. After being cooled to a room temperature, the mixture was quenched with 300 ml of 1N hydrochloric acid and an organic layer was concentrated and purified by a silica gel column to obtain 3-tert-butyl-5-methylsalicylaldehyde 7.36 g (yield 65%).

$^1$H-NMR(CDCl$_3$): 1.41 (s, 9H), 2.32 (t, 3H), 7.19 (d, 1H), 7.33 (d, 1H), 9.83 (s, 1H), 11.60 (s, 1H).

Ethanol 50 ml, n-hexylamine 1.52 g (15.02 mmol), and 3-tert-butyl-5-methylsalicylaldehyde 2.86 g (14.90 mmol) were charged in a 200 ml reactor sufficiently purged with nitrogen and the resultant mixture was continuously stirred for 24 hours at a room temperature. The reaction liquid was vacuum concentrated to remove the solvents to obtain a yellow color liquid compound of the following formula (L2) 4.14 g (yield 100%).

$^1$H-NMR(CDCl$_3$): 0.89 (t, 3H), 1.25-1.43 (s, 30H), 1.43 (s, 9H), 1.60-1.77 (m, 2H), 2.28 (s, 3H), 3.56 (t, 2H), 6.89 (s, 1H), 7.11 (d, 1H), 8.27 (s, 1H), 13.94 (s, 1H).

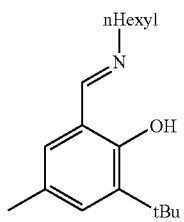

(L2)

The compound (L2) 4.16 g (15.10 mmol) and ether 70 ml were charged in a sufficiently dried 300 ml reactor purged with argon and cooled to −78° C. and stirred. To the resultant mixture, n-butyllithium 9.40 ml (an n-hexane solution, 1.60M, 15.04 mmol) was added dropwise in 30 minutes and after that, the resultant mixture was gradually heated to a room temperature and continuously stirred for 4 hours at a room temperature to prepare a lithium salt solution. The solution was added dropwise to 80 ml of a THF solution of $ZrCl_4(THF)_2$ complex 2.85 g (7.56 mmol) cooled to −78° C. On completion of dropwise addition, the resultant mixture was continuously stirred while being gradually heated to a room temperature. Further, the resultant mixture was stirred for 15 hours at a room temperature and then the solvents of the reaction liquid were evaporated. The obtained solid was washed with ether 50 ml and methylen chloride 200 ml and then the filtered liquid was concentrated followed by washing again with ether 20 ml to obtain a yellow color powder compound of the following formula (C2) 4.30 g (yield 80%).

$^1$H-NMR(CDCl$_3$): 0.74-1.54 (m, 18H) 1.55 (s, 18H), 2.31 (s, 6H), 3.37-3.68 (m, 4H), 6.99 (s, 2H), 7.36 (s, 2H), 8.09 (s, 2H). FD-mass spectrometry: 710

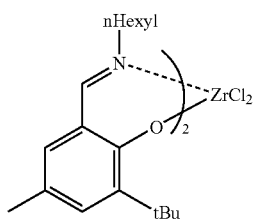

(C2)

Synthesis 3

Paracresol 34.15 g (316.0 mmol), Amberlyst 15E 2.50 g, and toluene 20 ml were charged in a sufficiently dried 200 ml reactor purged with argon, 30 ml of a toluene solution containing 4-cumylphenol 14.40 g (105.5 mmol) was added dropwise to the reactor at 80° C. and then the resultant mixture was stirred for 17 hours. After cooling to a room temperature, the resultant mixture was filtered while being washed with hexane. The obtained liquid was purified by silica gel column chromatography to obtain 2-cumyl-4-methylphenol 10.52 g (44%).

$^1$H-NMR(CDCl$_3$): 1.75 (s, 6H), 2.40 (s, 3H), 7.10-7.30 (m, 8H), 11.17 (s, 1H).

Ethylmagnesium bromide 21.0 ml (an ether solution, 3.0N, 63.1 mmol) and THF 40 ml were charged in a 500 ml reactor purged with nitrogen, 20 ml of a THF solution containing 2-cumyl-4-methylphenol 13.61 g (60.1 mmol) was added dropwise to the reactor at 0° C. in 1 hour and after that, the temperature was gradually raised to a room temperature and the resultant mixture was stirred for 30 minutes at a room temperature, in which toluene 220 ml was added, and then heated to 100° C. and about 50 ml of the mixed solvents of ether and THF were evaporated off to obtain a slightly opaque slurry. After the slurry was cooled to 24° C., p-formaldehyde 4.37 g (145.5 mmol) and triethylamine 12.0 ml (86.0 mmol) were added and the resultant mixture was stirred at 90° C. for 1 hour. After being cooled to a room temperature, the mixture was quenched with 42 ml of 18% hydrochloric acid and an organic layer was concentrated and the obtained liquid was purified by silica gel column chromatography to obtain 3-cumyl-5-methylsalicylaldehyde 14.13 g (yield 92%).

$^1$H-NMR(CDCl$_3$): 1.75 (s, 6H), 2.40 (s, 3H), 7.10-7.42 (m, 7H), 8.55 (s, 1H), 13.18 (s, 1H).

Ethanol 40 ml, n-hexylamine 1.82 g (18.0 mmol), and 3-cumyl-5-methylsalicylaldehyde 3.81 g (15.0 mmol) were charged in a 100 ml reactor sufficiently purged with nitrogen and the resultant mixture was continuously stirred for 3 hours at a room temperature. The reaction liquid was vacuum concentrated to remove the solvents to obtain a liquid which was purified by a silica gel chromatography to give a compound of the following formula (L3) 3.97 g (yield 78%).

$^1$H-NMR(CDCl$_3$): 0.85 (t, 3H), 1.27 (s, 6H), 1.52-1.70 (m, 2H), 1.71 (s, 6H), 2.34 (s, 3H), 3.45 (t, 2H), 6.92-7.35 (7H), 8.22 (s, 1H), 13.49 (s, 1H).

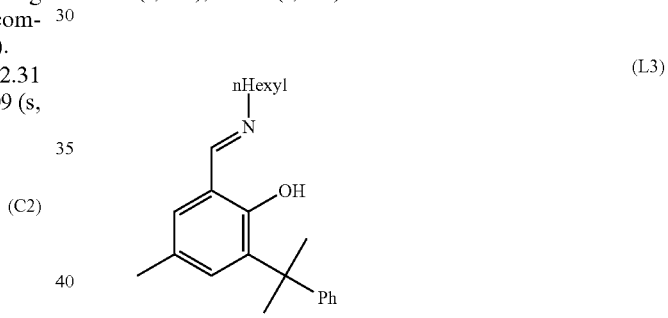

(L3)

The compound (L3) 1.01 g (3.00 mmol) and ether 30 ml were charged in a sufficiently dried 50 ml reactor purged with argon and cooled to −78° C. and stirred. To the resultant mixture, n-butyllithium 2.20 ml (an n-hexane solution, 1.57M, 3.45 mmol) was gradually added dropwise and after that, the resultant mixture was gradually heated to a room temperature and stirred for 4 hours at a room temperature to prepare a lithium salt solution. The solution was added dropwise to 30 ml of a THF solution which contained $ZrCl_4$(THF)$_2$ complex 0.622 g (1.65 mmol) and which was cooled to −78° C. On completion of dropwise addition, the resultant mixture was continuously stirred while being gradually heated to a room temperature. Further, the resultant mixture was stirred for 15 hours at a room temperature and then the solvents of the reaction liquid were evaporated. The obtained solid was mixed with ether 20 ml to give slurry and then being washed with ether 10 ml, the slurry was filtered. The filtered liquid was concentrated and washed again with hexane/ether to obtain a pale yellow color powder compound of the following formula (C3) 0.53 g (yield 42%).

$^1$H-NMR(CDCl$_3$): 0.50-2.00 (m, 34H), 2.25-2.45 (m, 6H), 2.50-2.75 (m, 4H), 6.90-7.55 (m, 14H), 8.85 (s, 2H). FD-mass spectrometry: 832

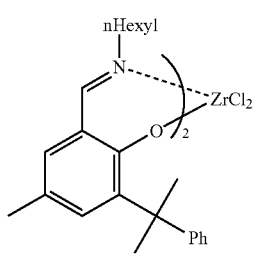

(C3)

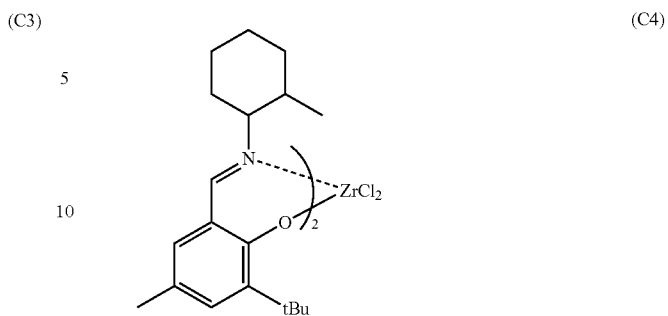

(C4)

Synthesis 4

Ethanol 30 ml, 2-methylcyclohexylamine 1.72 g (15.19 mmol) and 3-tert-butyl-5-methoxysalicylaldehyde 2.64 g (12.68 mmol) were charged in a 100 ml reactor purged with nitrogen and the mixture was continuously stirred for 24 hours at a room temperature. The precipitated solid was separated by filtration and washed with ethanol and vacuum dried to obtain a yellow powder compound of the formula (L4) 2.82 g (yield 73%).

$^1$H-NMR(CDCl$_3$): 0.93-1.86 (m, 1H), 1.43 (s, 9H), 3.42 (d, 2H), 3.77 (s, 3H), 6.60 (d, 1H), 6.96 (d, 1H), 8.25 (s, 1H), 13.71 (bs, 1H).

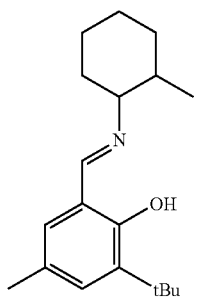

(L4)

The compound (L4) 0.91 g (3.00 ml) and ether 20 ml were charged in a 100 ml reactor which was sufficiently dried and purged with argon and the resultant mixture was cooled to −78° C. and stirred. To the resultant mixture, n-butyllithium 2.10 ml (n-hexane solution, 1.60M 3.36 mmol) was gradually added dropwise and then the mixture was gradually heated to a room temperature and continuously stirred for 2 hours at a room temperature to obtain a lithium salt solution. The solution was added dropwise to 20 ml of a THF solution which contained ZrCl$_4$(THF)$_2$ complex 0.57 g (1.51 mmol) and which was cooled to −78° C. On completion of dropwise addition, the resultant mixture was continuously stirred while being gradually heated to a room temperature. The resultant mixture was further stirred for 15 hours at a room temperature and then the solvents of the reaction liquid were evaporated. The obtained solid was washed with ether 10 ml and methylene chloride 60 ml and then the filtered liquid is concentrated and re-washed with hexane/ether to obtain 0.54 g of yellow color powder compound of the following formula (C4) (yield 46%).

$^1$H-NMR(CDCl$_3$): 0.53-1.85 (m, 22H), 1.55 (s, 18H), 3.22-3.40 (m, 4H), 3.80 (s, 6H), 6.64-6.67 (m, 2H), 7.10-7.26 (m, 2H), 7.96 (s, 2H). FD-mass spectrometry: 766

Example 1

Heptane 500 ml was charged in a 1 liter autoclave made of stainless steel and sufficiently purged with nitrogen, heated to 50° C., and the liquid phase and the gas phase were saturated with ethylene. After that, methylaluminoxane 1.25 mmol in terms of aluminum atom and the compound (C1) 0.0002 mmol were added to carry out polymerization at 8 kg/cm$^2$-G ethylene pressure for 15 minutes.

The obtained polymer suspension was mixed with a large amount of mixed solvents of acetone and methanol in 1:1 ratio containing a small amount of hydrochloric acid to precipitate a polymer and filtered by a glass filter and after the solvents were removed, the polymer was washed with methanol. The polymer was vacuum dried at 80° C. for 10 hours to obtain ethylene polymer 28.8 g. The intrinsic viscosity of the obtained ethylene polymer was 0.28 dl/g. The physical properties of the obtained ethylene polymer are given in the table 1.

Example 2

Preparation of a Solid Catalyst Component:

Silica 8.5 kg dried at 200° C. for 3 hours was suspended in toluene 33 liters and then a methylaluminoxane solution (Al=1.42 mol/l) 82.7 liters was added dropwise to the suspension in 30 minutes. Next, the resultant mixture was heated to 115° C. in 1.5 hours and reaction was carried out at the temperature for 4 hours. After that, the reaction liquid was cooled to 60° C. and the supernatant liquid was removed by decantation. The obtained solid catalyst component was washed with toluene three times and then suspended again in toluene to obtain a solid catalyst component (1) (the total volume 150 liters).

The suspension 33 ml of the solid catalyst component (1) obtained thus was transferred to a flask made of glass and further toluene 42 ml and a toluene solution 25 ml containing the compound (C2) (0.002 mmol/ml) were added and the suspension was stirred for 2 hours at a room temperature. The resultant suspension was washed with hexane 50 ml two times and mixed with hexane to give a solid catalyst component (2) in 50 ml of suspension.

Polymerization:

Heptane 0.5 l was charged in a 1 liter autoclave made of a stainless steel and sufficiently purged with nitrogen, heated to 80° C., and the liquid phase and the gas phase were saturated with ethylene. After that, triisobutylaluminum 0.5 mmol and the solid catalyst component (2) 0.0043 mmol in terms of Zr atom were added to carry out polymerization at 8 kg/cm$^2$-G ethylene pressure for 40 minutes.

The obtained polymer suspension was filtered by a glass filter, washed with hexane 500 ml two times and vacuum dried at 80° C. for 10 hours. 126.7 g of ethylene polymer was obtained, and its intrinsic viscosity was 0.59 dl/g. The physical properties of the obtained ethylene polymer are given in the table 1.

Example 3

Polymerization was carried out in the same manner as described in the example 2 except that the compound (C3) was used instead of the compound (C2) and the addition amount was adjusted to be 0.00075 mmol and the polymerization was carried out for 1 hour. 146.1 g of ethylene polymer was obtained, and its intrinsic viscosity was 0.39 dl/g. The physical properties of the obtained ethylene polymer are given in the table 1.

Example 4

Catalyst preparation and polymerization were carried out in the same manner as described in the example 2 except that the compound (C4) was used instead of the compound (C2) and the addition amount was adjusted to be 0.0015 mmol and the polymerization was carried out for 1 hour and the whole pressure was kept at 8 kg/cm$^2$-G by supplying a mixed gas of hydrogen and ethylene (hydrogen/ethylene pressure ratio=0.382) to the system. 33.3 g of ethylene polymer was obtained, and its intrinsic viscosity was 0.82 dl/g. The physical properties of the obtained ethylene polymer are given in the table 1.

Examples 5 to 7

Ethylene polymers were obtained by the same manner as described in the example 4 except that the pressure of ethylene and hydrogen was altered. The physical properties of the ethylene polymers are given in the table 1.

Example 8

Polymerization was carried out in the same manner as described in the example 2 except that the compound (C4) was used instead of the compound (C2) and the addition amount was adjusted to be 0.001 mmol and the polymerization time was changed to 1 hour and 1-hexene 40 ml was added to the system in which the whole pressure was kept at 8 kg/cm$^2$-G by supplying a mixed gas of hydrogen and ethylene (hydrogen/ethylene pressure ratio=0.429) to the system. 133.3 g of ethylene copolymer was obtained, and its intrinsic viscosity was 2.53 dl/g and the content of 1-hexene computed by IR was 0.8 mole %. The physical properties of the obtained ethylene copolymer are given in the table 1.

Example 9

Ethylene copolymer was obtained by the same manner as described in the example 8 except that the pressure of ethylene and hydrogen was altered and the addition amount of 1-hexene was altered. The physical properties of the ethylene copolymer are given in the table 1.

Example 10

After hexane 800 ml was charged in a 2 liter autoclave made of a stainless steel and sufficiently purged with nitrogen and 1-butene 200 ml was further added to the system, the system was heated to 80° C. and the liquid phase and the gas phase were saturated with ethylene. After that, tributylaluminum 1.0 mmol and a solid catalyst component (3) 0.001 mmol in terms of Zr atom which was produced by the same method as described in the solid catalyst component preparation of the example 2 except that the compound (C4) was used instead of the compound (C2) were added to carry out polymerization while the total pressure was kept at 10 kg/cm$^2$-G by supplying a gas mixture of hydrogen and ethylene (hydrogen/ethylene pressure ratio=0.0456) and polymerization was carried out for 1 hour at the pressure.

The obtained polymer suspension was filtered by a glass filter and washed with hexane 500 ml two times and vacuum dried at 80° C. for 10 hours. 130.1 g of ethylene copolymer was obtained, and its intrinsic viscosity was 2.20 dl/g, and the content of 1-butene computed by IR was 1.96 mole %. The physical properties of the obtained ethylene copolymer are given in the table 1.

Examples 11 and 12

Ethylene copolymers were obtained by the same manner as described in the example 10 except that the pressure of ethylene and hydrogen was altered and the addition amount of 1-butene was altered. The physical properties of the obtained ethylene copolymers are given in the table 1.

Example 13

Hexane 50 liter/h, the same solid catalyst component as that used for example 4 in 0.2 mmol/h in terms of Zr atom, triethylaluminum 20 mmol/h, ethylene 5 kg/h and hydrogen 40 N-liter/h were continuously supplied to a 200 liter complete stirred tank reactor and while the contents of the polymerization tank were continuously discharged as to keep the liquid level in the inside of the polymerization tank constant, polymerization was carried out in conditions of polymerization temperature 85° C., reaction pressure 8.5 kg/cm$^2$-G, and the average staying duration 2.5 h. The contents continuously discharged out of the polymerization tank were dried by a solvent separation apparatus to obtain ethylene polymer. The physical properties of the obtained ethylene polymer are given in the table 1.

Example 14

Ethylene polymer was obtained by the same manner as described in example 13 except that the hydrogen supply amount was altered as to obtain ethylene polymer having the intrinsic viscosity given in the table 1. The physical properties of the obtained ethylene polymer are given in the table 1.

Example 15

Ethylene copolymer was obtained by the same manner as described in example 13 except that 1-butene 20 kg/h was supplied and the hydrogen supply amount was altered as to obtain ethylene copolymer having the comonomer amount and the intrinsic viscosity given in the table 1. The physical properties of the obtained ethylene copolymer are given in the table 1.

Comparative Examples 1, 2

Ethylene polymer was obtained by the same manner as described in example 4 except that a Ziegler catalyst described in Japanese Patent No. 821037 and a mixed gas of hydrogen and ethylene was adjusted as to keep MFR as given in the table 1. The physical properties of the obtained ethylene polymer are given in the table 1.

Comparative Example 3

The physical properties of linear low density polyethylene (trade name Evolue SP2040, made by Mitsui Chemicals Inc.) produced using a metallocene catalyst are given in the table 1.

Comparative Example 4

The physical properties of polyethylene (trade name Affinity HF 1030, made by Dow Chemical Co.) which is assumed the produced using a constrained geometric catalyst are given in the table 1.

decantation. The obtained solid catalyst component was washed with toluene three times and then suspended again in toluene to obtain a solid catalyst component (4) (the total volume 150 liters).

The suspension 33 ml of the solid catalyst component (4) obtained thus was transferred to a 200 ml flask made of glass and further toluene 42 ml and a toluene solution 25 ml containing the compound (C4) (0.002 mmol/ml) were added and the suspension was stirred for 2 hours at a room temperature. The resultant suspension was washed with hexane 50 ml two times and mixed with hexane to give a solid catalyst component (5) in 50 ml of suspension.

Polymerization:

Hexane 50 liter/h, the same solid catalyst component (5) 0.2 mmol/h in terms of Zr atom, triethylaluminum 20 mmol/

TABLE 1

| | Type of comonomer | Amount of Comonomer mol % | Methyl branch/ 1000 C. | Hexyl branch/ 1000 C. | [η] dl/g | *1 | MFR g/10 min | Mw/Mn | TREF *2 (%) | TREF *3 (%) | *4 wt % | Tm ° C. | *5 | Density g/cm³ | Amount of decane-soluble component wt % | *6 |
|---|---|---|---|---|---|---|---|---|---|---|---|---|---|---|---|---|
| Example 1 | — | 0.0 | <0.1 | <0.1 | 0.28 | — | — | 1.91 | — | — | — | — | — | 0.984 | — | — |
| Example 2 | — | 0.0 | <0.1 | <0.1 | 0.59 | 0.54 | 600 | 1.95 | — | — | — | — | — | 0.982 | — | — |
| Example 3 | — | 0.0 | <0.1 | <0.1 | 0.39 | — | — | 1.96 | — | — | — | — | — | 0.983 | — | — |
| Example 4 | — | 0.0 | <0.1 | <0.1 | 0.82 | 0.74 | 120 | 3.86 | — | — | — | — | — | 0.981 | — | — |
| Example 5 | — | 0.0 | <0.1 | <0.1 | 1.70 | 1.42 | 4 | 3.83 | — | — | — | — | — | 0.973 | — | — |
| Example 6 | — | 0.0 | <0.1 | <0.1 | 3.30 | 2.66 | 0.15 | 3.76 | — | — | — | — | — | 0.954 | — | — |
| Example 7 | — | 0.0 | <0.1 | <0.1 | 6.56 | — | — | 3.66 | — | — | — | — | — | 0.942 | — | — |
| Example 8 | 1-hexene | 0.8 | <0.1 | <0.1 | 2.53 | 2.15 | 0.46 | 3.68 | — | 6.5 | 5.3 | 125.3 | 127.0 | 0.941 | 0.06 | 0.28 |
| Example 9 | 1-hexene | 2.0 | <0.1 | <0.1 | 2.23 | 2.05 | 0.58 | 3.75 | 2.2 | — | 13.8 | 117.2 | 119.3 | 0.929 | 0.18 | 0.70 |
| Example 10 | 1-butene | 2.0 | <0.1 | <0.1 | 2.20 | 1.92 | 0.83 | 3.61 | 2.9 | — | 14.2 | 116.8 | 119.3 | 0.930 | 0.15 | 0.64 |
| Example 11 | 1-butene | 1.7 | <0.1 | <0.1 | 5.22 | — | — | 3.58 | 4.3 | — | 12.2 | 118.2 | 119.7 | 0.922 | 0.09 | 1.30 |
| Example 12 | 1-butene | 3.6 | <0.1 | <0.1 | 3.60 | 3.18 | 0.06 | 3.78 | 0.4 | — | — | 112.6 | 117.2 | 0.912 | 0.24 | 3.36 |
| Example 13 | — | 0.0 | <0.1 | <0.1 | 1.23 | 1.10 | 15 | 3.82 | — | — | — | — | — | 0.975 | — | — |
| Example 14 | — | 0.0 | <0.1 | <0.1 | 2.24 | 1.92 | 0.82 | 3.72 | — | — | — | — | — | 0.964 | — | — |
| Example 15 | 1-butene | 1.5 | <0.1 | <0.1 | 3.33 | 2.78 | 0.12 | 3.78 | 4.7 | — | 11.3 | 117.3 | 120.0 | 0.935 | 0.12 | 0.43 |
| Comparative Example 1 | — | 0.0 | 0.6 | <0.1 | 0.70 | 0.62 | 300 | 2.92 | — | — | — | — | — | 0.972 | — | — |
| Comparative Example 2 | — | 0.0 | 0.3 | — | 1.83 | 1.72 | 1.45 | 2.64 | — | — | — | — | — | 0.965 | — | — |
| Comparative Example 3 | 1-hexene | 3.0 | 0.6 | <0.1 | 1.49 | 1.42 | 4 | 2.14 | 0.6 | — | — | 117.0 | 118.0 | 0.920 | 0.38 | 1.57 |
| Comparative Example 4 | 1-octene | 0.7 | 0.1 | 3.3 | 1.39 | 1.61 | 2.05 | 2.05 | 0.2 | — | 2.8 | 124.7 | 128.0 | 0.941 | 0.05 | 0.28 |

1 the value of $1.85 \times MFR^{-0.192}$ in the case of MFR < 1 and the value of $1.85 \times MFR^{-0.213}$ in the case of MFR ≧ 1.
2 the amount of components eluted at ≧105° C. in TREF
3 the amount of components eluted at ≧106° C. in TREF
4 the ratio of components dissolved in p-xylene at ≦75° C. to the whole copolymer before dissolution.
5 the value of 135.0 − 10.0K in the case the comonomer amount K = 0.1 to 1.5 mol %; the value of 121.9 − 1.3K in the case the comonomer amount K = 1.5 to 5.5 mol %; and the value of 139.7 − 4.5K in the case the comonomer amount K = 5.5 to 20 mol %.
6 the value of $80 \times \exp(-100 \times (d - 0.88)) + 0.1$ in the case MFR ≦ 10 g/10 min and the value of $80 \times (MFR - 9)^{0.26} \times \exp(-100 \times (d - 0.88)) + 0.1$ in the case MFR > 10 g/10 min.

Example 16

Ethylene polymer was produced using a polymerization apparatus comprising two perfect stirring and mixing type polymerization tanks of each 200 liter capacity and a flash drum connected in series.

Preparation of a Solid Catalyst Component:

Silica 8.5 kg dried at 200° C. for 3 hours was suspended in toluene 33 liters and then a methylaluminoxane solution (Al=1.42 mol/l) 82.7 liters was added dropwise to the suspension in 30 minutes. Next, the resultant mixture was heated to 115° C. in 1.5 hours and reaction was carried out at the temperature for 4 hours. After that, the reaction liquid was cooled to 60° C. and the supernatant liquid was removed by h, ethylene 6 kg/h and hydrogen 110 N-liter/h were continuously supplied to a first polymerization tank and while the contents of the polymerization tank were continuously discharged as to keep the liquid level in the inside of the polymerization tank constant, polymerization was carried out in conditions of polymerization temperature 85° C., reaction pressure 8.5 kg/cm²-G, and the average staying duration 2.5 h.

The contents continuously discharged out of the polymerization tank were treated by a flash drum kept at 0.2 kg/m²-G and 65° C. to substantially remove unreacted ethylene and hydrogen.

After that, together with 20 liter/h and ethylene 5 kg/h, the resultant contents were continuously supplied to a second polymerization tank and successively polymerized in conditions of polymerization temperature 80° C., reaction pressure 7 kg/cm$^2$-G, and the average staying duration 1.5 h.

The contents of the polymerization tank were also continuously discharged out of the second polymerization tank as to keep the liquid level in the inside of the polymerization tank constant and hexane and unreacted monomer were removed from the contents by a solvent separation apparatus and the resultant product was dried to obtain polymer. The analysis results and the physical properties of the obtained polymer are given in the table 2.

Example 17

Polymerization was carried out by the same manner as described in example 16 except that butene 20 kg/h was supplied to the second polymerization tank. The analysis results and the physical properties of the obtained polymer are given in the table 2. The polymerization was so controlled as to keep polymerization ratio at the first polymerization tank: the second polymerization tank=50:50 and the butene content=1.5 mol % in the ethylene copolymer produced in the second polymerization tank. The analysis results and the physical properties of the obtained polymer are given in the table 2.

Example 18

Paraxylene 700 ml, 7 g of mixed polymer samples of ethylene homopolymer (intrinsic viscosity: 0.72 dl/g; Mw/Mn: 3.69; density: 0.981 g/cm$^3$) produced by the similar method as that of example 4 and ethylene-1-butene copolymer (intrinsic viscosity: 5.22 dl/g; 1-butene content: 1.7 mol %; Mw/Mn: 3.58) produced by the same method as that of example 11 in 49:51, and a heat resistant stabilizer (BHT made by Yoshitomi Pharmaceutical, in 0.1% by weight to the polymer samples) were added to a double tubular separable flask which can be heated, the mixture was heated to 130° C. at 2° C./min, kept at 130° C. for 1 hour to obtain a solution of polymer samples dissolved in paraxylene. The solution 3.5 liters was added dropwise in acetone in 1 hour to precipitate polymer and the precipitated polymer was obtained by filtration. The obtained polymer was washed again with acetone and vacuum dried for a whole day and night at 60° C. The analysis results and the physical properties of the obtained ethylene copolymer are given in the table 2.

Comparative Example 5

Polyethylene was obtained by the same manner as described in example 16 except that a metallocene catalyst described on Japanese Patent Laid-Open No. 9-183816 was employed and the pressure of ethylene and hydrogen was altered as to obtain polymer given in the table 2. The physical properties of the polymer are given in the table 2.

Comparative Example 6

The physical properties of high density polyethylene (trade name: Hi-zex 1700J, made by Mitsui Petrochemical Ind. Ltd.) produced using a Ziegler catalyst are given in the table 2.

Comparative Example 7

The physical properties of high density polyethylene (trade name: Hi-zex 7700M, made by Mitsui Petrochemical Ind. Ltd.) produced using a Ziegler catalyst are given in the table 2.

(Tensile Fatigue Test)

A tensile fatigue test was carried out for the ethylene copolymer obtained by example 18 and the high density polyethylene of Comparative Example 7. As the results, the ethylene copolymer obtained by example 18 was ruptured by 500,000 times repeat and the high density polyethylene of Comparative Example 7 was ruptured by 20,000 times repeat.

The tensile fatigue test was carried out as follow.

The ethylene copolymer obtained by example 18 and a stabilizer (Irganox 1010, irgafos 168, and calcium stearate each in 0.1% by weight to the ethylene copolymer) were melted and kneaded at 190° C. and 50 rpm by a Plastomill for 5 minutes and the obtained kneaded mixture was quickly formed into a sheet-like shape by a cold press at 20° C. The obtained sheet-like material was cut into a proper size and press molded at 190° C. to obtain a specimen for the tensile fatigue test using a spacer (30×60 mm) of 6 mm$^t$ thickness. Using a spacer, a product pellet of the high density polyethylene of Comparative Example 7 was press molded to obtain a specimen for the tensile fatigue test by the same manner as described above.

Specimens for the tensile fatigue test were cut into square pillars of 6 mm both in length and width (length 60 mm) to be used as tensile fatigue test specimens. The measurement of the tensile fatigue test (80° C., 0.5 Hz) was carried out according to the method of JIS K 6774.

The evaluation of the results was carried out by obtaining the times to result in rupture of 4 specimens in the conditions equivalent to actual stress about 10 MPa, carrying out logarithmic calculation of the times to result in the rupture, and calculating the times to result in rupture at 10 MPa actual stress by logarithmic approximation using the actual stress as antilogarithm. The higher the number of times is, the more excellent the fatigue property is.

TABLE 2

| | Type of comonomer | Amount of Comonomer mol % | Methyl branch/ 1000 C. | Hexyl branch/ 1000 C. | [η] dl/g | *1 | MFR g/10 min | Mw/ Mn | *2 wt % | *3 wt % | *4 wt % | *5 wt % | *6 wt % | *7 wt % | Density g/cm$^3$ | Amount of C10-soluble component wt % | *8 |
|---|---|---|---|---|---|---|---|---|---|---|---|---|---|---|---|---|---|
| Example 16 | — | 0.0 | <0.1 | <0.1 | 3.36 | 3.29 | 0.05 | 22.5 | — | — | — | — | — | — | 0.968 | — | |
| Example 17 | 1-butene | 0.7 | <0.1 | <0.1 | 3.24 | 3.18 | 0.06 | 21.4 | 0.5 | — | 9.0 | 16.2 | 9.5 | 1.5 | 0.957 | 0.05 | 0.14 |
| Example 18 | 1-butene | 0.6 | <0.1 | <0.1 | 3.01 | — | not measured | 14.8 | — | — | — | — | — | — | 0.950 | — | — |

TABLE 2-continued

| | Type of comonomer | | | | | | | | | | | | | | | |
|---|---|---|---|---|---|---|---|---|---|---|---|---|---|---|---|---|
| Comparative Example 5 | 1-butene | 0.8 | 0.6 | <0.1 | 1.76 | 1.64 | 1.85 | 3.3 | 0.2 | — | 11.1 | 10.5 | 15.3 | 1.6 | 0.952 | 0.06 | 0.16 |
| Comparative Example 6 | — | 0.0 | 0.6 | — | 1.23 | 1.10 | 15 | 6.0 | — | — | — | — | — | — | 0.971 | — | — |
| Comparative Example 7 | 1-butene | 0.8 | 0.3 | <0.1 | 3.34 | 3.29 | 0.05 | 18.3 | 9.7 | — | 20.0 | 46.0 | 20.4 | 9.4 | 0.951 | 0.36 | 0.17 |

| | Equivalent product to ethylene (co)polymer (A2-1) | | | | | | Equivalent product to ethylene (co)polymer (A2-2) | | | | | |
|---|---|---|---|---|---|---|---|---|---|---|---|---|
| | Type of comonomer | Amount of comonomer mol % | Methyl branch/ 1000 C. | Hexyl branch/ 1000 C. | [η] dl/g | Mixing ratio wt % | Type of comonomer | Amount of comonomer mol % | Methyl branch/ 1000 C. | Hexyl branch/1000 C. | [η] dl/g | Mixing ratio wt % |
| Example 16 | — | — | <0.1 | <0.1 | 0.83 | 50 | — | — | <0.1 | <0.1 | 5.89 | 50 |
| Example 17 | — | — | <0.1 | <0.1 | 0.78 | 50 | 1-butene | 0.7 | <0.1 | <0.1 | 5.70 | 50 |
| Example 18 | — | — | <0.1 | <0.1 | 0.72 | 49 | 1-butene | 1.7 | <0.1 | <0.1 | 5.22 | 51 |
| Comparative Example 5 | — | — | 0.8 | <0.1 | 1.20 | 50 | 1-butane | 0.8 | 0.5 | <0.1 | 2.23 | 50 |
| Comparative Example 6 | — | — | 0.4 | <0.1 | — | — | — | — | — | — | — | — |
| Comparative Example 7 | — | — | 0.6 | <0.1 | 0.7 | 50 | 1-butene | 0.8 | 0.2 | <0.1 | 5.93 | 50 |

*1 the value of $1.85 \times MFR^{-0.192}$ in the case of MFR < 1 and the value of $1.85 \times MFR^{-0.213}$ in the case of MFR ≧ 1.
*2 the amount of components with ≧500,000 PE conversion molecular weight measured by GPC-IR in components eluted at ≧105° C. in TREF
*3 the amount of components eluted at ≧105° C. in TREF
*4 the amount of components eluted at ≧106° C. in TREF
*5 the amount of components with ≧10,000 PE conversion molecular weight in components eluted at ≦75° C. in PX
*6 the ratio of components dissolved at ≦75° C. in PX to the whole copolymer before dissolution.
*7 the ratio of components with ≧10,000 PE conversion molecular weight in components eluted at ≦75° C. in PX to the whole copolymer before dissolution.
*8 the value of $80 \times \exp(-100 \times (d - 0.88)) + 0.1$ in the case MFR ≦ 10 g/10 min and the value of $80 \times (MFR - 9)^{0.26} \times \exp(-100 \times (d - 0.88)) + 0.1$ in the case MFR > 10 g/10 min.
Branches of the product equivalent to (A1-2) component; [η] were calculated from the whole value, the value of the product equivalent to (A2-1) component, and the mixed ratio of the product equivalent to (A2-1).

Synthesis 5

Ethanol 40 ml, aniline 0.71 g (7.62 mmol) and 3-tert-butylsalicylaldehyde 1.35 g (7.58 mmol) were charged in a 100 ml reactor sufficiently purged with nitrogen and continuously stirred at a room temperature for 24 hours. The resultant reaction liquid was vacuum concentrated to remove solvents and again mixed with ethanol 40 ml and continuously stirred at a room temperature for 12 hours. The reaction liquid was vacuum concentrated to obtain an orange color oil-state compound 1.83 g (7.23 mmol, production yield 95%) of the following formula (L5).

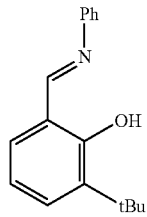

(L5)

$^1$H-NMR(CDCl$_3$): 1.47 (s, 9H), 6.88 (dd, 1H), 7.24-7.31 (m, 4H), 7.38-7.46 (m, 3H), 8.64 (s, 1H), 13.95 (s, 1H). IR(neat): 1575, 1590, 1610 cm$^-$FD mass spectrometry: 253

The compound (L5) 1.53 g (6.04 mmol) and tetrahydrofuran 60 ml were charged in a 200 ml reactor of sufficiently dried and purged with argon, cooled to –78° C., and stirred. To the resultant mixture, n-butyllithium 4.1 ml (1.55 mmol/ml n-hexane solution, 6.34 mmol) was added dropwise in 5 minutes and after that, the resultant mixture was gradually heated to a room temperature and continuously stirred for 4 hours at a room temperature. A mixed solution produced by adding tetrahydrofuran 10 ml to the resultant mixture was added dropwise to 30 ml of a tetrahydrofuran solution which contained ZrCl$_4$ 0.70 g (purity 99.9% grade, 3.02 mmol) and which was cooled to –78° C. The resultant mixture was gradually heated to a room temperature. After being stirred at a room temperature for 2 hours, the resultant mixture was stirred for 4 hours in reflux condition.

The obtained reaction liquid was vacuum concentrated and the precipitated solid was washed with methylene chloride 50 ml and insoluble matter was removed by a glass filter. The filtered liquid was vacuum concentrated and after the precipitated solid was dissolved in diethyl ether 30 ml, the obtained solution was kept still at –20° C. for 1 day under nitrogen atmosphere to precipitate an yellow crystal. The solid is separated by filtration and washed with hexane and then vacuum dried to obtain a phosphorescent yellow crystal compound 1.09 g (1.63 mmol, yield 54%) defined as the following formula (C5).

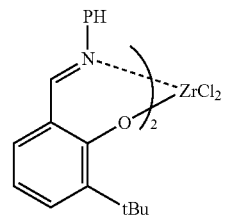

(C5)

Synthesis 6

2-(1-Adamantyl)-4-methyl-phenol 6.19 g (25.28 mmol) and tetrahydrofuran 22 ml were charged in a 100 ml reactor sufficiently dried and purged with argon and ethylmagnesium bromide 28 ml (an ether solution, 0.99 N, 27.81 mmol) was added dropwise at 0° C. in 15 minutes and the resultant mixture was gradually heated to a room temperature and stirred at a room temperature for 1 hour. The resultant reaction liquid was mixed with toluene 170 ml and heated to 100° C. to give a slightly opaque slurry. The slurry was cooled to 50° C. and then mixed with paraformaldehyde 2.00 g (66.7 mmol) and triethylamine 5.3 ml (3.79 mmol) and stirred at 82° C. for 1 hour. After being cooled to a room temperature, the resultant reaction liquid was quenched with 10% hydrochloric acid and the organic layer was concentrated to obtain a solid which was vacuum dried to give an yellow color solid compound 5.78 g (yield 85%) of the following formula (p6).

$^1$H-NMR(CDCl$_3$): 11.6 (s, 1H, OH), 9.8 (s, 1H, CHO), 7.5-7.0 (m, 2H, aryl), 2.3 (s, 3H, Me), 2.2-1.8 (s, 16H, adamantyl).

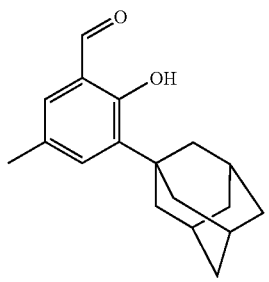

(p6)

The compound (p6) 4.84 g (17.9 mmol), ethanol 145 ml, and tetrahydrofuran 20 ml were charged in a 300 ml reactor sufficiently dried and purged with argon and an ethanol solution (10 ml) containing aniline 1.67 g (17.9 mmol) was added dropwise to the resultant mixture at a room temperature. After being heated to 65° C. and stirred for 7 hours, the resultant mixture was cooled to a room temperature. The resultant mixture was further cooled by acetone-dry ice and the precipitated solid was separated by filtration. The obtained solid was washed with cold methanol and then vacuum dried to obtain an orange color powder 4.00 g (yield 65%) of the following formula (L6).

$^1$H-NMR(CDCl$_3$): 13.7 (s, 1H, OH), 8.6 (s, 1H, N=CH), 7.5-7.0 (m, 7H, aryl), 2.3 (s, 3H, Me), 2.2, 2.1,1.8 (s, 16H, adamantyl). FD-mass spectrometry: 345

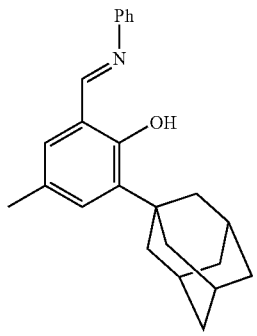

(L6)

The compound (L6) 1.00 g (2.90 mmol) and diethyl ether 20 ml were charged in a 100 ml reactor sufficiently dried and purged with argon, cooled to −78° C., and stirred. To the resultant mixture, n-butyllithium 1.89 ml (a n-hexane solution, 1.61 N, 3.04 mmol) was added dropwise in 10 minutes and after that, the resultant mixture was gradually heated to a room temperature and continuously stirred for 4 hours at a room temperature to produce a lithium salt solution. The solution was added dropwise to 20 ml of a diethyl ether solution which contained zirconium tetrachloride 0.33 g (1.42 mmol) and was cooled to −78° C. On completion of dropwise addition, the resultant mixture was continuously stirred while being gradually heated to a room temperature. The resultant mixture was stirred at a room temperature further for 15 hours and then the solvents of the reaction liquid were evaporated. Insoluble matter was removed from the obtained solid by filtration by a glass filter. The cake was dissolved in dichloromethane 40 ml to remove insoluble matter in the resultant solution and then the solution was vacuum concentrated. The obtained solid was again dissolved in a dichloromethane-hexane mixed solution and the precipitated solid was vacuum dried to obtain an yellow green powder compound 2 0.13 g (yield 11%) of the following formula (C6).

$^1$H-NMR(CDCl$_3$): 8.1 (s, 2H, N=CH), 7.4-6.8 (m, 14H, aryl), 2.4-1.6 (m, 38H, Me and adamantyl). FD-mass spectrometry: 850

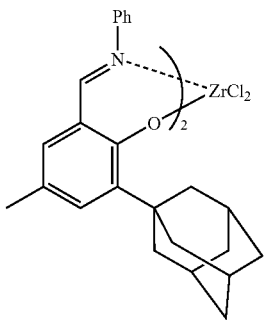

(C6)

Synthesis 7

2-tert-Butyl-4-methoxyphenol 4.51 g (25 mmol) and tetrahydrofuran 22 ml were charged in a 100 ml reactor sufficiently dried and purged with argon and ethylmagnesium bromide 28 ml (an ether solution, 0.99 N, 27.81 mmol) was added dropwise at 0° C. in 15 minutes and the resultant mixture was gradually heated to a room temperature and stirred at a room temperature for 1 hour. The resultant reaction liquid was mixed with toluene 170 ml and heated to 100° C. to give a slightly opaque slurry. The slurry was cooled to 50° C. and then mixed with paraformaldehyde 2.00 g (66.7 mmol) and triethylamine 5.3 ml (3.79 mmol) and stirred at 82° C. for 1 hour. After being cooled to a room temperature, the resultant reaction liquid was quenched with 10% hydrochloric acid and the organic layer was concentrated to obtain a solid which was vacuum dried to give an yellow color solid compound 4.17 g (yield 80%) of the following formula (p7).

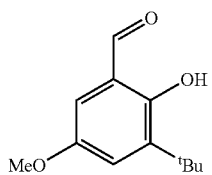

(p7)

The compound (p7) 3.75 g (18 mmol), ethanol 145 ml, and tetrahydrofuran 20 ml were charged in a 300 ml reactor sufficiently dried and purged with argon and an ethanol solution (10 ml) containing aniline 1.67 g (17.9 mmol) was added dropwise to the resultant mixture at a room temperature. After being heated to 65° C. and stirred for 7 hours, the resultant mixture was cooled to a room temperature. The resultant mixture was further cooled by acetone-dry ice and the precipitated solid was separated by filtration. The obtained solid was washed with cold methanol and then vacuum dried to obtain an orange color powder 4.08 g (yield 80%) of the following formula (L7).

$^1$H-NMR(CDCl$_3$): 14.0 (s, 1H, OH), 3.70 (s, 3H), 6.60-7.50 (m, 7H), 8.5 (s, 1H), 13.60 (s, 1H).

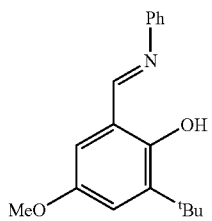

(L7)

The compound (L7) 0.64 g (2.26 mmol) and diethyl ether 20 ml were charged in a 100 ml reactor sufficiently dried and purged with argon, cooled to −78° C., and stirred. To the resultant mixture, n-butyllithium 1.40 ml (a n-hexane solution, 1.61 M, 2.26 mmol) was added dropwise in 5 minutes and after that, the resultant mixture was gradually heated to a room temperature and continuously stirred for 4 hours at a room temperature to produce a lithium salt solution. The solution was added dropwise to 20 ml of a THF solution which contained ZrCl$_4$(THF)$_2$ complex 0.42 g (1.10 mmol) and which was cooled to −78° C. On completion of dropwise addition, the resultant mixture was continuously stirred while being gradually heated to a room temperature. The resultant mixture was stirred at a room temperature further for 15 hours and then the solvents of the reaction liquid were removed. The obtained solid was dissolved in methylene chloride 50 ml and insoluble matter was removed by filtration by a glass filter. The filtered solution was vacuum concentrated and the obtained solid was again precipitated in a dichloromethane-hexane mixture and vacuum dried to obtain an yellow green powder compound 0.25 g (0.34 mmol, yield 31%) of the following formula (C7).

$^1$H-NMR(CDCl$_3$): 1.20-1.60 (m, 18H), 3.66-3.86 (m, 6H), 6.50-7.50 (m, 14H), 805-8.20 (m, 2H). FD-mass spectrometry: 726 (M+) elementary analysis: Zr; 12.4% (12.6).

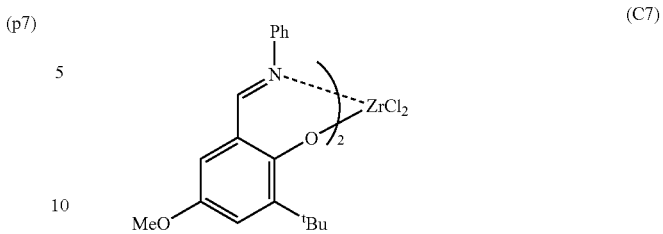

(C7)

Example 19

Heptane 500 ml was charged in a 1 liter autoclave made of a stainless steel and sufficiently purged with nitrogen, heated to 75° C., and the liquid phase and the gas phase were saturated with ethylene. After that, methylaluminoxane 1.25 mmol in terms of aluminum atom and 0.0001 mmol of the compound (C5) synthesized by synthesis 5 were added to carry out polymerization at 8 kg/cm$^2$-G ethylene pressure for 15 minutes.

The obtained polymer suspension was mixed with methanol 1.5 liter containing a small amount of hydrochloric acid to precipitate a polymer and filtered by a glass filter and after the solvents were removed, the polymer was washed with methanol and vacuum dried at 80° C. for 10 hours to obtain ethylene polymer 7.08 g. The same procedure was repeated 7 times and the obtained ethylene polymers were melted and kneaded to give a specimen. The polymers obtained by the respective procedure repeated 7 times were confirmed to be approximately similar to one another by separately measuring their intrinsic viscosity before they were melted and kneaded. The physical measurement results are given in the table 3.

Example 20

Ethylene polymer 8.00 g was obtained by the same manner as described in example 19 except that the compound (C7) synthesized by synthesis 7 was used instead of the compound (C5) and the polymerization temperature was altered to 50° C. The same procedure was repeated 6 times and the obtained ethylene polymers were melted and kneaded to give a specimen. The polymers obtained by the respective procedure repeated 6 times were confirmed to be approximately similar to one another by separately measuring their intrinsic viscosity before they were melted and kneaded. The physical measurement results are given in the table 3.

Example 21

Ethylene polymer 12.25 g was obtained by the same manner as described in example 19 except that the compound (C6) synthesized by synthesis 6 was used instead of the compound (C5) and the addition amount of compound (C6) was altered to be 0.00005 mmol and the polymerization temperature was altered to 50° C. The same procedure was repeated 4 times and the obtained ethylene polymers were melted and kneaded to give a specimen. The polymers obtained by the respective procedure repeated 4 times were confirmed to be approximately similar to one another by separately measuring their intrinsic viscosity before they were melted and kneaded. The physical measurement results are given in the table 3.

Example 22

Heptane 400 ml and 1-butene 100 ml were charged in a 1 liter autoclave made of a stainless steel purged with nitrogen and then pressurized by ethylene at 8 kg/cm$^2$-G total pressure. After that the polymerizer was heated to 75° C. and to the polymerizer, methylaluminoxane 1.25 mmol in terms of aluminum atom and 0.0001 mmol of the compound (C5) synthesized by synthesis 5 were added to carry out polymerization for 15 minutes.

After polymerization was stopped by a small amount of isobutyl alcohol, the obtained polymer suspension was mixed with methanol 1.5 liter containing a small amount of hydrochloric acid to precipitate a polymer. The precipitated polymer was separated by filtration by a glass filter and after the solvents were removed, the polymer was washed with methanol and vacuum dried at 80° C. for 10 hours. The obtained ethylene polymer was 5.68 g and the intrinsic viscosity was 2.05 dl/g. The content of 1-butene measured by IR was 2.20 mol % and the molecular weight distribution (Mw/Mn) measured by GPC was 15.36. The physical measurement results are given in the table 3.

Example 23

Polymerization was carried out by the same manner as described in example 22 except that the compound (C6) synthesized by synthesis 6 was used instead of the compound (C5). As a result, ethylene copolymer 6.40 g was obtained and the intrinsic viscosity was 4.86 dl/g. The content of 1-butene measured by IR was 2.01 mol % and the molecular weight distribution (Mw/Mn) measured by GPC was 57.22. The physical measurement results are given in the table 3.

Example 24

Polymerization was carried out by the same manner as described in example 22 except that the compound (C7) synthesized by synthesis 7 was used instead of the compound (CS) and the amounts of heptane and 1-butene were altered to 420 ml and 80 ml, respectively, and the polymerization temperature was altered to 50° C. As a result, ethylene copolymer 16.10 g was obtained and the intrinsic viscosity was 2.52 dl/g. The content of 1-butene measured by IR was 2.16 mol % and the molecular weight distribution (Mw/Mn) measured by GPC was 10.50. The physical measurement results are given in the table 3.

Comparative Example 8

Physical measurement was carried out for a high density polyethylene (trade name: Hi-zex 8200B, made by Mitsui Petrochemical Ind. Ltd.). The results are given in the tables 3 to 5.

Comparative Example 9

Physical measurement was carried out for a high density polyethylene (trade name: Hi-zex 7700M, made by Mitsui Petrochemical Ind. Ltd.). The results are given in the tables 3 to 5.

Comparative Example 10

Physical measurement was carried out for a high density polyethylene (trade name: Hi-zex 5000H, made by Mitsui Petrochemical Ind. Ltd.). The results are given in the tables 3 to 5.

Comparative Example 11

Physical measurement was carried out for a high density polyethylene (trade name: Hi-zex 7000F, made by Mitsui Petrochemical Ind. Ltd.). The results are given in the tables 3 to 5.

TABLE 3

| | [η] dl/g | *1 | MFR g/10 min | MT g | Log MT | *2 | SR — | *3 |
|---|---|---|---|---|---|---|---|---|
| Example 19 | 2.62 | 2.32 | 0.31 | 9.8 | 1.0 | 0.4 | 1.75 | 1.64 |
| Example 20 | 5.50 | 5.34 | 0.004 | 40.0 | 1.6 | 0.9 | 1.68 | 1.55 |
| Example 21 | 2.82 | 2.25 | 0.36 | 12.2 | 1.1 | −0.4 | 1.86 | 1.77 |
| Example 22 | 2.05 | 1.84 | 1.02 | 7.0 | 0.8 | 0.2 | 1.78 | 1.71 |
| Example 23 | 4.86 | 3.99 | 0.019 | 29.0 | 1.5 | 0.8 | 1.69 | 1.61 |
| Example 24 | 2.52 | 2.12 | 0.49 | 8.3 | 0.9 | −0.4 | 1.86 | 1.79 |
| Comparative Example 8 | 3.80 | 3.63 | 0.03 | 20.0 | 1.3 | 2.4 | 1.47 | 1.55 |
| Comparative Example 8 | 3.45 | 3.92 | 0.02 | 16.0 | 1.2 | 2.6 | 1.44 | 1.53 |
| Comparative Example 10 | 3.31 | 2.83 | 0.11 | 13.0 | 1.1 | 2.4 | 1.47 | 1.54 |
| Comparative Example 11 | 3.35 | 3.43 | 0.04 | 17.8 | 1.3 | 3.0 | 1.39 | 1.50 |

| | Mn ×10$^{-4}$ | Mw ×10$^{-5}$ | Mw ×10$^{-6}$ | Mw/Mn | Mz/Mw | *4 | *5 | *6 | The number of Terminating vinyl/1 molecular chain | Film fish eye |
|---|---|---|---|---|---|---|---|---|---|---|
| Example 19 | 1.16 | 1.59 | 1.94 | 13.73 | 12.21 | 11.68 | 15.90 | 22.88 | 0.62 | none |
| Example 20 | 0.45 | 2.32 | 3.47 | 51.97 | 14.95 | 7.83 | 8.58 | 9.64 | 0.61 | none |
| Example 21 | 1.01 | 0.92 | 0.82 | 9.10 | 8.97 | 17.69 | 29.95 | 712.00 | 0.80 | none |
| Example 22 | 0.76 | 1.16 | 1.55 | 15.36 | 13.35 | 10.90 | 14.34 | 19.07 | 0.60 | none |
| Example 23 | 0.31 | 1.75 | 2.72 | 57.22 | 15.52 | 7.74 | 8.43 | 9.46 | 0.60 | none |
| Example 24 | 0.82 | 0.86 | 0.85 | 10.50 | 9.90 | 14.70 | 22.50 | 54.93 | 0.78 | none |
| Comparative Example 8 | 1.58 | 2.27 | 1.77 | 14.40 | 7.80 | 11.33 | 15.18 | 21.04 | 0.07 | exist |
| Comparative | 1.35 | 2.45 | 2.38 | 18.20 | 9.90 | 10.03 | 12.63 | 15.65 | 0.14 | — |

TABLE 3-continued

| | | | | | | | | | | |
|---|---|---|---|---|---|---|---|---|---|---|
| Example 9 | | | | | | | | | | |
| Comparative Example 10 | 1.09 | 2.42 | 2.60 | 22.10 | 10.80 | 9.32 | 11.29 | 13.37 | 0.05 | — |
| Comparative Example 11 | 0.73 | 2.84 | 2.21 | 30.30 | 5.90 | 8.55 | 9.88 | 11.31 | 0.09 | none |

*1 the value of $1.85 \times MFR^{-0.192}$ in the case of MFR < 1 and the value of $1.85 \times MFR^{-0.213}$ in the case of MFR ≧ 1.
*2 the value of $12.9 - 7.15 \times SR$
*3 the value of $4.55 - 0.56 \times Log(Mw)$
*4 the value of $7/(1 - 5.5(Mw/Mn))$
*5 the value of $5/(0.7 - 6.45(Mw/Mn) + 3))$
*6 the value of $4/(0.5 - 4.40(Mw/Mn) - 0.2))$

Example 25

Heptane 500 ml was charged in a 1 liter autoclave made of a stainless steel and sufficiently purged with nitrogen, heated to 50° C., and the liquid phase and the gas phase were saturated with ethylene. After that, methylaluminoxane 1.25 mmol in terms of aluminum atom and 0.0001 mmol of the compound (C7) synthesized by synthesis 7 were added to carry out polymerization at 8 kg/cm²-G ethylene pressure for 15 minutes.

The obtained polymer suspension was mixed with methanol 1.5 liter containing a small amount of hydrochloric acid to precipitate a polymer and filtered by a glass filter and after the solvents were removed, the polymer was washed with methanol and vacuum dried at 80° C. for 10 hours to obtain ethylene polymer 8.00 g. The same procedure was repeated 6 times and the obtained ethylene polymers were melted and kneaded to give a specimen. The polymers obtained by the respective procedure repeated 6 times were confirmed to be approximately similar to one another by separately measuring their intrinsic viscosity before they were melted and kneaded. The physical measurement results are given in the table 4.

Example 26

Heptane 400 ml and 1-butene 100 ml were charged in a 1 liter autoclave made of a stainless steel and sufficiently purged with nitrogen and then pressurized by ethylene at 8 kg/cm²-G total pressure. After that the polymerizer was heated to 75° C. and to the polymerizer, methylaluminoxane 1.25 mmol in terms of aluminum atom and 0.0001 mmol of the compound (C7) synthesized by synthesis 7 were added to carry out polymerization for 15 minutes.

After polymerization was stopped by a small amount of isobutyl alcohol, the obtained polymer suspension was mixed with methanol 1.5 liter containing a small amount of hydrochloric acid to precipitate a polymer. The precipitated polymer was separated by filtration by a glass filter and after the solvents were removed, the polymer was washed with methanol and vacuum dried at 80° C. for 10 hours. The obtained polymer was 6.40 g and the intrinsic viscosity was 4.86 dl/g. The content of 1-butene measured by IR was 2.01 mol % and the molecular weight distribution (Mw/Mn) measured by GPC was 57.22. The physical measurement results are given in the table 4.

TABLE 4

| | Mn ×10⁻⁴ | Mw ×10⁻⁵ | Mw ×10⁻⁶ | Mw/Mn — | Mz/Mw — | *1 | [η] dl/g | *2 | MFR g/10 min |
|---|---|---|---|---|---|---|---|---|---|
| Example 25 | 0.45 | 2.32 | 3.47 | 51.97 | 14.95 | 9.64 | 5.50 | 5.34 | 0.004 |
| Example 26 | 0.31 | 1.75 | 2.72 | 57.22 | 15.52 | 9.46 | 4.86 | 3.99 | 0.019 |
| Comparative Example 8 | 1.58 | 2.27 | 1.77 | 14.40 | 7.80 | 21.04 | 3.80 | 3.63 | 0.03 |
| Comparative Example 9 | 1.35 | 2.45 | 2.38 | 18.20 | 9.90 | 15.65 | 3.45 | 3.92 | 0.02 |
| Comparative Example 10 | 1.09 | 2.42 | 2.60 | 22.10 | 10.80 | 13.37 | 3.31 | 2.83 | 0.11 |
| Comparative Example 11 | 0.73 | 2.84 | 2.21 | 30.30 | 5.90 | 11.31 | 3.35 | 3.43 | 0.04 |

| | MT g | Log MT | *3 | SR — | *4 | $W_1/W_2$ | Molecular weight distribution curve pattern | The number of terminating vinyl/1 molecular chain | Film fish eye |
|---|---|---|---|---|---|---|---|---|---|
| Example 25 | 40.0 | 1.6 | 0.9 | 1.68 | 1.55 | — | 1 relative maximum value, broad shoulder | 0.61 | none |
| Example 26 | 29.0 | 1.5 | 0.8 | 1.69 | 1.61 | — | 1 relative maximum value, broad shoulder | 0.60 | none |
| Comparative Example 8 | 20.0 | 1.3 | 2.4 | 1.47 | 1.55 | — | 1 relative maximum value, shoulder in the low molecular weight side | 0.07 | exist |

TABLE 4-continued

| | | | | | | | | | |
|---|---|---|---|---|---|---|---|---|---|
| Comparative Example 9 | 16.0 | 1.2 | 2.6 | 1.44 | 1.53 | — | 1 relative maximum value, shoulder in the high molecular weight side | 0.14 | — |
| Comparative Example 10 | 13.0 | 1.1 | 2.4 | 1.47 | 1.54 | 0.99 | 2 relative maximum values | 0.05 | — |
| Comparative Example 11 | 17.8 | 1.3 | 3.0 | 1.39 | 1.50 | 0.88 | 2 relative maximum values | 0.09 | none |

*1 the value of $4/(0.5 - 4.50(Mw/Mn) - 0.2))$
*2 the value of $1.85 \times MFR^{-0.192}$ in the case of MFR < 1 and the value of $1.85 \times MFR^{-0.213}$ in the case of MFR ≧ 1.
*3 the value of $12.9 - 7.15 \times SR$
*4 the value of $4.55 - 0.56 \times Log(Mw)$

Example 27

Heptane 500 ml was charged in a 1 liter autoclave made of a stainless steel and sufficiently purged with nitrogen, heated to 50° C., and the liquid phase and the gas phase were saturated with ethylene. After that, methylaluminoxane 1.25 mmol in terms of aluminum atom and 0.0005 mmol of the compound (C6) synthesized by synthesis 6 were added to carry out polymerization at 8 kg/cm²-G ethylene pressure for 15 minutes.

The obtained polymer suspension was mixed with methanol 1.5 liter containing a small amount of hydrochloric acid to precipitate a polymer and filtered by a glass filter and after the solvents were removed, the polymer was washed with methanol and vacuum dried at 80° C. for 10 hours to obtain ethylenic polymer 12.25 g. The same procedure was repeated 6 times and the obtained ethylenic polymers were melted and kneaded to give a specimen. The polymers obtained by the respective procedure repeated 6 times were confirmed to be approximately similar to one another by separately measuring their intrinsic viscosity before they were melted and kneaded. The physical measurement results are given in the table 5.

Example 28

Heptane 420 ml and 1-butene 80 ml were charged in a 1 liter autoclave made of a stainless steel and sufficiently purged with nitrogen and then pressurized by ethylene at 8 kg/cm²-G total pressure. After that the polymerizer was heated to 50° C. and to the polymerizer, methylaluminoxane 1.25 mmol in terms of aluminum atom and the compound (C6) synthesized by synthesis 6 0.0001 mmol were added to carry out polymerization for 15 minutes.

After polymerization was stopped by a small amount of isobutyl alcohol, the obtained polymer suspension was mixed with methanol 1.5 liter containing a small amount of hydrochloric acid to precipitate a polymer. The precipitated polymer was separated by filtration by a glass filter and after the solvents were removed, the polymer was washed with methanol and vacuum dried at 80° C. for 10 hours. The obtained polymer was 16.10 g and the intrinsic viscosity was 2.52 dl/g. The content of 1-butene measured by IR was 2.16 mol % and the molecular weight distribution (Mw/Mn) measured by GPC was 10.50. The physical measurement results are given in the table 5.

TABLE 5

| | $W_1/W_2$ — | Molecular weight distribution curve pattern | [η] dl/g | *1 | MFR g/10 min | MT g | Log MT | *2 | SR — | *3 |
|---|---|---|---|---|---|---|---|---|---|---|
| Example 27 | 0.79 | 2 relative maximum values | 2.82 | 2.25 | 0.36 | 12.2 | 1.1 | −0.4 | 1.86 | 1.77 |
| Example 28 | 0.76 | 2 relative maximum values | 2.52 | 2.12 | 0.49 | 8.3 | 0.9 | −0.4 | 1.86 | 1.79 |
| Comparative Example 8 | — | 1 relative maximum value, shoulder in the low molecular weight side | 3.80 | 3.63 | 0.03 | 20.0 | 1.3 | 2.4 | 1.47 | 1.55 |
| Comparative Example 9 | — | 1 relative maximum value, shoulder in the high molecular weight side | 3.45 | 3.92 | 0.02 | 16.0 | 1.2 | 2.6 | 1.44 | 1.53 |
| Comparative Example 10 | 0.99 | 2 relative maximum values | 3.31 | 2.83 | 0.11 | 13.0 | 1.1 | 2.4 | 1.47 | 1.54 |
| Comparative Example 11 | 0.88 | 2 relative maximum values | 3.35 | 3.43 | 0.04 | 17.8 | 1.3 | 3.0 | 1.39 | 1.50 |

| | Mn ×10⁻⁴ | Mw ×10⁻⁵ | Mz ×10⁻⁶ | Mw/Mn — | Mz/Mw — | *4 | *5 | *6 | The number of terminating vinyl/1 molecular chain | Film fish eye |
|---|---|---|---|---|---|---|---|---|---|---|
| Example 27 | 1.01 | 0.92 | 0.82 | 9.10 | 8.97 | 17.69 | 29.95 | 712.00 | 0.80 | none |
| Example 28 | 0.82 | 0.86 | 0.85 | 10.50 | 9.90 | 14.70 | 22.50 | 54.93 | 0.78 | none |
| Comparative Example 8 | 1.58 | 2.27 | 1.77 | 14.40 | 7.80 | 11.33 | 15.18 | 21.04 | 0.07 | exit |

TABLE 5-continued

| | | | | | | | | | |
|---|---|---|---|---|---|---|---|---|---|
| Comparative Example 9 | 1.35 | 2.45 | 2.38 | 18.20 | 9.90 | 10.03 | 12.63 | 15.65 | 0.14 | — |
| Comparative Example 10 | 1.09 | 2.42 | 2.60 | 22.10 | 10.80 | 9.32 | 11.29 | 13.37 | 0.05 | — |
| Comparative Example 11 | 0.73 | 2.84 | 2.21 | 30.30 | 5.90 | 8.55 | 9.88 | 11.31 | 0.09 | none |

*1 the value of $1.85 \times MFR^{-0.192}$ in the case of MFR < 1 and the value of $1.85 \times MFR^{-0.213}$ in the case of MFR ≧ 1.
*2 the value of $12.9 - 7.15 \times SR$
*3 the value of $4.55 - 0.56 \times Log(Mw)$
*4 the value of $7/(1 - 5.5(Mw/Mn))$
*5 the value of $5/(0.7 - 6.45(Mw/Mn) + 3))$
*6 the value of $4/(0.5 - 4.40(Mw/Mn) - 0.2))$

We claim:

1. A graft-modified ethylene (co)polymer (A1-1) produced by graft-modification of an ethylene (co)polymer (A1) with a polar group-containing monomer, wherein said ethylene (co)polymer (A1) being either an ethylene homopolymer or a copolymer of ethylene and an α-olefin of 4 to 20 carbon atoms, wherein ($i_{A1}$) the ethylene (co)polymer contains methyl branches less than 0.1 in number per 1,000 carbon atoms measured by $^{13}$C-NMR, and ($ii_{A1}$) the ethylene (co)polymer has a ratio of Mw/Mn (Mw denotes the weight average molecular weight; Mn denotes the number average molecular weight) measured by gel permeation chromatography is not lower than 1.8 and lower than 4.5.

2. The graft-modified ethylene (co)polymer (A1-1) according to claim 1, wherein the ethylene (co)polymer (A1) has ($iii_{A1}$) an intrinsic viscosity measured at 124° C. in decalin is within a range of 0.2 to 18 dl/g.

3. The graft-modified ethylene (co)polymer (A1-1) according to claim 1 or 2, wherein said ethylene (co)polymer (A1) has a feature of ($iv_{A1}$) the intrinsic viscosity [η] in dl/g and the density d in g/cm$^3$ satisfy the following relation:

d≧0.0003×[η]$^2$−0.0121×[η]+0.9874; in the case the intrinsic viscosity measured at 135° C. in decalin is 0.3 to 1.5 dl/g.

4. The graft-modified ethylene (co)polymer (A1-1) according to claim 1 or 2, wherein said ethylene (co)polymer (A1) has a feature of ($v_{A1}$) the intrinsic viscosity [η] in dl/g measured at 135° C. in decalin and the melt flow rate MFR in g/10 minutes measured under 2.16 kg load at 190° C. satisfy the following relations:

[η]>1.85×MFR$^{-0.192}$ when MFR<1, and
[η]>1.85×MFR$^{-0.213}$ when MFR≧1.

5. The graft-modified ethylene (co)polymer (A1-1) according to claim 1 or 2, wherein said ethylene (co)polymer (A1) has a feature of ($vi_{A1}$) when the comonomer content is 1.5 mole % or higher, an amount of components eluted at 105° C. or higher in a heating elution separation test is not more than 5% by weight; and when the comonomer content is less than 1.5 mole %, an amount of components eluted at 106° C. or higher in a heating elution separation test are not more than 8% by weight.

6. The graft-modified ethylene (co)polymer (A1-1) according to claim 1 or 2, wherein said ethylene (co)polymer (A1) has a feature of ($vii_{A1}$) the components are precipitated at 15% by weight or lower when said ethylene (co)polymer is dissolved in p-xylene at 130° C., then cooled to 75° C., and finally the dissolved components are precipitated in a poor solvent.

7. The graft-modified ethylene (co)polymer (A1-1) according to claim 1 or 2, wherein said ethylene (co)polymer (A1) has a feature of ($viii_{A1}$) the % by weight W of the decane-soluble components at 23° C. and the density d in g/cm$^3$ satisfy the following relations:

W<80×exp(−100×(d−0.88))+0.1 when MFR≦10 g/10 minutes; and

W<80×(MFR−9)$^{0.26}$×exp(−100×(d−0.88))+0.1 when MFR>10 g/10 minutes.

8. The graft-modified ethylene (co)polymer (A1-1) according to claim 1 or 2, wherein said ethylene (co)polymer (A1) has a feature of ($ix_{A1}$) the α-olefin content K in mole % and the melting point Tm in ° C. of the highest peak of an endothermic curve measured by a differential scanning calorimeter satisfy the following relations:

Tm≦135.0−10.0K in the case K=0.1 to 1.5 mole %;
Tm≦121.9−1.3K in the case K=1.5 to 5.5 mole %; and
Tm≦139.7−4.5K in the case K=5.5 to 20 mole %.

9. The graft-modified ethylene (co)polymer (A1-1) according to claim 1 or 2, wherein said ethylene (co)polymer (A1) has a feature of ($x_{A1}$) the number of branches having a length equivalent to that of hexyl or longer measured by $^{13}$C-NMR is less than 0.1 per 1,000 of carbon atoms.

10. The graft-modified ethylene (co)polymer (A1-1) according to claim 1 or 2, wherein said ethylene (co)polymer (A1) is a copolymer of ethylene and 1-butene.

11. The graft-modified ethylene (co)polymer (A1-1) according to claim 1 or 2, wherein said ethylene (co)polymer (A1) is a copolymer of ethylene and 1-hexene.

12. The graft-modified ethylene (co)polymer (A1-1) according to claim 1 or 2, wherein said ethylene (co)polymer (A1) is produced by either homopolymerization of ethylene or copolymerization of ethylene and α-olefin of 4 to 20 carbon atoms in the presence of an olefin polymerization catalyst comprising:

(a1) a transition metal compound of the following general formula (I)

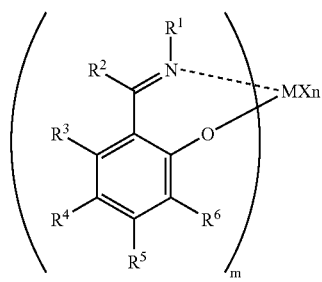

wherein M denotes a transition metal atom selected from the group IV and the group V of the periodic table;

m denotes 1 or 2;

$R^1$ denotes an aliphatic hydrocarbon group of 5 or more carbon atoms in total which may have alicyclic hydrocarbon group substituents or alicyclic hydrocarbon group of 7 or more carbon atoms in total which may be aromatic hydrocarbon group or aliphatic hydrocarbon group substituents;

$R^2$ to $R^5$ may be the same or different to one another and each denotes a hydrogen atom, a hydrocarbon group, a hydrocarbon group-substituted silyl, an oxygen-containing group, a nitrogen-containing group, or a sulfur-containing group and two or more of $R^2$ to $R^5$ may be bonded to one another to form a ring;

$R^6$ denotes a hydrocarbon group or a hydrocarbon-substituted silyl group;

in the case m is 2, at least one of the groups denoted as $R^2$ to $R^6$ belonging to any one of the ligands may be bonded to at least one of the groups denoted as $R^2$ to $R^6$ belonging to another ligand;

in the case m is 2, two of $R^1$, two of $R^2$, two of $R^3$, two of $R^4$, two of $R^5$, and two of $R^6$ may be the same or different to one another, and at least one of the groups $R^2$ to $R^6$ on ligand may be bonded to at least one of the groups $R^2$ to $R^6$ on another ligand;

n denotes a number satisfying the valence of M;

X denotes a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue group, a silicon-containing group, a germanium-containing group, or a tin-containing group; in the case n is 2 or higher, each X may be the same or different to one another and each X may be bonded to one another to form a ring; and optionally (b) at least one compound selected from the group consisting of:

(b-1) an organometallic compound, (b-2) an organoaluminum oxy compound, and (b-3) a compound capable of forming ion pairs by reaction on the transition metal compound.

13. A graft-modified ethylene (co)polymer (A2-1) produced by graft-modification of an ethylene (co)polymer (A2) with a polar group-containing monomer, wherein said ethylene (co)polymer (A2) being either an ethylene homopolymer or a copolymer of ethylene and an α-olefin of 4 to 20 carbon atoms, wherein ($i_{A2}$) the ethylene (co)polymer contains methyl branches less than 0.1 in number per 1,000 carbon atoms measured by $^{13}$C-NMR, and ($ii_{A2}$) the ethylene (co)polymer has Mw/Mn (Mw denotes the weight average molecular weight; Mn denotes the number average molecular weight) measured by gel permeation chromatography not lower than 4.5 and not higher than 60.

14. The graft-modified ethylene (co)polymer (A2-1) according to claim 13, wherein said ethylene (co)polymer (A2) has a feature of ($iii_{A2}$) the intrinsic viscosity measured at 135° C. in decalin is within a range of 0.2 to 18 dl/g.

15. The graft-modified ethylene (co)polymer (A2-1) according to claim 13 or 14, wherein said ethylene (co)polymer (A2) has a feature of ($iv_{A2}$) the intrinsic viscosity ([η]) (dl/g)) measured in 135° C. decalin and the melt flow rate (MFR (g/10 minutes)) measured under 2.16 kg load at 190° C. satisfy the following relations;

[η]>1.85×MFR$^{-0.192}$ in the case of MFR<1 and

[η]>1.85×MFR$^{-0.213}$ in the case of MFR≧1.

16. The graft-modified ethylene (co)polymer (A2-1) according to claim 13 or 14, wherein said ethylene (co)polymer (A2) has a feature of ($v_{A2}$) the components having a molecular weight of 500,000 reduced to polyethylene measured by GPC-IR are not more than 5% by weight in the components eluted at 105° C. or higher in a heating elution separation test.

17. The graft-modified ethylene (co)polymer (A2-1) according to claim 13 or 14, wherein said ethylene (co)polymer (A2) has a feature of ($vi_{A2}$) the components eluted at 105° C. or higher in a heating elution separation test are not more than 5% by weight in the case the comonomer content is 1.5 mole % or higher and the components eluted at 106° C. or higher in a heating elution separation test are not more than 8% by weight in the case the comonomer content is less than 1.5 mole %.

18. The graft-modified ethylene (co)polymer (A2-1) according to claim 13 or 14, wherein said ethylene (co)polymer (A2) has a feature of ($vii_{A2}$) the components having a molecular weight of 10,000 or more reduced to polyethylene measured by GPC-IR among components obtained by dissolution of the ethylene (co)polymer in p-xylene at 130° C. and successive precipitation of the dissolved components by cooling to 75° C. in a poor solvent are not more than 30% by weight in the precipitated components.

19. The graft-modified ethylene (co)polymer (A2-1) according to claim 13 or 14, wherein said ethylene (co)polymer (A2) has a feature of ($viii_{A2}$) the components obtained by dissolution of the ethylene (co)polymer in p-xylene at 130° C. and successive precipitation of the dissolved components by cooling to 75° C. in a poor solvent are not more than 15% in whole ethylene (co) polymer.

20. The graft-modified ethylene (co)polymer (A2-1) according to claim 13 or 14, wherein said ethylene (co)polymer (A2) has a feature of ($ix_{A2}$) the components having a molecular weight of 10,000 or more reduced to polyethylene measured by GPC-IR among components precipitated by dissolution of the ethylene (co)polymer in p-xylene at 130° C. and successive precipitation of the dissolved components by cooling to 75° C. in a poor solvent are not more than 5% in whole ethylene (co) polymer.

21. The graft-modified ethylene (co)polymer (A2-1) according to claim 13 or 14, wherein said ethylene (co)polymer (A2) has a feature of
($x_{A2}$) the decane-soluble components (W (% by weight)) at 23° C. and the density (d (g/cm³)) satisfy the following relations;
$W<80\times\exp(-100\times(d-0.88))+0.1$ in the case $MFR\leq10$ g/10 minutes and
$W<80\times(MFR-9)^{0.26}\times\exp(-100\times(d-0.88))+0.1$ in the case $MFR>10$ g/10 minutes.

22. The graft-modified ethylene (co)polymer (A2-1) according to claim 13 or 14, wherein said ethylene (co)polymer (A2) has a feature of ($xi_{A2}$) the number of branches having a length equivalent to that of hexyl or longer measured by $^{13}$C-NMR is less than 0.1 per 1,000 of carbon atoms.

23. The graft-modified ethylene (co)polymer (A2-1) according to claim 13 or 14, wherein said ethylene (co)polymer (A2) has a feature of
($xii_{A2}$) the ratio Mw/Mn of the weight average molecular weight (Mw) and the number average molecular weight (Mn) calculated from the logarithmic normal distribution produced by distributing molecular weight distribution curves measure by gel permeation chromatography to two same logarithmic normal distribution curves is within a range of 3 to 8.

24. The graft-modified ethylene (co)polymer (A2-1) according to claim 13 or 14, wherein said ethylene (co)polymer (A2) has a feature of
($xiii_{A2}$) components to be eluted at 109° C. or higher in a heating elution separation test exist and the intrinsic viscosity ([η] (dl/g)) thereof measured at 135° C. in decalin and the density (d (g/cm³)) of said components satisfy the following relation;
$d\geq0.0003\times[\eta]^2-0.0121\times[\eta]+0.9874$.

25. The graft-modified ethylene (co)polymer (A2-1) according to claim 13 or 14, wherein said ethylene (co)polymer (A2) is a copolymer of ethylene and 1-butene.

26. The graft-modified ethylene (co)polymer (A2-1) according to claim 13 or 14, wherein said ethylene (co)polymer (A2) is a copolymer of ethylene and 1-hexene.

27. The graft-modified ethylene (co)polymer (A2-1) according to claim 13 or 14, wherein said ethylene (co)polymer (A2) comprises:
(A2-x) either ethylene homopolymer or a copolymer of ethylene and an α-olefin of 4 to 20 carbon atoms, having
($i_{A2-x}$) the intrinsic viscosity ($[\eta]_{A2-x}$) measured at 135° C. in decalin is within a range of 0.3 to 2.5 dl/g,
($ii_{A2-x}$) the number of methyl branches measured by $^{13}$C-NMR is less than 0.1 per 1,000 of carbon atoms, and
($iii_{A2-x}$) Mw/Mn (Mw denotes the weight average molecular weight; Mn denotes the number average molecular weight) measured by gel permeation chromatography within a range of 3 to 8, and
(A2-y) either ethylene homopolymer or a copolymer of ethylene and an α-olefin of 4 to 20 carbon atoms, having
($i_{A2-y}$) the intrinsic viscosity ($[\eta]_{A2-y}$) measured at 135° C. in decalin within a range of 2.0 to 20 dl/g, and
($ii_{A2-y}$) the number of methyl branches measured by $^{13}$C-NMR less than 0.1 per 1,000 of carbon atoms;
wherein a relation between the intrinsic viscosity ($[\eta]A_{2-x}$) of said ethylene (co)polymer (A2-x) and the intrinsic viscosity ($[\eta]_{A2-y}$) of said ethylene (co)polymer (A2-y) satisfy $[\eta]_{A2-x}<[\eta]_{A2-y}$ and the ethylene (co)polymer contains 10 to 90 parts by weight of said ethylene (co)polymer (A2-x) and 10 to 90 parts by weight of said ethylene (co)polymer (A2-y), where (A2-x)+(A2-y)=100 parts by weight.

28. The graft-modified ethylene (co)polymer (A2-1) according to claim 27, wherein said ethylene (co)polymer (A2-x) satisfies the following relation between the intrinsic viscosity ([η] (dl/g)) and the density (d (g/cm³));
$d\geq0.0003\times[\eta]^2-0.0121\times[\eta]+0.9874$; in the case the intrinsic viscosity measured at 135° C. in decalin is 0.3 to 1.5 dl/g.

* * * * *